US007462126B2

(12) United States Patent
Fukuyama et al.

(10) Patent No.: US 7,462,126 B2
(45) Date of Patent: Dec. 9, 2008

(54) VEHICULAR AUTOMATIC TRANSMISSION

(75) Inventors: Satoshi Fukuyama, Anjo (JP); Toshihiko Aoki, Anjo (JP); Minoru Todo, Anjo (JP); Kazuhisa Ozaki, Anjo (JP); Takuya Fujimine, Anjo (JP); Takuya Ishii, Anjo (JP); Tomochika Inagaki, Anjo (JP); Yousuke Andoh, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 254 days.

(21) Appl. No.: 10/570,624

(22) PCT Filed: Sep. 10, 2004

(86) PCT No.: PCT/JP2004/013250

§ 371 (c)(1), (2), (4) Date: Mar. 3, 2006

(87) PCT Pub. No.: WO2005/026579

PCT Pub. Date: Mar. 24, 2005

(65) Prior Publication Data

US 2007/0060438 A1 Mar. 15, 2007

(30) Foreign Application Priority Data

| | | | |
|---|---|---|---|
| Sep. 10, 2003 | (JP) | ............................ | 2003-319101 |
| Dec. 18, 2003 | (JP) | ............................ | 2003-421650 |
| Jan. 9, 2004 | (JP) | ............................ | 2004-004842 |
| Feb. 27, 2004 | (JP) | ............................ | 2004-055564 |

(51) Int. Cl.
*F16H 3/44* (2006.01)

(52) U.S. Cl. ...................... 475/284; 475/275; 475/278; 475/293; 475/330

(58) Field of Classification Search ................ 475/275, 475/278, 284, 285, 293, 330
See application file for complete search history.

(56) References Cited

U.S. PATENT DOCUMENTS

| | | | | |
|---|---|---|---|---|
| 5,106,352 | A | 4/1992 | Lepelletier | |
| 6,110,069 | A | 8/2000 | Taniguchi et al. | |
| 6,120,410 | A | 9/2000 | Taniguchi et al. | |
| 6,135,912 | A | 10/2000 | Tsukamoto et al. | |
| 6,139,463 | A | 10/2000 | Kasuya et al. | |
| 6,176,802 | B1 * | 1/2001 | Kasuya et al. | ............. 475/269 |

(Continued)

FOREIGN PATENT DOCUMENTS

DE 103 18 565 A1 11/2004

(Continued)

*Primary Examiner*—David D. Le
(74) *Attorney, Agent, or Firm*—Oliff & Berridge, PLC

(57) ABSTRACT

A vehicular automatic transmission is provided with a reduction planetary gear for reducing and outputting an inputted rotation of an input shaft, first and third clutches for enabling the transmission of a reduced rotation reduced through the reduction planetary gear, a planetary gear unit having second and third sun gears to which the reduced rotation is transmitted by the first and third clutches and a fourth clutch for enabling the transmission of the inputted rotation to the second sun gear. The fourth clutch is linked to the second sun gear of the planetary gear unit via output side members, i.e., a clutch drum and a link member, of the third clutch to commonly use as the output side members. Thereby, the automatic transmission may be compactly built.

81 Claims, 81 Drawing Sheets

U.S. PATENT DOCUMENTS

| | | | | |
|---|---|---|---|---|
| 6,634,980 | B1 | 10/2003 | Ziemer | |
| 6,913,556 | B2 * | 7/2005 | Armstrong et al. | 475/269 |
| 7,276,011 | B2 * | 10/2007 | Tabata et al. | 475/276 |
| 2002/0091032 | A1 | 7/2002 | Hayabuchi et al. | |

FOREIGN PATENT DOCUMENTS

| | | |
|---|---|---|
| EP | 1 013 968 A2 | 6/2000 |
| EP | 1 249 644 A2 | 10/2002 |
| JP | U-04-56968 | 5/1992 |
| JP | A-04-219553 | 8/1992 |
| JP | A-2000-199548 | 7/2000 |
| JP | A-2000-199549 | 7/2000 |
| JP | A-2000-220704 | 8/2000 |
| JP | A-2000-220705 | 8/2000 |
| JP | A-2000-240740 | 9/2000 |
| JP | A-2001-182785 | 7/2001 |
| JP | A-2002-323098 | 11/2002 |
| JP | A-2003-514195 | 4/2003 |

* cited by examiner

FIG.4

| | C-1 | C-2 | C-3 | C-4 | B-1 | B-2 | F-1 |
|---|---|---|---|---|---|---|---|
| 1st | ● | | | | | (●) | ● |
| 2nd | ● | | | | ● | | |
| 3rd | ● | | ● | | | | |
| 4th | ● | | | ● | | | |
| 5th | ● | ● | | | | | |
| 6th | | ● | | ● | | | |
| 7th | | ● | ● | | | | |
| 8th | | ● | | | ● | | |
| Rev1 | | | ● | | | ● | |
| Rev2 | | | | ● | | ● | |

(●) ENGINE BRAKE IS ON

FIG.8

| | C-1 | C-2 | C-3 | B-1 | B-2 | F-1 |
|---|---|---|---|---|---|---|
| 1st | ● | | | | (●) | ● |
| 2nd | ● | | | ● | | |
| 3rd | ● | | ● | | | |
| 4th | ● | ● | | | | |
| 5th | | ● | ● | | | |
| 6th | | ● | | ● | | |
| Rev | | | ● | | ● | |

(●) ENGINE BRAKE IS ON

VEHICULAR AUTOMATIC TRANSMISSION

CROSS-REFERENCE TO RELATED APPLICATIONS

This application is the U.S. National Stage of PCT/JP 2004/013250, filed Sep. 10, 2004, which claimed priority from JP 2003-319101, filed Sep. 10, 2003; JP 2003-421650, filed Dec. 18, 2003; JP 2004-004842, filed Jan. 9, 2004; and JP 2004-055564, filed Feb. 27, 2004, the entire disclosures of which are incorporated herein by reference thereto.

BACKGROUND

The disclosure relates to an automatic transmission mounted in a vehicle or the like and more specifically to structural allocations of an automatic transmission capable of attaining a multi-stage shift by enabling transmission of a reduced rotation to at least two rotary elements within a planetary gear set and by enabling transmission of an inputted rotation to at least one of the rotary elements.

With the recent demand for improvement in fuel consumption, an automatic transmission mounted in a vehicle or the like has come to be required to have a multi-stage shift. Among such automatic transmissions, Japanese Patent Laid-Open No. 2001-182785 has proposed one capable of attaining the multi-stage shift by having a reduction planetary gear capable of outputting a 'reduced rotation' that is attained by reducing an 'inputted rotation' inputted to an input shaft and a planetary gear unit having a plurality of rotary elements and by arranging such that the reduced rotation from the reduction planetary gear may be inputted to the rotary elements of the planetary gear unit via, for example, clutches.

SUMMARY

Throughout the specification and claims words such as first, second, third and fourth are used to label various components. These words are to be considered labels rather than carrying a numeric meaning, especially in the claims so that one reading the claims can relate the components in the claims to those in the specification.

Although it is necessary to provide a number of clutches in order to build such an automatic transmission capable of attaining the multi-stage shift as described above. This is counter to the desire that the automatic transmission be compact from the point of view of mountability in mounting such an automatic transmission in a vehicle.

Further, although it is necessary to supply operating fluid to hydraulic servos of those many clutches by providing oil passages between relatively rotating members and to provide seal rings for sealing the part between those relatively rotating members, there is a possibility of causing problems such as a drop of efficiency and controllability of the automatic transmission because the relatively rotating members may cause sliding resistance when such a number of seal rings are provided.

It is therefore a primary object to provide a compact vehicular automatic transmission. Another object is to provide a vehicular automatic transmission wherein the number of seal rings may be reduced.

A first aspect is embodied in a vehicular automatic transmission capable of attaining a multi-stage shift, comprising a reduction planetary gear for reducing and outputting an inputted rotation of an input shaft;at least two reduction transmitting clutches for enabling transmission of the reduced rotation reduced through the reduction planetary gear; a planetary gear set having at least two rotary elements to which the reduced rotation can be transmitted by the reduction transmitting clutches; and an input transmitting clutch for enabling transmission of the inputted rotation to at least one of the two rotary elements, the vehicular automatic transmission characterized in that a hydraulic servo of the input transmitting clutch is disposed axially on the opposite side of the reduction planetary gear from the planetary gear set; and the input transmitting clutch is linked to the rotary element of the planetary gear set via output side members of one of the two reduction transmitting clutches.

Because the input transmitting clutch is linked to the rotary element of the planetary gear set via the output side members of one of the two reduction transmitting clutches as described above, the output side members become the output side members of the two clutches that transmit different rotations. That is, the output side members may be commonly used as one rotating member. Thereby, the vehicular automatic transmission may be compactly built.

A second aspect is embodied in a vehicular automatic transmission capable of attaining a multi-stage shift, comprising a reduction planetary gear for reducing and outputting an inputted rotation of an input shaft; at least two reduction transmitting clutches for enabling the transmission of the reduced rotation reduced through the reduction planetary gear; a planetary gear set having at least two rotary elements to which the reduced rotation can be transmitted by the reduction transmitting clutches; and an input transmitting clutch for enabling the transmission of the inputted rotation to one of the two rotary elements, the vehicular automatic transmission characterized in that a hydraulic servo of the input transmitting clutch is disposed axially on the opposite side of the reduction planetary gear from the planetary gear set and on a boss portion extending from a case; and operating fluid is supplied to the hydraulic servo of the input transmitting clutch through oil passages within the boss portion.

Because the hydraulic servo of the input transmitting clutch is disposed axially on the opposite side of the reduction planetary gear from the planetary gear set and on the boss portion extending from the case and operating fluid is supplied to the hydraulic servo of the input transmitting clutch through the oil passages within the boss portion, the number of seal rings can be reduced as compared to a case of disposing the hydraulic servo of the input transmitting clutch on the input shaft through an intermediary of a member having another speed of rotation, i.e., as compared to a case of supplying the operating fluid via another member. Thereby, it becomes possible to prevent the drop of the efficiency and controllability of the vehicular automatic transmission.

A third aspect is embodied in the vehicular automatic transmission as described in the first or second aspects, wherein the two reduction transmitting clutches are composed of first and third clutches; the input transmitting clutch is composed of a fourth clutch; the planetary gear set has four rotary elements including the two rotary elements described above, i.e., the first rotary element, the second rotary element, a third rotary element and a fourth rotary element; the first rotary element is capable of transmitting the inputted rotation in connection with the fourth clutch, is capable of transmitting the reduced rotation in connection with the third clutch and is capable of fixing the rotation with first braking means; the second rotary element is capable of transmitting the reduced rotation in connection with the first clutch; the third rotary element is capable of transmitting the inputted rotation in connection with the second clutch and is capable of fixing the rotation with second braking means; and the fourth rotary element is linked to an output member.

Thus, because the first rotary element is capable of transmitting the inputted rotation in connection with the fourth clutch, is capable of transmitting the reduced rotation in connection with the third clutch and is capable of fixing the rotation in connection with the first braking means, the second rotary element is capable of transmitting the reduced rotation in connection with the first clutch, the third rotary element is capable of transmitting the inputted rotation in connection with the second clutch and is capable of fixing the rotation in connection with the second braking means and the fourth rotary element is linked to the output member, the multi-stage shift of forward eighth speed and reverse second speed stages for example may be attained.

A fourth aspect is embodied in the vehicular automatic transmission as described in the third aspect, wherein the hydraulic servo of the third clutch is disposed axially on the opposite side of the reduction planetary gear from the planetary gear unit and the hydraulic servo of the first clutch is disposed axially between the planetary gear and the planetary gear unit.

Because the hydraulic servo of the third clutch is disposed axially on the opposite side of the reduction planetary gear from the planetary gear set and the hydraulic servo of the first clutch is disposed axially between the reduction planetary gear and the planetary gear set, the fourth clutch may be disposed on the inner peripheral side of the clutch drum of the third clutch. Accordingly, the vehicular automatic transmission may be compactly built, even though the capacity of the third clutch may be increased.

A fifth aspect is embodied in the vehicular automatic transmission as described in the fourth aspect, wherein the planetary gear and the fourth clutch are disposed on the inner peripheral side of at least either one of the clutch drum of the first clutch and the clutch drum of the third clutch.

Because the reduction planetary gear and the fourth clutch are disposed on the inner peripheral side of at least either one of the clutch drum of the first clutch and the clutch drum of the third clutch, the area of the friction plate of at least either one of the first and third clutches may be enlarged. Accordingly, even though the capacity for transmitting the reduced rotation may be increased, the fourth clutch and the reduction planetary gear, whose capacity for transmitting the inputted rotation can be relatively small, may be disposed on the inner peripheral side of the first or third clutch drum and the vehicular automatic transmission capable of attaining the multi-stage shift may be compactly built.

A sixth aspect is embodied in the vehicular automatic transmission as described in the fourth or fifth aspect, wherein the hydraulic servo of the third clutch, the hydraulic servo of the fourth clutch and the planetary gear are disposed on the boss portion extending from the case axially in order from the side of the joint of the boss portion with the case; the hydraulic servo of the first clutch is disposed on the input shaft and adjacent to the planetary gear; operating fluid is supplied respectively to the hydraulic servo of the third clutch and the hydraulic servo of the fourth clutch from the oil passages provided within the boss portion; and operating fluid is supplied to the hydraulic servo of the first clutch from oil passages provided within the input shaft.

Because the hydraulic servo of the third clutch, the hydraulic servo of the fourth clutch and the planetary gear are disposed on the boss portion extending from the case axially in order from the joint side of the boss portion with the case and operating fluid is supplied respectively to the hydraulic servo of the third clutch and the hydraulic servo of the fourth clutch from the oil passages provided within the boss portion, the operating fluid may be supplied just by providing a pair of seal rings respectively between the hydraulic servos of the third and fourth clutches and the boss portion. Thereby, the number of seal rings can be reduced as compared to a case of disposing the hydraulic servos of the third and fourth clutches on the input shaft and of supplying operating fluid to the hydraulic servos from the boss portion via an oil passage of the input shaft for example. Further, because the hydraulic servo of the first clutch is disposed on the input shaft and adjacent to the reduction planetary gear and operating fluid is supplied to the hydraulic servo of the first clutch from the oil passage provided within the input shaft, the operating fluid may be supplied just by providing the pair of seal rings respectively between the oil passage for supplying operating fluid from the hydraulic control unit and the input shaft and between the hydraulic servo of the first clutch and the input shaft. Thereby, the number of seal rings can be reduced as compared to a case of supplying operating fluid via another member for example. Thus, it becomes possible to prevent the drop in efficiency and controllability of the vehicular automatic transmission.

A seventh aspect is embodied in the vehicular automatic transmission as described in any one of the fourth through sixth aspects, wherein the third and fourth clutches are linked to the first rotary element through the outer peripheral side of the first clutch. Even though the increase in size of the first clutch, to the outer peripheral side, is limited because the third and fourth clutches are linked to the rotary element of the planetary gear set through the outer peripheral side of the first clutch and the member for linking the third and fourth clutches with the rotary element of the planetary gear set passes through the outer peripheral side of the first clutch, the capacity of the first clutch may be maintained by increasing the size in the inner diametric direction, as compared to a case of disposing it on the boss portion, because the first clutch is disposed on the input shaft.

An eighth aspect of the invention is embodied in the vehicular automatic transmission as described in any one of the fourth through seventh aspects, wherein the reduction planetary gear is composed of a double pinion planetary gear having a first sun gear whose rotation is fixed, a pinion gear engaging with the first sun gear, a pinion gear engaging with the pinion gear, a first carrier rotatably supporting the first and second pinion gears and always linked with the input shaft, and a first ring gear engaging with the second pinion gear and outputting the reduced rotation. Thereby, the reduced rotation, reduced from the inputted rotation of the input shaft, may be outputted from the first ring gear.

A ninth aspect is embodied in the vehicular automatic transmission as described in the eighth aspect, wherein the friction plate of the third clutch is disposed on the outer peripheral side of the first ring gear and the fourth clutch is disposed axially between the hydraulic servo of the third clutch and the friction plate of the third clutch.

Because the friction plate of the third clutch is disposed on the outer peripheral side of the first ring gear and the fourth clutch is disposed axially between the hydraulic servo of the third clutch and the friction plate of the third clutch, it becomes possible to prevent the fourth clutch from radially overlapping with the hydraulic servo or the friction plate of the third clutch. Accordingly, because the size of the fourth clutch may be increased, as compared to a case of disposing the fourth clutch on the inner peripheral side of the third clutch, the capacity may be maintained while compactly building the vehicular automatic transmission in the radial direction.

A 10th aspect is embodied in the vehicular automatic transmission as described in the eighth aspect, wherein the friction plate of the third clutch is disposed on the outer peripheral side of the fourth clutch and the friction plate of the first clutch is disposed on the outer peripheral side of the first ring gear.

Because the friction plate of the third clutch is disposed on the outer peripheral side of the fourth clutch and the friction plate of the first clutch is disposed on the outer peripheral side of the first ring gear, i.e., because the friction plate of the third clutch that relatively often changes over clamping during traveling is disposed on the outer peripheral side of the fourth clutch where it can be readily lubricated as compared to a case of disposing it on the outer peripheral side of the reduction planetary gear, heat of the friction plate of the third clutch may be readily radiated and the durability of the third clutch may be improved. Still more, the vehicular automatic transmission may be shortened in the axial direction by disposing the friction plate, of the first clutch, that relatively less changes over clamping on the outer peripheral side of the reduction planetary gear.

An 11th aspect is embodied in the vehicular automatic transmission as described in the tenth aspect, wherein the clutch drum of the third clutch is disposed in linkage on the outer peripheral side of the clutch drum of the fourth clutch; the hydraulic servo of the third clutch is disposed in linkage with the clutch drum of the fourth clutch and is built so as to have a cylinder member, a piston member and an oil chamber formed between the cylinder member and the piston member separately from the clutch drum of the third clutch; and the piston member of the hydraulic servo of the third clutch is disposed so as to penetrate through and intersect with the clutch drum of the third clutch and to face to the friction plate of the third clutch.

Because the clutch drum of the third clutch is disposed in linkage on the outer peripheral side of the clutch drum of the fourth clutch, the hydraulic servo of the third clutch is disposed in linkage with the clutch drum of the fourth clutch and is built so as to have the cylinder member, the piston member and the oil chamber formed between the cylinder member and the piston member separately from the clutch drum of the third clutch, and the piston member of the hydraulic servo of the third clutch is disposed so as to penetrate through and intersect with the clutch drum of the third clutch and to face to the friction plate of the third clutch, the clutch drum of the third clutch for transmitting the rotation of the clutch drum of the fourth clutch may be relatively shortened and its weight lightened even though the third clutch becomes removable.

A 12th aspect is embodied in the vehicular automatic transmission as described in the 11th aspect, wherein a return spring of the hydraulic servo of the third clutch is disposed on the clutch drum of the fourth clutch. Because the return spring of the hydraulic servo of the third clutch is disposed on the clutch drum of the fourth clutch, i.e., because the clutch drum of the fourth clutch may be used in common as a cancel plate of the hydraulic servo of the third clutch, the number of parts can be cut and the vehicular automatic transmission can be compactly built.

A 13th aspect is embodied in the vehicular automatic transmission as described in any one of the fourth through 12th aspects, wherein a friction plate of the first braking means is disposed on the outer peripheral side of the hydraulic servo of the third clutch. Because the first braking means is disposed on the outer peripheral side of the hydraulic servo of the third clutch, the friction plate of the first braking means may be disposed at the position radially overlapping with the third clutch while maintaining the capacity (torque capacity and thermal capacity) of the friction plate of the first braking means although reducing the radial size thereof. Accordingly, it becomes possible to compactly build the vehicular automatic transmission in the radial direction and to shorten it in the axial direction.

A 14th aspect is embodied in the vehicular automatic transmission as described in any one of the fourth through twelfth aspects, wherein the first braking means is disposed axially between the first clutch and the planetary gear unit. Because the first braking means is disposed axially between the first clutch and the planetary gear set, the friction plate of the third clutch may be disposed on the outer peripheral side of the fourth clutch.

A 15th aspect is embodied in the vehicular automatic transmission as described in the third aspect, wherein the hydraulic servo of the first clutch is disposed axially on the opposite side of the reduction planetary gear from the planetary gear unit; and the hydraulic servo of the third clutch is disposed axially between the reduction planetary gear and the planetary gear set. Because the hydraulic servo of the first clutch is disposed axially on the opposite side of the reduction planetary gear from the planetary gear set, the hydraulic servo of the third clutch may be disposed axially between the reduction planetary gear and the planetary gear set.

A 16th aspect is embodied in the vehicular automatic transmission as described in the 15th aspect, wherein the first braking means is disposed axially between the third clutch and the planetary gear set. Because the first braking means is disposed axially between the third clutch and the planetary gear set, it becomes possible to increase the radial size of the hydraulic servo and the friction plate of the fourth clutch and thus to increase the capacity of the fourth clutch.

A 17th aspect is embodied in the vehicular automatic transmission as described in the 15th or 16th aspect, wherein a support wall fixed to the case is disposed axially between the planetary gear set and the third clutch; and operating fluid is supplied to the hydraulic servo of the third clutch via an oil passage provided in the support wall.

Because the support wall, fixed to the case, is disposed axially between the planetary gear set and the third clutch and operating fluid is supplied to the hydraulic servo of the third clutch via the oil passage provided in the support wall, the operating fluid may be supplied to the hydraulic servo of the third clutch just by providing a pair of seal rings between the hydraulic servo and the support wall. Thereby, the number of seal rings can be reduced and sliding resistance of the seal rings may be reduced as compared to a case of supplying operating fluid to the hydraulic servo of the third clutch from the input shaft. Thus the power transmitting efficiency of the vehicular automatic transmission may be improved.

An 18th aspect is embodied in the vehicular automatic transmission as described in the 17th aspect, wherein the hydraulic servo of the first braking means is disposed on the outer peripheral side of the support wall. Because the hydraulic servo of the first braking means is disposed on the outer peripheral side of the support wall, the support wall may be used in common also as a cylinder member of the hydraulic servo of the first braking means and thus the number of parts may be cut.

A 19th aspect is embodied in the vehicular automatic transmission as described in the third aspect, wherein the hydraulic servo of the first clutch and the hydraulic servo of the third clutch are disposed axially between the reduction planetary gear and the planetary gear set. Because the hydraulic servo of the third clutch and the hydraulic servo of the third clutch are disposed axially between the planetary gear set and the reduction planetary gear, the vehicular automatic transmission may be compactly built, especially in the radial direction, while attaining the multi-stage shift as compared to a case of disposing a plurality of clutches and hydraulic servos on the boss portion extending from the case.

A 20th aspect is embodied in the vehicular automatic transmission as described in the 19th aspect, wherein the friction plate of the first braking means is disposed so as to overlap radially with the outside of the fourth clutch. Because the friction plate of the first braking means is disposed so as to overlap radially with the outside of the fourth clutch, i.e., because the friction plate of the first braking means is disposed on the outer peripheral side of the fourth clutch whose capacity is relatively small as compared to the reduction transmitting clutch, the axial size of the vehicular automatic transmission may be shortened by disposing the friction plate of the first braking means and the clutch in the radial direction without increasing the radial size thereof.

A 21st aspect is embodied in the vehicular automatic transmission as described in the 19th or 20th aspect, wherein the fourth clutch and the reduction planetary gear are disposed on the boss portion extending from one side of the case; operating fluid is supplied to the hydraulic servo of the fourth clutch from an oil passage provided within the boss portion; and operating fluid is supplied to the hydraulic servo of the second clutch from an oil passage provided in a wall on the other side of the case.

Because the fourth clutch and the reduction planetary gear are disposed on the boss portion extending from one side of the case, operating fluid is supplied to the hydraulic servo of the fourth clutch from the oil passage provided within the boss portion and operating fluid is supplied to the hydraulic servo of the second clutch from the oil passage provided in the wall on the other side of the case, the fourth clutch and the second clutch may be disposed separately with respect to the planetary gear set. Accordingly, it becomes possible to prevent the oil passages from concentrating within the case and to improve the freedom of design. Further, operating fluid may be supplied to the hydraulic servos of the fourth and second clutches just by providing a pair of seal rings, i.e., a least number of seal rings, and the power transmitting efficiency of the vehicular automatic transmission may be improved by cutting the sliding resistance of the seal rings.

A 22nd aspect is embodied in the vehicular automatic transmission as described in any one of the 19th through 21st aspects, wherein the hydraulic servo of the first clutch is disposed on the side of the planetary gear set; the hydraulic servo of the third clutch is disposed on the side of the reduction planetary gear; and a link member for linking the third clutch with the rotary element of the planetary gear set is disposed so as to pass through the outer peripheral side of the first clutch.

Because the link member for linking the third clutch with the rotary element of the planetary gear set is disposed so as to pass through the outer peripheral side of the first clutch, output side members of the fourth and third clutches disposed on the opposite sides of the reduction planetary gear may be linked without complicating the members and the vehicular automatic transmission may be compactly built.

A 23rd aspect is embodied in the vehicular automatic transmission as described in the 22nd aspect, wherein the reduction planetary gear is composed of a double pinion planetary gear having a first sun gear whose rotation is fixed, a first pinion gear engaging with the sun gear, a second pinion engaging with the first pinion gear, a carrier for rotatably supporting the first and second pinion gears and always linked with the input shaft, and a ring gear engaging with the pinion gear and outputting the reduced rotation. Thereby, the reduced rotation reduced from the inputted rotation of the input shaft may be outputted from the first ring gear.

A 24th aspect is embodied in the vehicular automatic transmission as described in the 23rd aspect, wherein the friction plate of the third clutch is disposed on the outer peripheral side of the first ring gear of the reduction planetary gear; a positioning member for positioning the first ring gear of the reduction planetary gear is disposed on the ***input shaft; a cylinder portion of the hydraulic servo of the first clutch and a cylinder portion of the hydraulic servo of the third clutch are disposed axially on the both sides of the positioning member; and the piston member of the hydraulic servo of the third clutch and the first ring gear of the reduction planetary gear are arranged so that they penetrate through and intersect with each other and so that the piston member is slidable against the first ring gear and the positioning member.

Because the friction plate of the third clutch is disposed on the outer peripheral side of the first ring gear of the reduction planetary gear, the positioning member for positioning the first ring gear of the reduction planetary gear is disposed on the input shaft, the cylinder portion of the hydraulic servo of the first clutch and the cylinder portion of the hydraulic servo of the third clutch are disposed axially on the both sides of the positioning member, and the piston member of the hydraulic servo of the third clutch and the first ring gear of the reduction planetary gear are arranged so that they penetrate through and intersect with each other and so that the piston member is slidable against the first ring gear and the positioning member, the positioning member may be used in common as the cylinder portion of the two clutches. Accordingly, the vehicular automatic transmission may be built so that the third clutch is removable while making the transmission more compact in the axial direction.

Further, because the hydraulic servo of the third clutch and the hydraulic servos of the first and third clutches are separately disposed and are disposed on the positioning member, it becomes possible to prevent the clutch drums and pistons of the first and third clutches from rotating due to the inputted rotation of the input shaft and to prevent the seal rings provided for the hydraulic servo of the reduction transmitting clutch from causing unnecessary sliding resistance. Accordingly, it becomes possible to prevent a drop in the power transmitting efficiency of the vehicular automatic transmission.

Further, because the positioning member becomes the cylinder portion of the hydraulic servos of the two clutches, i.e., because the oil chambers of their hydraulic servos are provided on the positioning member, seal rings need to be provided just between the input shaft and the positioning member to supply operating fluid to those oil chambers. Accordingly, the diameter of the seal rings may be reduced and the sliding resistance of those seal rings may be cut as compared to a case of providing the seal rings on the boss portion. Thereby, the power transmitting efficiency of the vehicular automatic transmission can be improved.

Still further, because the positioning member, composing the hydraulic servos, is disposed on the input shaft, i.e., because the clutch drum is disposed directly on the input shaft without interposing the boss portion between the clutch drum and the input shaft, a pressure receiving area of the oil chambers of the hydraulic servos of the clutches may be increased as compared to a case of disposing the hydraulic servos of the clutches on the boss portion. That is, it becomes possible to increase the capacity of the clutches that transmit the reduced rotation through which a higher torque than that of the rotation of the input shaft is transmitted.

A 25th aspect is embodied in the vehicular automatic transmission as described in the 24th aspect, wherein an end portion of the first ring gear of the reduction planetary gear is formed in the shape of a comb; and a plurality of through holes through which the comb-like end portion of the first ring gear of the reduction planetary gear penetrates and intersects is formed through the piston member of the hydraulic servo of the third clutch. Because the end portion of the first ring gear of the reduction planetary gear is formed in the shape of a comb and the plurality of through holes through which the comb-like end portion of the first ring gear of the reduction planetary gear penetrates and intersects is formed through the piston member of the hydraulic servo of the third clutch, it becomes possible to arrange the structure so that the piston member of the hydraulic servo of the third clutch is slidable as against the first ring gear and the positioning member and so that the third clutch is removable.

A 26th aspect is embodied in the vehicular automatic transmission as described in the 25th aspect, wherein an outer peripheral end portion of the positioning member is formed in the shape of a comb; the comb-like end portion of the first ring gear of the reduction planetary gear is fitted into the comb-like outer peripheral end portion of the positioning member; and the first ring gear of the reduction planetary gear is fixed to the positioning member in the axial direction by a snap ring.

Because the outer peripheral end portion of the positioning member is formed in the shape of a comb, the comb-like end portion of the first ring gear of the reduction planetary gear is fitted into the comb-like outer peripheral end portion of the positioning member and the first ring gear of the reduction planetary gear is fixed to the positioning member in the axial direction by the snap ring, the first ring gear may be fixed to and supported by the positioning member. Thereby, it becomes possible to stabilize the attitude of the first ring gear and to cut gear noise.

A 27th aspect is embodied in the vehicular automatic transmission as described in any one of the 19th through 21st aspects, wherein the hydraulic servo of the first clutch is disposed on the side of the reduction planetary gear; and the hydraulic servo of the third clutch is disposed on the side of the planetary gear set and a link member, for linking the first clutch with the second rotary element, is disposed through the inner peripheral side of the third clutch. Because the link member for linking the first clutch with the second rotary element of the planetary gear set is disposed through the inner peripheral side of the third clutch, the output side member of the third clutch may be provided on the outer peripheral side of the output side member of the first clutch and the output side members of the fourth and third clutches disposed on the opposite sides of the reduction planetary gear may be linked without complicating the members. Accordingly, the vehicular automatic transmission may be compactly built.

A 28th aspect is embodied in the vehicular automatic transmission as described in the 27th aspect, wherein the reduction planetary gear is composed of a double pinion planetary gear having a first sun gear whose rotation is fixed, a first pinion gear engaging with the sun gear, a second pinion gear engaging with the first pinion gear, a carrier for rotatably supporting the first and second pinion gears and always linked with the input shaft, and a first ring gear engaging with the second pinion gear and outputting the reduced rotation. Thereby, the reduced rotation reduced from the inputted rotation of the input shaft may be outputted from the first ring gear.

A 29th aspect is embodied in the vehicular automatic transmission as described in the 28th aspect, wherein the friction plate of the third clutch is disposed on the outer peripheral side of the first ring gear of the reduction planetary gear; and the first clutch is disposed on the inner peripheral side of the clutch drum of the third clutch.

Because the friction plate of the third clutch is disposed on the outer peripheral side of the first ring gear of the reduction planetary gear and the first clutch is disposed on the inner peripheral side of the clutch drum of the third clutch, it becomes possible to relatively enlarge the hydraulic servo and the friction plate of the first clutch in the radial direction, and thereby increase the capacity of the first clutch, as compared to a case of disposing the friction plate of the third clutch on the outer peripheral side of the first clutch, even though the vehicular automatic transmission may be compactly built in the radial direction.

A 30th aspect is embodied in the vehicular automatic transmission as described in the 28th aspect, wherein the friction plate of the fourth clutch is disposed on the outer peripheral side of the first ring gear of the reduction planetary gear. Because the friction plate of the fourth clutch is disposed on the outer peripheral side of the first ring gear of the reduction planetary gear, it becomes possible to relatively increase the radial size of the hydraulic servo and the friction plate of the fourth clutch and thereby to increase the capacity of the fourth clutch.

A 31st aspect is embodied in the vehicular automatic transmission as described in the 30th aspect, wherein the friction plate of the third clutch is disposed on the outer peripheral side of the clutch drum of the first clutch. Because the friction plate of the third clutch is disposed on the outer peripheral side of the clutch drum of the first clutch, it becomes possible to position the third clutch closer to the planetary gear set, as compared to a case of disposing the friction plate of the third clutch on the outer peripheral side of the reduction planetary gear. Accordingly, the length of a transmitting member for transmitting relatively high torque may be shortened, even though the vehicular automatic transmission may be compactly built in the axial direction. As a result, it becomes possible to shorten a transmitting member, that is required to have a high strength, and to thereby lighten the vehicular automatic transmission.

A 32nd aspect is embodied in the vehicular automatic transmission as described in any one of the 19th through 31st aspects, wherein the hydraulic servo of the first clutch and the hydraulic servo of the third clutch are disposed on the input shaft; and operating fluid is supplied to the hydraulic servo of the first clutch and the hydraulic servo of the third clutch via oil passages provided within the input shaft. Because the hydraulic servo of the first clutch and the hydraulic servo of the third clutch are disposed on the input shaft and operating fluid is supplied to the hydraulic servo of the first clutch and the hydraulic servo of the third clutch via the oil passages provided within the input shaft, operating fluid may be supplied to the hydraulic servos of the first and third clutches just by providing two pairs of seal rings between the boss portion and the input shaft and between the hydraulic servo and the input shaft. Because the diameter of the seal rings can be reduced, as compared to a case of disposing the first and third clutches on the boss portion, the sliding resistance of the seal rings can be reduced and the power transmitting efficiency of the vehicular automatic transmission may be improved.

A 33rd aspect is embodied in the vehicular automatic transmission as described in the 32nd aspect, wherein a first oil passage for supplying operating fluid to the hydraulic servo of the first clutch in the axial direction, a second oil passage for supplying operating fluid to the hydraulic servo of the third clutch in the axial direction and a third oil passage for supplying lubricant oil in the axial direction are formed within the input shaft in parallel with the axial direction. Because the first oil passage for supplying operating fluid to the hydraulic servo of the third clutch in the axial direction, the second oil passage for supplying operating fluid to the hydraulic servo of the third clutch in the axial direction and the third oil passage for supplying lubricant oil in the axial direction are formed within the input shaft in parallel with the axial direction, lubricant oil may be supplied from the input shaft even though operating fluid may be supplied to the hydraulic servo of the third clutch and to the hydraulic servo of the third clutch via the input shaft.

A 34th aspect is embodied in the vehicular automatic transmission as described in any one of the 19th through 31st aspects, wherein at least one of the hydraulic servo of the first clutch and the hydraulic servo of the third clutch is disposed on the input shaft; the support wall fixed to the case is disposed axially between the planetary gear set and the first clutch and the third clutch; operating fluid is supplied to one of the hydraulic servo of the first clutch and the hydraulic servo of the third clutch, via the oil passage provided within the input shaft; and operating fluid is supplied to the other one of the hydraulic servo of the first clutch and the hydraulic servo of the third clutch via the oil passage provided within the support wall.

Because at least one of the hydraulic servo of the first clutch and the hydraulic servo of the third clutch is disposed on the input shaft, the support wall fixed to the case is disposed axially between the planetary gear set and the first clutch and the third clutch, operating fluid is supplied to one of the hydraulic servo of the first clutch and the hydraulic servo of the third clutch via the oil passage provided within the input shaft and operating fluid is supplied to the other one of the hydraulic servo of the first clutch and the hydraulic servo of the third clutch via the oil passage provided within the support wall, operating fluid may be supplied to one of the hydraulic servos of the first and third clutches by providing two pairs of seal rings in total between the boss portion) and the input shaft and between the hydraulic servo and the input shaft and to the other one of the hydraulic servos of the first and third clutches by providing a pair of seal rings between the hydraulic servo and the support wall. Thereby, it becomes possible to cut a number of seal rings as compared to a case of supplying operating fluid to the hydraulic servos of the first and third clutches from the input shaft. Accordingly, the sliding resistance of the seal rings may be reduced and the power transmitting efficiency of the vehicular automatic transmission may be improved.

A 35th aspect is embodied in the vehicular automatic transmission as described in the third aspect, wherein the hydraulic servo of the first clutch and the hydraulic servo of the third clutch are disposed axially on the opposite side of the reduction planetary gear from the planetary gear set. Thereby, the hydraulic servo of the first clutch and the hydraulic servo of the third clutch may be disposed axially on the opposite side of the reduction planetary gear from the planetary gear set.

A 36th aspect is embodied in the vehicular automatic transmission as described in the 35th aspect, wherein the hydraulic servo of the third clutch, the hydraulic servo of the first clutch, the hydraulic servo of the fourth clutch and the reduction planetary gear are disposed on the boss portion extending from the case in order from the side of the joint of the boss portion with the case in the axial direction; and operating fluid is supplied to the hydraulic servo of the third clutch, the hydraulic servo of the first clutch and the hydraulic servo of the fourth clutch, respectively, from the oil passages provided within the boss portion.

Because the hydraulic servo of the third clutch, the hydraulic servo of the first clutch, the hydraulic servo of the fourth clutch and the reduction planetary gear are disposed on the boss portion extending from the case in order from the side of the joint of the boss portion with the case in the axial direction and operating fluid is supplied to the hydraulic servo of the third clutch, the hydraulic servo of the first clutch and the hydraulic servo of the fourth clutch, respectively, from the oil passages provided within the boss portion, operating fluid may be supplied to the hydraulic servo of the third clutch and the hydraulic servo of the third clutch by providing a pair of seal rings between the hydraulic servos and the boss portion and to the hydraulic servo of the third clutch by providing two pairs of seal rings between the hydraulic servo and the boss portion. Further, it is possible to shorten the oil passages as compared to the case of supplying operating fluid via an oil passage within the input shaft and thereby prevent a drop in efficiency and controllability of the vehicular automatic transmission.

A 37th aspect is embodied in the vehicular automatic transmission as described in the 35th or 36th aspect, wherein the first braking means is disposed axially between the reduction planetary gear and the planetary gear set. Because the first braking means is disposed axially between the reduction planetary gear and the planetary gear set, the friction plate of the third clutch may be disposed on the outer peripheral side of the fourth clutch.

A 38th aspect is embodied in the vehicular automatic transmission as described in the third aspect, wherein the hydraulic servo of the first clutch is disposed axially on the opposite side of the planetary gear set from the reduction planetary gear; and the hydraulic servo of the third clutch is disposed between the reduction planetary gear and the planetary gear set.

Because the hydraulic servo of the first clutch is disposed axially on the opposite side of the planetary gear set from the reduction planetary gear and the hydraulic servo of the third clutch is disposed between the reduction planetary gear and the planetary gear set, operating fluid may be supplied to the hydraulic servo of the third clutch by providing a pair of seal rings between the hydraulic servo and the input shaft and to the hydraulic servo of the third clutch by providing a pair of seal rings between the hydraulic servo and a center support, i.e., two pairs of seal rings in total. Thereby, it becomes possible to reduce the number of seal rings, to reduce the sliding resistance of the seal rings and to improve the power transmitting efficiency of the vehicular automatic transmission.

Further, because the hydraulic servo of the third clutch and the hydraulic servo of the third clutch are disposed separately on the both sides of the planetary gear set in the axial direction, members for linking the first clutch, the third clutch and the fourth clutch with the respective rotary elements of the planetary gear set may be shortened and thus the vehicular automatic transmission may be lightened. Accordingly, because the link members are shortened and lightened, inertia torque may be lowered and controllability of the vehicular automatic transmission may be improved. Additionally, because the hydraulic servo of the third clutch is disposed axially on the opposite side of the planetary gear set from the reduction planetary gear, it becomes possible to prevent the concentration of the oil passages for supplying operating fluid and to improve the degree of freedom of design.

A 39th aspect is embodied in the vehicular automatic transmission as described in the third aspect, wherein the hydraulic servo of the first clutch is disposed axially on the opposite side of the planetary gear set from the reduction planetary gear; and the hydraulic servo of the third clutch is disposed on the opposite side of the reduction planetary gear from the planetary gear set. Because the hydraulic servo of the first clutch is disposed axially on the opposite side of the planetary gear set from the reduction planetary gear and the hydraulic servo of the third clutch is disposed on the opposite side of the reduction planetary gear from the planetary gear set, operating fluid may be supplied to the hydraulic servo of the first clutch by providing a pair of seal rings between the hydraulic servo and the input shaft and to the hydraulic servo of the third clutch by providing a pair of seal rings between the hydraulic servo and the boss portion, i.e., two pair of seal rings in total. Thereby, it becomes possible to reduce the number of seal rings, to reduce the sliding resistance of the seal rings and to improve the power transmitting efficiency of the vehicular automatic transmission.

Further, because the hydraulic servo of the first clutch and the hydraulic servo of the third clutch are disposed separately on the both sides of the planetary gear set in the axial direction, the members for linking the first clutch, the third clutch and the fourth clutch with the respective rotary elements of the planetary gear set may be shortened and thus the vehicular automatic transmission may be lightened. Accordingly, because those link members are shortened and lightened, inertia torque may be lowered and the controllability of the vehicular automatic transmission may be improved. Additionally, because the hydraulic servo of the first clutch is disposed axially on the opposite side of the planetary gear set from the reduction planetary gear, it becomes possible to prevent the concentration of the oil passages for supplying operating fluid and to improve the degree of freedom of design.

A 40th aspect is embodied in the vehicular automatic transmission as described in any one of the third through 39th aspects, wherein the second clutch is disposed axially on the opposite side of the planetary gear set from the reduction planetary gear. Because the second clutch is disposed axially on the opposite side of the planetary gear set from the reduction planetary gear, the second clutch may be linked with the third rotary element without crossing each other with the members for linking the first and third clutches with the first and second rotary elements of the planetary gear set. Further, the planetary gear set and the reduction planetary gear may be disposed relatively close to each other and the transmitting member for transmitting the reduced rotation, i.e., the transmitting member for transmitting a large torque, may be shortened. Thereby, the controllability of the vehicular automatic transmission may be improved by lightening the vehicular automatic transmission and cutting the inertia.

A 41st aspect is embodied in the vehicular automatic transmission as described in any one of the third through 39th aspects, wherein the second clutch is disposed axially between the reduction planetary gear and the planetary gear set. Because the second clutch is disposed axially between the reduction planetary gear and the planetary gear set, the first through fourth clutches may be disposed together on one side of the planetary gear set. In the case of mounting the automatic transmission in an FR-type vehicle, in particular, the planetary gear set and the output members may be closely disposed and the member for linking the planetary gear set with the output members, i.e., the member for transmitting a large torque, may be shortened. Thereby, the controllability of the vehicular automatic transmission may be improved by lightening the vehicular automatic transmission and by cutting the inertia. Further, because the second clutch, whose capacity for transmitting torque can be relatively small, is disposed on the inner peripheral side of the first and third clutches, which are required to have a capacity for transmitting a relatively large torque, the vehicular automatic transmission may be compactly built as compared to a case of disposing the second clutch on the outer peripheral side.

A 42nd aspect is embodied in the vehicular automatic transmission as described in any one of the third through 41st aspects, wherein the reduced rotation of the reduction planetary gear is inputted to the clutch drum of the first clutch forming the hydraulic servo of the first clutch when the first clutch engages. Because the reduced rotation of the reduction planetary gear is inputted to the clutch drum of the first clutch forming the hydraulic servo of the first clutch when the first clutch engages, the reduced rotation is not inputted to the clutch drum of the first clutch when the first clutch is not engaged even if a driver races the engine in the Neutral or Parking range, for example, and the input shaft rotates. Accordingly, it is possible to prevent the entire hydraulic servo of the third clutch from rotating and to prevent a drag of the first clutch from occurring due to centrifugal hydraulic pressure generated in the oil chamber.

A 43rd aspect is embodied in the vehicular automatic transmission as described in any one of the third through 42nd aspects, wherein the reduced rotation of the reduction planetary gear is inputted to the clutch drum of the third clutch forming the hydraulic servo of the third clutch when the third clutch engages. Because the reduced rotation of the reduction planetary gear is inputted to the clutch drum of the third clutch forming the hydraulic servo of the third clutch when the third clutch engages, the reduced rotation is not inputted to the clutch drum of the third clutch when the third clutch is not engaged even if the driver races the engine in the Neutral or Parking range for example and the input shaft rotates. Accordingly, it is possible to prevent the entire hydraulic servo of the third clutch from rotating and to prevent a drag of the third clutch from occurring due to centrifugal hydraulic pressure generated in the oil chamber.

A 44th aspect is embodied in the vehicular automatic transmission as described in any one of the third through 43rd aspects, where the inputted rotation of the input shaft is inputted to the clutch drum of the fourth clutch forming the hydraulic servo of the fourth clutch when the fourth clutch engages. Because the inputted rotation of the input shaft is inputted to the clutch drum of the fourth clutch forming the hydraulic servo of the fourth clutch when the fourth clutch engages, the inputted rotation is not inputted to the clutch drum of the fourth clutch when the fourth clutch is not engaged even if the driver races the engine in the Neutral or Parking range, for example, and the input shaft rotates. Accordingly, it is possible to prevent the whole hydraulic servo of the third clutch from rotating and to prevent a drag of the fourth clutch from occurring due to centrifugal hydraulic pressure generated in the oil chamber.

A 45th aspect is embodied in the vehicular automatic transmission as described in any one of the third through 44th aspects, wherein the planetary gear set has the second sun gear, the third sun gear, the third pinion gear engaging with the third sun gear, the fourth pinion gear engaging with the second sun gear and with the third pinion gear, the carrier rotatably supporting the third and fourth pinion gears and the ring gear engaging with the fourth pinion gear; the first rotary element comprises the second sun gear; the second rotary element comprises the third sun gear; the third rotary element comprises the second carrier; and the fourth rotary element comprises the second ring gear. Thereby, the planetary gear set may be composed of the so-called Ravigneoux type planetary gear and a good gear ratio may be obtained even though it is capable of preventing the respective rotary elements from rotating at high speed.

A 46th aspect is embodied in the vehicular automatic transmission as described in the 45th aspect, wherein the planetary gear set is the Ravigneoux type planetary gear in which the second ring gear is disposed on one side of the outer peripheral side thereof; and a friction plate of the second brake is disposed on the other side of the outer peripheral side of the planetary gear set. Because the planetary gear set is the Ravigneoux type planetary gear in which the second ring gear is disposed on one side of the outer peripheral side and the friction plate of the second brake is disposed on the other side of the outer peripheral side of the planetary gear set, the friction plate of the second brake may be disposed in a position radially overlapping with the planetary gear set while maintaining the capacity and reducing the diameter thereof. Accordingly, it is possible to compactly build the vehicular automatic transmission in the radial direction and to shorten it in the axial direction.

A 47th aspect is embodied such that the vehicular automatic transmission as described in any one of the third through 46th aspects is capable of attaining a forward first speed stage by engaging the first clutch and fastening the second brake; a forward second speed stage by engaging the first clutch and fastening the first braking means; a forward third speed stage by engaging the first clutch and the third clutch; a forward fourth speed stage by engaging the first clutch and the fourth clutch; a forward fifth speed stage by engaging the first clutch and the second clutch; a forward sixth speed stage by engaging the second clutch and the fourth clutch; a forward seventh speed stage by engaging the second clutch and the third clutch; a forward eighth speed stage by engaging the second clutch and fastening the first braking means; and a reverse stage by engaging the third clutch or the fourth clutch and fastening the second braking means. Thereby, the vehicular automatic transmission is capable of attaining the forward first through eight speed stages and a reverse stage.

A 48th aspect is embodied in the vehicular automatic transmission as described in any one of the third through 47th aspects, wherein the reduction planetary gear and the planetary gear set are disposed coaxially and in line in the axial direction. Because the reduction planetary gear and the planetary gear set are disposed coaxially and in line in the axial direction, the automatic transmission may be readily mounted in an FR-type vehicle.

A 49th aspect is embodied in the vehicular automatic transmission as described in any one of the third through 48th aspects, wherein the fourth clutch is removable. Because the fourth clutch is removable, it is possible to provide a vehicular automatic transmission capable of attaining the forward sixth speed stage and the reverse first speed stage while using the parts of the vehicular automatic transmission as they are other than the fourth clutch. Accordingly, it becomes possible to line up the vehicular automatic transmission of the forward eighth speed stage having the fourth clutch for example and the vehicular automatic transmission of the forward sixth speed stage which requires no fourth clutch, without increasing the cost.

A 50th aspect is embodied in the vehicular automatic transmission as described in any one of the third through 49th aspects, wherein the output member described above is an output shaft for transmitting a rotation coaxially with the input shaft. Thereby, the vehicular automatic transmission may be suitably used for the FR-type vehicle.

A 51st aspect is embodied in the vehicular automatic transmission as described in any one of the third through 49th aspects, wherein the output member described above is a counter gear that transmits a rotation to a shaft parallel with the input shaft. Thereby, the vehicular automatic transmission may be suitably used in an FF-type vehicle.

A 52nd aspect is embodied in the vehicular automatic transmission as described in the 51st aspect, the counter gear and a support wall for supporting the counter gear are disposed axially between the reduction planetary gear and the planetary gear set. Thereby, operating fluid may be supplied to the hydraulic servo from the support wall when the hydraulic servo of the clutch adjoins the support wall and the number of seal rings may be cut as compared to the case of supplying operating fluid from the input shaft. Thus, it becomes possible to prevent a drop in the efficiency and controllability of the vehicular automatic transmission. When a multi-plate type brake adjoins the support wall, a part of the support wall may be used in common as a cylinder member of the brake. It also allows the number of parts to be cut and the weight of the vehicular automatic transmission to be lightened.

A 53rd aspect is embodied in the vehicular automatic transmission as described in the 51st aspect, wherein the counter gear is disposed axially on the opposite side of the planetary gear set from the reduction planetary gear.

A 54th aspect is embodied in the vehicular automatic transmission as described in the 53rd aspect, wherein the counter gear is disposed on a boss portion extending from a side wall of the case axially on the opposite side of the planetary gear unit from the reduction planetary gear. Because the counter gear is disposed on the boss portion, it becomes possible to eliminate the support wall, to cut the number of parts and to lighten the vehicular automatic transmission.

A 55th aspect is embodied in the vehicular automatic transmission as described in the 53rd or 54th aspect, the counter gear is disposed axially at an end position on the opposite side of the input shaft within the case. Thereby, the vehicular automatic transmission, suitably used for the FF-type vehicle, may be readily converted into one for use in the FR-type vehicle.

A 56th aspect is embodied in the vehicular automatic transmission as described in the 53rd aspect, the counter gear is disposed axially at an end position on the side of the input shaft within the case. Because the counter gear can be disposed closer to the input side in the vehicular automatic transmission and closer to the axial position of a differential unit, the axial length of a counter shaft may be shortened.

BRIEF DESCRIPTION OF THE DRAWINGS

The disclosure will be made with reference to the drawings in which:

FIG. 4 is an operation table of the automatic transmission;

FIG. 8 is an operation table of the automatic transmission;

FIGS. 13A and 13B show a ring gear and a piston member, wherein FIG. 13A is an enlarged section view seen from its axial direction and FIG. 13B is a section view taken along 13-13 in FIG. 13A;

FIGS. 14A and 14B are section views showing an input shaft, wherein FIG. 14A is a partially enlarged section view and FIG. 14B is a section view taken along 14-14 in FIG. 14A;

DETAILED DESCRIPTION OF PREFERRED EMBODIMENTS

A first exemplary embodiment will be explained with reference to FIGS. 1 through 5.

Figure 2:
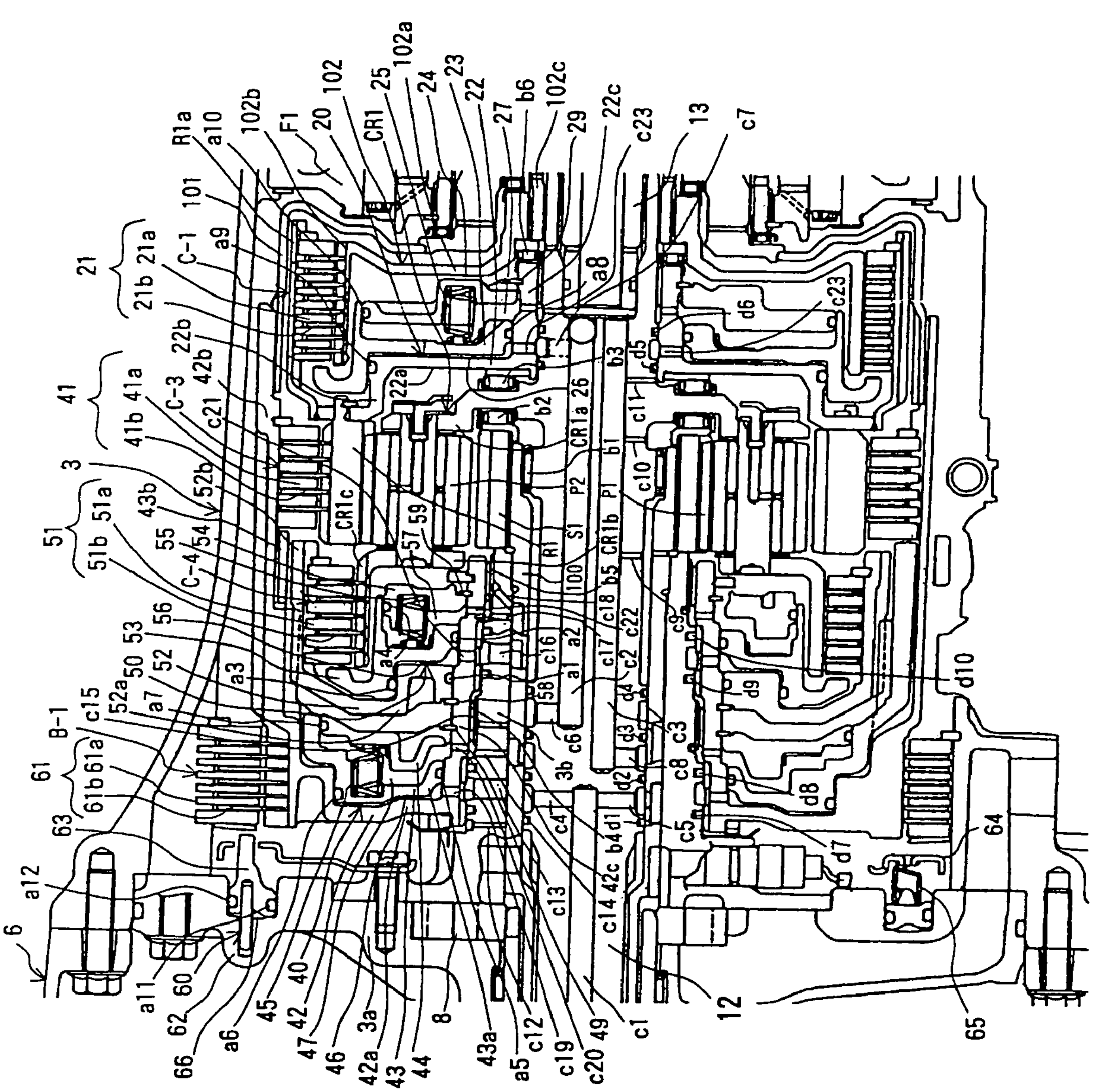
FIG. 2 is an enlarged section view showing a part of a transmission mechanism.
Figure 3:
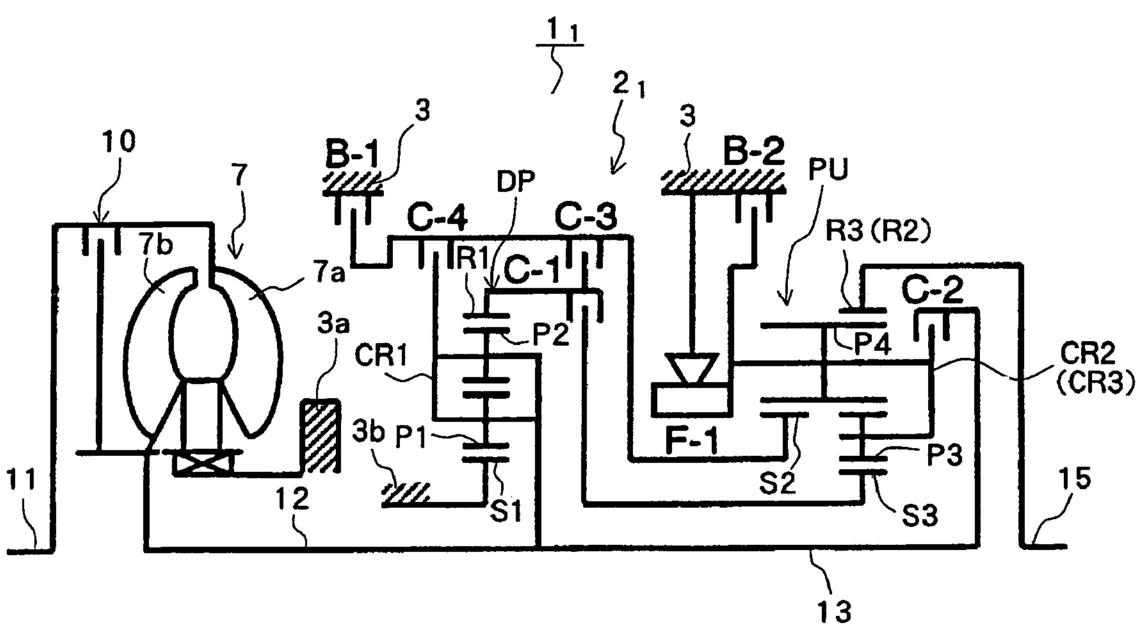
FIG. 3 is a schematic view of the automatic transmission.

It is noted that the following explanation will be made so that upper, lower, left and right directions in FIGS. 1, 2 and 3 correspond to “upper”, “lower”, “front” and “rear” directions in the actual vehicular automatic transmission (or referred to simply as “automatic transmission” hereinafter) $\mathbf{1}_1$. Accordingly, although an input shaft 11 of the automatic transmission $\mathbf{1}_1$ as well as an input shaft 12, an intermediate shaft 13 and an output shaft (output member) 15 of a transmission mechanism $\mathbf{2}_1$ are shown on one straight line in order from the left to right, nearly at the middle of the vertical direction in FIGS. 1 and 3, they are actually aligned in this order from the front to rear. Here, the input shaft 12 and the intermediate shaft, described above, are combined in a body and compose an ‘input shaft’ in a broad sense because the rear part of the input shaft 12 is spline-coupled with the front part of the intermediate shaft 13. Further, the direction of the input shaft along the longitudinal direction will be referred to as the “axial direction” and the direction orthogonal to the axial direction as the “radial direction”. In addition, as for the position in the radial direction, the side closer to the shafts’ axis will be referred to as the “inner diametric side (inner peripheral side)” and the side farther from the shafts’ axis as the “outer diametric side (outer peripheral side)”.

First, a schematic structure of the automatic transmission $\mathbf{1}_1$ will be explained with reference to FIG. 3. As shown in FIG. 3, the automatic transmission $\mathbf{1}_1$, that may be suitably used for an FR (front engine, rear drive) type vehicle, has the input shaft 11, that may be connected to an engine (not shown), and is provided with a torque converter 7 and the transmission mechanism $\mathbf{2}_1$ centering on the axis of the input shaft 11.

The torque converter 7 has a pump impeller **7*a* connected to the input shaft 11 of the automatic transmission $\mathbf{1}_1$ and a turbine runner 7*b* to which the rotation of the pump impeller 7*a* is transmitted through an intermediary of operating fluid. The turbine runner 7*b* is connected to the input shaft 12 of the transmission mechanism $\mathbf{2}_1$ disposed coaxially with the input shaft 11. The torque converter 7 is also provided with a lockup clutch 10. When the lockup clutch 10 engages, through a hydraulic control made by a hydraulic control unit (not shown), the rotation of the input shaft 11 of the automatic transmission $\mathbf{1}_1$ is transmitted directly to the input shaft 12** of the transmission mechanism $\mathbf{2}_1$.

The transmission mechanism $\mathbf{2}_1$ is provided with a planetary gear (reduction planetary gear) DP and a planetary gear unit (planetary gear set) PU on the input shaft 12 (and more specifically on the intermediate shaft 13 described later). The planetary gear DP is provided with a sun gear (first sun gear) S1, a carrier (first carrier) CR1 and a ring gear (first ring gear) R1. It is a so-called double pinion planetary gear having a pinion (first pinion gear) P1 engaging with the sun gear S1 and a pinion (second pinion gear) P2 engaging with the ring gear in a manner of engaging each with the carrier CR1.

The planetary gear unit PU has four rotary elements, i.e., a sun gear S2 (one of two rotary elements, i.e., a first rotary element or a second sun gear), a sun gear S3 (one of the two rotary elements, i.e., a second rotary element or a third sun gear), a carrier CR2 (CR3) (a third rotary element or a second carrier) and a ring gear R3 (R2) (a fourth rotary element or a second ring gear). It is a so-called Ravigneoux type planetary gear having a long pinion P4 engaging with the sun gear S2 and the ring gear R3 and a short pinion P3 engaging with the sun gear S3 in a manner of engaging each other with the carrier CR2.

The sun gear S1 of the planetary gear DP is connected with a boss portion 3*b* that is fixed in a body with a mission case 3, described in detail later, so that its rotation is fixed. The carrier CR1 is connected with the input shaft 12 so as to rotate equally with the rotation of the input shaft 12 (hereinafter referred to as "inputted rotation") and is also connected with a fourth clutch C-4 (input transmitting clutch). The ring gear R1 rotates at the "reduced rotation" reduced from the inputted rotation in connection with the fixed sun gear S1 and the carrier CR1 that rotates at the inputted rotation and is connected with a first clutch C-1 (reduction transmitting clutch) and a third clutch C-3 (reduction transmitting clutch).

The sun gear S2 of the planetary gear unit PU is connected with a first brake B-1, i.e., braking means, so that it may be fixed to the mission case 3 and is also connected with the fourth and third clutches C-4, C-3 so that the inputted rotation of the carrier CR1 may be inputted thereto via the fourth clutch C-4 and so that the reduced rotation of the ring gear R1 may be inputted thereto via the third clutch C-3, respectively. The sun gear S3 is connected with the first clutch C-1 so that the reduced rotation of the ring gear R1 may be inputted thereto.

The carrier CR2 is connected with the second clutch C-2 to which the rotation of the input shaft 12 is inputted via the intermediate shaft 13 so that the inputted rotation may be inputted via the second clutch C-2. It is also connected with a one-way clutch F1 and a second brake B-2 as braking means so that the rotation of the carrier CR2 in one direction is restricted with respect to the mission case 3 via the one-way clutch F-1 and so that its rotation may be fixed through an intermediary of the second brake B-2. The ring gear R3 is connected with the output shaft (output member) 15 for outputting the rotation to driving wheels (not shown).

Figure 5:
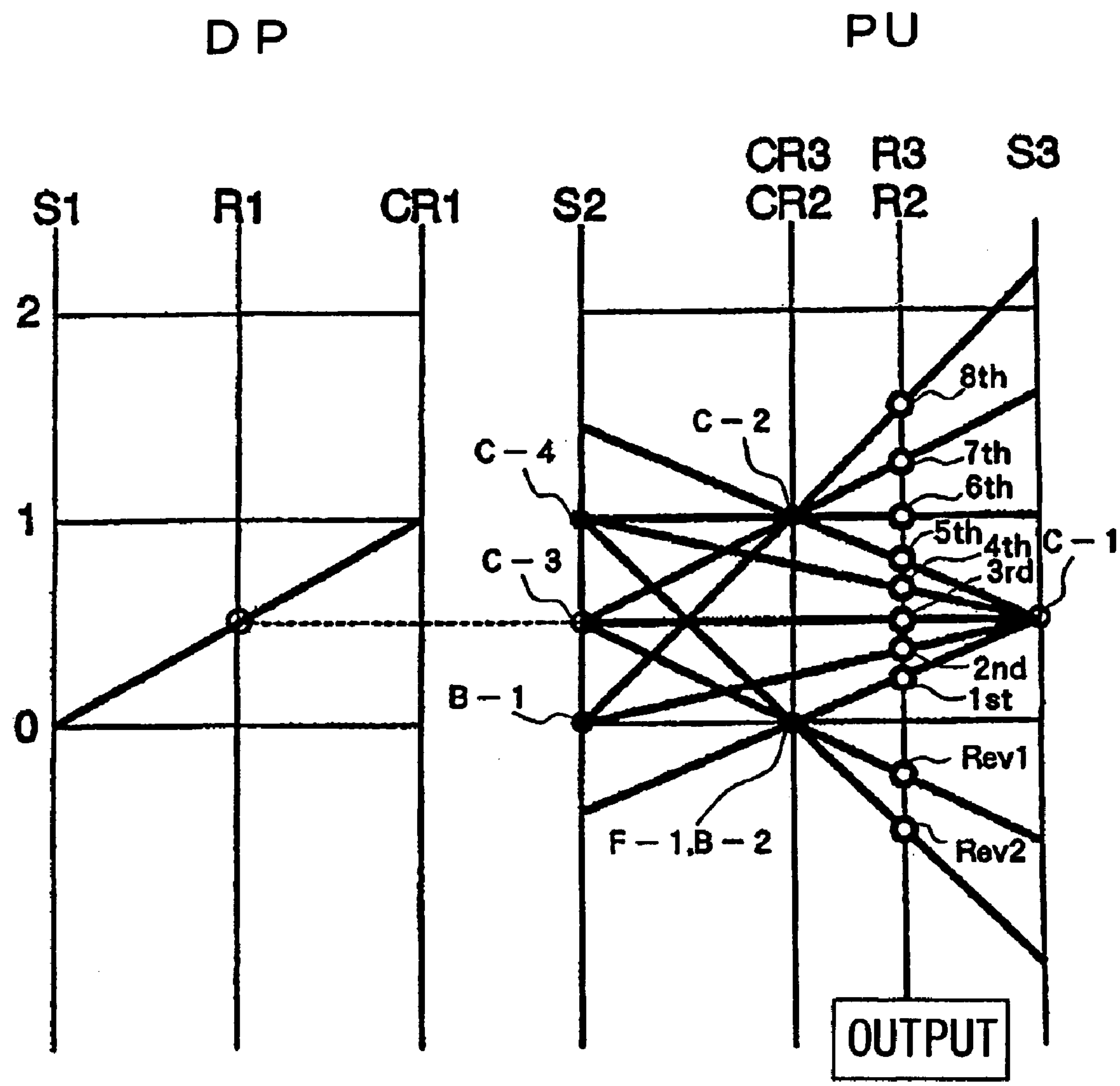
FIG. 5 is a speed diagram of the automatic transmission.
Figure 6:
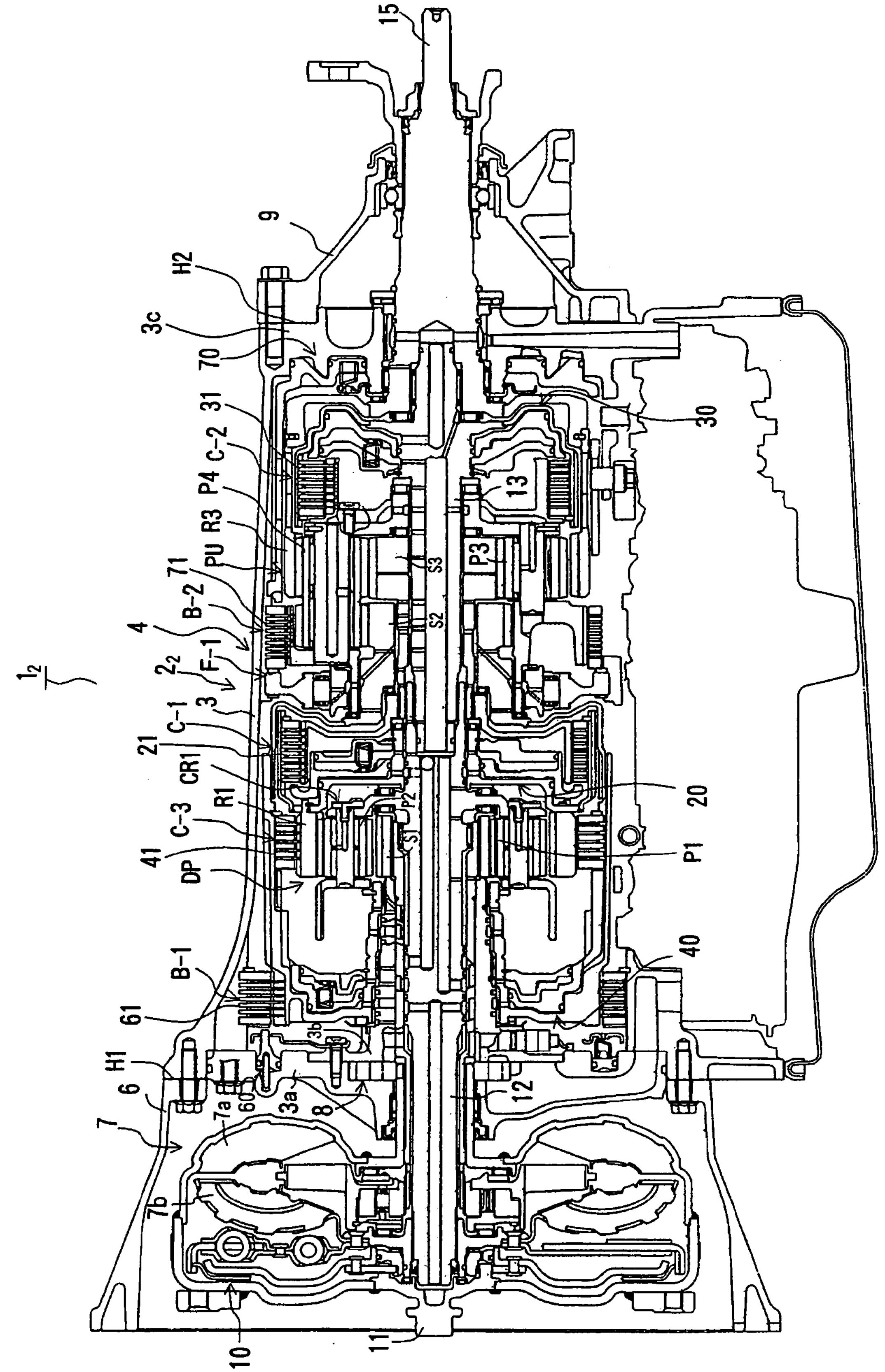
FIG. 6 is a section view showing an automatic transmission according to a second exemplary embodiment.

Next, operation of the transmission mechanism $\mathbf{2}_1$ will be explained with reference to FIGS. 3, 4 and 5. It is noted that in the speed diagram of FIG. 5, the vertical axis indicates a number of rotations of each rotary element (gear) and the horizontal axis corresponds to a gear ratio of the respective rotary elements. In the part of the planetary gear DP in the speed diagram, the left vertical line corresponds to the sun gear S1. The other vertical lines correspond, in order to the right, to the ring gear R1 and the carrier CR1, respectively. For the planetary gear unit PU, the rightmost vertical line corresponds to the sun gear S3. The other vertical lines correspond, in order to the left, to the ring gear R3 (R2), the carrier CR2 (CR3) and the sun gear S2, respectively.

For example, in case of a forward first speed stage (1st) in D (drive) range, the first clutch C-1 and the one-way clutch F-1 engage as shown in FIG. 4. Then, as shown in FIGS. 3 and 5, the rotation of the ring gear R, at the reduced rotation reduced by the fixed sun gear S1 and the carrier CR1 rotating at the inputted rotation, is inputted to the sun gear S3 via the first clutch C-1. Further, the carrier CR2 is restricted so as to rotate in one direction (normal rotating direction) and is prevented from rotating in the reverse direction, i.e., it is locked from rotating in reverse. Then, the reduced rotation inputted to the sun gear S3 is outputted to the ring gear R3 via the fixed carrier CR2 and the output shaft 15 outputs the normal rotation of the forward first speed stage.

It is noted that when an engine brake is on (coasting time), the condition of the forward first speed stage is kept in a manner of fastening the second brake B-2 to fix the carrier CR2 and to prevent the carrier CR2 from rotating normally. Because the one-way clutch F-1 prevents the carrier CR2 from rotating in the reverse direction and allows the normal rotation in the forward first speed stage, the forward first speed stage in shifting from a non-Driving range to a Driving range, for example, may be achieved smoothly by automatically engaging the one-way clutch F-1.

In case of a forward second speed stage (2nd)), the first clutch C-1 is engaged and the first brake B-1 is fastened as shown in FIG. 4. Then, as shown in FIGS. 3 and 5, the rotation of the ring gear R1, at the reduced rotation reduced by the fixed sun gear S1 and the carrier CR1 rotating at the inputted rotation, is inputted to the sun gear S3 via the first clutch C-1. The rotation of the sun gear S2 is fixed because the first brake B-1 is fastened. Then, the carrier CR2 rotates at a reduced rotation whose speed is lower than that of the sun gear S3, the reduced rotation inputted to the sun gear S3 is outputted to the ring gear R3 via the carrier CR2 and the output shaft 15 outputs the normal rotation of the forward second speed stage.

In case of a forward third speed stage (3rd), the first clutch C-1 and the third clutch C-3 engage as shown in FIG. 4. Then, as shown in FIGS. 3 and 5, the rotation of the ring gear R1 at the reduced rotation, reduced by the fixed sun gear S1 and the carrier CR1 rotating at the inputted rotation, is inputted to the sun gear S3 via the first clutch C-1. Further, because the third clutch C-3 engages, the reduced rotation of the ring gear R1 is inputted to the sun gear S2. That is, because the reduced rotation of the ring gear R1 is inputted to the sun gear S2 and the sun gear S3, the planetary gear unit PU is put into a state in which it is directly coupled at the reduced rotation. That is, the reduced rotation is outputted to the ring gear R3 as it is and the output shaft 15 outputs the normal rotation of the forward third speed stage.

In case of a forward fourth speed stage (4th), the first clutch C-1 and the fourth clutch C-4 engage as shown in FIG. 4. Then, as shown in FIGS. 3 and 5, the rotation of the ring gear R1 at the reduced rotation, reduced by the fixed sun gear S1 and the carrier CR1 rotating at the inputted rotation, is inputted to the sun gear S3 via the first clutch C-1. Further, because the fourth clutch C-4 engages, the inputted rotation of the carrier CR1 is inputted to the sun gear S2. Then, the carrier CR2 rotates at a reduced rotation whose speed is higher than that of the sun gear S3, the reduced rotation inputted to the sun gear S3 is outputted to the ring gear R3 via the carrier CR2 and the output shaft 15 outputs the normal rotation of the forward fourth speed stage.

In case of a forward fifth speed stage (5th), the first clutch C-1 and the second clutch C-2 engage as shown in FIG. 4. Then, as shown in FIGS. 3 and 5, the rotation of the ring gear R1 at the reduced rotation, reduced by the fixed sun gear S1 and the carrier CR1 rotating at the inputted rotation, is inputted to the sun gear S3 via the first clutch C-1. Because the second clutch C-2 engages, the inputted rotation is inputted to the carrier CR2. Then, a reduced rotation whose speed is higher than that of the forward fourth speed stage, due to the reduced rotation inputted to the sun gear S3 and the inputted rotation inputted to the carrier CR2, is outputted to the ring gear R3 and the output shaft 15 outputs the normal rotation of the forward fifth speed stage.

In case of a forward sixth speed stage (6th), the second clutch C-2 and the fourth clutch C-4 engage as shown in FIG. 4. Then, as shown in FIGS. 3 and 5, the inputted rotation of the carrier CR1 is inputted to the sun gear S2 because the fourth clutch C-4 engages. Further, because the second clutch C-2 engages, the inputted rotation is inputted to the carrier CR2. That is, because the inputted rotation is inputted to the sun gear S2 and the carrier CR2, the planetary gear unit PU is directly coupled at the inputted rotation, the inputted rotation is outputted to the ring gear R3 as it is and the output shaft 15 outputs the normal rotation of the forward sixth speed stage.

In case of a forward seventh speed stage (7th), the second clutch C-2 and the third clutch C-3 engage as shown in FIG. 4. Then, as shown in FIGS. 3 and 5, the rotation of the ring gear R1 at the reduced rotation, reduced by the fixed sun gear S1 and the carrier CR1 rotating at the inputted rotation, is inputted to the sun gear S2 via the third clutch C-3. Still more, the inputted rotation is inputted to the carrier CR2 as the second clutch C-2 engages. Then, an over-driven rotation, whose speed has become slightly higher than that of the inputted rotation due to the reduced rotation inputted to the sun gear S2 and the inputted rotation inputted to the carrier CR2, is outputted to the ring gear R3 and the output shaft 15 outputs the normal rotation of the forward seventh speed stage.

In case of a forward eighth speed stage (8th), the second clutch C-2 engages and the first brake B-1 is fastened as shown in FIG. 4. Then, as shown in FIGS. 3 and 5, the inputted rotation is inputted to the carrier CR2 because the second clutch C-2 engages. Further, because the first brake B-1 is fastened, the rotation of the sun gear S2 is fixed. Then, the inputted rotation of the carrier CR2 turns out to be an over-driven rotation whose speed is higher than that of the forward seventh speed stage described above and is outputted to the ring gear R3. Thus, the output shaft 15 outputs the normal rotation of the forward eighth speed stage.

In case of a reverse first speed stage (Rev1), the third clutch C-3 engages and the second brake B-2 is fastened as shown in FIG. 4. Then, as shown in FIGS. 3 and 5, the rotation of the ring gear R1 at the reduced rotation, reduced by the fixed sun gear S1 and the carrier CR1 rotating at the inputted rotation, is inputted to the sun gear S2 via the third clutch C-3. Further, because the second brake B-2 is fastened, the rotation of the carrier CR2 is fixed. Then, the reduced rotation inputted to the sun gear S2 is outputted to the ring gear R3 via the fixed carrier CR2 and the output shaft 15 outputs the reverse rotation of the reverse first speed stage.

In case of a reverse second speed stage (Rev2), the fourth clutch C-4 engages and the second brake B-2 is fastened as shown in FIG. 4. Then, as shown in FIGS. 3 and 5, because the fourth clutch C-4 engages, the inputted rotation of the carrier CR1 is inputted to the sun gear S2. Further, because the second brake B-2 is fastened, the rotation of the carrier CR2 is fixed. Then, the inputted rotation inputted to the sun gear S2 is outputted to the ring gear R3 via the fixed carrier CR2 and the output shaft 15 outputs the reverse rotation of the reverse second speed stage.

It is noted that in P (parking) and N (neutral) ranges for example, the first clutch C-1, the second clutch C-2, and the third and fourth clutches C-3, C-4 are disengaged. Then, the transmission of power between the carrier CR1 and the sun gear S2 and between the ring gear R1, the sun gear S2 and the sun gear S3, i.e., the transmission of power between the planetary gear DP and the planetary gear unit PU, is disconnected. Further, the transmission of power between the input shaft 12 (the intermediate shaft 13) and the carrier CR2 is disconnected. Thereby, the transmission of power between the input shaft 12 and the planetary gear unit PU is disconnected. That is, the transmission of power between the input shaft 12 and the output shaft 15 is disconnected.

Here, the overall schematic structure of the automatic transmission 1 or, more specifically, the relative positional relationship among the components will be explained briefly with reference to FIG. 1. It is noted that the terms "clutch" (first through fourth clutches C-1 through C-4) and "brake" (first brake B-1 and second brake B-2) will be used in a sense of including friction plates (outer and inner frictional plates) and hydraulic servos for engaging/disengaging them in the following explanation.

Figure 1:
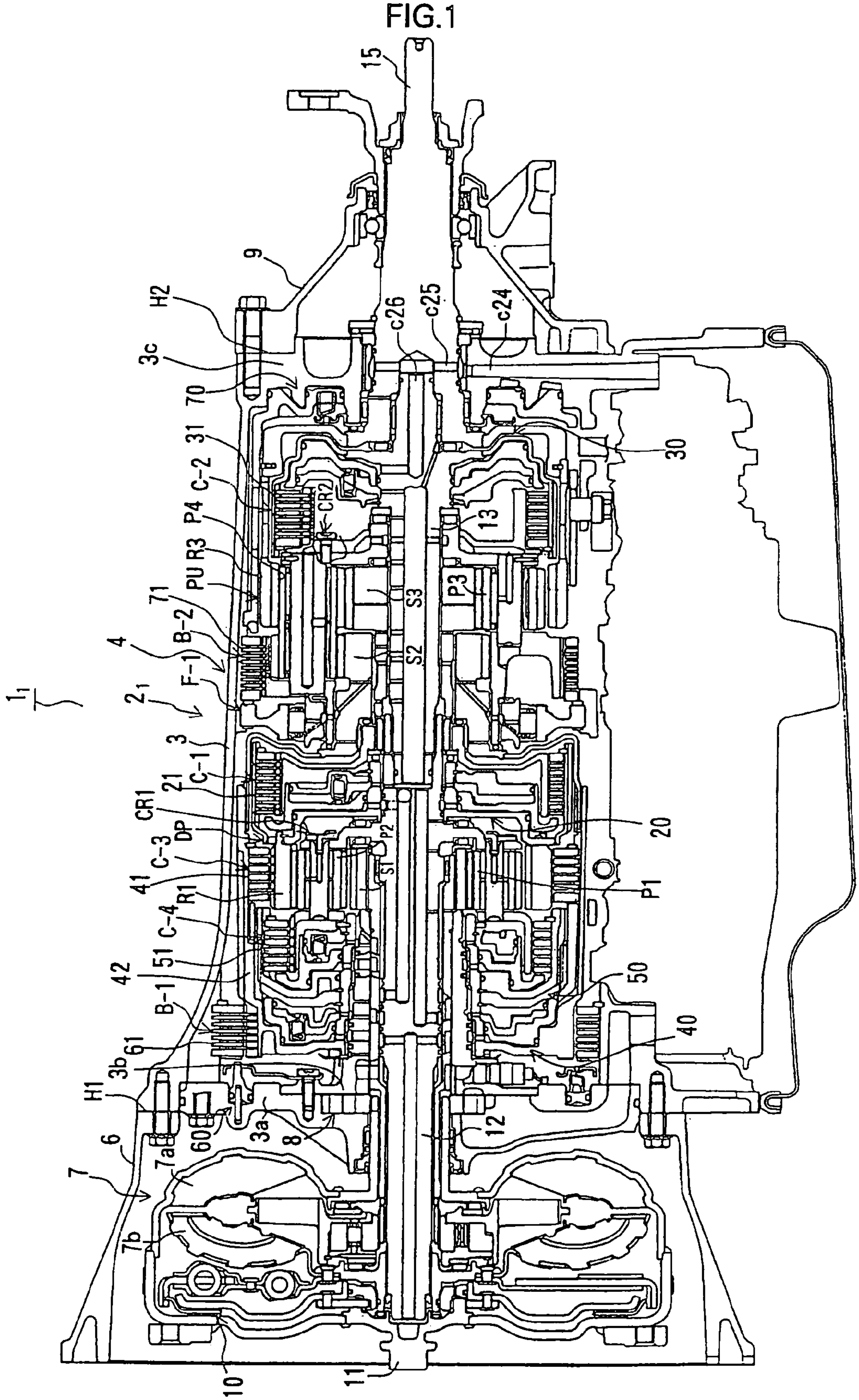
FIG. 1 is a section view showing an automatic transmission according to a first exemplary embodiment.

As shown in FIG. 1, a case 4 of the automatic transmission 1 is formed approximately in a cylindrical shape having a large diameter more or less at its front side (the left side in FIG. 1) and a small diameter at its rear side. The case 4 is composed of three partial cases. That is, it is formed by jointing a front housing case 6, the intermediary mission case 3 and a rear extension case 9, respectively, at joint faces H1, H2. A flange-like partition member 3*a* is fixed at the front edge of the mission case 3, positioned in the vicinity of the front joint face H1 among the joint faces H1, H2. It is noted that a boss portion 3*b* projects toward the rear on the inner diametric side of the rear face of the partition member 3*a*. Meanwhile, a flange-like partitioning portion 3*c* is provided in a body with the mission case 3 at the rear end of the mission case 3 and positioned in the vicinity of the rear joint face H2.

The input shaft 11 of the automatic transmission 1, the input shaft 12, the intermediate shaft 13 and the output shaft 15 of the transmission mechanism 2 are disposed on the same axis in order from the front to the rear side at the center of the case 4 described above. As for their position in the axial direction, the input shaft 11 of the automatic transmission 1 is positioned at the front part of the housing case 6 and the input shaft 12 of the transmission mechanism 2 extends from just behind the input shaft 11 nearly to the center of the mission case 3 by penetrating through the center of the partition member 3*a*. The front part of the intermediate shaft 13 is spline-coupled with the inside of the rear part of the input shaft 12 and the rear end thereof extends nearly to the rear joint face H2. The front part of the output shaft 15 is fitted around the outer peripheral face of the intermediate shaft 13 so as to be relatively rotatable and the rear part thereof protrudes out of the rear part of the extension case 9. It is noted that the input shaft 12 and the intermediate shaft 13 are built in a body as described above and compose the input shaft in a broad sense.

The aforementioned torque converter 7 is stored within the housing case 6 on the input shaft 12 of the transmission mechanism 2. An oil pump 8 is disposed on the inner diametric side of the partition member 3*a* dividing the inside of the housing case 6 from the inside of the mission case 3.

Within the mission case 3, the planetary gear unit PU is disposed on the intermediate shaft 13 and the third clutch C-3, the fourth clutch C-4, the planetary gear DP, and the first clutch C-1 are disposed axially on the front side (on one side) of the planetary gear unit PU. The fourth clutch C-4 and the planetary gear DP are disposed on the inner peripheral side of a clutch drum 42 of the third clutch C-3 described later in detail. Further, the first brake B-1 is disposed on the outer peripheral side of the clutch drum 42 of the third clutch C-3.

Meanwhile, the second clutch C-2 is disposed axially on the rear side (on the other side) of the planetary gear unit PU. The second brake B-2 is disposed on the outer peripheral side of the planetary gear unit PU and the one-way clutch F-1 is disposed between the planetary gear unit PU and the first clutch C-1.

More specifically, friction plates 61 of the first brake B-1, friction plates 51 of the fourth clutch C-4, friction plates 41 of the third clutch C-3 and friction plates 21 of the first clutch C-1 are disposed on the input shaft 12 in order from the front relatively on the outer diametric side within the front half part of the mission case 3, i.e., within the part before the one-way clutch F-1. A hydraulic servo 60 of the first brake B-1 is disposed just before the friction plates 61. A hydraulic servo 40 of the third clutch C-3 extending to the friction plates 41 is disposed on the inner diametric side of the friction plates 61. Further, a hydraulic servo 50 of the fourth clutch C-4 is disposed from the front side to the inner diametric side of the friction plates 51. The planetary gear DP is disposed on the inner diametric side of the friction plates 41 and a hydraulic servo 20 of the first clutch C-1 is disposed approximately on the inner diametric side of the friction plates 21. That is, the hydraulic servo 40, the hydraulic servo 50 and the planetary gear DP are disposed in order approximately from the front (in order from the side of the joint of the boss portion 3*b* with the case 4 in the axial direction) on the boss portion 3*b*, described later, on the inner diametric side within the front half part of the mission case 3 and the hydraulic servo 20 is disposed on the input shaft 12 in a manner of adjoining with the planetary gear DP.

Meanwhile, the planetary gear unit PU is disposed on the intermediate shaft 13 within the rear half part of the mission case 3, i.e., within the part behind the one-way clutch F-1. Friction plates 71 of the second brake B-2 are disposed on the outer peripheral side in the front half portion of the planetary gear unit PU and friction plates 31 of the second clutch C-2 are disposed on the outer diametric side behind the planetary gear unit PU. A hydraulic servo 30 of the second clutch C-2 is disposed from the part behind the friction plates 31 to the inner diametric side and a hydraulic servo 70 of the second brake B-2, that partially extends to the friction plates 71 from the rear side by passing through the outer diametric side of the friction plates 31 is disposed behind the hydraulic servo 30.

Next, the structure within the mission case 3 will be explained in detail with reference to FIG. 2. It is noted that the structure for supporting each component and the structure of each oil passage will be collectively explained later.

The planetary gear DP disposed within the mission case 3 is provided with the sun gear S1, the carrier CR1 and the ring gear R1 as described above. Among them, the sun gear S1 is fixed to a sleeve member 100. The sleeve member 100 fits around the outer peripheral face of the input shaft 12 and extends forward to be joined with the inner peripheral face of the boss portion 3*b* that extends to the rear from the inner diametric side of the rear face of the partition member 3*a* of the mission case 3 as described above. That is, it is a part of the boss portion 3*b* in a broad sense and the sun gear S1 is fixed to the boss portion 3*b* so as not to be rotatable. The carrier CR1 has a rear carrier plate CR1*a* and a front carrier plate CR1*b* to rotatably support the pinions P1, P2. While the pinions P1, P2 engage with each other, the pinion P1 engages with the sun gear S1 and the pinion P2 engages with the ring gear R1, respectively. The rear carrier plate CR1*a* is formed so as to extend from the outer peripheral face of the rear part of the input shaft 12 to the outer diametric side in the shape of a flange. Meanwhile, the front carrier plate CR1*b* is formed in the shape of a ring and has a hub portion CR1*c* extending forward from its outer periphery. Inner friction plates 51*b* of the fourth clutch C-4, described later, are spline-coupled with the outer peripheral face of the hub portion CR1*c*. The inner friction plates 41*b* of the third clutch C-3, described later, are spline-coupled with the outer peripheral face of the ring gear R1. A hub portion R1*a* extending to the rear from substantially the outer diametric side is linked to the rear end of the ring gear R1. Outer friction plates 21*a* of the first clutch C-1, described later, are spline-coupled with the hub portion R1*a*. Further, the ring gear R1 is rotatably supported by the input shaft 12 through an intermediary of a clutch drum 22 of the hydraulic servo 20, described later, extending from its rear end to the inside.

The fourth clutch C-4 is disposed on the boss portion 3*b* through an intermediary of the clutch drum 42 of the third clutch C-3, described later, just in front of the planetary gear DP described above. The fourth clutch C-4 is provided with the friction plate 51 composed of outer friction plates 51*a* and inner friction plates 51*b* and a hydraulic servo 50 for engaging/disengaging the friction plates 51. The hydraulic servo 50 has a clutch drum 52, a piston member 53, a cancel plate 54 and a return spring 55 and composes thereby an oil chamber 56 and a cancel oil chamber 57. The clutch drum 52 has a flange portion 52*a* extending from the inner diametric side to the outer diametric side and a drum portion 52*b*, the drum portion 52*b* extending from the outer periphery of the flange portion 52*a* to the rear. The base portion, on the inner diametric side, of the flange portion 52*a* is blocked from moving to the front side by a snap ring 58 fitted to a hub portion 42*c* that is a part of the clutch drum 42 of the hydraulic servo 40 of the third clutch C-3, described later. The drum portion 52*b* is disposed on the outer diametric side of the hub portion CR1*c* of the front carrier plate CR1*b* of the planetary gear DP described above and the outer friction plates 51*a* are spline-coupled with the inner peripheral face thereof. The piston member 53 is disposed behind the flange portion 52*a* of the clutch drum 52 so as to be reciprocal in the longitudinal direction and composes the oil-tight oil chamber 56 between the clutch drum 52 by three seal rings a1, a2, a3. Further, the cancel plate 54 is blocked from moving to the rear by a snap ring 59 fitted to the hub portion 42*c* described above. The cancel plate 54 is provided with the return spring 55 contracted between the piston member 53, disposed to the front and the clutch drum 52. The oil-tight cancel oil chamber 57 is provided by two seal rings a2, a4.

It is noted that because the fourth clutch C-4 is structured as described above, the inputted rotation of the carrier CR1 is inputted to the clutch drum 52 when the fourth clutch C-4 engages. The rotation is not inputted to the clutch drum 52 and the hydraulic servo 50 will not rotate when the fourth clutch C-4 is not engaged, especially in Neutral and Parking ranges.

The third clutch C-3 is built so as to surround the inner peripheral side, the front side and the outer peripheral side of the fourth clutch C-4 and is disposed on the boss portion 3*b*. The third clutch C-3 is provided with the friction plates 41 comprising outer friction plates 41*a* and inner friction plates 41*b* and the hydraulic servo 40 for engaging/disengaging the friction plates 41. The hydraulic servo 40 has the clutch drum 42, the piston member 43, a cancel plate 44 and a return spring 45 and defines an oil chamber 46 and a cancel oil chamber 47 with the clutch drum 42, piston member 43, and cancel plate 44. The clutch drum 42 has a flange portion 42*a* disposed behind the partition member 3*a*, a hub portion 42*c* extending to the rear from the inner periphery of the flange portion 42*a* and a drum portion 42*b* extending to the rear from the outer periphery of the flange portion 42*a*. The boss portion 3*b* extends from the rear face of the partition member 3*a* as described above. The hub portion 42*c* is fitted around the outer peripheral face of the boss portion 3*b* and is rotatably supported by the boss portion 3*b*. The hub portion 42*c* is formed so that its outer peripheral face has a plurality of steps whose diameter is large at the front end side and is small at the rear end side. The rear end of the hub portion 42_c_ is positioned just before the front end face of the sun gear S1 described above. In other words, the rear end of the hub portion 42_c_ is positioned on the rear side of the fourth clutch C-4. The drum portion 42_b_ of the clutch drum 42 extends to the outer diametric side of the first clutch C-1 passing by the outer diametric side of the fourth clutch C-4. The drum portion 42_b_ is spline-coupled with an inner friction plates 61_b_ of the first brake B-1 on the outer peripheral face of the front part thereof and is spline-coupled with the inner friction plates 41_b_ on the inner peripheral face of the middle part thereof, i.e., at the part corresponding to the ring gear R1 described above, and is linked with a link member 101 at the rear part. The link member 101 extends to the inner diametric side of the drum portion 42_b_ via the outer diametric side and the rear side of the first clutch C-1 and is linked with the sun gear S2 shown in FIG. 1.

The piston member 43 of the third clutch C-3 has a flange portion 43_a_ and a drum portion 43_b_ extending to the rear from the outer periphery of the flange portion 43_a_. The flange portion 43_a_ is disposed behind the flange portion 42_a_ of the clutch drum 42 described above so as to be movable in the axial direction and defines an oil-tight oil chamber 46 between the clutch drum 42 and the flange portion 43_a_ with two seal rings a5, a6. Further, the drum portion 43_b_ extends to the rear along the outer peripheral side of the drum portion 52_b_ of the clutch drum 52 of the fourth clutch C-4 and on the inner peripheral side of the drum portion 42_b_ of the clutch drum 42 so that its rear end faces the friction plates 41. It is noted that a part of the outer peripheral face of the drum portion 52_b_ is spline-coupled with a part of the inner peripheral face of the drum portion 42_b_ via a cut-away portion (not shown) provided in a part of the drum portion 43_b_. A cancel plate 44 is blocked from moving to the rear side by a snap ring 49 fitted into the hub portion 42_c_ described above. The cancel plate 44 is provided with a return spring 45 in contraction between the piston member 43 and the cancel plate 44. The cancel plate 44 and the piston member 43 define an oil-tight cancel oil chamber 47 with two seal rings a5, a7.

It is noted that because the third clutch C-3 is built as described above, the reduced rotation of the ring gear R1 is inputted to the clutch drum 42 when the third clutch C-3 engages. The rotation is not inputted to the clutch drum 42 and the hydraulic servo 40 will not rotate when the third clutch C-3 is not engaged, specially in Neutral and Parking ranges.

The first clutch C-1 is disposed on the input shaft 12 behind the planetary gear DP and the friction plates 41 of the third clutch C-3. The first clutch C-1 is provided with the friction plates 21 comprising outer friction plates 21_a_ and inner friction plates 21_b_ and the hydraulic servo 20 for engaging/disengaging the friction plates 21. The outer friction plates 21_a_ are spline-coupled with the inner peripheral face of a drum portion R1_a_ of the ring gear R1. The inner friction plates 21_b_ are linked with a drum portion 102_b_ of a link member 102. The link member 102 is linked with a flange portion 102_a_ extending to the inner diametric side from the drum portion 102_b_ and with the sun gear S3 described above (see FIG. 1) via a sleeve-like hub portion 102_c_ extending to the rear from the inner periphery of the flange portion 102_a_. The hydraulic servo 20 has a clutch drum 22, a piston member 23, a cancel plate 24 and a return spring 25 and defines an oil chamber 26 and a cancel oil chamber 27 with them. The clutch drum 22 has a flange portion 22_a_ extending from the inner diametric side to the outer diametric side, a drum portion 22_b_ extending forward from the outer periphery of the flange portion 22_a_ to be linked with the rear end of the ring gear R1 and a hub portion 22_c_ extending to the rear from the inner periphery of the flange portion 22_a_. The hub portion 22_c_ is attached to the outer peripheral face of the rear part of the input shaft 12 so as to be relatively rotatable. The piston member 23 is disposed behind the clutch drum 22 so as to be movable in the axial direction and defines an oil-tight oil chamber 26 between the clutch drum 22 and piston member 23 with two seal rings a8, a9. A part of the piston member 23 on the outer peripheral side faces to the front face of the friction plates 21 from the front side. The cancel plate 24 is blocked from moving to the rear by a snap ring 29 fitted to the hub portion 22_c_ described above. The cancel plate 24 is provided with the return spring 25 contracted between the piston member 23 and the cancel plate 24. The cancel plate 24 and the piston member 23 define an oil-tight cancel oil chamber 27 with two seal rings a8, a10.

The first brake B-1 is disposed in the vicinity of the outer diametric side of the partition member 3_a_. The first brake B-1 is provided with friction plates 61 composed of outer friction plates 61_a_ and inner friction plates 61_b_ and a hydraulic servo 60 for engaging/disengaging the friction plates 61. The outer friction plates 61_a_ are spline-coupled with the inner peripheral face of the front end side of the mission case 3. The inner friction plates 61_b_ are spline-coupled with the outer peripheral face of the front part of the drum portion 42_b_ of the third clutch C-3 described above. The hydraulic servo 60 has a clutch drum 62, a piston member 63, a cancel plate 64 and a return spring 65 and defines an oil chamber 66 with them. The clutch drum 62 is formed by providing a concave portion on the outer peripheral side of the rear face of the partition member 3_a_. The piston member 63 is engaged with the cylinder member 62 so as to be movable in the axial direction. A part of the piston member 63 on the rear end part penetrates through the cancel plate 64 and faces to the front end of the friction plates 61. An oil-tight oil chamber 66 is formed between the piston member 63 and the cylinder member 62 by two seal rings a11, a12. The cancel plate 64 is formed in the shape of a plate and ring and its inner peripheral side is fixed to the rear face of the partition member 3_a_ by bolts. A return spring 65 is disposed in contraction between the cancel plate 64 and the piston member 63.

Next, the supporting structure for each component, i.e., bearings, will be explained.

A bearing b1 is interposed between the inner peripheral face of the rear end of the sleeve member 100, which is combined in a body with the boss portion 3_b_ of the partition member 3_a_, and the outer peripheral face of the input shaft 12. Bearings b2, b3 are interposed between the front face of the inner diametric side of the rear carrier plate CR1_a_ which is combined with the input shaft 12 and the rear end face of the sun gear S1 and between the rear face thereof and the clutch drum 22, respectively. Thereby, the input shaft 12 is rotatably supported to the mission case 3. Bearings b4, b5 are interposed between the outer peripheral face of the boss portion 3_b_ of the partition member 3_a_ and the inner peripheral face of the hub portion 42_c_ of the clutch drum 42. Thus, the clutch drum 42 is rotatably supported to the boss portion 3_b_. A bearing b6 is interposed between the rear end of the hub portion 22_c_ of the clutch drum 22 of the first clutch C-1 and the hub portion 102_c_ of the link member 102.

Next, the structure of oil passages of each component will be explained.

The input shaft 12 is provided with three perforated oil passages in the axial direction, i.e., an oil passage cl heading from the front end to the rear and oil passages c2, c3 heading from the rear end to the front. The oil passage c1 communicates with the outer peripheral face of the input shaft 12 through oil passages c4, c5 in the radial direction, the oil passage c2 communicates through oil passages c6, c7 in the radial direction and the oil passage c3 communicates through oil passages c8 through c11 in the radial direction, respectively. Seven oil passages c12 through c18 are perforated through the boss portion 3*b* of the partition member 3*a* in the radial direction in order from the front side. Oil passages c19 through c22 are perforated radially through the hub portion 42*c*, of the clutch drum 42 of the third clutch C-3 positioned on the outer peripheral side of the boss portion 3*b*, in order from the front side. An oil passage c23 is perforated radially through the hub portion 22*c* of the clutch drum 22 of the first clutch C-1 positioned on the outer peripheral side of the rear part of the input shaft 12. Further, an oil groove (not shown) is formed on the outer peripheral side of the sleeve member 100 and defines an oil passage between the boss portion 3*b* and the sleeve member 100. That is, an oil passage is formed within the boss portion 3*b* in a broad sense (hereinafter referred to as an "oil passage within the boss portion 3*b*"). Seal rings d1 through d4 for sealing the boss portion 3*b* (sleeve member 100) and the oil passages c4, c5, c8, c6 are provided on the outer peripheral side of the input shaft 12 and seal rings d5, d6 for sealing the oil passages c7, c23 are provided on the outer peripheral side of the rear side of the input shaft 12. In addition, seal rings d7 through d10 for sealing the oil passages c13, c16 of the boss portion 3*b* and the oil passages c19, c21 of the hub portion 42*c* of the clutch drum 42 are provided on the outer peripheral side of the boss portion 3*b*.

It is noted that operating fluid is supplied from the hydraulic control unit to the hydraulic servo 30 of the second clutch C-2 via an oil passage c24 provided in the partitioning portion 3*c* of the mission case 3, an oil passage 25 provided in the output shaft 15, and an oil passage c26 provided in the intermediate shaft (input shaft) 13 as shown in FIG. 1.

Next, the supply of lubricant oil will be explained. When lubricant oil is supplied to the oil passages within the boss portion 3*b* based on hydraulic pressure generated by the oil pump 8, the lubricant oil is supplied to the oil passages c12, c14, c15, c17, c18 within the boss portion 3*b* and is splashed to the outer peripheral side of the boss portion 3*b*. Further, the lubricant oil supplied to the oil passages within the boss portion 3*b* by the oil pump 8 is supplied to the oil passage c8 of the input shaft 12 in a manner of being sealed by the seal rings d2, d3. Then, it is supplied to the rear side via the oil passage c3 and is splashed to the outer peripheral side of the input shaft 12 from the oil passages c9, c10, c11. Thereby, each member within the mission case 3, i.e., each gear of the planetary gear DP, each member of the first clutch C-1, each member of the third clutch C-3, each member of the fourth clutch C-4, each member of the first brake B-1 and specifically the friction plates 21, 41, 51 and 61 as well as the bearings b1 through b6 are lubricated. It is noted that oil within the cancel oil chambers 47, 57 of the third and fourth clutches C-3, C-4 for example, is also supplied in the same manner as the lubricant oil via the oil passages c20, c22 and lubricates each member within the mission case 3 in a manner of joining with other lubricant oil when it is emitted.

Next, the supply of operating fluid will be explained. The hydraulic control unit (not shown) generates and controls engaging pressure of the first clutch C-1, the second clutch C-2, the third clutch C-3, the fourth clutch C-4, the first brake B-1, the second brake B-2 and the lockup clutch 10 based on the hydraulic pressure caused by the oil pump 8, for example. Each operating fluid is supplied to each oil passage provided separately within the boss portion 3*b* (within the sleeve member 100) from around the joint of the boss portion 3*b* on the front side based on the engaging hydraulic pressure of the lockup clutch 10, the first clutch C-1, and the third and fourth clutches C-3, C-4 among them.

When the operating fluid for engaging the lockup clutch 10 is supplied to the oil passage within the boss portion 3*b*, it is supplied from the oil passage within the boss portion 3*b* to the oil passages c4, c5 in a manner of being sealed by the seal rings d1, d2. The operating fluid supplied to the oil passages c4, c5 is supplied to the friction plate of the lockup clutch 10 via the oil passage c1 and acts on the friction plate. Then, a flange-like member, provided around the input shaft 11, presses the friction plate and the lockup clutch 10 engages as a result. It is noted that the operating fluid is emitted in reverse via the oil passages c1, c4, c5 when the lockup clutch 10 is disengaged based on the hydraulic control made by the hydraulic control unit.

When the operating fluid for engaging the third clutch C-3 is supplied to the oil passage within the boss portion 3*b*, it is supplied to the oil passage c13 from the oil passage in the axial direction (not shown) within the boss portion 3*b*. The operating fluid supplied to the oil passage c13 is supplied to the oil passage c19 in a manner of being sealed by the seal rings d7, d8, i.e., from the oil passage c13 in the boss portion 3*b* to the oil passage c19 of the clutch drum 42 which are mutually and relatively rotatable. Then, the operating fluid is supplied to the oil chamber 46 of the hydraulic servo 40 of the third clutch C-3 via the oil passage c19. Thus, the piston member 43 is pressed backward and the drum portion 43*b* presses the friction plates 41, i.e., the third clutch C-3 engages. It is noted that when the third clutch C-3 is disengaged, based on the hydraulic control by the hydraulic control unit, the piston member 43 is pressed forward by an urging force of the return spring 45 and, thereby, the operating fluid of the oil chamber 46 is emitted in reverse via the oil passages c19, c13 and the oil passage in the axial direction within the boss portion 3*b*.

When the operating fluid for engaging the fourth clutch C-4 is supplied to the oil passage within the boss portion 3*b*, it is supplied to the oil passage c16 from the oil passage in the axial direction (not shown) within the boss portion 3*b*. The operating fluid supplied to the oil passage c16 is supplied to the oil passage c21 in a manner of being sealed by the seal rings d9, d10, i.e., from the oil passage c16 in the boss portion 3*b* to the oil passage c21 of the clutch drum 42 which are mutually and relatively rotatable. Then, the operating fluid is supplied to the oil chamber 56 of the hydraulic servo 50 of the fourth clutch C-4 via the oil passage c21. Thus, the piston member 53 is pressed backward and the friction plates 51 are pressed, i.e., the fourth clutch C-4 engages. It is noted that when the fourth clutch C-4 is disengaged based on the hydraulic control by the hydraulic control unit, the piston member 53 is pressed forward by an urging force of the return spring 55 and thereby, the operating fluid of the oil chamber 56 is emitted in reverse via the oil passages c21, c16 and the oil passage in the axial direction within the boss portion 3*b*.

When the operating fluid for engaging the first clutch C-1 is supplied to the oil passage within the boss portion 3*b*, it is supplied to the oil passage c6 from the oil passage in the axial direction (not shown) within the boss portion 3*b* in a manner of being sealed by the seal rings d3, d4. That is, it is supplied from the oil passage in the boss portion 3*b* to the oil passage c6 of the input shaft 12, which are mutually and relatively rotatable. Further, the operating fluid supplied to the oil passage c6 is supplied to the rear side to the oil passage c7 via the oil passage c2 within the input shaft 12. The operating fluid supplied to the oil passage c7 is then supplied to the oil passage c23 of the clutch drum 22 from the oil passage c7 of the input shaft 12 which are mutually and relatively rotatable in a manner of being sealed by the seal rings d5, d6. Then, the operating fluid is supplied to the oil chamber 26 of the hydraulic servo 20 of the first clutch C-1 via the oil passage c23. Thus, the piston member 23 is pressed backward and the friction plates 21 are pressed, i.e., the first clutch C-1 engages. It is noted that when the first clutch C-1 is disengaged, based on the hydraulic control by the hydraulic control unit, the piston member 23 is pressed forward by an urging force of the return spring 25 and thereby, the operating fluid in the oil chamber 26 is emitted in reverse via the oil passages c23, c17, c2, c6 and the oil passage in the axial direction within the boss portion 3*b*.

According to the automatic transmission $\mathbf{1}_1$ described above, the fourth clutch C-4 is linked with the sun gear S2 of the planetary gear unit PU via the output side members (the clutch drum 42 and the link member 102) of the third clutch C-3, so that the output side members become the output side members of the two clutches transmitting different rotations, i.e., they may be shared in common as one rotary member. As a result, the automatic transmission $\mathbf{1}_1$ may be compactly built.

Further, because the hydraulic servo 50 of the fourth clutch C-4 is disposed axially on the opposite side of the planetary gear DP from the planetary gear unit PU and on the boss portion 3*b*, extending from the case 4, to supply the operating fluid to the hydraulic servo 50 of the fourth clutch C-4 from the oil passage within the boss portion 3*b*, it becomes possible to reduce the number of seal rings as compared to a case of disposing the hydraulic servo 50 of the fourth clutch C-4 on the input shaft 12 through an intermediary of a member having another rotation speed, i.e., as compared to a case of supplying the operating fluid via the other member for example. Thereby, it is possible to prevent a drop in the efficiency and controllability of the automatic transmission $\mathbf{1}_1$.

By the way, the clutch that enables the transmission of the reduced rotation as described above has a problem in that it is required to transmit a relatively large torque because the rotation is reduced as compared to the clutch that enables the transmission of the inputted rotation that is inputted to the input shaft.

However, according to the automatic transmission $\mathbf{1}_1$, because the planetary gear DP, the first clutch C-1, the third clutch C-3 and the fourth clutch C-4 are disposed axially on one side of the planetary gear unit PU and the planetary gear DP and the fourth clutch C-4 are disposed on the inner peripheral side of the clutch drum 42 of the third clutch C-3, it becomes possible to increase an area of the friction plates 21, 41 of the first and third clutches C-1, C-3. That is, even though the capacity of the first and third clutches C-1, C-3 for transmitting the reduced rotation may be increased, the fourth clutch C-4 and the planetary gear DP whose transmittable torque capacity can be relatively small for transmitting the inputted rotation may be disposed on the inner peripheral side of the clutch drum 42 of the third clutch C-3 (note that even though ‘capacity’ means to include a transmittable torque capacity, a thermal capacity and the like, it will be simply referred to as ‘capacity’ herein below). Accordingly, the automatic transmission $\mathbf{1}_1$ that is capable of attaining the multi-stage shift, such as the forward eighth speed stage and the reverse second speed stage, may be compactly built.

Additionally, because the hydraulic servo 20 of the first clutch C-1 is disposed on the input shaft 12 and adjacent to the planetary gear DP and the operating fluid is supplied to the hydraulic servo 20 of the first clutch C-1 from the oil passage provided within the input shaft 12, the operating fluid may be supplied just by providing the pairs of seal rings d3, d4 and d5, d6 along the oil passage for supplying the operating fluid from the hydraulic control unit, i.e., between the oil passage within the boss portion 3*b* and the input shaft 12 and between the hydraulic servo 20 of the first clutch C-1 and the input shaft 12, respectively. Accordingly, it becomes possible to reduce the number of seal rings as compared to a case of supplying operating fluid via another member, for example. Thus, it becomes possible to prevent the drop of the efficiency and controllability of the vehicular automatic transmission $\mathbf{1}_1$.

In addition, although the increase in the radial size of the first clutch C-1 to the outer peripheral side is limited because the third and fourth clutches C-3, C-4 are linked to the sun gear S2 of the planetary gear unit PU through the outer peripheral side of the first clutch C-1 and the link member 101, for example, and others for linking the third and fourth clutches C-3, C-4 with the sun gear S2 of the planetary gear unit PU pass by the outer peripheral side of the first clutch C-1, the capacity of the first clutch C-1 may be maintained by increasing the size in the inner radial direction because the first clutch C-1 is disposed on the input shaft 12, as compared to a case of disposing it on the boss portion b3.

Furthermore, the sun gear S2 of the planetary gear unit PU is capable of transmitting the inputted rotation in connection with the fourth clutch C-4, is capable of transmitting the reduced rotation in connection with the third clutch C-3, and is capable of fixing the rotation in connection with the first brake B-1; the sun gear S3 is capable of transmitting the reduced rotation in connection with the first clutch C-1; the carrier CR2 is capable of transmitting the inputted rotation in connection with the second clutch C-2 and is capable of fixing the rotation in connection with the second brake B-2; and the ring gear R3 is linked to the output shaft 15, so that the multi-stage shift, such as the forward eighth speed stage and the reverse second speed stage, may be attained.

Further, because the friction plates 41 of the third clutch C-3 are disposed on the outer peripheral side of the ring gear R1 and the fourth clutch C-4 is disposed axially between the hydraulic servo 40 of the third clutch C-3 and the friction plates 41 of the third clutch C-3, it is possible to prevent the fourth clutch C-4 from radially overlapping with the hydraulic servo 40 or the friction plates 41 of the third clutch C-3. Accordingly, because the radial size of the fourth clutch C-4 may be increased as compared to a case of disposing it on the inner peripheral side of the third clutch C-3, the automatic transmission $\mathbf{1}_1$ may be compactly built in the radial direction.

Additionally, because the first brake B-1 is disposed on the outer peripheral side of the hydraulic servo 40 of the third clutch C-3, and it may be disposed at the position radially overlapping with the third clutch C-3 while maintaining the capacity of the friction plates 61 of the first brake B-1 and reducing the radial size thereof, the automatic transmission $\mathbf{1}_1$ may be built both compactly in the radial direction and shorter in the axial direction.

Further, because the automatic transmission $\mathbf{1}_1$ is built so that the reduced rotation of the ring gear R1 is inputted to the clutch drum 42 of the third clutch C-3 forming the hydraulic servo 40 of the third clutch C-3 when the third clutch C-3 engages, the reduced rotation is not inputted to the clutch drum 42 of the third clutch C-3 when the third clutch C-3 is not engaged even if a driver races an engine in Neutral or Parking range, for example, and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Still further, because the automatic transmission $\mathbf{1}_1$ is built so that the inputted rotation is inputted to the clutch drum 52, forming the hydraulic servo 50 of the fourth clutch C-4, via the carrier CR1 when the fourth clutch C-4 engages, the inputted rotation is not inputted to the clutch drum 52 when the fourth clutch C-4 is not engaged even if the driver races the engine in Neutral or Parking range, for example, and the input shaft rotates. Accordingly, it is possible to prevent the rotation of the entire hydraulic servo 50 of the fourth clutch C-4 and to prevent dragging of the fourth clutch C-4 which is otherwise caused by a centrifugal hydraulic pressure generated in the oil chamber 56.

Because the second clutch C-2 is disposed axially on the opposite side of the planetary gear unit PU from the planetary gear DP, the second clutch C-2 may be linked with the carrier CR2 without interfering with the member, for example, the link member 101, for linking the first clutch C-1 with the sun gear S3 and the member, for example, the link member 102, for linking the third clutch C-3 with the sun gear S2 for example.

In addition, because planetary gear unit PU is a Ravigneaux type planetary gear in which the ring gear R3 is disposed at one side of the outer peripheral side thereof and the friction plates 71 of the second brake B-2 are disposed on the other side of the outer peripheral side of the planetary gear unit PU, the friction plates 71 of the second brake B-2 may be disposed at the position radially overlapping with the planetary gear unit PU while assuring its capacity and decreasing the diameter thereof. Accordingly, the automatic transmission $\mathbf{1}_1$ may be built both compactly in the radial direction and shorter in the axial direction.

It is noted that although the fourth clutch C-4 and the planetary gear DP are disposed on the inner peripheral side of the clutch drum 42 of the third clutch C-3 in the first embodiment described above, the structure is not limited to that and they may be disposed on the inner peripheral side of the clutch drum 22 of the first clutch C-1, for example. Or, the fourth clutch C-4 may be disposed on the inner peripheral side of the clutch drum 42 of the third clutch C-3 and the planetary gear DP may be disposed on the inner peripheral side of the clutch drum 22 of the first clutch C-1. That is, the fourth clutch C-4 and the planetary gear DP may be disposed at any position as long as they are disposed on the inner peripheral side of at least one of the clutch drum 22 of the first clutch C-1 and the clutch drum 42 of the third clutch C-3.

A second exemplary embodiment, which is a partial modification of the first embodiment, will be explained with reference to FIGS. 6 through 9. The automatic transmission $\mathbf{1}_2$ of the second embodiment is provided with a transmission mechanism $\mathbf{2}_2$. The transmission mechanism $\mathbf{2}_1$ of the automatic transmission $\mathbf{1}_1$ of the first embodiment is arranged so that the fourth clutch C-4 (and its hydraulic servo 50, the friction plate 51 and other elements) is removable. Here, the transmission mechanism $\mathbf{2}_2$, from which the fourth clutch C-4 has been removed, will be explained below. It is noted that the members other than the fourth clutch C-4 are built in the same manner with those in the automatic transmission $\mathbf{1}_1$ of the first embodiment, so that they are denoted by the same reference numerals and their explanation will be omitted here except as needed to facilitate understanding.

Figure 7:
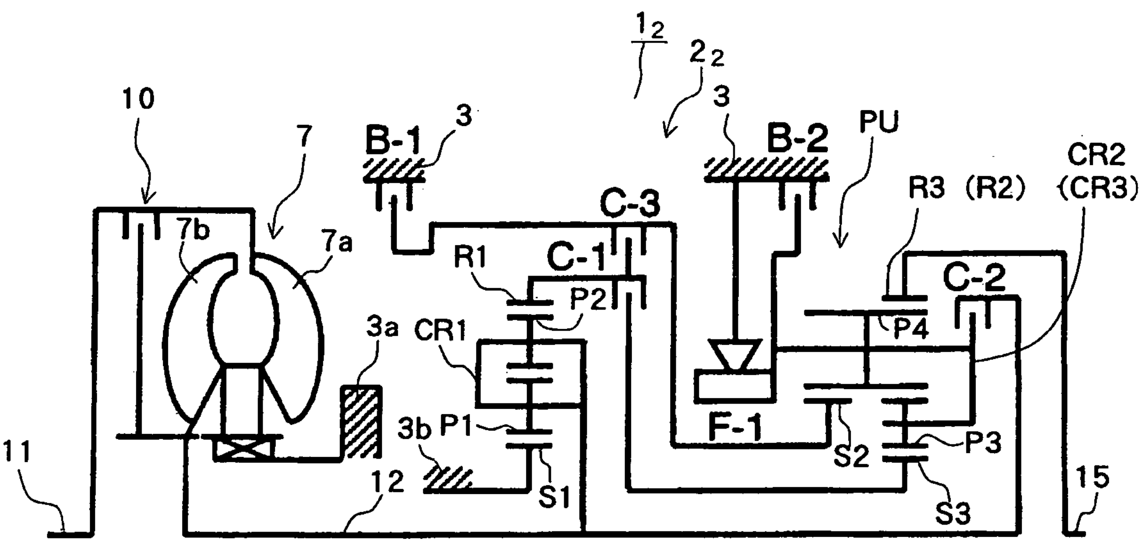
FIG. 7 is a schematic view of the automatic transmission.
Figure 9:
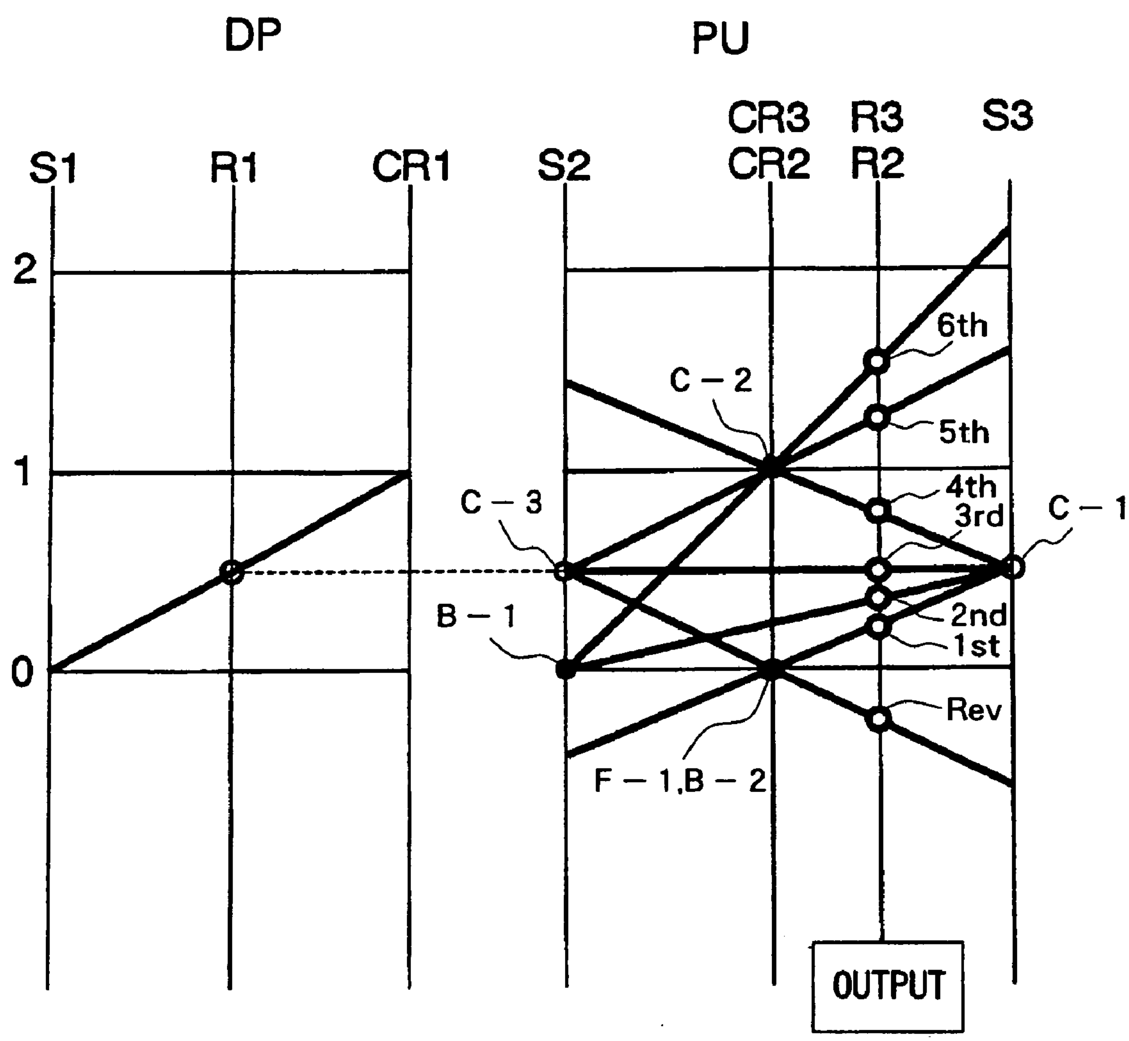
FIG. 9 is a speed diagram of the automatic transmission.

Operation of the transmission mechanism $\mathbf{2}_2$ will be explained with reference to FIGS. 7, 8 and 9. It is noted that in the speed diagram shown in FIG. 9, the vertical axis indicates a number of rotations of each rotary element (each gear) and the horizontal axis indicates a gear ratio of those rotary elements. In the part of the planetary gear DP in the speed diagram, the vertical line on the left side corresponds to the sun gear S1. The other vertical lines correspond, in order to the right in the diagram, to the ring gear R1 and to the carrier CR1, respectively. In the part of the planetary gear unit PU in the speed diagram, the vertical line on the right side corresponds to the sun gear S3 and the other vertical lines correspond, in order to the left, to the ring gear R3, the carrier CR2 (CR3) and the sun gear S2, respectively.

For example, in the case of a forward first speed stage (1st) in D (drive) range, the first clutch C-1 and the one-way clutch F-1 engage as shown in FIG. 8. Then, as shown in FIGS. 7 and 9, the rotation of the ring gear R1 at the reduced rotation reduced by the fixed sun gear S1 and the carrier CR1 rotating at the inputted rotation is inputted to the sun gear S3 via the first clutch C-1. Further, the carrier CR2 is restricted so as to rotate in one direction (normal rotating direction) and is prevented from rotating in the reverse direction, i.e., it is fixed. Then, the reduced rotation inputted to the sun gear S3 is outputted to the ring gear R3 via the fixed carrier CR2 and the output shaft 15 outputs the normal rotation of the forward first speed stage.

It is noted that when the engine brake is on (coasting time), the condition of the forward first speed stage is maintained by engaging the second brake B-2 to fix the carrier CR2 and to prevent the carrier CR2 from normal rotation. Because the one-way clutch F-1 prevents the carrier CR2 from rotating in the reverse direction and allows the normal rotation in the forward first speed stage, the forward first speed stage in shifting from non-Driving range to Driving range, for example, may be achieved smoothly by automatically engaging the one-way clutch F-1.

In the case of a forward second speed stage (2nd)), the first clutch C-1 engages and the first brake B-1 is engaged as shown in FIG. 8. Then, as shown in FIGS. 7 and 9, the rotation of the ring gear R1 at the rotation reduced by the fixed sun gear S1 and the carrier CR1 rotating at the inputted rotation is inputted to the sun gear S3 via the first clutch C-1. Further, the rotation of the sun gear S2 is fixed because the first brake B-1 is engaged. Then, the carrier CR2 rotates at a reduced rotation whose speed is lower than that of the sun gear S3, the reduced rotation inputted to the sun gear S3 is outputted to the ring gear R3 via the carrier CR2 and the output shaft 15 outputs the normal rotation of the forward second speed stage.

In the case of a forward third speed stage (3rd), the first clutch C-1 and the third clutch C-3 engage as shown in FIG. 8. Then, as shown in FIGS. 7 and 9, the rotation of the ring gear R1 at the reduced rotation reduced by the fixed sun gear S1 and the carrier CR1 rotating at the inputted rotation is inputted to the sun gear S3 via the first clutch C-1. Further, because the third clutch C-3 engages, the reduced rotation of the ring gear R1 is inputted to the sun gear S2. That is, because the reduced rotation of the ring gear R1 is inputted to the sun gear S2 and the sun gear S3, the planetary gear unit PU is put into a state in which the reduced rotation is directly connected. Then, the reduced rotation is outputted to the ring gear R3 as it is and the output shaft 15 outputs the normal rotation of the forward third speed stage.

In the case of a forward fourth speed stage (4th), the first clutch C-1 and the second clutch C-2 engage as shown in FIG. 8. Then, as shown in FIGS. 7 and 9, the rotation of the ring gear R1 at the reduced rotation reduced by the fixed sun gear S1 and the carrier CR1 rotating at the inputted rotation is inputted to the sun gear S3 via the first clutch C-1. Further, because the second clutch C-2 engages, the inputted rotation is inputted to the carrier CR2. Then, the ring gear R3 rotates at a reduced rotation whose speed is higher than that of the forward third speed stage due to the reduced rotation inputted to the sun gear S3 and the inputted rotation inputted to the carrier CR2. Thus, the output shaft 15 outputs the normal rotation of the forward fourth speed stage.

In the case of a forward fifth speed stage (5th), the second clutch C-2 and the third clutch C-3 engage as shown in FIG. 8. Then, as shown in FIGS. 7 and 9, the rotation of the ring gear R1 at the reduced rotation reduced by the fixed sun gear S1 and the carrier CR1 rotating at the inputted rotation is inputted to the sun gear S2 via the third clutch C-3. Further, because the second clutch C-2 engages, the inputted rotation is inputted to the carrier CR2. Then, the ring gear R3 outputs an over-driven rotation whose speed is slightly higher than the inputted rotation due to the reduced rotation inputted to the sun gear S2 and the inputted rotation inputted to the carrier CR2 and the output shaft 15 outputs the normal rotation of the forward fifth speed stage.

In the case of a forward sixth speed stage (6th), the second clutch C-2 engages and the first brake B-1 is engaged as shown in FIG. 8. Then, as shown in FIGS. 7 and 9, the inputted rotation is inputted to the carrier CR2 as the second clutch C-2 engages. Further, because the first brake B-1 is engaged, the rotation of the sun gear S2 is fixed. Then, the carrier CR2 rotates at an over-driven rotation whose speed is higher than that of the forward fifth speed stage due to the fixed sun gear S2 and the output shaft 15 outputs the normal rotation of the forward sixth speed stage.

In the case of the reverse first speed stage, the third clutch C-3 engages and the second brake B-2 is engaged as shown in FIG. 8. Then, as shown in FIGS. 7 and 9, the rotation of the ring gear R1 at the reduced rotation reduced by the fixed sun gear S1 and the carrier CR1 rotating at the inputted rotation is inputted to the sun gear S2 via the third clutch C-3. Further, because the second brake B-2 is engaged, the rotation of the carrier CR2 is fixed. Then, the reduced rotation inputted to the sun gear S2 is outputted to the ring gear R3 via the fixed carrier CR2 and the output shaft 15 outputs the reverse rotation of the reverse first speed stage.

It is noted that in P (parking) and N (neutral) ranges, the first clutch C-1, the second clutch C-2, and the third clutch C-3 are disengaged. Then, the transmission of power among the ring gear R1, the sun gear S2 and the sun gear S3, i.e., the transmission of power between the planetary gear DP and the planetary gear unit PU, is disconnected. Further, the transmission of power between the input shaft 12 (the intermediate shaft 13) and the carrier CR2 is disconnected. As a result, the transmission of power between the input shaft 12 and the planetary gear unit PU is disconnected. That is, the transmission of power between the input shaft 12 and the output shaft 15 is disconnected.

As described above, according to the second embodiment, even though the fourth clutch C-4 of the vehicular automatic transmission $1_1$ is removed, the components other than the fourth clutch C-4 may be used as they are. That is, it is possible to provide the automatic transmission $1_1$ capable of attaining the forward sixth speed stage and the reverse first speed stage, for example, while commonly using the components and the production line to lower costs. Accordingly, it becomes possible to line up the automatic transmission $1_1$ having the fourth clutch C-4 and capable of attaining the forward eighth speed stage and the reverse second speed stage and the automatic transmission $1_2$ that requires no fourth clutch C-4 and capable of attaining the forward sixth speed stage and the reverse first speed stage without increasing their cost.

A third exemplary embodiment, which is a partial modification of the first embodiment described above, will be explained with reference to FIGS. 10 and 11. The automatic transmission $1_3$ of the third embodiment is provided with the transmission mechanism $2_3$. As compared to the transmission mechanism $2_1$ of the automatic transmission $1_1$ of the first embodiment, the transmission mechanism $2_3$ is characterized in that the third clutch C-3 is disposed on the outer peripheral side of the fourth clutch C-4, the friction plate 21 of the first clutch C-1 is disposed on the outer peripheral side of the ring gear R1 of the planetary gear DP and the first brake B-1 is disposed axially between the first clutch C-1 and the planetary gear unit PU. It is noted that the members other than those components are built in almost the same manner as those in the automatic transmission $1_1$ of the first embodiment. As such they are denoted by the same reference numerals and their explanation will be omitted here except as necessary to facilitate understanding. Further, as the operations in the forward 1st through eighth speed stages and in the reverse 1st and second speed stages are the same, their explanation will be also omitted here (see FIGS. 3 through 5).

Figure 10:
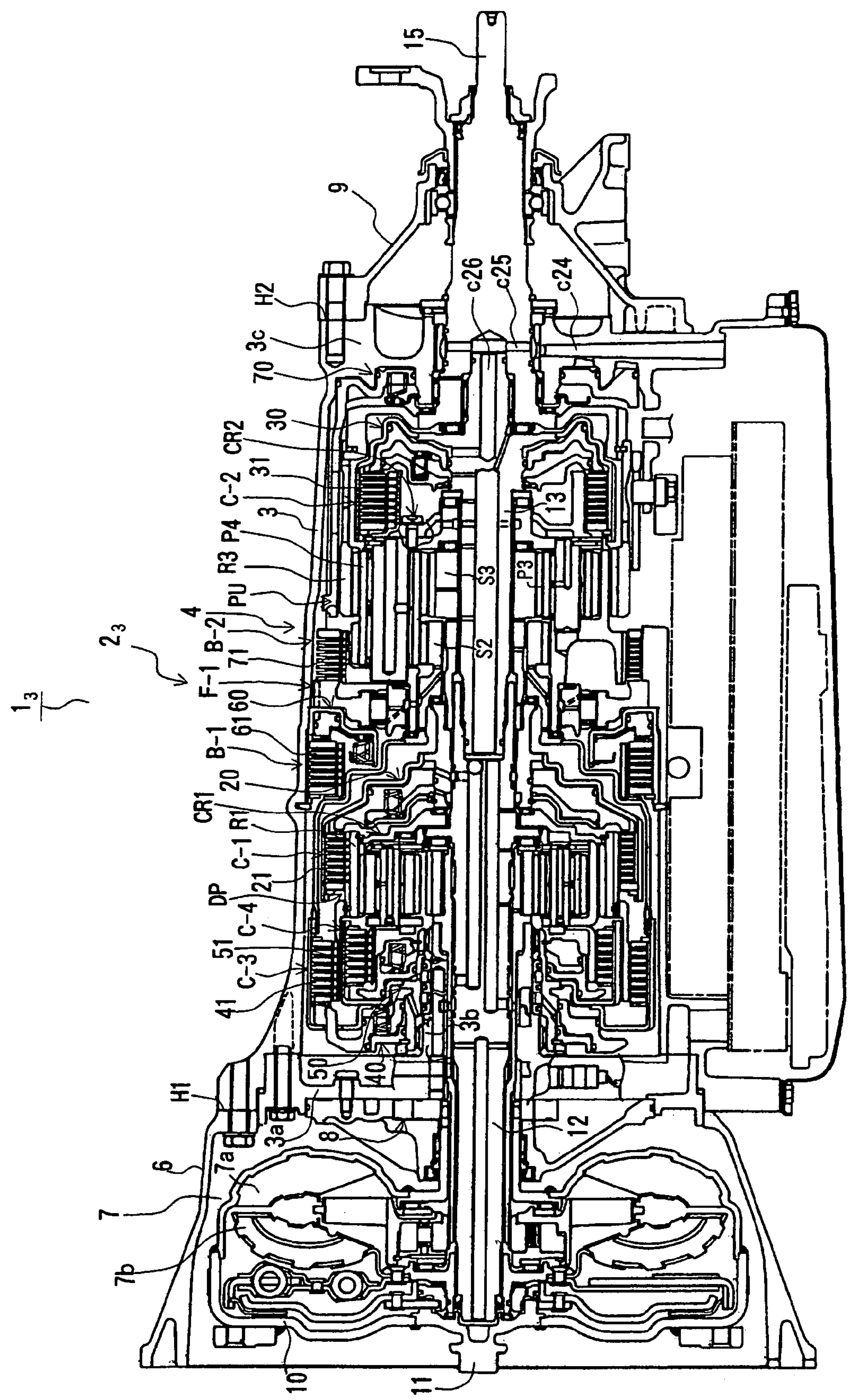
FIG. 10 is a section view showing an automatic transmission according to a third exemplary embodiment.
Figure 11:
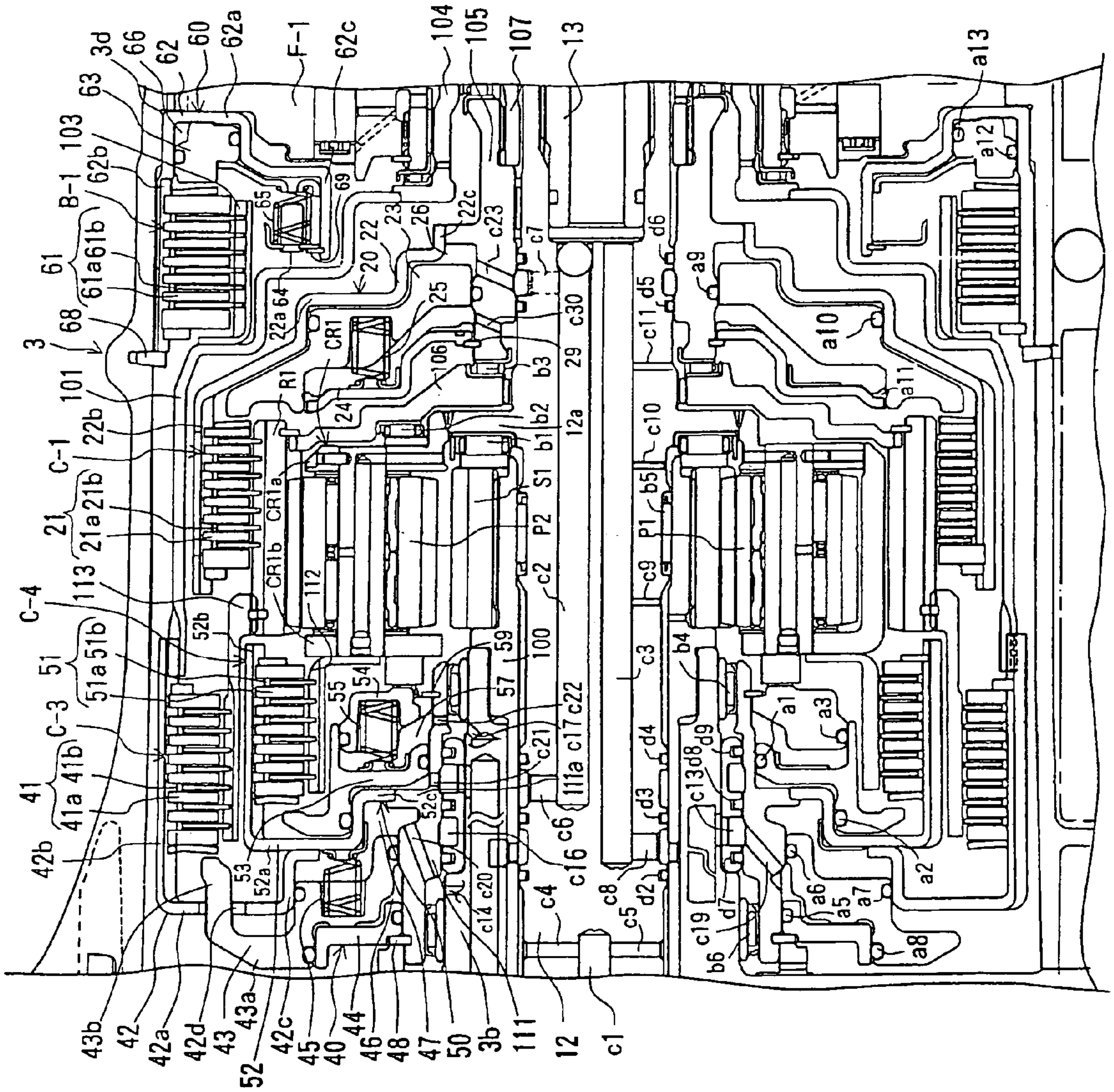
FIG. 11 is an enlarged section view showing a part of a transmission mechanism.

The planetary gear DP disposed within the mission case 3 is provided with the sun gear S1, the carrier CR1 and the ring gear R1, as shown in FIGS. 10 and 11, in the same manner as the first embodiment. Among them, the sun gear S1 is fixed to the sleeve member 100 as shown in detail in FIG. 11. The sleeve member 100 fits around the outer peripheral face of the input shaft 12 and extends forward to be fixed with the inner peripheral face of the boss portion 3*b* that extends to the rear from the inner diametric side of the rear face of the partition member 3*a* of the mission case 3. That is, it is a part of the boss portion 3*b* in a broad sense and the sun gear S1 is thus fixed to the boss portion 3*b* so as not to be rotatable. The carrier CR1 has the rear carrier plate CR1*a* and the front carrier plate CR1*b* to rotatably support the pinions P1, P2. While the pinions P1, P2 engage each other, the pinion P1 engages with the sun gear S1 and the pinion P2 engages with the ring gear R1, respectively. The rear carrier plate CR1*a* is linked with the flange portion 12*a* that is formed in the shape of a flange so as to extend from the outer peripheral face of the rear part of the input shaft 12 to the outer diametric side by welding for example. Meanwhile, the front carrier plate CR1*b* is formed in the shape of a ring and is linked with a hub member 112 at its front side. Inner friction plates 51*b* of the fourth clutch C-4, described later, are spline-coupled with the outer peripheral face of the hub member 112. The inner friction plates 21*b* of the first clutch C-1, described later, are spline-coupled with the outer peripheral side of the ring gear R1. A hub member 113 is spline-coupled with the outer peripheral side of the front end of the ring gear R1 and the inner friction plates 41*b* of the third clutch C-3, described later, are spline-coupled with the outer peripheral side of the hub member 113. The flange-like positioning member 106 is disposed on the inner peripheral side of the rear end of the ring gear R1 and the ring gear R1 is rotatably supported by the input shaft 12 through an intermediary of the positioning member 106.

The fourth clutch C-4 is disposed on the boss portion 3*b* just in front of the planetary gear DP described above. The fourth clutch C-4 is provided with the friction plates 51 composed of the outer friction plates 51*a* and the inner friction plates 51*b* and the hydraulic servo 50 for engaging/disengaging the friction plates 51. The hydraulic servo 50 has the clutch drum 52, the sleeve member 11 linked with the clutch drum 52, the piston member 53, the cancel plate 54 and the return spring 55 to thereby define the oil chamber 56 and the cancel oil chamber 57. The clutch drum 52 has the flange portion 52*a* extending from the inner diametric side to the outer diametric side, the drum portion 52*b* extending from the outer periphery of the flange portion 52*a* to the rear and a link portion 52*c* disposed on the inner peripheral side of the flange portion 52*a* and linked with the sleeve member 111 rotatably provided on the boss portion 3*b*. A clutch drum is formed in a broad sense by the rear part of the sleeve member 111 and the clutch drum 52. The drum portion 52*b* is disposed on the outer diametric side of the hub member 112 linked with the front carrier plate CR1*b* and the outer friction plates 51*a* are spline-coupled with the inner peripheral face thereof. The piston member 53 is disposed behind the flange portion 52*a* of the clutch drum 52 and a flange portion 111*a* of the sleeve member 111 so as to be reciprocal in the axial direction and defines the oil-tight oil chamber 56 with the flange portion 52*a* and is sealed between the clutch drum 52 and the sleeve member 111 by two seal rings a1, a2. Further, the cancel plate 54 is blocked from moving to the rear by the snap ring 59 fitted on the outer peripheral side of the rear end of the sleeve member 111. The cancel plate 54 is provided with the return spring 55 contracted between it and the piston member 53 disposed in the front. The piston member 53 and the cancel plate 54 define the oil-tight cancel oil chamber 57 sealed by the seal rings a3.

It is noted that because the fourth clutch C-4 is built as described above, the inputted rotation of the carrier CR1 is inputted to the clutch drum 52 when the fourth clutch C-4 engages. The rotation is not inputted to the clutch drum 52 and the hydraulic servo 50 will not rotate when the fourth clutch C-4 is not engaged, especially in Neutral and Parking ranges.

The third clutch C-3 is built so as to generally surround the front side and the outer peripheral side of the fourth clutch C-4 and is disposed on the boss portion 3*b* through an intermediary of the sleeve member 111 described above. The third clutch C-3 is provided with the friction plates 41 comprising the outer friction plates 41*a* and the inner friction plates 41*b* and the hydraulic servo 40 for engaging/disengaging the friction plates 41. The hydraulic servo 40 has the clutch drum 42, the piston member 43, a cylinder member 44 formed separately from the clutch drum 42, and the return spring 45 that define the oil chamber 46 and the cancel oil chamber 47 to be described later in detail. The clutch drum 42 has the flange portion 42*a*, the hub portion 42*c* extending to the rear from the inner periphery of the flange portion 42*a* and the drum portion 42*b* extending to the rear from the outer periphery of the flange portion 42*a*. The hub portion 42*c* is linked to the side face of the flange portion 52*a* of the clutch drum 52 of the fourth clutch C-4 by means of welding, for example. The boss portion 3*b* extends from the rear face of the partition member 3*a* described above. A plurality of holes 42*d* is perforated through the flange portion 42*a* in the circumferential direction. Meanwhile, the drum portion 42*b* of the clutch drum 42 extends to the outer diametric side of the friction plates 41 of the third clutch C-3 disposed on the outer diametric side of the fourth clutch C-4 and is spline-coupled with an outer friction plates 41*a* at the part corresponding to the hub member 113. A drum-like member 101, having a shape to encompass the first clutch C-1 and described later, is linked to the rear end of the drum portion 42*b*. The drum-like member 101 is linked with the sun gear S2 (see FIG. 10) of the planetary gear unit PU via the sleeve member 104. That is, the clutch drum 52 of the fourth clutch C-4 and the clutch drum 42 of the third clutch C-3 are linked with the sun gear S2 of the planetary gear unit PU thereby.

The piston member 43 of the third clutch C-3 has the flange portion 43*a* whose inner peripheral side faces to the cylinder member 44 and the drum portion 43*b* extending to the rear from the outer periphery of the flange portion 43*a* and formed in the shape of a comb. Among them, the flange portion 43*a* is disposed so as to be movable on the sleeve member 111, described above, in the axial direction and defines the oil-tight oil chamber 46 between the cylinder member 44, positioned by the snap ring 48, with three seal rings a5, a6, a8. Further, the drum portion 43*b* penetrates through the hole 42*d*, perforated through the flange portion 42*a* of the clutch drum 42, and its end faces to the friction plates 41. The return spring 45 is disposed between the rear side of the flange portion 43*a* of the piston member 43 and the front side of the clutch drum 52 of the fourth clutch C-4. That is, because the return spring 45 is disposed against the clutch drum 52, the clutch drum 52 is also used, in common, as a cancel plate. That is, the hydraulic servo 40 of the third clutch C-3 is disposed in linkage with the clutch drum 52 of the fourth clutch C-4. Additionally, the oil-tight cancel oil chamber 47 is formed between the clutch drum 52 and the piston member 43 and sealed with two seal rings a6, a7. It is noted that an urging force toward the front side always acts on the cylinder member 44 based on operating and centrifugal hydraulic pressures of the oil chamber 46, centrifugal hydraulic pressure of the cancel oil chamber 47 and a biasing force of the return spring 45. That is, it takes a form of being fixed to the sleeve member 111 by one snap ring 48.

It is noted that because the third clutch C-3 is built as described above, the reduced rotation of the ring gear R1 is inputted to the clutch drum 42 when the third clutch C-3 engages. The rotation is not inputted to the clutch drum 42 and the hydraulic servo 40 will not rotate when the third clutch C-3 is not engaged, specifically in Neutral and Parking ranges.

The first clutch C-1 is disposed on the input shaft 12 behind the planetary gear DP and is provided with the friction plates 21 comprising the outer friction plates 21*a* and the inner friction plates 21*b* and the hydraulic servo 20 for engaging/disengaging the friction plates 21. The hydraulic servo 20 has the clutch drum 22, the second sleeve member 105 linked with the clutch drum 22, the piston member 23, the cancel plate 24 and the return spring 25 and defines the oil chamber 26 and the cancel oil chamber 27 thereby. The clutch drum 22 has the flange portion 22*a* extending from the inner diametric side to the outer diametric side, the drum portion 22*b* extending to the outer peripheral side of the ring gear R1 from the outer periphery of the flange portion 22*a*, and a link portion 22*c*. The link portion 22*c* is linked with the sleeve member 105 rotatably provided around the input shaft 12 on the inner peripheral side of the flange portion 22*a* and composes the clutch drum in a broad sense with the front part of the sleeve member 105 and the clutch drum 22. The drum portion 22*b* is disposed on the outer diametric side of the ring gear R1 and the outer friction plates 21*a* are spline-coupled on the inner peripheral side thereof (the inner friction plates 21*b* are spline-coupled with the outer peripheral side of the ring gear R1 as described above). The piston member 23 is disposed on the front side of the flange portion 22*a* of the clutch drum 22 and a flange portion 105*a* of the sleeve member 105 so as to be movable in the axial direction and defines the oil-tight oil chamber 26 between the clutch drum 22 and the sleeve member 105 using two seal rings a9, a10. The cancel plate 24 is blocked from moving to the front side by the snap ring 29 fitted to the outer peripheral side of the front end of the sleeve member 105. The cancel plate 24 is provided with the return spring 25 in contraction between the piston member 23 disposed there behind and defines the oil-tight cancel oil chamber 27 using two seal rings a9, a11. The rear side of the sleeve member 105 is linked with the sun gear S3 via the sleeve member 107 (see FIG. 10).

It is noted that because the first clutch C-1 is built as described above, the reduced rotation of the ring gear R1 is inputted to the clutch drum 22 when the first clutch C-I engages. The rotation is not inputted to the clutch drum 22 and the hydraulic servo 20 will not rotate when the first clutch C-1 is not engaged, specifically in Neutral and Parking ranges.

The first brake B-1 is disposed axially between the first clutch C-1 and the planetary gear unit PU. More specifically, it is disposed on the outer peripheral side of the rear part of the hydraulic servo 20 of the first clutch C-1, on the front side of the one-way clutch F-1 and in the vicinity of the inner peripheral side nearly at the center of the mission case 3 (see FIG. 10). The first brake B-1 is provided with the friction plates 61 composed of the outer friction plates 61*a* and the inner friction plates 61*b* and the hydraulic servo 60 for engaging/disengaging the friction plates 61. The hydraulic servo 60 has the drum member 62, the piston member 63, the cancel plate 64 and the return spring 65. The drum member 62 has a flange portion 62*a* extending from the inner diametric side to the outer diametric side, a drum portion 62*b* extending from the outer periphery of the flange portion 62*a* along the inner peripheral face of the mission case 3 and a hub portion 62*c* extending to the inner peripheral side of the flange portion 62*a*. The drum portion 62*b* is disposed along the inner peripheral face of the mission case 3, as described above, and its outer peripheral side is spline-coupled with the inner peripheral face of the mission case 3. The front end of the drum portion 62*b* abuts against a snap ring 68 so as to be stopped from moving to the front side and the outer peripheral side of the flange portion 62*a* abuts against a stepped portion 3*d* of the mission case 3 so as to be stopped from moving to the rear side. That is, the drum member 62 is positioned and fixed with respect to the mission case 3. Meanwhile, the piston member 63 is disposed at the front side of the flange portion 62*a* of the drum member 62 so as to be movable in the axial direction and defines the oil-tight oil chamber 66 between the drum member 62 using two seal rings a12, a13. Further, the cancel plate 64 is blocked from moving to the front side by a snap ring 69 fitted around the outer peripheral side of the front end of the hub portion 62*c* of the drum member 62. The cancel plate 64 is provided with the return spring 65 in contraction between the piston member 63 and the cancel plate 64. Then, the outer friction plates 61*a* are spline-coupled with the inner peripheral side of the drum portion 62*b* of the drum member 62 and the inner friction plates 61*b*are spline-coupled with the hub member 103. The hub member 103 is linked to the drum member 101 by means of welding for example. That is, the hub member 103 is linked to the sun gear S2 via the sleeve member 104 (see FIG. 10).

Next, the structure for supporting each component, i.e., bearings, will be explained. The bearing b5 is interposed between the inner peripheral face of the rear end of the sleeve member 100, which is combined in a body with the boss portion 3*b* of the partition member 3*a*, and the outer peripheral face of the input shaft 12. Thereby, the input shaft 12 is rotatably supported to the mission case 3. The bearing b1 is interposed between the flange portion 12*a* of the input shaft 12 and the rear face of the sleeve member 100 (sun gear S1), the bearing b2 is interposed between the front side of the positioning member 106 and the rear side of the rear carrier plate CR1*a*, and the bearing b3 is interposed between the rear side of the inner periphery of the positioning member 106 and the front end of the sleeve member 105, respectively. Thereby, the carrier CR1, the ring gear R1 and the sleeve member 105 are rotatably supported to the input shaft 12 through the intermediary of the positioning member 106. Still more, bearings b4, b6 are interposed between the outer peripheral side of the boss portion 3*b* and the inner peripheral side of the sleeve member 111. Thereby, the sleeve member 111 is rotatably supported to the boss portion 3*b*.

Next, the structure of oil passages of each component will be explained. The input shaft 12 is provided with three perforated oil passages in the axial direction, i.e., the oil passage c1 heading from the front end to the rear and the oil passages c2, c3 heading from the rear end to the front. The oil passage c1 communicates with the outer peripheral face of the input shaft 12 through the oil passages c4, c5 in the radial direction, the oil passage c2 communicates through the oil passages c6, c7 in the radial direction and the oil passage c3 communicates through the oil passages c8 through c11 in the radial direction, respectively. Four oil passages c13, c14, c16, c17 are perforated through the boss portion 3*b* of the partition member 3*a* in the radial direction in order from the front side. Oil passages c19, c20, c21, c22 are perforated radially through the sleeve member 111 positioned on the outer peripheral side of the boss portion 3*b*. It is noted that the oil passages c19, c20 are perforated so as to intersect each other in three-dimensions within the sleeve member 111. Further, oil passages c23, c30 are perforated so as to penetrate through the sleeve member 105 positioned on the outer peripheral side of the rear part of the input shaft 12. Still more, an oil groove (not shown) is formed on the outer peripheral side of the sleeve member 100 and defines an oil passage between the sleeve member 100 and the boss portion 3*b*. That is, the oil passage is formed within the boss portion 3*b* in a broad sense (hereinafter referred to "the oil passage within the boss portion 3*b* "). The seal rings d2 through d4, for sealing the boss portion 3*b* (sleeve member 100) and the oil passages c4, c5, c8, c6, are provided on the outer peripheral side of the input shaft 12. The seal rings d5, d6 for sealing the oil passages c7, c23 are provided on the outer peripheral side of the rear part of the input shaft 12. Further, seal rings d7 through d9, for sealing the oil passages c13, c16 of the boss portion 3*b* and the oil passages c19, c21 of the sleeve member 111 are provided on the outer peripheral side of the boss portion 3*b*. It is noted that the hydraulic servo 60 of the first brake B-1 is provided, in the drum member 62 thereof, with an oil passage (not shown) communicating with the hydraulic control unit (indicated by a dashed line in abbreviation in the figure) located under the automatic transmission $\mathbf{1}_3$.

Next, the supply of lubricant oil will be explained. When lubricant oil is supplied to the oil passages within the boss portion 3*b* based on hydraulic pressure generated by the oil pump 8, the lubricant oil is supplied to the oil passages c14, c17 of the boss portion 3*b* and is splashed to the outer peripheral side of the boss portion 3*b*. Further, the lubricant oil supplied to the oil passages within the boss portion 3*b* by the oil pump 8 is supplied to the oil passage c8 of the input shaft 12 in a manner of being sealed by the seal rings d2, d3. Then, it is supplied to the rear side via the oil passage c3 and is splashed to the outer peripheral side of the input shaft 12 from the oil passages c9, c10, c11. Thereby, each member within the mission case 3, i.e., each gear of the planetary gear DP, each member of the first clutch C-1, each member of the third clutch C-3, each member of the fourth clutch C-4, each member of the first brake B-1 and specifically the friction plates 21, 41, 51, 61, as well as the bearings b1 through b6, are lubricated. It is noted that oil within the cancel oil chambers 27, 47, 57 of the first clutch C-1, and the third and fourth clutches C-3, C-4, for example, is also supplied in the same manner with the lubricant oil via the oil passages c20, c22, c11, c30 and lubricates each member within the mission case 3 in a manner of joining with other lubricant oil when it is emitted.

Next, the supply of operating fluid will be explained. The hydraulic control unit (not shown) generates and controls engaging pressure of the first clutch C-1, the second clutch C-2, the third clutch C-3, the fourth clutch C-4, the first brake B-1, the second brake B-2 and the lockup clutch 10 based on the hydraulic pressure caused by the oil pump 8 for example. Each operating fluid is supplied to each oil passage provided separately within the boss portion 3*b* (within the sleeve member 100) from around the joint of the boss portion 3*b* on the front side based on the engaging hydraulic pressure of the lockup clutch 10, the first clutch C-1, the third and fourth clutches C-3, C-4.

When the operating fluid for engaging the lockup clutch 10 is supplied to the oil passage within the boss portion 3*b*, it is supplied from the oil passage within the boss portion 3*b* to the oil passages c4, c5. The operating fluid supplied to the oil passages c4, c5 is supplied to the friction plates of the lockup clutch 10 via the oil passage c1 and acts on the friction plates. Then, a flange-like member provided around the input shaft 11 presses the friction plates and the lockup clutch 10 engages as a result. It is noted that the operating fluid is emitted in reverse via the oil passages c1, c4, c5 when the lockup clutch 10 is disengaged based on the hydraulic control made by the hydraulic control unit.

When the operating fluid for engaging the third clutch C-3 is supplied to the oil passage within the boss portion 3*b*, it is supplied to the oil passage c13 from the oil passage in the axial direction (not shown) within the boss portion 3*b*. The operating fluid supplied to the oil passage c13 is supplied to the oil passage c19 in a manner of being sealed by the seal rings d7, d8, i.e., from the oil passage c13 in the boss portion 3*b* to the oil passage c19 of the sleeve member 111 which are mutually and relatively rotatable. Then, the operating fluid is supplied to the oil chamber 46 of the hydraulic servo 40 of the third clutch C-3 via the oil passage c19. Thus, the piston member 43 is pressed backward and the friction plates 41 are pressed by the drum portion 43*b*, i.e., the third clutch C-3 engages. It is noted that when the third clutch C-3 is disengaged based on the hydraulic control made by the hydraulic control unit, the piston member 43 is pressed forward by a biasing force of the return spring 45 and thereby, the operating fluid of the oil chamber 46 is emitted in reverse via the oil passages c19, c13 and the oil passage in the axial direction within the boss portion 3*b*.

When the operating fluid for engaging the fourth clutch C-4 is supplied to the oil passage within the boss portion 3*b*, it is supplied to the oil passage c16 from the oil passage in the axial direction (not shown) within the boss portion 3*b*. The operating fluid supplied to the oil passage c16 is supplied to the oil passage c21 in a manner of being sealed by the seal rings d8, d9, i.e., from the oil passage c16 in the boss portion 3*b* to the oil passage c21 of the sleeve member 111 which are mutually and relatively rotatable. Then, the operating fluid is supplied to the oil chamber 56 of the hydraulic servo 50 of the fourth clutch C-4 via the oil passage c21. Thus, the piston member 53 is pressed backward and the friction plate 51 is pressed, i.e., the fourth clutch C-4 engages. It is noted that when the fourth clutch C-4 is disengaged based on the hydraulic control made by the hydraulic control unit, the piston member 53 is pressed forward by a biasing force of the return spring 55 and, thereby, the operating fluid of the oil chamber 56 is emitted in reverse via the oil passages c21, c16 and the oil passage in the axial direction within the boss portion 3*b*.

When the operating fluid for engaging the first clutch C-1 is supplied to the oil passage within the boss portion 3*b*, it is supplied to the oil passage c6 from the oil passage in the axial direction (not shown) within the boss portion 3*b* in a manner of being sealed by the seal rings d3, d4. That is, it is supplied from the oil passage within the boss portion 3*b* to the oil passage c6 of the input shaft 12, which are mutually and relatively rotatable. Further, the operating fluid supplied to the oil passage c6 is supplied to the rear side to the oil passage c7 via the oil passage c2 within the input shaft 12. The operating fluid supplied to the oil passage c7 is then supplied to the oil passage c23 of the sleeve member 105 from the oil passage c7 of the input shaft 12 which are mutually and relatively rotatable in a manner of being sealed by the seal rings d5, d6. Then, the operating fluid is supplied to the oil chamber 26 of the hydraulic servo 20 of the first clutch C-1 via the oil passage c23. Thus, the piston member 23 is pressed backward and the friction plate 21 is pressed, i.e., the first clutch C-1 engages. It is noted that when the first clutch C-1 is disengaged based on the hydraulic control made by the hydraulic control unit, the piston member 23 is pressed forward by a biasing force of the return spring 25 and, thereby, the operating fluid in the oil chamber 26 is emitted in reverse via the oil passages c23, c7, c2, c26 and the oil passage in the axial direction within the boss portion 3*b*. Further, it is noted that operating fluid for fastening the first brake B-1 is supplied directly to the oil chamber 66 via an oil passage in the drum member 62 (not shown) communicating with the hydraulic control unit of the automatic transmission $\mathbf{1}_3$ described above and is emitted via that oil passage.

According to the inventive automatic transmission $\mathbf{1}_3$ described above, the fourth clutch C-4 is linked with the sun gear S2 of the planetary gear unit PU through an intermediary of the output side members (the clutch drum 42 and the drum-like member 101 and the sleeve member 104 which comprise link members) of the third clutch C-3, so that the output side members are output side members of the two clutches that transmit different rotations, i.e., they may be shared in common as one rotary member. Thereby, the automatic transmission $\mathbf{1}_3$ may be compactly built.

Additionally, because the hydraulic servo 50 of the fourth clutch C-4 is disposed axially on the opposite side of the planetary gear DP from the planetary gear unit PU and on the boss portion 3*b* extending from the case 4 to supply the operating fluid to the hydraulic servo 50 of the fourth clutch C-4 from the oil passage within the boss portion 3*b*, the number of seal rings can be reduced as compared to a case of disposing the hydraulic servo 50 of the fourth clutch C-4 on the input shaft 12 through an intermediary of a member that does not reduce a rotation or that does not rotate, i.e., as compared to a case of supplying the operating fluid via the other member for example. Thereby, it becomes possible to prevent the drop of the efficiency and controllability of the automatic transmission $\mathbf{1}_3$.

However, it is noted, the clutch that enables the transmission of the reduced rotation described above has a problem that it is required to transmit a relatively large torque because the rotation is reduced as compared to the clutch that enables the transmission of the inputted rotation inputted to the input shaft.

Yet, according to the inventive automatic transmission $\mathbf{1}_3$, because the planetary gear DP, the first clutch C-1, the third and fourth clutches C-3, C-4 are disposed axially on one side of the planetary gear unit PU and the planetary gear DP and the fourth clutch C-4 are disposed on the inner peripheral side of the clutch drum 42 of the third clutch C-3, it becomes possible to increase the area of the friction plates 21, 41 of the first and third clutches C-1, C-3. That is, even though the capacity of the first and third clutches C-1, C-3 for transmitting the reduced rotation may be increased, the fourth clutch C-4 and the planetary gear DP, whose transmittable torque capacity can be relatively small for transmitting the inputted rotation, may be disposed on the inner peripheral side of the clutch drum 42 of the third clutch C-3. Accordingly, the automatic transmission $\mathbf{1}_3$, that is capable of attaining the multi-stage shift such as the forward eighth speed stage, and the reverse second speed stage may be compactly built.

In addition, because the hydraulic servo 40 of the third clutch C-3, the hydraulic servo 50 of the fourth clutch C-4 and the planetary gear DP are disposed on the boss portion 3*b* extending from the case 4 from the side of the joint of the boss portion 3*b* with the case 4 in order in the axial direction and operating fluid is supplied from the oil passages provided within the boss portion 3*b* to the hydraulic servo 40 of the third clutch C-3 and the hydraulic servo 50 of the fourth clutch C-4, the operating fluid may be supplied just by providing paired seal rings d7, d8 and d8, d9 between the hydraulic servos 40, 50 of the third and fourth clutches C-3, C-4 and the boss portion 3*b*, respectively. As such, the number of seal rings can be reduced compared to a case of supplying operating fluid to the hydraulic servos 40, 50 of the third and fourth clutches C-3, C-4 from the oil passage within the input shaft 12 via the boss portion 3*b*. Thereby, it becomes possible to prevent the drop of the efficiency and controllability of the automatic transmission $\mathbf{1}_3$.

Further, because the hydraulic servo 20 of the first clutch C-1 is disposed on the input shaft 12 and adjacent to the planetary gear DP and operating fluid is supplied to the hydraulic servo 20 of the first clutch C-1 from the oil passage provided within the input shaft 12, the operating fluid may be supplied just by providing the respective pairs of seal rings d3, d4, and d5, d6 along the oil passage for supplying the operating fluid from the hydraulic control unit, i.e., between the oil passage within the boss portion 3*b* and the input shaft 12 and between the hydraulic servo 20 of the first clutch C-1 and the input shaft 12. Accordingly, the number of seal rings can be reduced compared to a case of supplying operating fluid via other members, for example. Thereby, it becomes possible to prevent the drop of the efficiency and controllability of the vehicular automatic transmission.

Additionally, although the increase in the radial size of the first clutch C-1 to the outer peripheral side is limited because the third and fourth clutches C-3, C-4 are linked to the sun gear S2 of the planetary gear unit PU through the outer peripheral side of the first clutch C-1 and the link member 101 and others for linking the third and fourth clutches C-3, C-4 with the sun gear S2 of the planetary gear unit PU pass along the outer peripheral side of the first clutch C-1, the capacity of the first clutch C-1 may be maintained by increasing the size in the inner diametric direction because the first clutch C-1 is disposed on the input shaft 12 as compared to a case of disposing it on the boss portion 3*b*.

Also, because the sun gear S2 of the planetary gear unit PU is capable of transmitting the inputted rotation in connection with the fourth clutch C-4, is capable of transmitting the reduced rotation in connection with the third clutch C-3, and is capable of fixing the rotation in connection with the first brake B-1; the sun gear S3 is capable of transmitting the reduced rotation in connection with the first clutch C-1; the carrier CR2 is capable of transmitting the inputted rotation in connection with the second clutch C-2 and is capable of fixing the rotation in connection with the second brake B-2; and the ring gear R3 is linked to the output shaft 15, the multi-stage shift, such as the forward eighth speed stage and the reverse second speed stage, may be attained.

Because the friction plate 41 of the third clutch C-3 is disposed on the outer peripheral side of the fourth clutch C-4 and the friction plate 21 of the first clutch C-1 is disposed on the outer peripheral side of the ring gear R1, i.e., because the friction plate 41 of the third clutch C-3 that relatively often changes between engaged and disengaged (see FIG. 4) during traveling is disposed on the outer peripheral side of the fourth clutch C-4 which can be readily lubricated as compared to a case of disposing it on the outer peripheral side of the planetary gear DP, heat of the friction plates 41 of the third clutch C-3 may be readily radiated and the durability of the third clutch C-3 may be improved. Meanwhile, because the friction plates 21 of the first clutch C-1, that is kept engaging from the forward first speed stage to the forward fifth speed stage and that relatively less changes between engaged and disengaged (see FIG. 4), is disposed on the outer peripheral side of the planetary gear DP, the vehicular automatic transmission $\mathbf{1}_3$ may be shortened in the axial direction.

Additionally, because the automatic transmission $\mathbf{1}_3$ is built so that the clutch drum 42 of the third clutch C-3 is disposed in linkage on the outer peripheral side of the clutch drum 52 of the fourth clutch C-4 and the hydraulic servo 40 of the third clutch C-3 is disposed in linkage with the clutch drum 52 of the fourth clutch C-4, so as to have the cancel plate 44, the piston member 43 and the oil chamber 46 formed between the cylinder member 44 and the piston member 43 separately from the clutch drum 42 of the third clutch C-3, and so that the piston member 43 of the hydraulic servo 40 of the third clutch C-3 is disposed so as to penetrate through and intersect with the clutch drum 42 of the third clutch C-3 and to face to the friction plates 41 of the third clutch C-3, the clutch drum 42 of the third clutch C-3 for transmitting the rotation of the clutch drum 52 of the fourth clutch C-4 may be relatively shortened and lightened, even though the third clutch C-3 is removable.

Because the return spring 45 of the hydraulic servo 40 of the third clutch C-3 is disposed in the clutch drum 52 of the fourth clutch C-4, i.e., because the clutch drum 52 of the fourth clutch C-4 may be commonly used also as a cancel plate of the hydraulic servo 40 of the third clutch C-3, it is possible to cut a number of parts and to compactly build the automatic transmission $\mathbf{1}_3$.

Further, because the first brake B-1 is disposed axially between the first clutch C-1 and the planetary gear unit PU, the friction plate 41 of the third clutch C-3 may be disposed on the outer peripheral side of the fourth clutch C-4.

In addition, because the automatic transmission $\mathbf{1}_3$ is built so that the reduced rotation of the ring gear R1 is inputted to the clutch drum 22 of the first clutch C-1 forming the hydraulic servo 20 of the first clutch C-1 when the first clutch C-1 engages, the reduced rotation is not inputted to the clutch drum 22 of the first clutch C-1 when the first clutch C-1 is not engaged even if the driver races the engine in Neutral or Parking range, for example, and the input shaft 12 rotates. Accordingly, it is possible to prevent the entire hydraulic servo 20 of the first clutch C-1 from rotating and to prevent dragging of the first clutch C-1 which is otherwise caused by a centrifugal hydraulic pressure generated in the oil chamber 26.

Because the automatic transmission $\mathbf{1}_3$ is built so that the reduced rotation of the ring gear R1 is inputted to the clutch drum 42 of the third clutch C-3 forming the hydraulic servo 40 of the third clutch C-3 when the third clutch C-3 engages, the reduced rotation is not inputted to the clutch drum 42 of the third clutch C-3 when the third clutch C-3 is not engaged even if the driver races the engine in Neutral or Parking range, for example, and the input shaft 12 rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Because the automatic transmission $\mathbf{1}_3$ is built so that the inputted rotation is inputted to the clutch drum 52 of the fourth clutch C-4 forming the hydraulic servo 50 of the fourth clutch C-4 via the carrier CR1 when the fourth clutch C-4 engages, the inputted rotation is not inputted to the clutch drum 52 of the fourth clutch C-4 when the fourth clutch C-4 is not engaged even if the driver races the engine in Neutral or Parking range, for example, and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56.

Still further, because the second clutch C-2 is disposed axially on the opposite side of the planetary gear unit PU from the planetary gear DP, the second clutch C-2 may be linked with the carrier CR2 without becoming entangled with the member for linking the first clutch C-1 with the sun gear S3 and the member for linking the third clutch C-3 with the sun gear S2, for example.

Further, because the planetary gear unit PU is a Ravigneaux type planetary gear in which the ring gear R3 is disposed at one side of the outer peripheral side and the friction plates 71 of the second brake B-2 are disposed on the other side of the outer peripheral side of the planetary gear unit PU, the friction plates 71 of the second brake B-2 may be disposed at the position radially overlapping with the planetary gear unit PU while assuring its capacity and decreasing the diameter thereof. Accordingly, the automatic transmission $\mathbf{1}_3$ may be built both compactly in the radial direction and shorter in the axial direction.

A fourth embodiment, which is a partial modification of the first and third embodiments described above, will be explained with reference to FIGS. 12 through 14. The automatic transmission $\mathbf{1}_4$ of the fourth embodiment is provided with a transmission mechanism $\mathbf{2}_4$. The transmission mechanism $\mathbf{2}_4$ is different from the transmission mechanisms $\mathbf{2}_1$, $\mathbf{2}_3$ of the first and third embodiments in that the hydraulic servo 20 of the first clutch C-1 and the hydraulic servo 40 of the third clutch C-3 are disposed axially between the planetary gear DP and the planetary gear unit PU, or more specifically, the hydraulic servo 40 of the third clutch C-3 is disposed axially on the side of the planetary gear DP and the hydraulic servo 20 of the first clutch C-1 is disposed on the side of the planetary gear unit PU.

Figure 12:
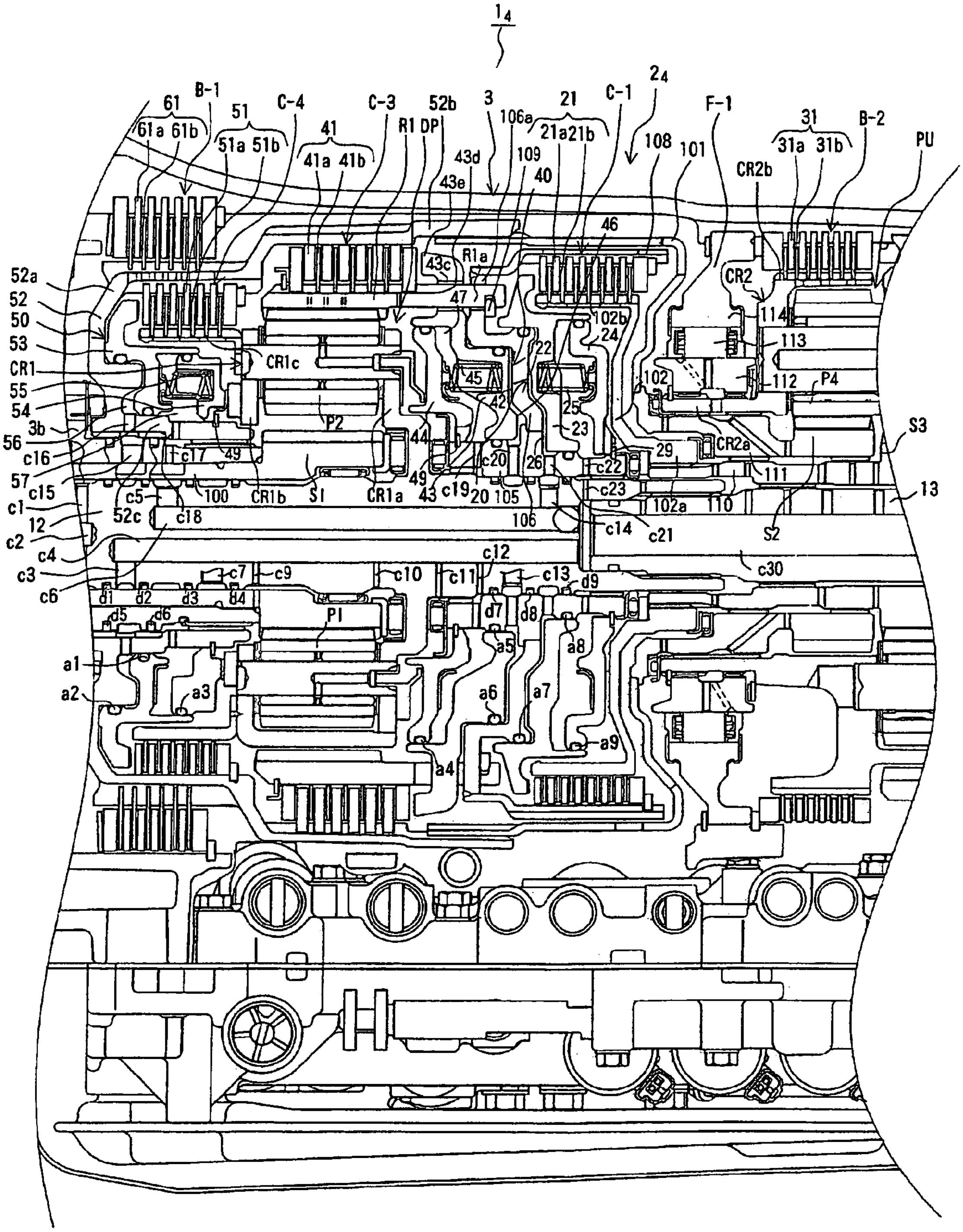
FIG. 12 is an enlarged section view showing a part of an automatic transmission according to a fourth exemplary embodiment.

Specifically, the planetary gear unit PU is disposed on the intermediate shaft 13 within the mission case 3 and the fourth clutch C-4, the planetary gear DP, the first clutch C-1 and the third clutch C-3 are disposed axially within the front half of the mission case 3, i.e., on the front side (on one side) of the planetary gear unit PU as shown in FIG. 12. The hydraulic servo 50 of the fourth clutch C-4 is disposed on the front side of the planetary gear DP, i.e., axially on the opposite side of the planetary gear DP from the planetary gear unit PU, and the hydraulic servo 20 of the first clutch C-1 and the hydraulic servo 40 of the third clutch C-3 are disposed axially between the planetary gear DP and the planetary gear unit PU.

Further, the friction plates 61 of the first brake B-1, the friction plates 51 of the fourth clutch C-4, the friction plates 41 of the third clutch C-3 and the friction plates 21 of the first clutch C-1 are disposed relatively on the outer diametric side within the mission case 3 on the input shaft 12 in order from the front side. The friction plates 51 of the fourth clutch C-4 and the hydraulic servo 50 of the fourth clutch C-4 are disposed on the inner peripheral side of the friction plates 61. That is, the friction plates 61 are disposed so as to overlap radially with the outside of the fourth clutch C-4. The planetary gear DP is disposed on the inner diametric side of the friction plates 41 and the friction plates 21 are disposed behind the friction plates 41. The hydraulic servo 40 of the third clutch C-3 and the hydraulic servo 20 of the first clutch C-1 are disposed from the rear side of the planetary gear DP to the inner peripheral side of the friction plates 21.

The planetary gear DP, disposed within the mission case 3, is provided with the sun gear S1, the carrier CR1 and the ring gear R1 as described above. Among them, the sun gear S1 is fixed to the first sleeve member 100. The first sleeve member 100 fits around the outer peripheral face of the input shaft 12 and extends forward to be fixed in a body with the inner peripheral face of the boss portion 3*b* that extends to the rear from the inner diametric side of the rear face of the partition member 3*a* of the mission case 3. That is, it is a part of the boss portion 3*b* in a broad sense and the sun gear S1 is fixed to the boss portion 3*b* so as not to be rotatable.

The carrier CR1 has the rear carrier plate CR1*a* and the front carrier plate CR1*b* to rotatably support the pinions P1, P2. While the pinions P1, P2 engage with each other, the pinion P1 engages with the sun gear S1 and the pinion P2 engages with the ring gear R1, respectively. The rear carrier plate CR1*a* is formed so as to extend from the outer peripheral face of the rear part of the input shaft 12 to the outer diametric side in the shape of a flange. Meanwhile, the front carrier plate CR1*b* is formed in the shape of a ring and has the hub portion CR1*c* extending forward from its outer periphery. The inner friction plates 51*b* of the fourth clutch C-4, described later, are spline-coupled with the outer peripheral face of the ring gear R1.

The inner friction plates 41*b* of the third clutch C-3, described later, are spline-coupled with the outer peripheral face of the ring gear R1. The hub portion R1*a*, extending to the rear, is linked with the rear end of the ring gear R1 as described later in detail. A supporting plate 106 nearly having the shape of a disc, for supporting the ring gear R1, is connected to the hub portion R1*a*. The inner peripheral side of the supporting plate 106 is connected with the second sleeve member 105, the outer peripheral side of the supporting plate 106 is connected with the drum member 108, described later, and the outer friction plates 21*a* of the first clutch C-1 are spline-coupled with the inner peripheral side of the drum member 108.

The fourth clutch C-4 is disposed on the boss portion 3*b* through an intermediary of the clutch drum 52 just in front of the planetary gear DP. The fourth clutch C-4 is provided with the friction plates 51 composed of the outer friction plates 51*a* and the inner friction plates 51*b* and the hydraulic servo 50 for engaging/disengaging the friction plates 51. The hydraulic servo 50 has the clutch drum 52, the piston member 53, the cancel plate 54 and the return spring 55 and defines thereby the oil chamber 56 and the cancel oil chamber 57. The clutch drum 52 has the flange portion 52*a* extending from the inner diametric side to the outer diametric side, the drum portion 52*b* extending from the outer periphery of the flange portion 52*a* to the rear part of the third clutch C-3, and a hub portion 52*c* whose inner diametric side is rotatably supported by the boss portion 3*b*.

The inner peripheral side of the front side of the drum portion 52*b* is disposed to the outer diametric side of the hub portion CR1*c* of the front carrier plate CR1*b* of the planetary gear DP described above and the outer friction plates 51*a* of the friction plates 51 are spline-coupled with the inner peripheral face thereof. The inner friction plates 51*b* of the friction plates 51 are spline-coupled with the hub portion CR1*c* of the carrier CR1 as described above. Further, the inner friction plates 61*b* of the first brake B-1 are spline-coupled with the outer peripheral side of the front side of the drum portion 52*b*. The rear side of the drum portion 52*b* extends along the outer peripheral side of the third clutch C-3 to be spline-coupled with the outer friction plates 41*a* of the friction plates 41. The rear end of the drum portion 52*b* is spline-coupled with the drum member (output side member, link member) 101. The drum member 101 is linked with the fourth sleeve member 111 that is rotatably supported by the third sleeve member 110 that is also rotatably supported on the intermediate shaft 13. The sun gear S2 is formed as a part of the fourth sleeve member 111. That is, the drum member 101 is linked to the sun gear S2 of the planetary gear unit PU. Accordingly, the clutch drum 52 to which the rotation of the fourth clutch C-4 is outputted is linked to the sun gear S2 of the planetary gear unit PU via the drum member 101 which is capable of transmitting the reduced rotation in connection with the third clutch C-3.

Meanwhile, the piston member 53 of the hydraulic servo 50 of the fourth clutch C-4 is disposed behind the flange portion 52*a* of the clutch drum 52 so as to be movable in the axial direction and defines an oil-tight oil chamber 56 between the flange portion 52*a* and the clutch drum 52 using two seal rings d1, d2. Further, the cancel plate 54 is prevented from moving to the rear side by the snap ring 49 fitted to the hub portion 52*c*. The cancel plate 54 is provided with the return spring 55 in contraction between the cancel plate 54 and the piston member 53 disposed in front thereof and defines the oil-tight oil chamber 57 with a seal ring a3.

The third clutch C-3 is provided with the friction plates 41 composed of the outer friction plates 41*a* and the inner friction plates 41*b* and the hydraulic servo 40 for engaging/disengaging the friction plates 41. The hydraulic servo 40 has the clutch drum 42 formed by the front side of the supporting plate 106 of the ring gear R1 and the inner peripheral side of the front part of the second sleeve member 105, the piston member 43, the cancel plate 44 and the return spring 45 and thereby forms the oil chamber 46 and the cancel oil chamber 47.

Figure 13A:
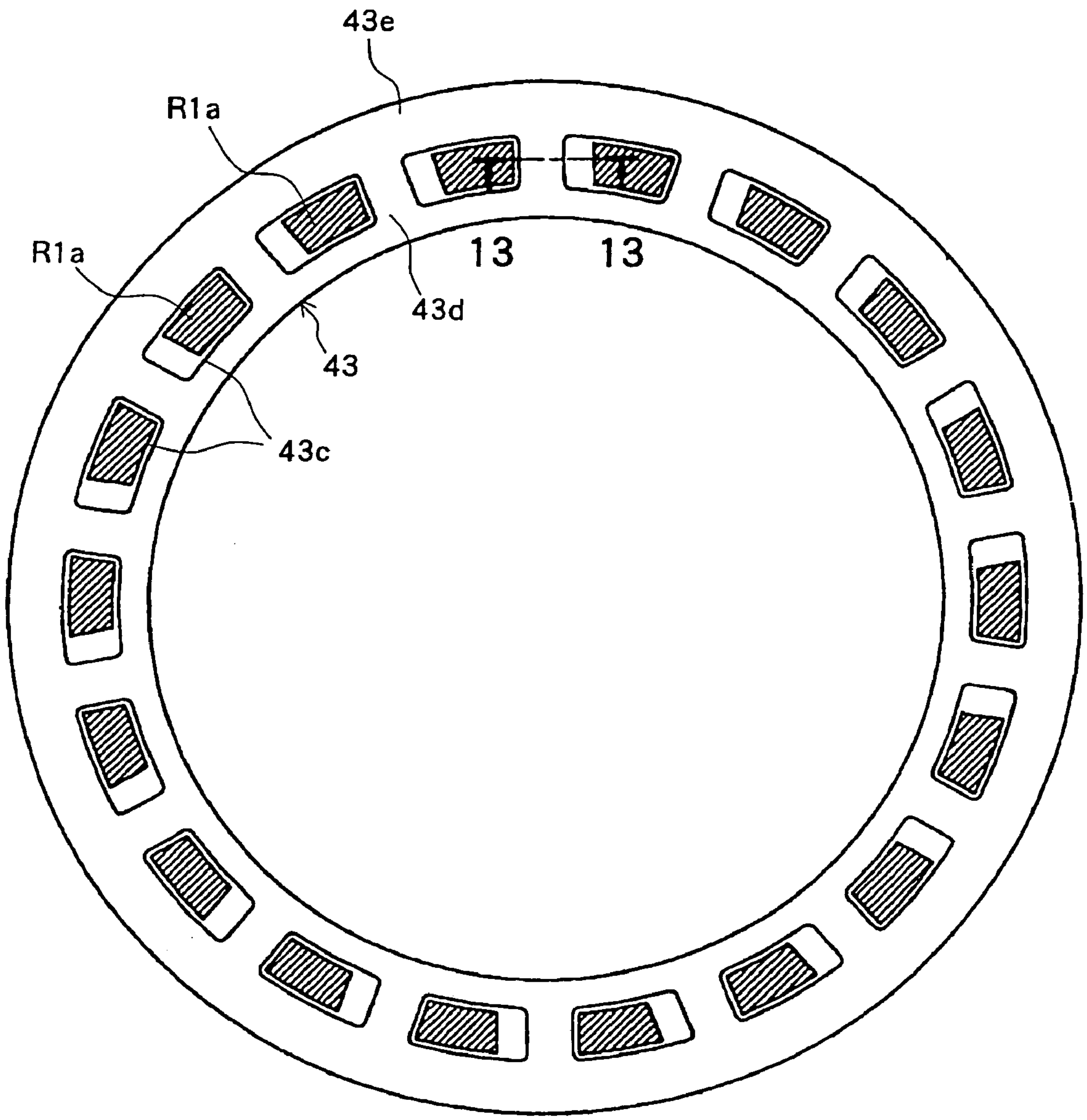
Figure 13B:
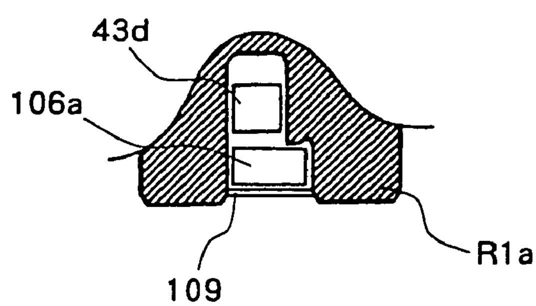

The drum portion R1*a* of the ring gear R1 is formed in the shape of a comb as shown in FIGS. 13A and 13B and is constructed so as to penetrate through and intersect with a plurality of through holes 43*c* perforated through the piston member 43. Further, as shown in FIGS. 12 and 13B, an outer peripheral end 106*a* of the supporting plate 106 is formed also in the shape of a comb and fits in a manner of engaging with the drum portion R1*a* of the ring gear R1. Further, the ring gear R1 is fixed to the supporting plate 106 in the axial direction, by a tapered snap ring 109. That is, the clutch drum of the hydraulic servo 40 of the third clutch C-3 is formed by the ring gear R1, the supporting plate 106 and the second sleeve member 105.

Further, as shown in FIGS. 12 and FIG. 13A, the piston member 43 slidably penetrates through and intersects with the ring gear R1 through the through holes 43*c* as described above. That is, the piston member 43 is capable of pressing the friction plates 41 because an abutting portion 43*e* for abutting and pressing the friction plates 41 through an intermediary of a link portion 43*d* becomes movable in the axial direction.

Thus, the piston member 43 of the third clutch C-3 is disposed to be movable in the axial direction as against the positioning member (hereinafter referred to as the supporting plate) 106 and the second sleeve member 105 as shown in FIG. 12 and defines the oil-tight oil chamber 46 between the supporting plate 106 and the second sleeve member 105, i.e., between the cylinder portion 42, by two seal rings a5, a6. Additionally, the cancel plate 44 is blocked from moving to the rear side by the snap ring 49 fitted to the second sleeve member 105 described above. The cancel plate 44 is provided with the return spring 45 in contraction between the piston member 43 disposed behind it and composes the oil-tight cancel oil chamber 47 by the seal ring a4.

The first clutch C-1 is disposed behind the third clutch C-3, i.e., on the rear side on the opposite side of the supporting plate 106 from the third clutch C-3, and has the friction plates 21 composed of the outer friction plates 21*a* and the inner friction plates 21*b* and the hydraulic servo 20 for engaging/disengaging the friction plates 21. The outer friction plates 21*a* are spline-coupled with the drum member 108 connected to an outer peripheral end 106*a* of the supporting plate 106 by means of welding, for example. That is, the clutch drum of the hydraulic servo 20 of the first clutch C-1 is formed by the drum member 108, the supporting plate 106 and the second sleeve member 105. Further, because the drum member 108 is connected to the outer peripheral end 106*a* of the supporting plate 106, it is connected to the ring gear R1 through an intermediary of the supporting plate 106. Meanwhile, the inner friction plates 21*b* are spline-coupled with a drum portion 102*b* of the link member 102. The link member 102 has the sleeve-like hub portion 102*a* extending to the rear on the inner peripheral side thereof and is connected to the third sleeve member 110 rotatably supported on the intermediate shaft 13. The sun gear S3 is formed as a part of the third sleeve member 110. That is, the link member 102 is linked to the sun gear S3 through an intermediary of the third sleeve member 110.

The hydraulic servo 20 has the cylinder portion 22 formed by the rear side of the supporting plate 106 of the ring gear R1 and the inner peripheral side of the rear part of the second sleeve member 105, the piston member 23, the cancel plate 24 and the return spring 25 and defines the oil chamber 26 and the cancel oil chamber 27 therewith. The piston member 23 is disposed so as to be movable in the axial direction as against the positioning member 106 and the second sleeve member 105 and defines the oil-tight oil chamber 26 between the positioning member 106 and the second sleeve member 105, i.e., between the cylinder portion 22, using two seal rings a7, a8. The cancel plate 24 is blocked from moving to the rear by the snap ring 29 fitted to the second sleeve member 105. The cancel plate 24 is provided with the return spring 25 contracted between the cancel plate 24 and the piston member 23 and defines the oil-tight cancel oil chamber 27 using the seal ring a9.

Meanwhile, the carrier CR2 of the planetary gear unit PU, supported through an intermediary of the hub portion CR2*a*, is disposed on the outer peripheral side of the fourth sleeve member 111 and the one-way clutch F-1 is disposed further on the outer peripheral side of the hub portion CR2*a*. The one-way clutch F-1 is provided with, in order from the inner peripheral side to the outer peripheral side, an inner race 112 supported by the hub portion CR2*a*, a sprag mechanism $1_{13}$ and an outer race 114 spline-coupled with the inner peripheral side of the mission case 3. The second brake B-2, provided with the friction plates 31 composed of outer friction plates 31*a* and inner friction plates 31*b* is disposed behind the outer race 114 such that the outer friction plates 31*a* are spline-coupled with the inner peripheral side of the mission case 3 and the inner friction plates 31*b* are spline-coupled with the hub portion CR2*b* of the carrier CR2, respectively.

Figure 14B:
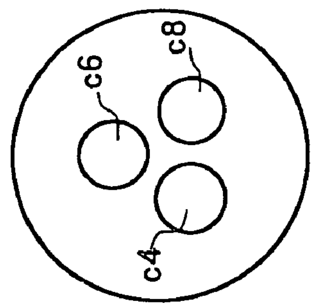
Figure 14A:
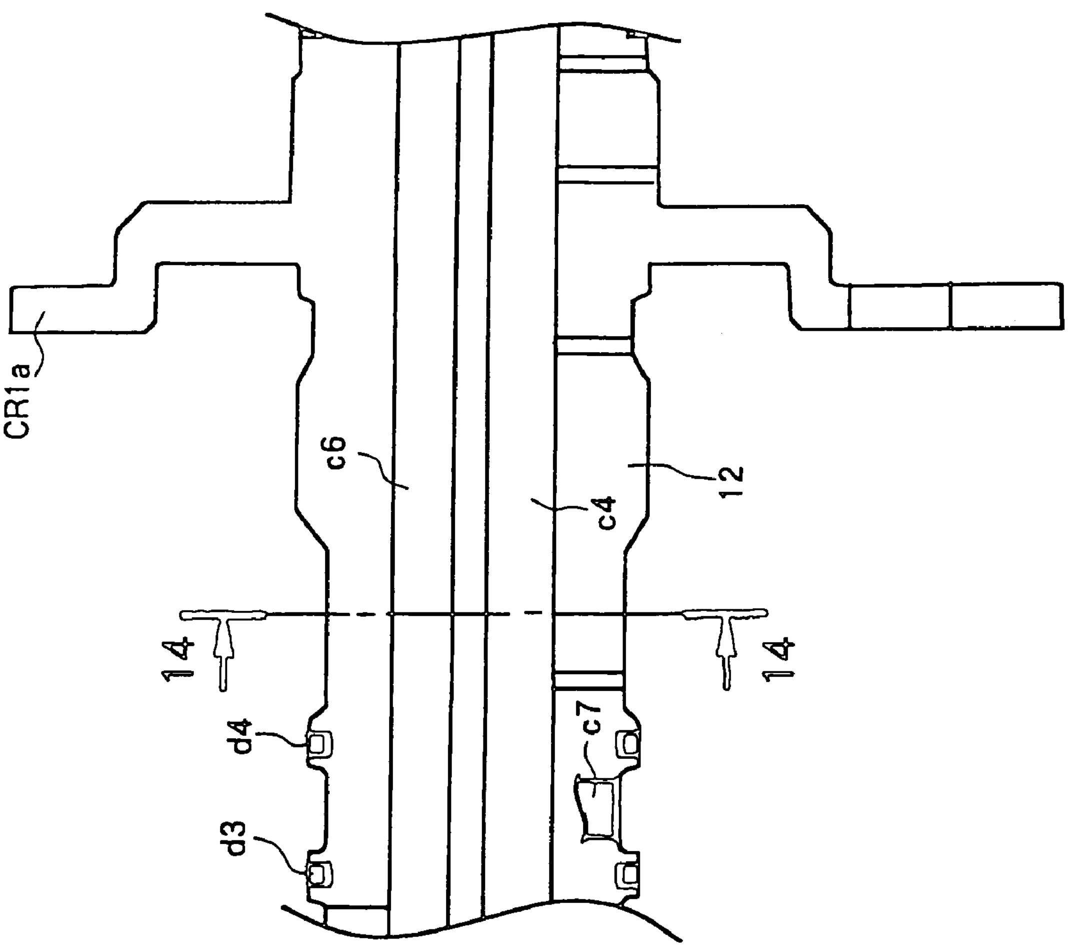

Next, the structure of oil passages of each component will be explained. The input shaft 12 is provided with four oil passages c2, c4, c6, c8 perforated in the axial direction. Specifically, the oil passages c4, c6, c8 which are parallel with the axial direction are perforated in the nearly rear half part of the input shaft 12 at the positions almost equal distance in the circumferential direction such that the center axes of the oil passages form an equilateral triangle as shown in FIGS. 14A and 14B. The oil passage c2 communicates with the outer peripheral face of the input shaft 12 through the oil passage c1 in the radial direction; the oil passage c6 communicates with the outer peripheral face through the oil passages c5, c14 in the radial direction; the oil passage c8 communicates with the outer peripheral face through the oil passages c7, c13 and the oil passage c4 communicates with the outer peripheral face through the oil passage c3 and the oil passages c9 through c12 in the radial direction, respectively.

The oil passages c15, c17 are perforated through the boss portion 3*b* of the partition member 3*a* in the radial direction in order from the front side. The oil passages c16, c18 are perforated radially through the hub portion 52*c* of the clutch drum 52 of the fourth clutch C-4 positioned on the outer peripheral side of the boss portion 3*b* in order from the front side. The oil passages c19, c20, c21, c22 are perforated radially through the second sleeve member 105 positioned on the outer peripheral side of the rear part of the input shaft 12. Further, the oil passage c23 is perforated at the position corresponding to the oil passage c22 of the second sleeve member 105 on the rear side of the input shaft 12. The oil passage c23 communicates with the oil passage c30 perforated through the intermediate shaft 13.

Meanwhile, an oil groove (not shown) is formed on the outer peripheral side of the sleeve member 100 and comprises the oil passage between the boss portion 3*b* and the sleeve member 100. That is, the oil passage is formed within the boss portion 3*b* in a broad sense (hereinafter referred to as "the oil passage within the boss portion 3*b* "). The seal rings d1 through d4 for sealing the boss portion 3*b* (sleeve member 100) and the oil passages c1, c3, c5, c7 are provided on the outer peripheral side of the input shaft 12 and the seal rings d7, d8, d9 for sealing the oil passages c13, c20 of the second sleeve member 105 and the oil passages c14, c21 are provided on the outer peripheral side of the rear part of the input shaft 12. Further, the seal rings d5, d6 for sealing the oil passage c15 of the boss portion 3*b* and the oil passage c16 of the hub portion 52*c* of the clutch drum 52 are provided on the outer peripheral side of the boss portion 3*b*.

Figure 15:
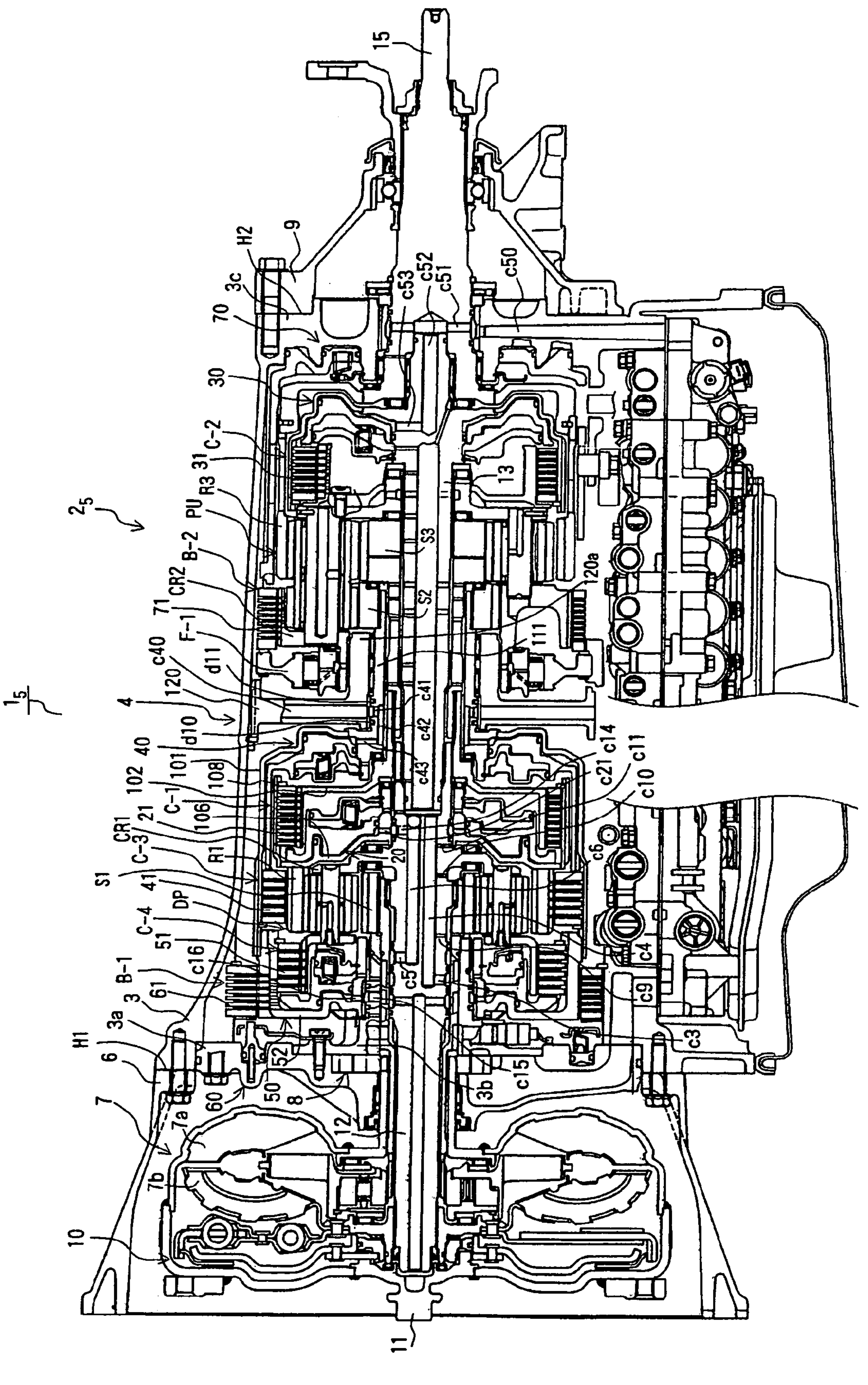
FIG. 15 is a section view showing an automatic transmission according to a fifth exemplary embodiment.
Figure 16:
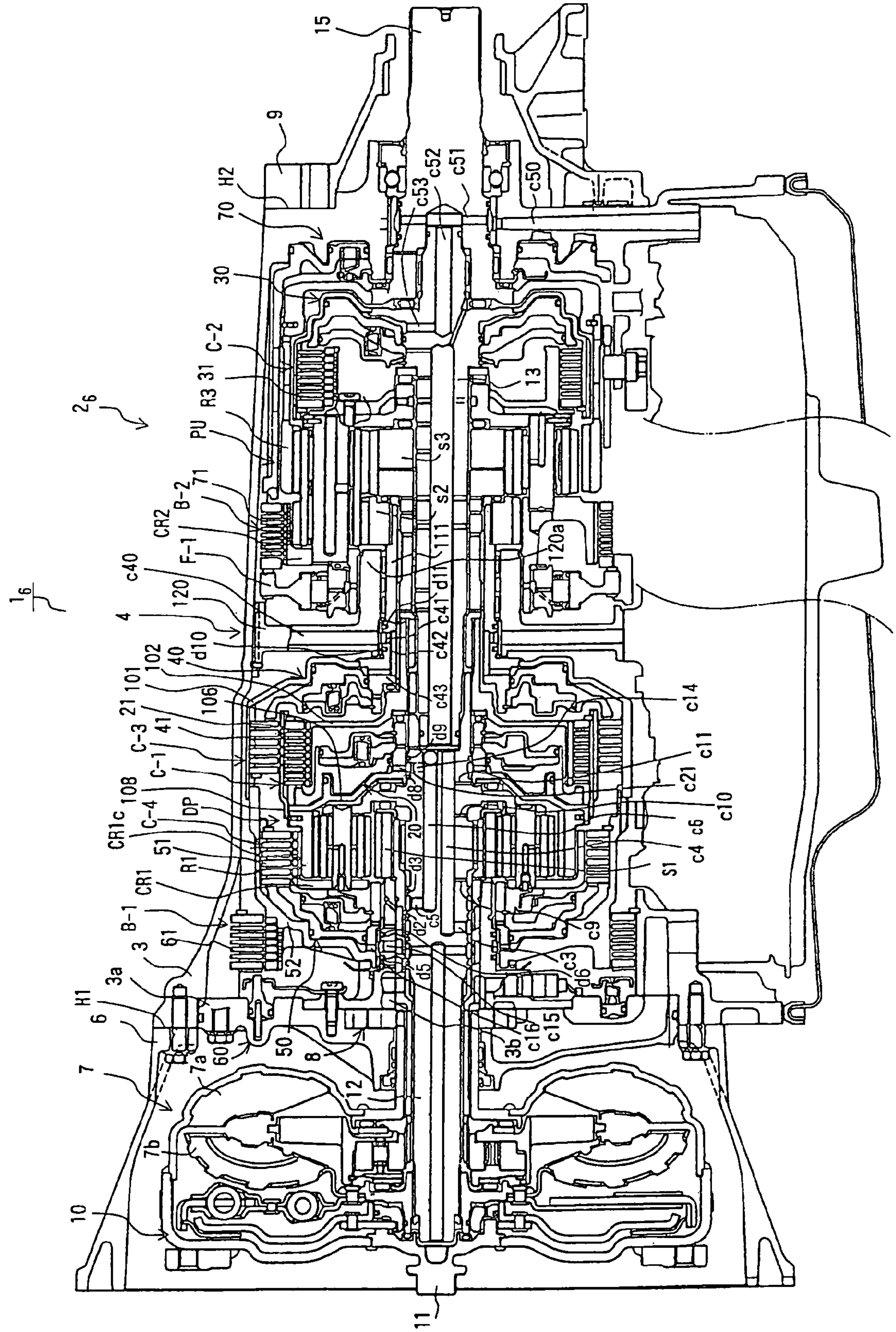
FIG. 16 is a section view showing an automatic transmission according to a sixth exemplary embodiment.

It is noted that although a plurality of oil passages for supplying lubricant oil are perforated through the intermediate shaft 13, the third sleeve member 110 and the fourth sleeve member 111, their explanation will be omitted here because their structure is an ordinary one. Operating fluid is supplied from the hydraulic control unit to the hydraulic servo 30 of the second clutch C-2 via the oil passage c24 provided in the partition wall 3*c* of the mission case 3, the oil passage c25 provided within the output shaft 15 and the oil passage c26 provided within the intermediate (input) shaft 13 (FIG. 15 or 16 for example).

Next, the supply of lubricant oil will be explained. When lubricant oil is supplied to the oil passages within the boss portion 3*b* based on a hydraulic pressure generated by the oil pump 8 described above, the lubricant oil is splashed to the outer peripheral side of the boss portion 3*b* via the oil passage c17. Similarly, the lubricant oil supplied to the oil passages within the boss portion 3*b* by the oil pump 8 is supplied to the oil passages c3, c4 of the input shaft 12 in a manner of being sealed by the seal rings d1, d2. The oil is then supplied to the rear side via the oil passage c4 and is splashed to the outer peripheral side of the input shaft 12 from the oil passages c9, c10, c11, c12. Thereby, each member within the mission case 3, i.e., each gear of the planetary gear DP, each member of the first clutch C-1, each member of the third clutch C-3, each member of the fourth clutch C-4, each member of the first brake B-1 and specifically the friction plates 21, 41, 51 and 61 are lubricated. It is noted that oil within the cancel oil chambers 47, 57 of the third and fourth clutches C-3, C-4, for example, is also supplied in the same manner with the lubricant oil via the oil passages c18, c19 and lubricates each member within the mission case 3 in a manner of joining with other lubricant oil when it is to be emitted. Further, oil within the cancel oil chamber 27 of the first clutch C-1, for example, is lubricant oil, which has been supplied to the oil passage c30 of the intermediate shaft 13, and which is to be supplied via the oil passages c23, c22. It lubricates each member within the mission case 3 in a manner of joining with other lubricant oil when it is to be emitted.

Next, the supply of operating fluid will be explained. The hydraulic control unit (not shown) generates and controls engaging pressures of the first clutch C-1, the second clutch C-2, the third clutch C-3, the fourth clutch C-4, the first brake B-1, the second brake B-2 and the lockup clutch 10 based on the hydraulic pressure produced by the oil pump 8. Operating fluid of the lockup clutch 10, the first clutch C-1, and the third and fourth clutches C-3, C-4 is supplied to each oil passage provided separately within the boss portion 3*b* (within the first sleeve member 100) from around the joint of the boss portion 3*b* on the front side based on the engaging hydraulic pressure.

When the operating fluid for engaging the lockup clutch 10 is supplied to the oil passage within the boss portion 3*b*, it is supplied from the oil passage within the boss portion 3*b* to the oil passage c1 in a manner of being sealed by seal rings (not shown). The operating fluid supplied to the oil passage c1 is supplied to the friction plate of the lockup clutch 10 via the oil passage c2 and acts on the friction plate. Then, the flange-like member provided around the input shaft 11 presses the friction plate and the lockup clutch 10 engages as a result (FIG. 15 or 16 for example). It is noted that the operating fluid is emitted in reverse via the oil passages c2, c1 when the lockup clutch 10 is disengaged based on the hydraulic control made by the hydraulic control unit.

When the operating fluid for engaging the fourth clutch C-4 is supplied to the oil passage within the boss portion 3*b*, it is supplied to the oil passage c15 from the oil passage in the axial direction (not shown) within the boss portion 3*b*. The operating fluid supplied to the oil passage c15 is supplied to the oil passage c16 in a manner of being sealed by the seal rings d5, d6, i.e., from the oil passage c15 in the boss portion 3*b* to the oil passage c16 of the clutch drum 52 which are mutually and relatively rotatable. Then, the operating fluid is supplied to the oil chamber 56 of the hydraulic servo 50 of the fourth clutch C-4 via the oil passage c16. Thus, the piston member 53 is pressed backward and the friction plates 51 are pressed, i.e., the fourth clutch C-4 engages. It is noted that when the fourth clutch C-4 is disengaged based on the hydraulic control made by the hydraulic control unit, the piston member 53 is pressed forward by an urging force of the return spring 55 and thereby, the operating fluid of the oil chamber 56 is emitted in reverse via the oil passages c16, c15 and the oil passage in the axial direction within the boss portion 3*b*.

When the operating fluid for engaging the third clutch C-3 is supplied to the oil passage within the boss portion 3*b*, it is supplied to the oil passage c7 of the input shaft 12 from the oil passage in the axial direction (not shown) within the boss portion 3*b* sealed by seal rings d3, d4. The operating fluid supplied to the oil passage c7 is supplied to the outer peripheral part on the rear side of the input shaft 12. The operating fluid supplied to the oil passage c13 is supplied to the oil passage c20 of the second sleeve member 105 in a manner of being sealed by the seal rings d7, d8, i.e., from the oil passage c13 of the input shaft 12 to the oil passage c20 of the second sleeve member 105 which are mutually and relatively rotatable. Then, the operating fluid is supplied to the oil chamber 46 of the hydraulic servo 40 of the third clutch C-3 via the oil passage c20. Thus, the piston member 43 is pressed forward and the friction plates 41 are pressed by the drum portion 43*b*, i.e., the third clutch C-3 engages. It is noted that when the third clutch C-3 is disengaged based on the hydraulic control made by the hydraulic control unit, the piston member 43 is pressed forward by an urging force of the return spring 45 and thereby, the operating fluid in the oil chamber 46 is emitted in reverse via the oil passages c20, c13, c8, c7 and the oil passage in the axial direction within the boss portion 3*b*.

When the operating fluid for engaging the first clutch C-1 is supplied to the oil passage within the boss portion 3*b*, it is supplied to the oil passage c5 in the input shaft 12 from the oil passage in the axial direction (not shown) within the boss portion 3*b* in a manner of being sealed by the seal rings d2, d3 similar to the operating fluid of the third clutch C-3. The operating fluid supplied to the oil passage c5 is supplied to the outer peripheral part on the rear side of the input shaft 12 via the oil passages c6, c14. The operating fluid supplied to the oil passage c14 is supplied to the oil passage c21 of the second sleeve member 105 sealed by the seal rings d8, d9, i.e., the operating fluid is supplied from the oil passage c14 within the input shaft 12 to the oil passage c21 of the second sleeve member 105, which are mutually and relatively rotatable. Then, the operating fluid is supplied to the oil chamber 26 of the hydraulic servo 20 of the first clutch C-1 via the oil passage c21. Thus, the piston member 23 is pressed backward and the drum portion 23*b* presses the friction plates 21, i.e., the first clutch C-1 engages. It is noted that when the first clutch C-1 is disengaged based on the hydraulic control made by the hydraulic control unit, the piston member 23 is pressed forward by an urging force of the return spring 25 and thereby, the operating fluid in the oil chamber 26 is emitted in reverse via the oil passages c21, c14, c5 and the oil passage in the axial direction within the boss portion 3*b*.

According to the automatic transmission $\mathbf{1}_4$ described above, the fourth clutch C-4 is linked with the sun gear S2 of the planetary gear unit PU via the output side members (the clutch drum 42 and the drum-like member 101 and the sleeve member 104 which are link members) of the third clutch C-3, so that the output side members turn out to be output side members of the two clutches transmitting different rotations, i.e., they may be shared in common as one rotary member. Thereby, the automatic transmission $\mathbf{1}_4$ may be compactly built.

Further, because the hydraulic servo 50 of the fourth clutch C-4 is disposed axially on the opposite side of the planetary gear DP from the planetary gear unit PU and on the boss portion 3*b*, extending from the case 4, to supply the operating fluid to the hydraulic servo 50 from the oil passage within the boss portion 3*b*, the number of seal rings can be reduced as compared to a case of disposing the hydraulic servo 50 of the fourth clutch C-4 on the input shaft 12 through an intermediary of a member having another speed of rotation, i.e., as compared to a case of supplying the operating fluid via the other member, for example. Thereby, it becomes possible to prevent the drop of the efficiency and controllability of the automatic transmission $\mathbf{1}_4$.

It should be noted that, although it is necessary to provide a number of clutches, for example, in order to build the automatic transmission capable of attaining the multi-stage shift as described above, there is a need that the automatic transmission is required to be compact from the aspect of mountability in mounting the automatic transmission in a vehicle. While the boss portion extending from the case is generally disposed on the outer peripheral side of the input shaft on the front side of the transmission mechanism of the automatic transmission to pass lubricant oil of oil pumps and operating fluid from the hydraulic control unit to the input shaft, there is a problem in disposing a plurality of clutches on the outer peripheral side on the boss portion located on the outer peripheral side of the input shaft that hampers the compactness of the automatic transmission in the radial direction.

However, according to the vehicular automatic transmission $\mathbf{1}_4$, the planetary gear DP, the first and third clutches C-1, C-3, and the fourth clutch C-4 are disposed axially on one side of the planetary gear unit PU; the hydraulic servo 50 of the fourth clutch C-4 is disposed axially on the opposite side of the planetary gear DP from the planetary gear unit PU; and the hydraulic servos 20, 40 of the first and third clutches C-1, C-3 are disposed axially between the planetary gear unit PU and the planetary gear DP, so that the vehicular automatic transmission $\mathbf{1}_4$ may be compactly built in the radial direction as compared to a case of disposing the hydraulic servos of the plurality of clutches on the boss portion 3*b* extending from the case 4, for example, even though it is capable of attaining the forward eighth speed and reverse second speed stages, for example.

Still more, because the friction plate 61 of the first brake B-1 is disposed so as to overlap with the outside, in the radial direction, of the fourth clutch C-4, i.e., because the friction plates 61 of the first brake B-1 are disposed on the outer peripheral side of the fourth clutch C-4 whose capacity is relatively small as compared to the clutch that transmits reduced rotation, the axial size of the vehicular automatic transmission $\mathbf{1}_4$ may be reduced without increasing the radial size thereof by disposing the friction plates 61 of the first brake B-1 so as to overlap with the fourth clutch C-4.

Further, because the second clutch C-2 is disposed on the opposite side of the planetary gear unit PU from the planetary gear DP, the first and third clutches C-1, C-3 may be disposed adjacent to the planetary gear DP without interposing the second clutch C-2 between the planetary gear DP and the planetary gear unit PU and the planetary gear DP may be disposed relatively closely to the planetary gear unit PU, the transmitting members, e.g., the ring gear R1, the link member 101, the link member 102. Further, the drum member 108, for transmitting a reduced rotation, i.e., for transmitting a large torque, may be shortened. Thereby, the vehicular automatic transmission $\mathbf{1}_4$ may be lightened and the controllability thereof may be improved by cutting its inertia.

In addition, because the fourth clutch C-4 and the planetary gear DP are disposed on the boss portion 3*b* extending from the wall 3*a* on one side of the case 4, oil is supplied to the hydraulic servo 50 of the fourth clutch C-4 from the oil passage c15 provided within the boss portion 3*b* and oil is supplied to the hydraulic servo 20 of the second clutch C-2 from the oil passage c50 provided in the wall 3*c* on the other side of the case 4, the fourth clutch C-4 and the second clutch C-2 may be disposed separately from the planetary gear unit PU. Accordingly, it becomes possible to prevent the oil passages from concentrating within the case 4 and to improve the freedom of design. Further, oil may be supplied to the hydraulic servos 30, 50 of the second and fourth clutches C-2, C-4 just by providing a pair (the least) of seal rings. Accordingly, it becomes possible to improve the power transmitting efficiency of the vehicular automatic transmission $1_4$ by reducing sliding resistance of the seal rings.

Additionally, because the link member 101, for linking the third clutch C-3 with the sun gear S2, is disposed so as to pass along the outer peripheral side of the first clutch C-1, the fourth clutch C-4 and the output side members 52, 101 of the third clutch C-3, disposed on the opposite sides of the planetary gear DP, may be linked without complicating the members and the vehicular automatic transmission $1_4$ may be compactly built.

Because the friction plate 41 of the third clutch C-3 is disposed on the outer peripheral side of the ring gear R1 of the planetary gear DP, the supporting plate 106 for supporting the ring gear R1 of the planetary gear DP and the second sleeve member 105 are disposed on the input shaft 12, the cylinder portion 22 of the hydraulic servo 20 of the first clutch C-1 and the clutch drum 42 of the hydraulic servo 40 of the third clutch C-3 are disposed axially on the both sides of the supporting plate 106 and the piston member 43 of the hydraulic servo 40 of the third clutch C-3 and the ring gear R1 of the planetary gear DP are built so that they penetrate through and intersect with each other and so that the piston member 43 is slidable against the ring gear R1, the supporting plate 106 and the second sleeve member 105, the supporting plate 106 and the second sleeve member 105 may be used in common as the cylinder portions 22, 42 of the first and third clutches C-1, C-3. Accordingly, the vehicular automatic transmission may be built so that the third clutch C-3 is removable while compacting in the axial direction.

Further, because the hydraulic servo 50 of the fourth clutch C-4 and the hydraulic servos 20, 40 of the first and third clutches C-1, C-2 are separately disposed and the hydraulic servos 20, 40 of the first and third clutches C-1, C-3 are disposed on the supporting plate 106 and the second sleeve member 105, it becomes possible to prevent the clutch drums and pistons, e.g., the piston member 23, the piston member 43, the second sleeve member 105, the positioning member 106, the drum member 108 and the ring gear R1, of the hydraulic servos 20, 40 of the first and third clutches C-1, C-3 from rotating due to the inputted rotation of the input shaft 12 and to prevent the seal rings d7, d8, d9, provided for the hydraulic servos 20, 40 of the first and third clutches C-1, C-3, from causing unnecessary sliding resistance. Accordingly, it becomes possible to prevent the drop of the power transmitting efficiency of the vehicular automatic transmission $1_4$.

Further, because the second sleeve member 105 becomes the cylinder portions 22, 42 of the hydraulic servos 20, 40 of the first and third clutches C-1, C-3, i.e., because the oil chambers 26, 46 of their hydraulic servos 20, 40 are provided on the second sleeve member 105, seal rings d7, d8, d9 need to be provided just between the input shaft 12 and the second sleeve member 105 to supply operating fluid to the oil chambers 26, 46. Accordingly, the diameter of the seal rings d7, d8, d9 may be cut and the sliding resistance of those seal rings d7, d8, d9 can be reduced as compared to a case of providing the seal rings on the boss portion 3*b*. Thereby, the power transmitting efficiency of the vehicular automatic transmission $1_4$ may be improved.

Further, because the second sleeve member 105 composing the hydraulic servos 20, 40 is disposed on the input shaft 12, i.e., because the second sleeve member 105 is disposed directly on the input shaft 12 without interposing a member, such as the boss portion 3*b*, between the second sleeve member 105, which turns out to be the clutch drum, and the input shaft 12, a pressure receiving area of the oil chamber 26, 46 of the hydraulic servos 20, 40 of the first and third clutches C-1, C-3 may be increased as compared to a case of disposing the hydraulic servos of the clutches on the boss portion 3*b*. That is, the capacity of the first and third clutches C-1, C-3 that transmit the reduced rotation, i.e., a higher torque than that of the rotation of the input shaft 12, may be increased.

Because the end portion R1*a* of the ring gear R1 of the planetary gear DP is formed in the shape of a comb and a plurality of through holes 43*c*, through which the comb-like end portion R1*a* of the ring gear R1 of the planetary gear DP penetrates and intersects, are formed through the piston member 43 of the hydraulic servo 40 of the third clutch C-3, it becomes possible the piston member 43 of the hydraulic servo 40 of the third clutch C-3 is slidable against the ring gear R1, the supporting plate 106 and the second sleeve member 105 and the third clutch is removable.

Because the outer peripheral end portion 106*a* of the supporting plate 106 is formed in the shape of a comb, the comb-like end portion R1*a* of the ring gear R1 of the planetary gear DP is fitted into the comb-like outer peripheral end portion 106*a* of the supporting plate 106 and the ring gear R1 of the planetary gear DP is fixed to the supporting plate 106 in the axial direction by the tapered snap ring 109, the ring gear R1 may be fixed to and supported by the supporting plate 106 and the second sleeve member 105.

Because the hydraulic servo 20 of the first clutch C-1 and the hydraulic servo 40 of the third clutch C-3 are disposed on the input shaft 12 and operating fluid is supplied to the hydraulic servo 20 of the first clutch C-1 and the hydraulic servo 40 of the third clutch C-3 via oil passages c7, c8, c13, provided within the input shaft 12, operating fluid may be supplied to the hydraulic servos 20, 40 of the first and third clutches C-1, C-3 just by providing two pairs of seal rings d1, d2, and d3, d4, and d7, d8 and d8, d9 between each of the boss portion 3*b* and the input shaft 12 and the hydraulic servos 20, 40 and the input shaft 12, respectively. Because the diameter of the seal rings may be reduced as compared to a case of disposing the first and third clutches C-1, C-3 on the boss portion 3*b*, the sliding resistance caused by the seal rings can be reduced and the power transmitting efficiency of the vehicular automatic transmission$1_4$ may be improved.

Further, because the first oil passage c6 for supplying operating fluid to the hydraulic servo 20 of the first clutch C-1 in the axial direction, the second oil passage c8 for supplying operating fluid to the hydraulic servo 40 of the third clutch C-3 in the axial direction, and the third oil passage c4 for supplying lubricant oil in the axial direction are formed within the input shaft 12 in parallel with the axial direction, lubricant oil may be supplied from the input shaft 12 even though operating fluid may be supplied to the hydraulic servos 20, 40 of the first and third clutches C-1, C-3.

Further, because it is arranged so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

In addition, because it is arranged so that the inputted rotation is inputted to the clutch drum 52 forming the hydraulic servo 50 of the fourth clutch C-4 via the carrier CR1 when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56.

A 5th embodiment, which is a partial modification of the 4th embodiment, will be explained with reference to FIG. 15. It is noted that in the 5th embodiment, components having the same structure with those of the automatic transmission $\mathbf{1}_4$ of the 4th embodiment will be denoted by the same reference characters and an explanation thereof will be omitted here except as necessary for easier understanding.

The automatic transmission $\mathbf{1}_5$ of the 5th embodiment has a transmission mechanism $\mathbf{2}_5$ which is different from the automatic transmission $\mathbf{1}_4$ of the 4th embodiment in that the disposition of the hydraulic servo 20 of the first clutch C-1 and the hydraulic servo 40 of the third clutch C-3 is reversed, i.e., the hydraulic servo 20 of the first clutch C-1 is disposed axially on the side of the planetary gear DP and the hydraulic servo 40 of the third clutch C-3 is disposed on the side of the planetary gear unit PU. Further, the ringed support wall 120 is disposed between the planetary gear unit PU and the first and third clutches C-1, C-3, or more specifically, between the one-way clutch F-1 and the hydraulic servo 40 of the third clutch C-3.

That is, the friction plates 41 of the third clutch C-3 is disposed on the outer peripheral side of the ring gear R1 of the planetary gear DP and the outer peripheral side of the friction plates 41 is spline-coupled with the drum member 101 for linking the clutch drum 52 of the fourth clutch C-4 with the sun gear S2 of the planetary gear unit PU via the fourth sleeve member 111. That is, the drum member 101 becomes a clutch drum of the third clutch C-3. Then, the hydraulic servo 40 of the third clutch C-3 is disposed on the inner peripheral side of the rear part of the drum member 101.

The ring gear R1 is connected with the supporting plate 106 by means of welding, for example, to be fixed and supported. A drum member 108 spline-coupled with the outer friction plates of the friction plates 21 of the first clutch C-1 is connected on the outer peripheral side of the supporting plate 106. That is, the supporting plate 106 and the drum member 108 form a clutch drum of the first clutch C-1. Then, the hydraulic servo 20 of the first clutch C-1 is disposed on the inner peripheral side of the rear part of the supporting plate 106.

Meanwhile, the support wall 120 having a sleeve portion 120*a* on the inner peripheral side thereof is disposed on the outer peripheral side of the fourth sleeve member 111. The outer peripheral side of the support wall 120 is spline-coupled with the inner peripheral side of the mission case 3 so as not to be rotatable. An oil passage c40, communicating with the hydraulic control unit, is perforated in the radial direction within the support wall 120. An oil passage c41 is perforated at the position corresponding to the inner peripheral side of the oil passage c40 of the support wall 120 and the oil passage c40 communicates with the oil passage c41 in a manner of being sealed by the seal rings d10, d11. Then, an oil passage c42 communicating with the oil passage c41 and an oil passage c43 communicating with the oil passage c42 are perforated in the fourth sleeve member 111. The oil passage c43 communicates with the operating oil chamber 46 of the hydraulic servo 40 of the third clutch C-3. That is, the oil passage c40 within the support wall 120 communicates with the oil chamber 46 of the hydraulic servo 40 of the third clutch C-3.

When operating fluid for engaging the third clutch C-3 is supplied to the oil passage c40 of the support wall 120, it is supplied to the oil passage c41 of the fourth sleeve member 111 in a manner of being sealed by the seal rings d10, d11 from the oil passage c40. That is, operating fluid is supplied from the oil passage c40 of the support wall 120 to the oil passage c41 of the fourth sleeve member 111 which rotate relative to each other. The operating fluid supplied to the oil passage c41 is supplied to the operating oil chamber of the hydraulic servo 40 of the third clutch C-3 via oil passages c42, c43. Then, the piston member is pressed forward and the friction plates 41 are pressed, thus engaging the third clutch C-3. It is noted that when the third clutch C-3 is disengaged, based on the hydraulic control made by the hydraulic control unit, the piston member is pressed forward urged by the return spring and thereby the operating fluid in the operating oil chamber is emitted in reverse via the oil passages c43, c42, c41, c40.

It is noted that the operating fluid supplied to the hydraulic servo 40 of the third clutch C-3 is supplied not via the oil passage within the input shaft 12 as described above but via the oil passages within the support wall 120 and the fourth sleeve member 111, so that no oil passage for the hydraulic servo 40 of the third clutch C-3 needs to be perforated in the input shaft 12. Therefore, only the oil passages c5, c6, c14 for supplying operating fluid to the hydraulic servo 20 of the first clutch C-1 and the oil passages c3, c4 and c9 through c12 for supplying lubricant oil are perforated in the input shaft 12 of the automatic transmission $\mathbf{1}_5$ of the fifth embodiment. That is, only the two oil passages c4, c6 in the axial direction are perforated in parallel.

According to the inventive vehicular automatic transmission $\mathbf{1}_5$ described above, the fourth clutch C-4 is linked to the sun gear S2 of the planetary gear unit PU through an intermediary of the output side members (the clutch drum 42, the drum member 101, and the sleeve member 104 which become the link member) of the third clutch C-3, so that the output side members become the output side members of the two clutches that transmit different rotations. That is, they may be commonly used as one rotary member. Thereby, the vehicular automatic transmission $\mathbf{1}_5$ may be compactly built.

Further, the hydraulic servo 50 of the fourth clutch C-4 is disposed axially on the opposite side of the planetary gear DP from the planetary gear unit PU and is disposed on the boss portion 3*b* extending from the case 4. Operating fluid is supplied to the hydraulic servo 50 from the oil passage within the boss portion 3*b*, so that the number of seal rings can be reduced as compared to a case of disposing the hydraulic servo 50 on the input shaft 12 through an intermediary of a member having another speed of rotation, i.e., as compared to a case of supplying operating fluid through an intermediary of another member. Thereby, it becomes possible to prevent the drop of the efficiency and controllability of the vehicular automatic transmission $\mathbf{1}_5$.

By the way, although it is necessary to provide a number of clutches, for example, in order to build the automatic transmission capable of attaining the multi-stage shifts as described above, there is a need, on the other hand, that the automatic transmission is required to be compact from the aspect of mounting the automatic transmission in a vehicle. While the boss portion extending from the case is generally disposed on the outer peripheral side of the input shaft on the front side of the transmission mechanism of the automatic transmission to pass lubricant oil of the oil pump and operating fluid from the hydraulic control unit to the input shaft, it is a problem to dispose a plurality of clutches on the outer peripheral side on the boss portion located on the outer peripheral side of the input shaft because it hampers the compactness of the automatic transmission in the radial direction.

However, according to the inventive vehicular automatic transmission $1_5$, the planetary gear DP, the first and third clutches C-1, C-3, and the fourth clutch C-4 are disposed axially on one side of the planetary gear unit PU; the hydraulic servo 50 of the fourth clutch C-4 is disposed axially on the opposite side of the planetary gear DP from the planetary gear unit PU, and the hydraulic servos 20, 40 of the first and third clutches C-1, C-3 are disposed axially between the planetary gear unit PU and the planetary gear DP, so that the vehicular automatic transmission $1_5$ may be compactly built in the radial direction, as compared to a case of disposing the hydraulic servos of the plurality of clutches on the boss portion 3*b*, extending from the case 4 for example, even though such is capable of attaining the forward eighth speed and reverse second speed stages.

Further, because the friction plates 61 of the first brake B-1 are disposed so as to overlap with the outside, in the radial direction, of the fourth clutch C-4, i.e., because the friction plates 61 of the first brake B-1 are disposed on the outer peripheral side of the fourth clutch C-4, whose capacity is relatively small as compared to the clutch that transmits a reduced rotation, the axial size of the vehicular automatic transmission $1_5$ may be reduced without increasing the radial size thereof by disposing the friction plates 61 so as to overlap with the fourth clutch C-4.

Further, the second clutch C-2 is disposed axially on the opposite side of the planetary gear unit PU from the planetary gear DP, the first and third clutches C-1, C-3 may be disposed adjacent to the planetary gear DP without interposing the second clutch C-2 between the planetary gear DP and the planetary gear unit PU and the planetary gear DP may be disposed relatively closely with the planetary gear unit PU, so that the transmitting members, e.g., the ring gear R1, the link member 101, the link member 102 and the drum member 108, for transmitting reduced rotation, i.e., for transmitting a large torque, may be shortened. Thereby, the vehicular automatic transmission $1_5$ may be lightened and the controllability thereof may be improved by cutting its inertia.

Moreover, the fourth clutch C-4 and the planetary gear DP are disposed on the boss portion 3*b* extending from the wall 3*a* on one side of the case 4, oil is supplied to the hydraulic servo 50 from the oil passage c15 provided within the boss portion 3*b* and oil is supplied to the hydraulic servo 20 from the oil passage c50 provided in the wall 3*c* on the other side of the case 4, so that the fourth clutch C-4 and the second clutch C-2 may be disposed separately from the planetary gear unit PU. Accordingly, it becomes possible to prevent the oil passages from concentrating within the case 4 and to improve the freedom of design. Further, oil may be supplied to the hydraulic servos 30, 50 of the second and fourth clutches C-2, C-4 just by providing a pair (the least) of seal rings. Accordingly, it becomes possible to improve the power transmitting efficiency of the vehicular automatic transmission $1_5$ by reducing sliding resistance of the seal rings.

Additionally, because the hydraulic servo 20 of the first clutch C-1 is disposed on the side of the planetary gear DP and the hydraulic servo 40 of the third clutch C-3 is disposed on the side of the planetary gear unit PU, it becomes possible to dispose the hydraulic servos 20, 40 of the first and third clutches C-1, C-3 axially between the planetary gear unit PU and the planetary gear DP.

Furthermore, because the friction plates 41 of the third clutch C-3 are disposed on the outer peripheral side of the ring gear R1 of the planetary gear DP and the first clutch C-1 is disposed on the inner peripheral side of the clutch drum (drum member) 101 of the third clutch C-3, the hydraulic servo 20 and/or the friction plates 21 of the first clutch C-1 may be relatively enlarged in the radial direction and thereby the capacity of the first clutch C-1 may be increased, as compared to a case of disposing the friction plates 41 of the third clutch C-3 on the outer peripheral side of the first clutch C-1, even though the vehicular automatic transmission $1_5$ may be compactly built in the radial direction.

Further, the hydraulic servo 50 of the fourth clutch C-4 is disposed on the boss portion 3*b* extending from the case 4, the hydraulic servo 20 of the first clutch C-1 and the hydraulic servo 40 of the third clutch C-3 are disposed on the input shaft 12, the support wall 120 fixed to the case 4 is disposed axially between the planetary gear unit PU and the first clutch C-1 and the third clutch C-3, operating fluid is supplied to the hydraulic servo 50 via the oil passage c15 provided within the boss portion 3*b*, operating fluid is supplied to the hydraulic servo 20 via the oil passages c5, c6, c14 provided within the input shaft 12, and operating fluid is supplied to the hydraulic servo 40 via the oil passage c40 provided within the support wall 120, so that operating fluid may be supplied to the hydraulic servo 50 by providing the pair of seal rings d5, d6 between the hydraulic servo 50 and the boss portion 3*b*, to the hydraulic servo 20 by providing the two pairs of seal rings d2, d3 and d8, d9 between the boss portion 3*b* and the input shaft 12 and between the hydraulic servo 20 and the input shaft 12, respectively, and to the hydraulic servo 40 by providing the pair of seal rings d10, d11 between the hydraulic servo 40 and the support wall 120. Thereby, the number of seal rings can be reduced as compared to a case of supplying operating fluid to the both of the hydraulic servos 20, 40 of the first and third clutches C-1, C-3 from the input shaft 12. Accordingly, it becomes possible to reduce sliding resistance of the seal rings and to improve the power transmitting efficiency of the vehicular automatic transmission $1_5$.

Further, because it is arranged so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

In addition, because it is arranged so that the inputted rotation is inputted to the clutch drum 52 forming the hydraulic servo 50 of the fourth clutch C-4 via the carrier CR1 when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56.

A 6th embodiment, which is a partial modification of the 4th and 5th embodiments described above, will be explained with reference to FIG. 16. It is noted that in the 6th embodiment, components having the same structure with those of the automatic transmissions $1_4$ and $1_5$ of the 4th and 5th embodiments will be denoted by the same reference characters and an explanation thereof will be omitted here except as necessary.

The automatic transmission $1_6$ of the 6th embodiment has a transmission mechanism $2_6$ which is different from the transmission mechanism $2_4$ of the automatic transmission $1_4$ of the 4th embodiment in that the disposition of the hydraulic servo 20 of the first clutch C-1 and the hydraulic servo 40 of the third clutch C-3 is reversed, i.e., the hydraulic servo 20 of the first clutch C-1 is disposed axially on the side of the planetary gear DP and the hydraulic servo 40 of the third clutch C-3 is disposed on the side of the planetary gear unit PU similar to the transmission mechanism $\mathbf{2}_5$ of the automatic transmission $\mathbf{1}_5$ of the 5th embodiment.

Further, the support wall 120 is disposed between the planetary gear unit PU and the first and third clutches C-1, C-3, or more specifically, between the one-way clutch F-1 and the hydraulic servo 40 of the third clutch C-3 similar to the transmission mechanism $\mathbf{2}_5$ of the automatic transmission $\mathbf{1}_5$ of the 5th embodiment. Additionally, the friction plate 51 of the fourth clutch C-4 is disposed on the outer peripheral side of the planetary gear DP and the friction plate 41 of the third clutch C-3 is disposed on the outer peripheral side of the first clutch C-1.

That is, the drum portion CR1*c* connected to the carrier CR1 of the planetary gear DP is formed in a manner of folding back from the front side of the planetary gear DP to the outer peripheral side thereof and the friction plates 51 of the fourth clutch C-4 are spline-coupled with the outer peripheral side of the drum portion CR1*c*. Further, the clutch drum 52 of the fourth clutch C-4 passes along the outer peripheral side of the friction plates 51 and is spline-coupled with an outer friction plates of the friction plates 51 and is connected to the drum member 101 that is also the clutch drum of the third clutch C-3.

The inner peripheral side of the friction plates 41 of the third clutch C-3 is spline-coupled with the outer peripheral side of the first clutch C-1, or more specifically, with the outer peripheral side of the drum member 108 forming the clutch drum of the first clutch C-1 and the outer peripheral side of the friction plates 41 is spline-coupled with the drum member 101 for linking the clutch drum 52 of the fourth clutch C-4 with the sun gear S2 of the planetary gear unit PU through an intermediary of the fourth sleeve member 111. Then, the hydraulic servo 40 of the third clutch C-3 is disposed on the inner peripheral side of the rear part of the drum member 101.

The ring gear R1 is connected with the supporting plate 106 by means of welding, for example, to be fixed and supported and the drum member 108 is connected to the outer peripheral side of the supporting plate 106 similarly by means of welding, for example. The outer friction plates of the friction plates 21 of the first clutch C-1 are spline-coupled with the inner peripheral side of the drum member 108 and the inner friction plates of the friction plates 41 of the third clutch C-3 are also spline-coupled with the outer friction plates of the friction plates 21 of the first clutch C-1. Then, the hydraulic servo 20 of the first clutch C-1 is disposed on the inner peripheral side of the rear part of the supporting plate 106.

Meanwhile, the support wall 120, having the sleeve portion 120*a*, is disposed on the outer peripheral side of the fourth sleeve member 111 similar to the automatic transmission $\mathbf{1}_5$ of the fifth embodiment. The outer peripheral side of the support wall 120 is spline-coupled with the inner peripheral side of the mission case 3 so as not to be rotatable.

It is noted that because the structure of the oil passages for supplying operating fluid to the hydraulic servo 50 of the fourth clutch C-4, the hydraulic servo 20 of the first clutch C-1 and the hydraulic servo 40 of the third clutch C-3 are almost the same as that of the fifth embodiment, an explanation thereof will be omitted here.

According to the inventive vehicular automatic transmission $\mathbf{1}_5$ described above, the fourth clutch C-4 is linked to the sun gear S2 of the planetary gear unit PU via the output side members (the clutch drum 42, the drum member 101, and the sleeve member 104 which function as the link member) of the third clutch C-3, so that the output side members become the output side members of the two clutches that transmit different rotations. That is, they may be commonly used as one rotary member. Thereby, the vehicular automatic transmission $\mathbf{1}_5$ may be compactly built.

Further, the hydraulic servo 50 of the fourth clutch C-4 is disposed axially on the opposite side of the planetary gear DP from the planetary gear unit PU and is disposed on the boss portion 3*b* extending from the case 4 and operating fluid is supplied to the hydraulic servo 50 of the fourth clutch C-4 from the oil passage within the boss portion 3*b*, so that a number of seal rings can be reduced as compared to a case of disposing the hydraulic servo 50 of the fourth clutch C-4 on the input shaft 12 through an intermediary of a member having another speed of rotation, i.e., as compared to a case of supplying operating fluid through an intermediary of another member. Thereby, it becomes possible to prevent the drop of the efficiency and controllability of the vehicular automatic transmission $\mathbf{1}_6$.

Although it is necessary to provide a number of clutches, for example, in order to build the automatic transmission capable of attaining the multi-stage shifts, there is a need that the automatic transmission be compact from the aspect of mountability in mounting the automatic transmission in a vehicle. While the boss portion extending from the case is generally disposed on the outer peripheral side of the input shaft on the front side of the transmission mechanism of the automatic transmission to pass lubricant oil of the oil pump and operating fluid from the hydraulic control unit to the input shaft, there is a problem to dispose a plurality of clutches on the outer peripheral side on the boss portion located on the outer peripheral side of the input shaft because it hampers the compactness of the automatic transmission in the radial direction.

However, according to the inventive vehicular automatic transmission $\mathbf{1}_6$, the planetary gear DP, the first and third clutches C-1, C-3 and the fourth clutch C-4 are disposed axially on one side of the planetary gear unit PU, the hydraulic servo 50 of the fourth clutch C-4 is disposed axially on the opposite side of the planetary gear DP from the planetary gear unit PU and the hydraulic servos 20, 40 of the first and third clutches C-1, C-3 are disposed axially between the planetary gear unit PU and the planetary gear DP, so that the vehicular automatic transmission $\mathbf{1}_6$ may be compactly built in the radial direction as compared to a case of disposing the hydraulic servos of the plurality of clutches on the boss portion 3*b* extending from the case 4, for example, even though it is capable of attaining the forward eighth speed and reverse second speed stages for example.

In addition, because (at least a part of) the friction plates 61 of the first brake B-1 are disposed so as to overlap with the outside in the radial direction of the fourth clutch C-4, i.e., because the friction plates 61 of the first brake B-1 are disposed on the outer peripheral side of the fourth clutch C-4, whose capacity is relatively small as compared to the clutch for transmitting reduced rotation, the axial size of the vehicular automatic transmission $\mathbf{1}_5$ may be reduced without increasing the radial size thereof by disposing the friction plates 61 of the first brake B-1 so as to overlap with the fourth clutch C-4.

Further, the second clutch C-2 is disposed on the opposite side of the planetary gear unit PU from the planetary gear DP, the first and third clutches C-1, C-3 may be disposed adjacent to the planetary gear DP without interposing the second clutch C-2 between the planetary gear DP and the planetary gear unit PU. As a result, the planetary gear DP may be disposed relatively closely with the planetary gear unit PU, so that the transmitting members, e.g., the ring gear R1, the link member 101, the link member 102 and the drum member 108, for transmitting a reduced rotation, i.e., for transmitting a large torque, may be shortened. Thereby, the vehicular automatic transmission $1_6$ may be lightened and the controllability thereof may be improved by cutting its inertia.

In addition, because the fourth clutch C-4 and the planetary gear DP are disposed on the boss portion 3*b* extending from the wall 3*a* on one side of the case 4, oil is supplied to the hydraulic servo 50 of the fourth clutch C-4 from the oil passage c15 provided within the boss portion 3*b* and oil is supplied to the hydraulic servo 20 of the second clutch C-2 from the oil passage c50 provided in the wall 3*c* on the other side of the case 4, the fourth clutch C-4 and the second clutch C-2 may be disposed separately from the planetary gear unit PU. Accordingly, it becomes possible to prevent the oil passages from concentrating within the case 4 and to improve the freedom of design. Further, oil may be supplied to the hydraulic servos 30, 50 of the second and fourth clutches C-2, C-4 just by providing a pair (the least) of seal rings. Accordingly, it becomes possible to improve the power transmitting efficiency of the vehicular automatic transmission $1_5$ by cutting sliding resistance of the seal rings.

Moreover, because the hydraulic servo 20 of the first clutch C-1 is disposed on the side of the planetary gear DP and the hydraulic servo 40 of the third clutch C-3 is disposed on the side of the planetary gear unit PU, it becomes possible to dispose the hydraulic servos 20, 40 of the first and third clutches C-1, C-3 axially between the planetary gear unit PU and the planetary gear DP.

Furthermore, because the friction plates 51 of the fourth clutch C-4 are disposed on the outer peripheral side of the ring gear R1 of the planetary gear DP and the friction plates 41 of the third clutch C-3 are disposed on the outer peripheral side of the clutch drum (drum member) 101*d* of the first clutch C-1, the hydraulic servo 50 and the friction plate 51 of the fourth clutch C-4 may be relatively enlarged in the radial direction and thereby the capacity of the fourth clutch C-4 may be increased as compared to a case of disposing the friction plate 41 of the third clutch C-3 on the outer peripheral side of the planetary gear DP, even though the vehicular automatic transmission $1_6$ may be compactly built in the axial direction.

Further, the hydraulic servo 50 of the fourth clutch C-4 is disposed on the boss portion 3*b* extending from the case 4, the hydraulic servo 20 of the first clutch C-1 and the hydraulic servo 40 of the third clutch C-3 are disposed on the input shaft 12, the support wall 120, fixed to the case 4, is disposed axially between the planetary gear unit PU and the first clutch C-1 and the third clutch C-3, operating fluid is supplied to the hydraulic servo 50 via the oil passage c15 provided within the boss portion 3*b*, operating fluid is supplied to the hydraulic servo 20 via the oil passages c5, c6, c14 provided within the input shaft 12 and operating fluid is supplied to the hydraulic servo 40 of the third clutch C-3 via the oil passage c40 provided within the support wall 120, so that operating fluid may be supplied to the hydraulic servo 50 by providing the pair of seal rings d5, d6 between the hydraulic servo 50 and the boss portion 3*b*, to the hydraulic servo 20 by providing the two pairs of seal rings d2, d3 and d8, d9 between the boss portion 3*b* and the input shaft 12 and between the hydraulic servo 20 and the input shaft 12, and to the hydraulic servo 40 by providing the pair of seal rings d10, d11 between the hydraulic servo 40 and the support wall 120. Thereby, the number of seal rings can be reduced as compared to a case of supplying operating fluid to the both of the hydraulic servos 20, 40 of the first and third clutches C-1, C-3 from the input shaft 12. Accordingly, it becomes possible to cut sliding resistance of the seal rings and to improve the power transmitting efficiency of the vehicular automatic transmission $1_6$.

Further, because it is arranged so that the reduced rotation of the ring gear R1 is inputted to the clutch drum 42 of the third clutch C-3 forming the hydraulic servo 40 of the third clutch C-3 when the third clutch C-3 engages, the reduced rotation is not inputted to the clutch drum 42 of the third clutch C-3 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Additionally, because it is arranged so that the inputted rotation is inputted to the clutch drum 52 forming the hydraulic servo 50 of the fourth clutch C-4 via the carrier CR1 when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56.

Figure 17:
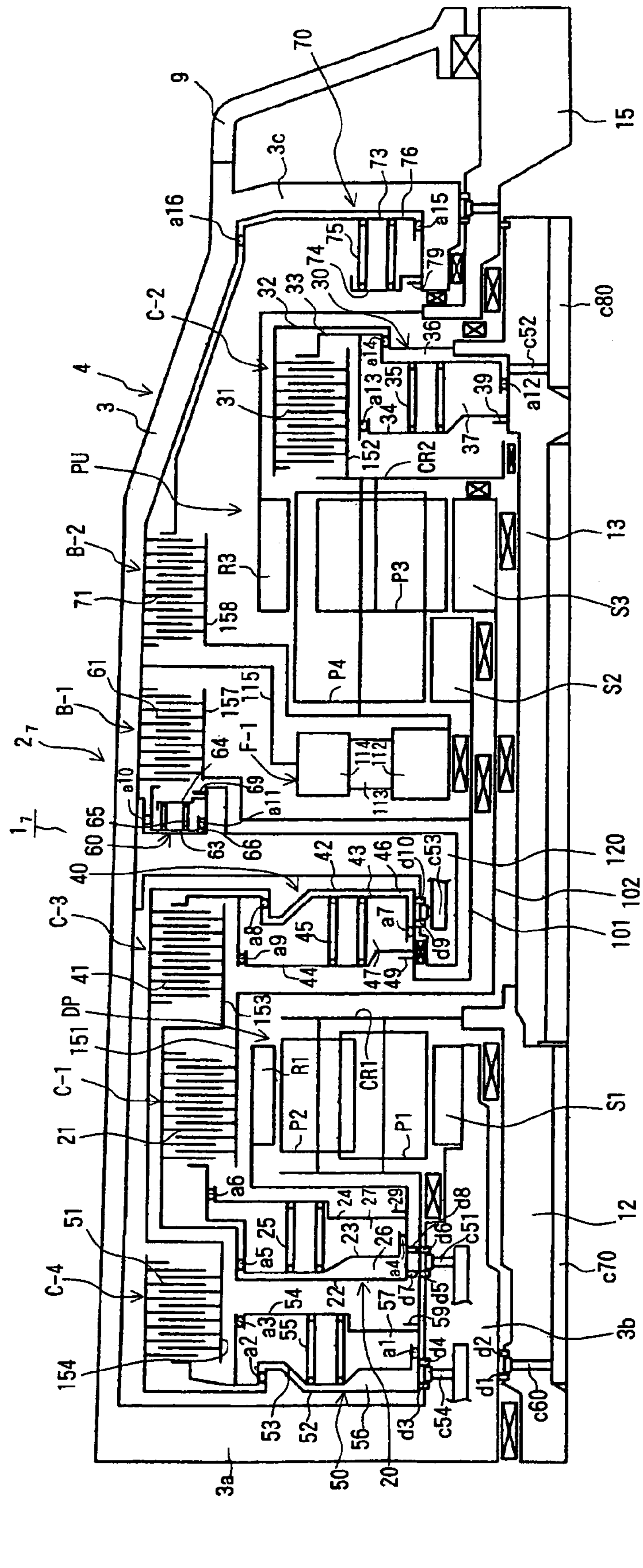
FIG. 17 is a diagrammatic section view showing an automatic transmission according to a seventh exemplary embodiment.

A 7th embodiment, which is a partial modification of the first embodiment described above, will be explained with reference to FIG. 17. FIG. 17 is a diagrammatic section view showing an automatic transmission $1_7$ of the 7th embodiment. It is noted that in the 7th embodiment explained below, components having the same structure with those of the automatic transmission $1_1$ of the first embodiment will be denoted by the same reference characters and an explanation thereof will be omitted here, except of partial components such as oil passages, seal rings and hub members.

The automatic transmission $1_7$ of the 7th embodiment has a transmission mechanism $2_7$ which is different from the automatic transmission $1_1$ of the first embodiment in that the disposition of the hydraulic servo 20 of the first clutch C-1, the hydraulic servo 40 of the third clutch C-3 and the hydraulic servo 50 of the fourth clutch C-4 is changed. That is, the hydraulic servo 50 of the fourth clutch C-4 and the hydraulic servo 20 of the first clutch C-1 are disposed axially on the opposite side of the planetary gear DP from the planetary gear unit PU and the hydraulic servo 40 of the third clutch C-3 is disposed between the planetary gear DP and the planetary gear unit PU.

Further, the support wall 120 is disposed between the planetary gear unit PU and the third clutch C-3, or more specifically, between the one-way clutch F-1 and the hydraulic servo 40 of the third clutch C-3. Further, the first brake B-1 is disposed on the outer peripheral side of the one-way clutch F-1, the hydraulic servo 60 of the first brake B-1 is disposed on the outer peripheral side of the rear part of the support wall 120 and the hydraulic servo 70 of the second brake B-2 is disposed between the planetary gear unit PU and the partitioning portion 3*c*.

Further, the friction plates 51 of the fourth clutch C-4 are disposed on the outer peripheral side of the hydraulic servo 50 of the fourth clutch C-4, the friction plates 21 of the first clutch C-1 are disposed on the outer peripheral side of the planetary gear DP, the friction plates 41 of the third clutch C-3 are disposed on the outer peripheral side of the hydraulic servo 40 of the third clutch C-3, the friction plates 61 of the first brake B-1 are disposed on the outer peripheral side of the one-way clutch F-1, the friction plates 71 of the second brake B-2 are disposed on the outer peripheral side of the planetary gear unit PU and the friction plates 31 of the second clutch C-2 are disposed on the outer peripheral side of the hydraulic servo 30 of the second clutch C-2, respectively.

Next, transmission routes of the transmission mechanism $2_7$ will be briefly explained. The carrier CR1 of the planetary gear DP is linked to the clutch drum 52 of the fourth clutch C-4 through the inner peripheral side of the first clutch C-1. A hub member 154, spline-coupled with the inner friction plates of the friction plate 51 of the fourth clutch C-4, is linked to the clutch drum 42 of the third clutch C-3 through the outer peripheral side of the first clutch C-1. The clutch drum 42 is linked to the sun gear S2 of the planetary gear unit PU through an intermediary of the link member 101 and a hub member 157, spline-coupled with the inner friction plates of the friction plates 61 of the first brake B-1, is linked to the link member 101.

Meanwhile, the ring gear R1 of the planetary gear DP is linked to the clutch drum 22 of the first clutch C-1 and a hub member 153, spline-coupled with the inner friction plates of the friction plates 41 of the third clutch C-3, is linked to the clutch drum 22. A hub member 151, spline-coupled with the inner friction plates of the friction plates 21 of the first clutch C-1, is linked to the sun gear S3 of the planetary gear unit PU through an intermediary of the link member 102.

Further, more, the carrier CR2 of the planetary gear unit PU is linked to the inner race 112 of the one-way clutch F-1 and is also linked to a hub member 158, spline-coupled with the inner friction plates of the friction plates 71 of the second brake B-2. Further, it is linked to a hub member 152, spline-coupled with the inner friction plates of the friction plates 31 of the second clutch C-2, on the rear side. It is noted that an outer race 114 of the one-way clutch F-1 is connected to the inner peripheral side of the mission case 3 through an intermediary of the flange-like member 115. The ring gear R3 of the planetary gear unit PU is linked to the output shaft 15.

Next, the structures of each oil passage and the supply of operating fluid will be briefly explained. The oil chamber 56 of the hydraulic servo 50 of the fourth clutch C-4, i.e., the oil chamber 56 formed by sealing the part between the clutch drum 52 and the piston member 53 by the seal rings a1, a2, is arranged so as to communicate with an oil passage c54 within the boss portion 3*b* by sealing the part between the clutch drum 52 and the boss portion 3*b* by the seal rings d3, d4 and operating fluid is supplied thereto from the oil passage c54. It is noted that oil is supplied from an oil passage (not shown) to the cancel oil chamber 57 formed by sealing the part between the piston member 53 and the cancel plate 54 by the seal rings a1, a3.

The oil chamber 26 of the hydraulic servo 20 of the first clutch C-1, i.e., the oil chamber 26 formed by sealing the part between the clutch drum 22 and the piston member 23 by the seal rings a4, a5, is arranged so as to communicate with an oil passage c51 within the boss portion 3*b* by sealing the part between the boss portion 3*b* and the clutch drum 52 by seal rings d5, d6 and the part between the clutch drum 22 and the clutch drum 52 by seal rings d7, d8, respectively, and operating fluid is supplied thereto from the oil passage c51. It is noted that oil is supplied from an oil passage (not shown) to the cancel oil chamber 27 formed by sealing the part between the piston member 23 and the cancel plate 24 by the seal rings a4, a6.

The oil chamber 46 of the hydraulic servo 40 of the third clutch C-3, i.e., the oil chamber 46 formed by sealing the part between the clutch drum 42 and the piston member 43 by the seal rings a7, a8, is arranged so as to communicate with an oil passage c53 within the support wall 120 by sealing the part between the support wall 120 and the clutch drum 42 by the seal rings d9, d10 and operating fluid is supplied thereto from the oil passage c53. It is noted that oil is supplied from an oil passage (not shown) to the cancel oil chamber 47 formed by sealing the part between the piston member 43 and the cancel plate 44 by the seal rings a7, a9.

The oil chamber 36 of the hydraulic servo 30 of the second clutch C-2, i.e., the oil chamber 36 formed by sealing the part between the clutch drum 32 and the piston member 33 by the seal rings a12, a14, is arranged so as to communicate with oil passages c52, c80 within the input shaft (intermediate shaft 13) and operating fluid is supplied thereto from the oil passages c52, c80. It is noted that oil is supplied from an oil passage (not shown) to the cancel oil chamber 37 formed by sealing the part between the piston member 33 and the cancel plate 34 by the seal rings a12, a13.

Further, operating fluid is supplied from an oil passage (not shown) within the support wall 120 to the oil chamber 66 of the hydraulic servo 60 of the first brake B-1, i.e., to the oil chamber 66 formed by sealing the part between the support wall 120 and the piston member 63 by the seal rings a10, a11.

Further, operating fluid is supplied from an oil passage (not shown) within the partitioning portion 3*c* to the oil chamber 76 of the hydraulic servo 70 of the second brake B-2, i.e., to the oil chamber 76 formed by sealing the part between the partitioning portion 3*c* of the mission case 3 and the piston member 73 by the seal rings a 15, a 16.

While oil passages c60, c70 within the input shaft 12 are arranged so as to communicate with an oil passage (not shown) within the boss portion 3*b* by sealing by the seal rings d1, d2, lubricant oil is splashed from the oil passage c70 to the outer peripheral side of the input shaft 12 via the oil passage not shown.

According to the inventive vehicular automatic transmission $1_7$ described above, the fourth clutch C-4 is linked to the sun gear S2 of the planetary gear unit PU via the output side members (the clutch drum 42 and the link member 101) of the third clutch C-3, so that the output side members become the output side members of the two clutches that transmit different rotations. That is, they may be commonly used as one rotary member. Thereby, the vehicular automatic transmission $1_7$ may be compactly built.

The hydraulic servo 50 of the fourth clutch C-4 is disposed axially on the opposite side of the planetary gear DP from the planetary gear unit PU and is also disposed on the boss portion 3*b* extending from the case 4 and operating fluid is supplied to the hydraulic servo 50 from the oil passage within the boss portion 3*b*, so that a number of seal rings can be reduced as compared to a case of disposing the hydraulic servo 50 on the input shaft 12 through an intermediary of a member having another speed of rotation, i.e., as compared to a case of supplying operating fluid through an intermediary of another member. Thereby, it becomes possible to prevent the drop of the efficiency and controllability of the vehicular automatic transmission $1_7$.

Further, because the first brake B-1 is disposed axially between the third clutch C-3 and the planetary gear unit PU, the hydraulic servo 50 and the friction plates 51 of the fourth clutch C-4 may be enlarged in the radial direction and thereby, the capacity of the fourth clutch C-4 may be increased.

Because the support wall 120, fixed to the case 4, is disposed axially between the planetary gear unit PU and the third clutch C-3 and operating fluid is supplied to the hydraulic servo 40 of the third clutch C-3 via the oil passage c53 provided in the support wall 120, operating fluid may be supplied to the hydraulic servo 40 of the third clutch C-3 just by providing the pair of seal rings d9, d10 between the hydraulic servo 40 and the support wall 120. Thereby, it becomes possible to reduce the number of seal rings as compared to a case of supplying operating fluid to the hydraulic servo 40 of the third clutch C-3 from the input shaft 12. Accordingly, it becomes possible to cut sliding resistance of the seal rings and to improve the power transmitting efficiency of the vehicular automatic transmission $\mathbf{1}_7$.

In addition, because the hydraulic servo 60 of the first brake B-1 is disposed on the outer peripheral side of the support wall 120, it becomes possible to use the support wall 120 in common as the cylinder member of the hydraulic servo 60 of the first brake B-1 and to cut the number of parts.

Further, because the second clutch C-2 is disposed axially on the opposite side of the planetary gear unit PU from the planetary gear DP, the second clutch C-2 may be linked with the carrier CR2 without being entangled with the members for linking the first and third clutches C-1, C-3 with the sun gear S2 and the sun gear S3 of the planetary gear unit PU. Because the planetary gear DP may be disposed relatively closely with the planetary gear unit PU, the transmitting members for transmitting a reduced rotation, i.e., a large torque, may be shortened. Thereby, it becomes possible to lighten the vehicular automatic transmission $\mathbf{1}_7$ and to improve the controllability thereof by cutting its inertia.

Further, because the vehicular automatic transmission $\mathbf{1}_7$ is arranged so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Figure 18:
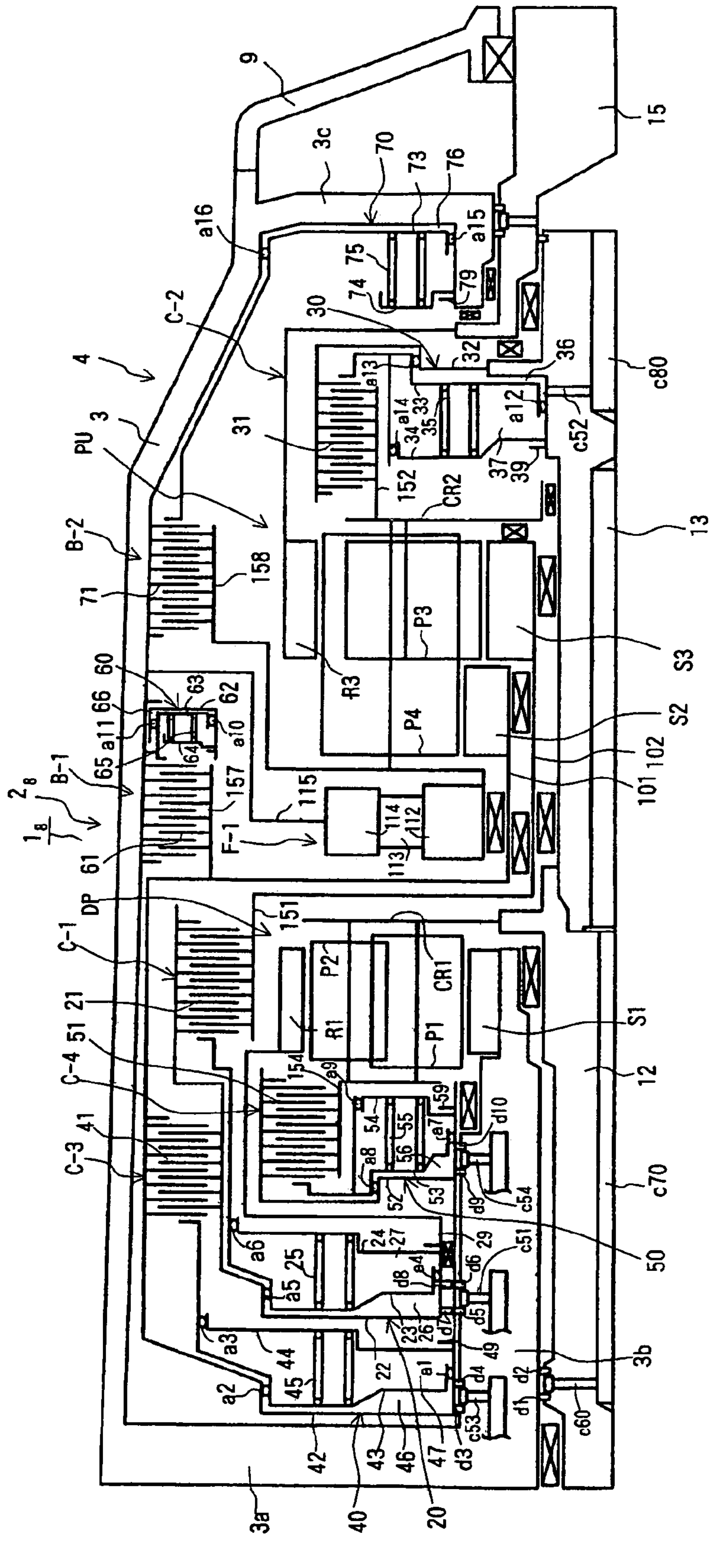
FIG. 18 is a diagrammatic section view showing an automatic transmission according to an eighth exemplary embodiment.

An 8th embodiment, which is a partial modification of the 7th embodiment described above, will be explained with reference to FIG. 18. FIG. 18 is a diagrammatic section view showing an automatic transmission $\mathbf{1}_8$ of the 8th embodiment. It is noted that in the 8th embodiment explained below, components having the same structure with those of the automatic transmission $\mathbf{1}_7$ of the 7th embodiment will be denoted by the same reference characters and an explanation thereof will be omitted here, except of partial components such as oil passages, seal rings and hub members.

The automatic transmission $\mathbf{1}_8$ of the 8th embodiment has a transmission mechanism $\mathbf{2}_8$ which is different from the automatic transmission $\mathbf{1}_7$ of the 7th embodiment in that the disposition of the hydraulic servo 40 of the third clutch C-3 is changed. That is, the hydraulic servo 40 of the third clutch C-3, the hydraulic servo 50 of the fourth clutch C-4 and the hydraulic servo 20 of the first clutch C-1 are disposed axially on the opposite side of the planetary gear DP from the planetary gear unit PU. Further, the first brake B-1 is disposed on the outer peripheral side of the one-way clutch F-1 and the hydraulic servo 70 of the second brake B-2 is disposed between the planetary gear unit PU and the partitioning portion 3*c*.

Further, the friction plates 51 of the fourth clutch C-4 are disposed on the outer peripheral side of the hydraulic servo 50 of the fourth clutch C-4, the friction plates 21 of the first clutch C-1 are disposed on the outer peripheral side of the planetary gear DP, the friction plates 41 of the third clutch C-3 are disposed on the outer peripheral side of the hydraulic servo 20 of the first clutch C-1 and the friction plates 51 of the fourth clutch C-4, the friction plates 61 of the first brake B-1 are disposed on the outer peripheral side of the one-way clutch F-1, the friction plates 71 of the second brake B-2 are disposed on the outer peripheral side of the planetary gear unit PU and the friction plates 31 of the second clutch C-2 are disposed on the outer peripheral side of the hydraulic servo 30 of the second clutch C-2, respectively.

Next, transmission routes of the transmission mechanism $\mathbf{2}_8$ will be briefly explained. The carrier CR1 of the planetary gear DP is linked to the hub member 154 of the fourth clutch C-4. The clutch drum 52, spline-coupled with the outer friction plates of the friction plates 51 of the fourth clutch C-4, is linked to the clutch drum 42 of the third clutch C-3 through the inner peripheral side of the first clutch C-1. Further, the clutch drum 42 is linked to the sun gear S2 of the planetary gear unit PU through an intermediary of the link member 101 by passing along the outer peripheral side of the first clutch C-1. The hub member 157 spline-coupled with the inner friction plate of the friction plates 61 of the first brake B-1 is linked to the link member 101.

Meanwhile, the ring gear R1 of the planetary gear DP is linked to the clutch drum 22 of the first clutch C-1 through the outer peripheral side of the fourth clutch C-4 and the inner friction plates of the friction plates 41 of the third clutch C-3 are spline-coupled with the outer peripheral side of the clutch drum 22. Further, the hub member 151, spline-coupled with the inner friction plates of the friction plates 21 of the first clutch C-1, is linked to the sun gear S3 of the planetary gear unit PU through an intermediary of the link member 102.

In addition, the carrier CR2 of the planetary gear unit PU is linked to the inner race 112 of the one-way clutch F-1 and is also linked to the hub member 158 spline-coupled with the inner friction plates of the friction plates 71 of the second brake B-2. Further, it is linked to the hub member 152, spline-coupled with the inner friction plates of the friction plates 31 of the second clutch C-2, on the rear side. It is noted that the outer race 114 of the one-way clutch F-1 is connected to the inner peripheral side of the mission case 3 through an intermediary of the flange-like member 115. Then, the ring gear R3 of the planetary gear unit PU is linked to the output shaft 15.

Next, the structures of each oil passage and the supply of operating fluid will be briefly explained. The oil chamber 46 of the hydraulic servo 40 of the third clutch C-3, i.e., the oil chamber 46 formed by sealing the part between the clutch drum 42 and the piston member 43 by the seal rings a1, a2, is arranged so as to communicate with the oil passage c53 within the boss portion 3*b*. The part between the clutch drum 42 and the boss portion 3*b* is sealed by the seal rings d3, d4 and operating fluid is supplied thereto from the oil passage c53. It is noted that operating fluid is supplied from an oil passage (not shown) to the cancel oil chamber 47 formed by sealing the part between the piston member 43 and the cancel plate 44 by the seal rings a1, a3.

The oil chamber 26 of the hydraulic servo 20 of the first clutch C-1, i.e., the oil chamber 26 formed by sealing the part between the clutch drum 22 and the piston member 23 by the seal rings a4, a5, is arranged so as to communicate with the oil passage c51 within the boss portion 3*b*. The part between the boss portion 3*b* and the clutch drum 42 is sealed by seal rings d5, d6 and the part between the clutch drum 22 and the clutch drum 42 by the seal rings d7, d8, respectively. Operating fluid is supplied thereto from the oil passage c51. It is noted that oil is supplied from an oil passage (not shown) to the cancel oil chamber 27 formed by sealing the part between the piston member 23 and the cancel plate 24 by the seal rings a4, a6.

The oil chamber 56 of the hydraulic servo 50 of the fourth clutch C-4, i.e., the oil chamber 56 formed by sealing the part between the clutch drum 52 and the piston member 53 by the seal rings a7, a8, is arranged so as to communicate with the oil passage c54 within the boss portion 3*b* by sealing the part between the clutch drum 52 and the boss portion 3*b* by the seal rings d9, d10. Operating fluid is supplied thereto from the oil passage c54. It is noted that oil is supplied from an oil passage (not shown) to the cancel oil chamber 57 formed by sealing the part between the piston member 53 and the cancel plate 54 by the seal rings a7, a9.

The oil chamber 36 of the hydraulic servo 30 of the second clutch C-2, i.e., the oil chamber 36 formed by sealing the part between the clutch drum 32 and the piston member 33 by the seal rings a12, a13, is arranged so as to communicate with oil passages c52, c80 within the input shaft (intermediate shaft 13) and operating fluid is supplied thereto from the oil passages c52, c80. It is noted that oil is supplied from an oil passage (not shown) to the cancel oil chamber 37 formed by sealing the part between the piston member 33 and the cancel plate 34 by the seal rings a12, a14.

Further, operating fluid is supplied from an oil passage (not shown) within the mission case 3 to the oil chamber 66 of the hydraulic servo 60 of the first brake B-1, i.e., to the oil chamber 66 formed by sealing the part between the cylinder member 62 and the piston member 63 by the seal rings a10, a11.

Further, operating fluid is supplied from an oil passage (not shown) within the partitioning portion 3*c* of the mission case 3 to the oil chamber 76 of the hydraulic servo 70 of the second brake B-2, i.e., to the oil chamber 76 formed by sealing the part between the partitioning portion 3*c* and the piston member 73 by the seal rings a15, a16.

In addition, although the oil passages c60, c70 within the input shaft 12 are arranged so as to communicate with an oil passage (not shown) within the boss portion 3*b* sealed by the seal rings d1, d2, lubricant oil is splashed from the oil passage c70 to the outer peripheral side of the input shaft 12 via the oil passage (not shown).

According to the inventive vehicular automatic transmission $\mathbf{1}_8$ described above, the fourth clutch C-4 is linked to the sun gear S2 of the planetary gear unit PU via the output side members (the clutch drum 42 and the link member 101) of the third clutch C-3, so that the output side members become the output side members of the two clutches that transmit different rotations. That is, they may be commonly used as one rotary member. Thereby, the vehicular automatic transmission $\mathbf{1}_8$ may be compactly built.

Furthermore, the hydraulic servo 50 of the fourth clutch C-4 is disposed axially on the opposite side of the planetary gear DP from the planetary gear unit PU and is also disposed on the boss portion 3*b*, extending from the case 4. Operating fluid is supplied to the hydraulic servo 50 from the oil passage within the boss portion 3*b* so that the number of seal rings can be reduced as compared to a case of disposing the hydraulic servo 50 of the fourth clutch C-4 on the input shaft 12 through an intermediary of a member having another speed of rotation, i.e., as compared to a case of supplying operating fluid through an intermediary of another member. Thereby, it becomes possible to prevent the drop of the efficiency and controllability of the vehicular automatic transmission $\mathbf{1}_8$.

Further, the hydraulic servo 40 of the third clutch C-3, the hydraulic servo 20 of the first clutch C-1, the hydraulic servo 50 of the fourth clutch C-4 and the planetary gear DP are disposed on the boss portion 3*b*, extending from the case 4, in order from the side of the joint of the boss portion 3*b* to the case 4 in the axial direction and operating fluid is supplied to the hydraulic servo 40 of the third clutch C-3, the hydraulic servo 20 of the first clutch C-1 and the hydraulic servo 50 of the fourth clutch C-4 from the oil passages c53, c51, c54 provided within the boss portion 3*b*, respectively, so that operating fluid may be supplied to the hydraulic servo 40 and the hydraulic servo 50 just by providing a pair of seal rings d3, d4 and d9, d10 between the hydraulic servos 40, 50 and the boss portion 3*b* and to the hydraulic servo 20 by providing two pairs of seal rings d5, d6 and d7, d8 between the hydraulic servo 20 and the boss portion 3*b*.

Further, because the first brake B-1 is disposed axially between the planetary gear DP and the planetary gear unit PU, it becomes possible to dispose the friction plate 41 of the third clutch C-3 on the outer peripheral side of the fourth clutch C-4.

Because the second clutch C-2 is disposed axially on the opposite side of the planetary gear unit PU from the planetary gear DP, the second clutch C-2 may be linked with the carrier CR2 without being entangled with the members for linking the first and third clutches C-1, C-3 with the sun gear S2 and the sun gear S3 of the planetary gear unit PU. And, because the planetary gear DP may be disposed relatively closely with the planetary gear unit PU, the transmitting members for transmitting reduced rotation, i.e., a large torque, may be shortened. Thereby, it becomes possible to lighten the vehicular automatic transmission $\mathbf{1}_8$ and to improve the controllability thereof by cutting its inertia.

Further, because the vehicular automatic transmission $\mathbf{1}_8$ is arranged so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Lastly, because it is arranged so that the inputted rotation is inputted to the clutch drum 52 forming the hydraulic servo 50 of the fourth clutch C-4 via the carrier CR1 when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56.

Figure 19:
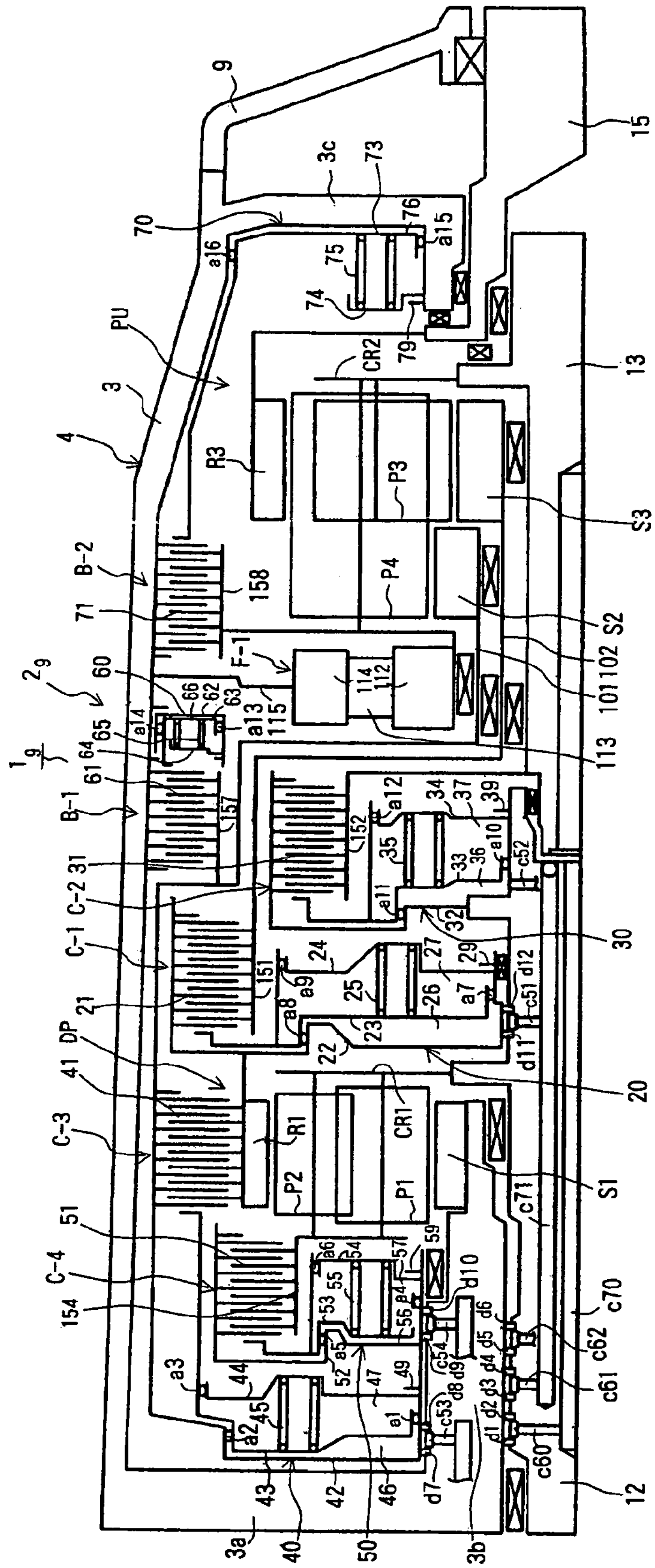
FIG. 19 is a diagrammatic section view showing an automatic transmission according to a ninth exemplary embodiment.

A 9th embodiment, which is a partial modification of the first embodiment, will be explained with reference to FIG. 19. It is noted that in the 9th embodiment explained below, components having the same structure with those of the automatic transmission $\mathbf{1}_1$ of the first embodiment will be denoted by the same reference characters and an explanation thereof will be omitted here, except of partial components such as oil passages, seal rings and hub members.

The automatic transmission $\mathbf{1}_9$ of the 9th embodiment has a transmission mechanism $\mathbf{2}_9$ which is different from the automatic transmission $\mathbf{1}_1$ of the first embodiment in that the disposition of the hydraulic servo 30 of the second clutch C-2 is changed. That is, the hydraulic servo 40 of the third clutch C-3 and the hydraulic servo 50 of the fourth clutch C-4 are disposed axially on the opposite side of the planetary gear DP from the planetary gear unit PU and the hydraulic servo 20 of the first clutch C-1 and the hydraulic servo 30 of the second clutch C-2 are disposed between the planetary gear DP and the planetary gear unit PU.

Further, the first brake B-1 is disposed on the outer peripheral side of the second clutch C-2 and the hydraulic servo 70 of the second brake B-2 is disposed between the planetary gear unit PU and the partitioning portion 3*c*.

Further, the friction plates 51 of the fourth clutch C-4 are disposed on the outer peripheral side of the hydraulic servo 50 of the fourth clutch C-4, the friction plates 41 of the third clutch C-3 are disposed on the outer peripheral side of the planetary gear DP, the friction plates 21 of the first clutch C-1 are disposed on the outer peripheral side of the hydraulic servo 20 of the first clutch C-1, the friction plates 31 of the second clutch C-2 are disposed on the outer peripheral side of the hydraulic servo 30 of the second clutch C-2, the friction plates 61 of the first brake B-1 are disposed on the outer peripheral side of the friction plates 31 of the second clutch C-2 and the friction plates 71 of the second brake B-2 are disposed on the front side of the outer peripheral side of the planetary gear unit PU, respectively.

Next, transmission routes of the transmission mechanism $2_9$ will be briefly explained. The carrier CR1 of the planetary gear DP is linked to the hub member 154 of the fourth clutch C-4. The clutch drum 52, spline-coupled with the outer friction plates of the friction plates 51 of the fourth clutch C-4, is linked to the clutch drum 42 on the inner peripheral side of the third clutch C-3. Further, the clutch drum 42 is linked to the sun gear S2 of the planetary gear unit PU through an intermediary of the link member 101 passing along the outer peripheral side of the first clutch C-1. The hub member 157, spline-coupled with the inner friction plates of the friction plates 61 of the first brake B-1, is linked to the link member 101.

Meanwhile, the ring gear R1 of the planetary gear DP is spline-coupled with the inner friction plates of the friction plates 41 of the third clutch C-3 and is linked to the clutch drum 22 of the first clutch C-1. Further, the hub member 151, spline-coupled with the inner friction plates of the friction plates 21 of the first clutch C-1, is linked to the sun gear S3 of the planetary gear unit PU through an intermediary of the link member 102. The clutch drum 32 of the second clutch C-2 is linked to the input shaft 12 and the hub member 152, spline-coupled with the inner friction plates of the friction plates 31 of the second clutch C-2, is linked to the intermediate shaft 13.

In addition, the carrier CR2 of the planetary gear unit PU is linked to the inner race 112 of the one-way clutch F-1 on the front side and is also linked to the hub member 158, spline-coupled with the inner friction plates of the friction plates 71 of the second brake B-2. The one-way clutch F-1 is linked to the intermediate shaft 13 on the rear side. It is noted that the outer race 114 of the one-way clutch F-1 is connected to the inner peripheral side of the mission case 3 through an intermediary of the flange-like member 115. The ring gear R3 of the planetary gear unit PU is linked to the output shaft 15. It is noted that in the automatic transmission $1_9$ in the 9th embodiment, the intermediate shaft 13 does not always rotate equally with the input shaft 12 and rotates at the inputted rotation only when the second clutch C-2 engages.

Next, the structures of each oil passage and the supply of operating fluid will be briefly explained. The oil chamber 46 of the hydraulic servo 40 of the third clutch C-3, i.e., the oil chamber 46 formed by sealing the part between the clutch drum 42 and the piston member 43 by the seal rings a1, a2, is arranged so as to communicate with the oil passage c53 within the boss portion 3*b* by sealing the part between the boss portion 3*b* and the clutch drum 42 by the seal rings d7, d8. Operating fluid is supplied thereto from the oil passage c53. It is noted that operating fluid is supplied from an oil passage (not shown) to the cancel oil chamber 47 formed by sealing the part between the piston member 43 and the cancel plate 44 by the seal rings a1, a3.

The oil chamber 56 of the hydraulic servo 50 of the fourth clutch C-4, i.e., the oil chamber 56 formed by sealing the part between the clutch drum 52 and the piston member 53 by the seal rings a4, a5, is arranged so as to communicate with the oil passage c54 within the boss portion 3*b* by sealing the part between the clutch drum 52 and the boss portion 3*b* by the seal rings d9, d10. Operating fluid is supplied thereto from the oil passage c54. It is noted that oil is supplied from an oil passage (not shown) to the cancel oil chamber 57 formed by sealing the part between the piston member 53 and the cancel plate 54 by the seal rings a4, a6.

Further, oil passages (not shown) within the boss portion 3*b* communicate with oil passages c61, c71, c51 within the input shaft 12 by sealing the part between the boss portion 3*b* and the input shaft 12 by the seal rings d3, d4 and d11, d12. The oil chamber 26 of the hydraulic servo 20 of the first clutch C-1, i.e., the oil chamber 26 formed by sealing the part between the clutch drum 22 and the piston member 23 by the seal rings a7, a8, is arranged so as to communicate with the oil passage c51 by sealing the part between the input shaft 12 and the clutch drum 22 by the seal rings d11, d12 and operating fluid is supplied thereto from the oil passage c51. It is noted that oil is supplied from an (oil passage) not shown to the cancel oil chamber 27 formed by sealing the part between the piston member 23 and the cancel plate 24 by the seal rings a7, a9.

Further, oil passages (not shown) within the boss portion 3*b* communicate with the oil passage c62 within the input shaft 12 by sealing the part between the boss portion 3*b* and the input shaft 12 by the seal rings d5, d6, with an oil passage perforated in parallel with the c71 (not shown), and with the oil passage c52. The oil chamber 36 of the hydraulic servo 30 of the second clutch C-2, i.e., the oil chamber 36 formed by sealing the part between the clutch drum 32 and the piston member 33 by the seal rings a10, a11, is arranged so as to communicate with the oil passage c52 and operating fluid is supplied thereto from the oil passage c52. It is noted that oil is supplied from an oil passage (not shown) to the cancel oil chamber 37 formed by sealing the part between the piston member 33 and the cancel plate 34 by the seal rings a10, a12.

Further, operating fluid is supplied from an oil passage (not shown) within the mission case 3 to the oil chamber 66 of the hydraulic servo 60 of the first brake B-1, i.e., to the oil chamber 66 formed by sealing the part between the cylinder member 62 and the piston member 63 by the seal rings a13, a14.

Further, operating fluid is supplied from an oil passage (not shown) within the partitioning portion 3*c* of the mission case 3 to the oil chamber 76 of the hydraulic servo 70 of the second brake B-2, i.e., to the oil chamber 76 formed by sealing the part between the partitioning portion 3*c* and the piston member 73 by the seal rings a15, a16.

While oil the passages c60, c70 within the input shaft 12 are arranged so as to communicate with an oil passage (not shown) within the boss portion 3*b* by sealing by the seal rings d1, d2, lubricant oil is splashed from the oil passage c70 to the outer peripheral side of the input shaft 12 via the oil passage (not shown).

According to the vehicular automatic transmission $1_9$ described above, the fourth clutch C-4 is linked to the sun gear S2 of the planetary gear unit PU via the output side members (the clutch drum 42 and the link member 101) of the third clutch C-3, so that the output side members become the output side members of the two clutches that transmit different rotations. That is, they may be commonly used as one rotary member. Thereby, the vehicular automatic transmission $1_9$ may be compactly built.

Further, the hydraulic servo 50 of the fourth clutch C-4 is disposed axially on the opposite side of the planetary gear DP from the planetary gear unit PU and is also disposed on the boss portion 3*b* extending from the case 4 and operating fluid is supplied to the hydraulic servo 50 of the fourth clutch C-4 from the oil passage within the boss portion 3*b*, so that the number of seal rings can be reduced as compared to a case of disposing the hydraulic servo 50 on the input shaft 12 through an intermediary of a member having another speed of rotation, i.e., as compared to a case of supplying operating fluid through an intermediary of another member. Thereby, it becomes possible to prevent the drop in the efficiency and controllability of the vehicular automatic transmission $1_9$.

In addition, the hydraulic servo 40 of the third clutch C-3 is disposed axially on the opposite side of the planetary gear DP from the planetary gear unit PU and the hydraulic servo 20 of the first clutch C-1 is disposed axially between the planetary gear DP and the planetary gear unit PU, so that the fourth clutch C-4 may be disposed on the inner peripheral side of the clutch drum 42 of the third clutch C-3. Accordingly, the vehicular automatic transmission $1_9$ may be compactly built while increasing the capacity of the third clutch C-3.

Further, because the planetary gear DP and the fourth clutch C-4 are disposed on the inner peripheral side of the clutch drum 42 of the third clutch C-3, an area of the friction plates 41 of the third clutch C-3 may be increased. Accordingly, the fourth clutch C-4 and the planetary gear DP, whose capacity for transmitting inputted rotation can be relatively small, may be disposed on the inner peripheral side of the clutch drum 42 and the vehicular automatic transmission $1_9$ capable of attaining the multi-stage shifts may be compactly built while increasing the capacity for transmitting reduced rotation.

Further, the hydraulic servo 40 of the third clutch C-3, the hydraulic servo 50 of the fourth clutch C-4 and the planetary gear DP are disposed on the boss portion 3*b* extending from the case 4 in order from the side of the joint of the boss portion 3*b* to the case 4 in the axial direction. Operating fluid is supplied to the hydraulic servo 40 C-and the hydraulic servo 50 from the oil passages provided within the boss portion 3*b*, respectively, so that operating fluid may be supplied to the hydraulic servo 40 and the hydraulic servo 50 just by providing the pairs of seal rings d7, d8 and d9, d10 between the hydraulic servos 40, 50 of the third and fourth clutches C-3, C-4 and the boss portion 3*b*, respectively. Accordingly, it becomes possible to cut the number of seal rings as compared to a case of supplying operating fluid to the hydraulic servos 40, 50 of the third and fourth clutches C-3, C-4 from the oil passages within the input shaft 12 and thereby, to prevent the drop in the efficiency and controllability of the vehicular automatic transmission $1_9$.

Furthermore, although the increase of size of the first clutch C-1 to the outer peripheral side is limited because the third and fourth clutches C-3, C-4 are linked to the sun gear S2 of the planetary gear unit PU through the outer peripheral side of the first clutch C-1 and the link member 101 for linking the third and fourth clutches C-3, C-4 with the sun gear S2 of the planetary gear unit PU passing along the outer peripheral side of the first clutch C-1, the capacity of the first clutch C-1 may be maintained by increasing the size of the first clutch C-1 in the inner diametric direction as compared to a case of disposing the first clutch C-1 on the boss portion 3*b*, because the first clutch C-1 is disposed on the input shaft 12.

Further, because the friction plates 41 of the third clutch C-3 are disposed on the outer peripheral side of the ring gear R1 and the fourth clutch C-4 is disposed axially between the hydraulic servo 40 of the third clutch C-3 and the friction plates 41 of the third clutch C-3, it becomes possible to prevent the fourth clutch C-4 from radially overlapping with the hydraulic servo 40 or the friction plates 41 of the third clutch C-3 and to increase the size of the fourth clutch C-4 as compared to a case of disposing the fourth clutch C-4 on the inner peripheral side of the third clutch C-3. Accordingly, the vehicular automatic transmission $1_9$ may be compactly built in the radial direction.

Additionally, because the first brake B-1 is disposed axially between the planetary gear DP and the planetary gear unit PU, it becomes possible to dispose the friction plates 41 of the third clutch C-3 on the outer peripheral side of the fourth clutch C-4.

Further, because the second clutch C-2 is disposed axially between the planetary gear DP and the planetary gear unit PU, the first through fourth clutches may be disposed collectively on one side of the planetary gear unit PU. The planetary gear unit PU may be disposed close to the output shaft 15 especially when the vehicular automatic transmission is mounted in an FR-type vehicle, so that the member for linking the planetary gear unit PU with the output shaft 15, i.e., the member for transmitting a large torque, may be shortened. Thereby, it becomes possible to lighten the vehicular automatic transmission $1_9$ and to improve the controllability thereof by cutting its inertia.

Further, because the vehicular automatic transmission $1_9$ is arranged so that the reduced rotation of the ring gear R1 is inputted to the clutch drum 42 of the third clutch C-3 forming the hydraulic servo 40 of the third clutch C-3 when the third clutch C-3 engages, the reduced rotation is not inputted to the clutch drum 42 of the third clutch C-3 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

In addition, because the vehicular automatic transmission $1_9$ is arranged so that the inputted rotation is inputted to the clutch drum 52 forming the hydraulic servo 50 of the fourth clutch C-4 via the carrier CR1 when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56. START HERE Further, because the planetary gear unit PU is a Ravigneaux type planetary gear in which the ring gear R3 is disposed at one side of the outer peripheral side and the friction plates 71 of the second brake B-2 are disposed on the other side of the outer peripheral side of the planetary gear unit PU, the friction plates 71 of the second brake B-2 may be disposed at the position radially overlapping with the planetary gear unit PU while assuring its capacity and decreasing the size thereof. Accordingly, the automatic transmission $1_9$ may be built both compactly in the radial direction and shorter in the axial direction.

Figure 20:
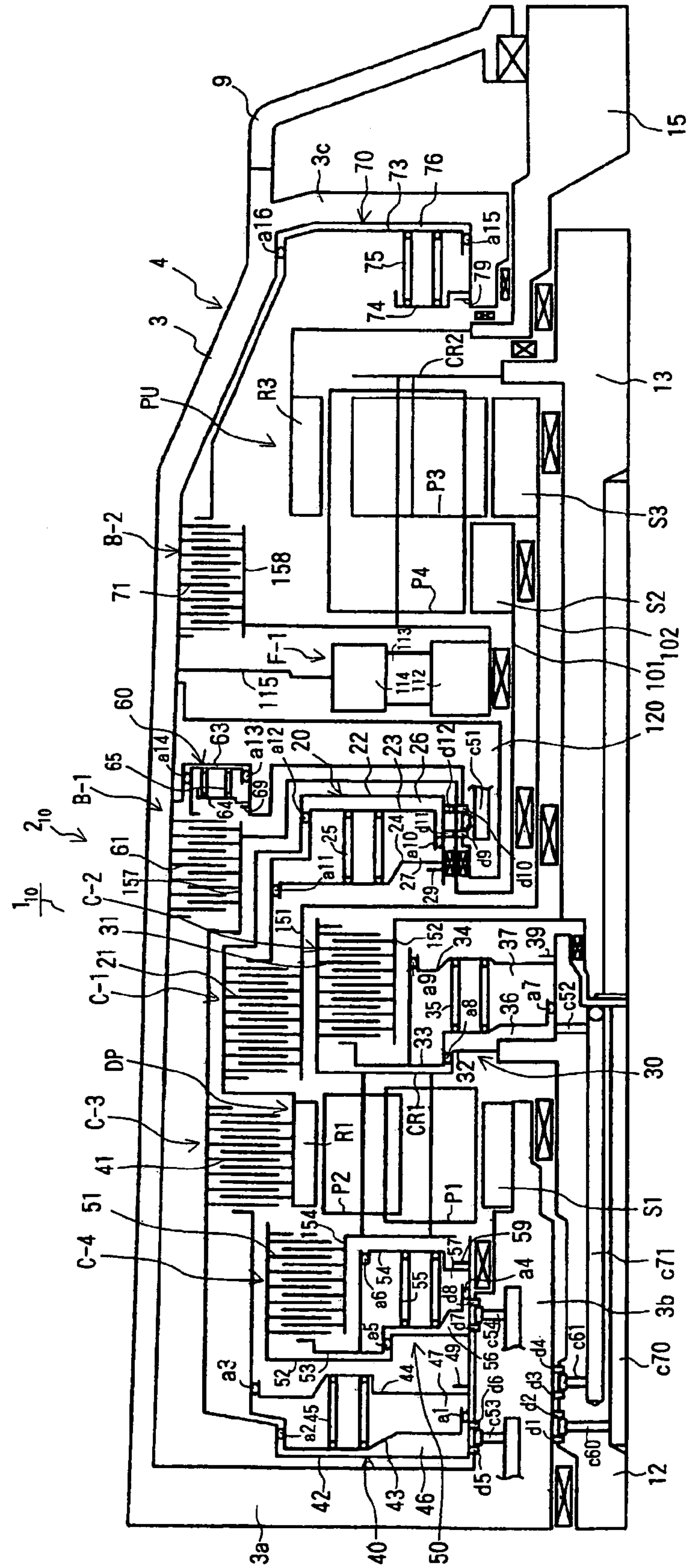
FIG. 20 is a diagrammatic section view showing an automatic transmission according to a tenth exemplary embodiment.

A 10th embodiment, which is a partial modification of the ninth embodiment described above, will be explained with reference to FIG. 20. It is noted that in the 10th embodiment explained below, components having the same structure with those of the automatic transmission $1_9$ of the ninth embodiment will be denoted by the same reference characters and an explanation thereof will be omitted here, except of partial components such as oil passages, seal rings and hub members.

The automatic transmission $1_{10}$ of the 10th embodiment has a transmission mechanism $2_{10}$ which is different from the automatic transmission $1_9$ of the ninth embodiment in that the disposition of the hydraulic servo 20 of the first clutch C-1 and the hydraulic servo 30 of the second clutch C-2 is changed. That is, the hydraulic servo 40 of the third clutch C-3 and the hydraulic servo 50 of the fourth clutch C-4 are disposed axially on the opposite side of the planetary gear DP from the planetary gear unit PU and the hydraulic servo 30 of the second clutch C-2 and the hydraulic servo 20 of the first clutch C-1 are disposed between the planetary gear DP and the planetary gear unit PU.

The support wall 120 is disposed between the planetary gear unit PU and the first clutch C-1, or more specifically, between the one-way clutch F-1 and the hydraulic servo 20 of the first clutch C-1. Further, the first brake B-1 is disposed on the outer peripheral side of the hydraulic servo 20 of the first clutch C-1, the hydraulic servo 60 of the first brake B-1 is disposed on the outer peripheral side of the front part of the support wall 120 and the hydraulic servo 70 of the second brake B-2 is disposed between the planetary gear unit PU and the partitioning portion 3*c*.

Further, the friction plates 51 of the fourth clutch C-4 are disposed on the outer peripheral side of the hydraulic servo 50 of the fourth clutch C-4, the friction plates 41 of the third clutch C-3 are disposed on the outer peripheral side of the planetary gear DP, the friction plates 21 of the first clutch C-1 are disposed on the outer peripheral side of the friction plates 31 of the second clutch C-2, the friction plates 31 of the second clutch C-2 are disposed on the outer peripheral side of the hydraulic servo 30 of the second clutch C-2, the friction plates 61 of the first brake B-1 are disposed on the outer peripheral side of the hydraulic servo 20 of the first clutch C-1 and the friction plates 71 of the second brake B-2 are disposed on the front side of the outer peripheral side of the planetary gear unit PU, respectively.

Next, transmission routes of the transmission mechanism $2_{10}$ will be briefly explained. The carrier CR1 of the planetary gear DP is linked to the hub member 154 of the fourth clutch C-4. The clutch drum 52, spline-coupled with the outer friction plates of the friction plates 51 of the fourth clutch C-4, is linked to the clutch drum 42 on the inner peripheral side of the third clutch C-3. Further, the clutch drum 42 is linked to the link member 101 along the outer peripheral side of the fourth clutch C-4 and the first clutch C-1 and is linked to the sun gear S2 of the planetary gear unit PU through an intermediary of the link member 101. The hub member 157, spline-coupled with the inner friction plates of the friction plates 61 of the first brake B-1 is linked to the link member 101.

Meanwhile, the ring gear R1 of the planetary gear DP is spline-coupled with the inner friction plates of the friction plates 41 of the third clutch C-3 and is linked to the clutch drum 22 of the first clutch C-1. Further, the hub member 151, spline-coupled with the inner friction plates of the friction plates 21 of the first clutch C-1, is linked to the sun gear S3 of the planetary gear unit PU through an intermediary of the link member 102. The clutch drum 32 of the second clutch C-2 is linked to the carrier CR1, i.e., the input shaft 12, and the hub member 152, spline-coupled with the inner friction plates of the friction plates 31 of the second clutch C-2, is linked to the intermediate shaft 13.

Further, the carrier CR2 of the planetary gear unit PU is linked to the inner race 112 of the one-way clutch F-1 on the front side and is also linked to the hub member 158, spline-coupled with the inner friction plates of the friction plates 71 of the second brake B-2. The carrier CR2 is linked to the intermediate shaft 13 on the rear side. It is noted that the outer race 114 of the one-way clutch F-1 is connected to the inner peripheral side of the mission case 3 through an intermediary of the flange-like member 115. Then, the ring gear R3 of the planetary gear unit PU is linked to the output shaft 15. It is noted that in the automatic transmission $1_{10}$ in the 10th embodiment, the intermediate shaft 13 does not always rotate equally with the input shaft 12 and rotates at the inputted rotation only when the second clutch C-2 engages.

Next, the structures of each oil passage and the supply of operating fluid will be briefly explained. The oil chamber 46 of the hydraulic servo 40 of the third clutch C-3, i.e., the oil chamber 46 formed by sealing the part between the clutch drum 42 and the piston member 43 by the seal rings a1, a2, is arranged so as to communicate with the oil passage c53 within the boss portion 3*b* by sealing the part between the boss portion 3*b* and the clutch drum 42 by the seal rings d5, d6. Operating fluid is supplied thereto from the oil passage c53. It is noted that operating fluid is supplied from an oil passage (not shown) to the cancel oil chamber 47 formed by sealing the part between the piston member 43 and the cancel plate 44 by the seal rings a1, a3.

The oil chamber 56 of the hydraulic servo 50 of the fourth clutch C-4, i.e., the oil chamber 56 formed by sealing the part between the clutch drum 52 and the piston member 53 by the seal rings a4, a5, is arranged so as to communicate with the oil passage c54 within the boss portion 3*b* by sealing the part between the clutch drum 52 and the boss portion 3*b* by the seal rings d7, d8. Operating fluid is supplied thereto from the oil passage c54. It is noted that oil is supplied from an oil passage (not shown) to the cancel oil chamber 57 formed by sealing the part between the piston member 53 and the cancel plate 54 by the seal rings a4, a6.

Further, oil passages (not shown) within the boss portion 3*b* communicate with the oil passages c61, c71, c51 within the input shaft 12 by sealing the part between the boss portion 3*b* and the input shaft 12 by the seal rings d3, d4. The oil chamber 36 of the hydraulic servo 30 of the second clutch C-2, i.e., the oil chamber 36 formed by sealing the part between the clutch drum 32 and the piston member 33 by the seal rings a7, a8, is arranged so as to communicate with the oil passage c52 within the input shaft 12 and operating fluid is supplied thereto from the oil passage c52. It is noted that oil is supplied from an oil passage (not shown) to the cancel oil chamber 37 formed by sealing the part between the piston member 33 and the cancel plate 34 by the seal rings a7, a9.

The oil chamber 26 of the hydraulic servo 20 of the first clutch C-1, i.e., the oil chamber 26 formed by sealing the part between the clutch drum 22 and the piston member 23 by the seal rings a10, a11, is arranged so as to communicate with the oil passage c51 within the support wall 120 by sealing the part between the support wall 120 and the link member 101 by the seal rings d9, d10 and by sealing the part between the link member 101 and the clutch drum 22 by the seal rings d11, d12, and operating fluid is supplied thereto from the oil passage c51. It is noted that oil is supplied from an oil passage (not shown) to the cancel oil chamber 27 formed by sealing the part between the piston member 23 and the cancel plate 24 by the seal rings a10, a11.

Further, operating fluid is supplied from an oil passage (not shown) within the support wall 120 to the oil chamber 66 of the hydraulic servo 60 of the first brake B-1, i.e., to the oil chamber 66 formed by sealing the part between the support wall 120 and the piston member 63 by the seal rings a13, a14.

Further, operating fluid is supplied from an oil passage (not shown) within the partitioning portion 3*c* of the mission case 3 to the oil chamber 76 of the hydraulic servo 70 of the second brake B-2, i.e., to the oil chamber 76 formed by sealing the part between the partitioning portion 3*c* and the piston member 73 by the seal rings a15, a16.

While the oil passages c60, c70 within the input shaft 12 are arranged so as to communicate with the oil passage (not shown) within the boss portion 3*b* by sealing by the seal rings d1, d2, lubricant oil is splashed from the oil passage c70 to the outer peripheral side of the input shaft 12 via the oil passage (not shown).

According to the vehicular automatic transmission $\mathbf{1}_{10}$ described above, the fourth clutch C-4 is linked to the sun gear S2 of the planetary gear unit PU through an intermediary of the output side members (the clutch drum 42 and the link member 101) of the third clutch C-3, so that the output side members become the output side members of the two clutches that transmit different rotations. That is, they may be commonly used as one rotary member. Thereby, the vehicular automatic transmission $\mathbf{1}_{10}$ may be compactly built.

In addition, the hydraulic servo 50 of the fourth clutch C-4 is disposed axially on the opposite side of the planetary gear DP from the planetary gear unit PU and is also disposed on the boss portion 3*b* extending from the case 4 and operating fluid is supplied to the hydraulic servo 50 of the fourth clutch C-4 from the oil passage within the boss portion 3*b*, so that the number of seal rings can be reduced as compared to a case of disposing the hydraulic servo 50 of the fourth clutch C-4 on the input shaft 12 through an intermediary of a member having another speed of rotation, i.e., as compared to a case of supplying operating fluid through an intermediary of another member. Thereby, it becomes possible to prevent the drop in the efficiency and controllability of the vehicular automatic transmission $\mathbf{1}_{10}$.

Additionally, the hydraulic servo 40 of the third clutch C-3 is disposed axially on the opposite side of the planetary gear DP from the planetary gear unit PU and the hydraulic servo 20 of the first clutch C-1 is disposed axially between the planetary gear DP and the planetary gear unit PU, so that the fourth clutch C-4 may be disposed on the inner peripheral side of the clutch drum 42 of the third clutch C-3. Accordingly, the vehicular automatic transmission $\mathbf{1}_{10}$ may be compactly built while increasing the capacity of the third clutch C-3.

Further, because the planetary gear DP and the fourth clutch C-4 are disposed on the inner peripheral side of the clutch drum 42 of the third clutch C-3, an area of the friction plates 41 of the third clutch C-3 may be increased. Accordingly, the fourth clutch C-4 and the planetary gear DP, whose capacity for transmitting inputted rotation can be relatively small, may be disposed on the inner peripheral side of the clutch drum 42 and the vehicular automatic transmission $\mathbf{1}_{10}$ capable of attaining the multi-stage shifts may be compactly built while increasing the capacity for transmitting a reduced rotation.

Further, the hydraulic servo 40 of the third clutch C-3, the hydraulic servo 50 of the fourth clutch C-4 and the planetary gear DP are disposed on the boss portion 3*b* extending from the case 4 in order from the side of the joint of the boss portion 3*b* to the case 4 in the axial direction. Operating fluid is supplied to the hydraulic servos 40, 50, from the oil passages provided within the boss portion 3*b*, respectively, so that operating fluid may be supplied to the hydraulic servos 40, 50 just by providing the pairs of seal rings d7, d8 and d9, d10 between the hydraulic servos 40, 50 of the third and fourth clutches C-3, C-4 and the boss portion 3*b*, respectively. Accordingly, it becomes possible to cut the number of seal rings as compared to a case of supplying operating fluid to the hydraulic servos 40, 50 of the third and fourth clutches C-3, C-4 from the oil passages within the input shaft 12 and thereby, to prevent the drop of the efficiency and controllability of the vehicular automatic transmission $\mathbf{1}_{10}$.

In addition, although the increase of size of the first clutch C-1 to the outer peripheral side is limited because the third and fourth clutches C-3, C-4 are linked to the sun gear S2 of the planetary gear unit PU through the outer peripheral side of the first clutch C-1 and the link member 101, for linking the third and fourth clutches C-3, C-4 with the sun gear S2 of the planetary gear unit PU, passes along the outer peripheral side of the first clutch C-1, the capacity of the first clutch C-1 may be maintained by increasing the size of the first clutch C-1 in the inner diametric direction as compared to a case of disposing the first clutch C-1 on the boss portion 3*b*, because the first clutch C-1 is disposed on the input shaft 12.

Further, because the friction plates 41 of the third clutch C-3 are disposed on the outer peripheral side of the ring gear R1 and the fourth clutch C-4 is disposed axially between the hydraulic servo 40 of the third clutch C-3 and the friction plates 41 of the third clutch C-3, it becomes possible to prevent the fourth clutch C-4 from radially overlapping with the hydraulic servo 40 or the friction plates 41 of the third clutch C-3 and to increase the size of the fourth clutch C-4 as compared to a case of disposing the fourth clutch C-4 on the inner peripheral side of the third clutch C-3. Accordingly, the vehicular automatic transmission $\mathbf{1}_{10}$ may be compactly built in the radial direction.

Furthermore, because the first brake B-1 is disposed axially between the planetary gear DP and the planetary gear unit PU, it becomes possible to dispose the friction plates 41 of the third clutch C-3 on the outer peripheral side of the fourth clutch C-4.

Further, because the second clutch C-2 is disposed axially between the planetary gear DP and the planetary gear unit PU, the first through fourth clutches may be disposed collectively on one side of the planetary gear unit PU. The planetary gear unit PU may be disposed close to the output shaft 15, especially when the vehicular automatic transmission is mounted in the FR-type vehicle, so that the member for linking the planetary gear unit PU with the output shaft 15, i.e., the member for transmitting a large torque, may be shortened. Thereby, it becomes possible to lighten the vehicular automatic transmission $\mathbf{1}_{10}$ and to improve the controllability thereof by cutting its inertia.

Further, because the vehicular automatic transmission $\mathbf{1}_{10}$ is arranged so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

In addition, because the vehicular automatic transmission $\mathbf{1}_{10}$ is arranged so that the inputted rotation is inputted to the clutch drum 52 forming the hydraulic servo 50 of the fourth clutch C-4 via the carrier CR1, when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56.

Lastly, because the planetary gear unit PU is a Ravigneaux type planetary gear in which the ring gear R3 is disposed at one side of the outer peripheral side and the friction plates 71 of the second brake B-2 are disposed on the other side of the outer peripheral side of the planetary gear unit PU, the friction plates 71 of the second brake B-2 may be disposed at the position radially overlapping with the planetary gear unit PU while assuring its capacity and decreasing the size thereof. Accordingly, the automatic transmission $\mathbf{1}_{10}$ may be built both compactly in the radial direction and shortly in the axial direction.

Figure 21:
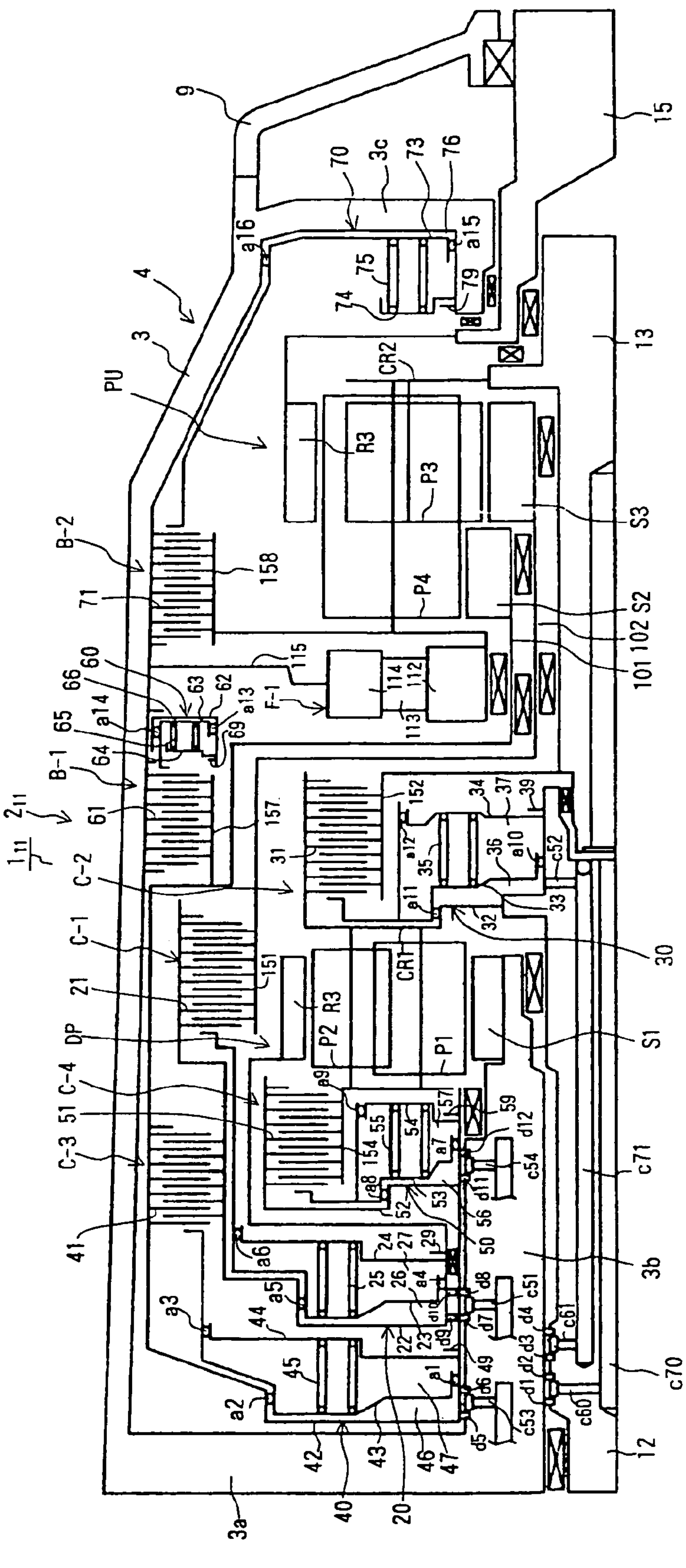
FIG. 21 is a diagrammatic section view showing an automatic transmission according to an eleventh exemplary embodiment.

An 11th embodiment, which is a partial modification of the eighth embodiment described above, will be explained with reference to FIG. 21. It is noted that in the 11th embodiment explained below, components having the same structure with those of the automatic transmission $\mathbf{1}_8$ of the eighth embodiment will be denoted by the same reference characters and an explanation thereof will be omitted here, except of partial components such as oil passages, seal rings and hub members.

The automatic transmission $\mathbf{1}_{11}$ of the 11th embodiment has a transmission mechanism $\mathbf{2}_{11}$ which is different from the automatic transmission $\mathbf{1}_8$ of the eighth embodiment in that the disposition of the hydraulic servo 30 of the second clutch C-2 is changed. That is, the hydraulic servo 40 of the third clutch C-3, the hydraulic servo 20 of the first clutch C-1 and the hydraulic servo 50 of the fourth clutch C-4 are disposed axially on the opposite side of the planetary gear DP from the planetary gear unit PU and the hydraulic servo 30 of the second clutch C-2 is disposed between the planetary gear DP and the planetary gear unit PU.

Further, the first brake B-1 is disposed on the outer peripheral side of the second clutch C-2 and the hydraulic servo 70 of the second brake B-2 is disposed between the planetary gear unit PU and the partitioning portion 3*c*.

The friction plates 41 of the third clutch C-3 are disposed on the outer peripheral side of the hydraulic servo 20 of the first clutch C-1 and the friction plates 51 of the fourth clutch C-4, the friction plates 51 of the fourth clutch C-4 are disposed on the outer peripheral side of the hydraulic servo 50 of the fourth clutch C-4, the friction plates 21 of the first clutch C-1 are disposed on the outer peripheral side of the planetary gear DP, the friction plates 31 of the second clutch C-2 are disposed on the outer peripheral side of the hydraulic servo 30 of the second clutch C-2, the friction plates 61 of the first brake B-1 are disposed on the outer peripheral side of the second clutch C-2 and the friction plates 71 of the second brake B-2 are disposed on the front side of the outer peripheral side of the planetary gear unit PU, respectively.

Next, transmission routes of the transmission mechanism $\mathbf{2}_{11}$ will be briefly explained. The carrier CR1 of the planetary gear DP is linked to the hub member 154 of the fourth clutch C-4. The clutch drum 52, spline-coupled with the outer friction plates of the friction plates 51 of the fourth clutch C-4, is linked to the clutch drum 42 of the third clutch C-3 through the inner peripheral side of the hydraulic servo 20 of the first clutch C-1. The clutch drum 42 is linked to the link member 101 through the outer peripheral side of the first clutch C-1 and is linked to the sun gear S2 of the planetary gear unit PU through an intermediary of the link member 101. The hub member 157, spline-coupled with the inner friction plates of the friction plates 61 of the first brake B-1, is linked to the link member 101.

Meanwhile, the ring gear R1 of the planetary gear DP is linked to the clutch drum 22 of the first clutch C-1 through the outer peripheral side of the fourth clutch C-4 and the inner friction plates of the friction plates 41 of the third clutch C-3 are spline-coupled with the outer peripheral side of the clutch drum 22. Further, the hub member 151, spline-coupled with the inner friction plates of the friction plates 21 of the first clutch C-1, is linked to the sun gear S3 of the planetary gear unit PU through an intermediary of the link member 102. The clutch drum 32 of the second clutch C-2 is linked to the carrier CR1, i.e., the input shaft 12, and the hub member 152, spline-coupled with the inner friction plates of the friction plates 31 of the second clutch C-2, is linked to the intermediate shaft 13.

Further, the carrier CR2 of the planetary gear unit PU is linked to the inner race 112 of the one-way clutch F-1 on the front side and is also linked to the hub member 158, spline-coupled with the inner friction plates of the friction plates 71 of the second brake B-2. The carrier CR2 is linked to the intermediate shaft 13 on the rear side. It is noted that the outer race 114 of the one-way clutch F-1 is connected to the inner peripheral side of the mission case 3 through an intermediary of the flange-like member 115. Then, the ring gear R3 of the planetary gear unit PU is linked to the output shaft 15. It is noted that in the automatic transmission $\mathbf{1}_{11}$ in the 11th embodiment, the intermediate shaft 13 does not always rotate equally with the input shaft 12 and rotates at the inputted rotation only when the second clutch C-2 engages.

Next, the structures of each oil passage and the supply of operating fluid will be briefly explained. The oil chamber 46 of the hydraulic servo 40 of the third clutch C-3, i.e., the oil chamber 46 formed by sealing the part between the clutch drum 42 and the piston member 43 by the seal rings a1, a2, is arranged so as to communicate with the oil passage c53 within the boss portion 3*b* by sealing the part between the boss portion 3*b* and the clutch drum 42 by the seal rings d5, d6. Operating fluid is supplied thereto from the oil passage c53. It is noted that operating fluid is supplied from an oil passage (not shown) to the cancel oil chamber 47 formed by sealing the part between the piston member 43 and the cancel plate 44 by the seal rings a1, a3.

The oil chamber 26 of the hydraulic servo 20 of the first clutch C-1, i.e., the oil chamber 26 formed by sealing the part between the clutch drum 22 and the piston member 23 by the seal rings a4, a5, is arranged so as to communicate with the oil passage c51 within the boss portion 3*b* by sealing the part between the boss portion 3*b* and the clutch drum 42 by the seal rings d7, d8 and by sealing the part between the clutch drum 22 and the clutch drum 42 by the seal rings d9, d10. Operating fluid is supplied thereto from the oil passage c51. It is noted that oil is supplied from an oil passage (not shown) to the cancel oil chamber 27 formed by sealing the part between the piston member 23 and the cancel plate 24 by the seal rings a4, a6.

The oil chamber 56 of the hydraulic servo 50 of the fourth clutch C-4, i.e., the oil chamber 56 formed by sealing the part between the clutch drum 52 and the piston member 53 by the seal rings a7, a8, is arranged so as to communicate with the oil passage c54 within the boss portion 3*b* by sealing the part between the clutch drum 52 and the boss portion 3*b* by the seal rings d11, d12. Operating fluid is supplied thereto from the oil passage c54. It is noted that oil is supplied from an oil passage (not shown) to the cancel oil chamber 57 formed by sealing the part between the piston member 53 and the cancel plate 54 by the seal rings a7, a9.

Further, oil passages (not shown) within the boss portion 3*b* communicate with the oil passages c61, c71, c52 within the input shaft 12 by sealing the part between the boss portion 3*b* and the input shaft 12 by the seal rings d3, d4. The oil chamber 36 of the hydraulic servo 30 of the second clutch C-2, i.e., the oil chamber 36 formed by sealing the part between the clutch drum 32 and the piston member 33 by the seal rings a10, a11, is arranged so as to communicate with the oil passage c52 within the input shaft 12 and operating fluid is supplied thereto from the oil passage c52. It is noted that oil is supplied from an oil passage (not shown) to the cancel oil chamber 37 formed by sealing the part between the piston member 33 and the cancel plate 34 by the seal rings a10, a12.

Operating fluid is supplied from an oil passage (not shown) within the mission case 3 to the oil chamber 66 of the hydraulic servo 60 of the first brake B-1, i.e., to the oil chamber 66 formed by sealing the part between the cylinder member 62 and the piston member 63 by the seal rings a13, a14.

Further, operating fluid is supplied from an oil passage (not shown) within the partitioning portion 3*c* to the oil chamber 76 of the hydraulic servo 70 of the second brake B-2, i.e., to the oil chamber 76 formed by sealing the part between the partitioning portion 3*c* and the piston member 73 by the seal rings a15, a16.

While the oil passages c60, c70 within the input shaft 12 are arranged so as to communicate with the oil passage (not shown) within the boss portion 3*b* by sealing by the seal rings d1, d2, lubricant oil is splashed from the oil passage c70 to the outer peripheral side of the input shaft 12 via the oil passage (not shown).

According to the vehicular automatic transmission $\mathbf{1}_{11}$ described above, the fourth clutch C-4 is linked to the sun gear S2 of the planetary gear unit PU through an intermediary of the output side members (the clutch drum 42 and the link member 101) of the third clutch C-3, so that the output side members become the output side members of the two clutches that transmit different rotations. That is, they may be commonly used as one rotary member. Thereby, the vehicular automatic transmission $\mathbf{1}_{11}$ may be compactly built.

Further, the hydraulic servo 50 of the fourth clutch C-4 is disposed axially on the opposite side of the planetary gear DP from the planetary gear unit PU and is also disposed on the boss portion 3*b* extending from the case 4 and operating fluid is supplied to the hydraulic servo 50 of the fourth clutch C-4 from the oil passage within the boss portion 3*b*, so that the number of seal rings can be reduced as compared to a case of disposing the hydraulic servo 50 of the fourth clutch C-4 on the input shaft 12 through an intermediary of a member having another speed of rotation, i.e., as compared to a case of supplying operating fluid through an intermediary of another member. Thereby, it becomes possible to prevent the drop in the efficiency and controllability of the vehicular automatic transmission $\mathbf{1}_{11}$.

Further, the hydraulic servo 40 of the third clutch C-3, the hydraulic servo 20 of the first clutch C-1, the hydraulic servo 50 of the fourth clutch C-4 and the planetary gear DP are disposed on the boss portion 3*b* extending from the case 4 in order from the side of the joint of the boss portion 3*b* to the case 4 in the axial direction. Operating fluid is supplied to the hydraulic servos 40, 20, 50 from the oil passages c53, c51, c54 provided within the boss portion 3*b*, respectively, so that operating fluid may be supplied to the hydraulic servo 40 and the hydraulic servo 50 just by providing the pairs of seal rings d5, d6 and d11, d12 between the hydraulic servos 40, 50 and the boss portion 3*b* and to the hydraulic servo 20 by providing two pairs of seal rings d7, d8 and d9, d10 between the hydraulic servo 20 and the boss portion 3*b*, respectively.

Because the first brake B-1 is disposed axially between the planetary gear DP and the planetary gear unit PU, it becomes possible to dispose the friction plates 41 of the third clutch C-3 on the outer peripheral side of the fourth clutch C-4.

Further, because the second clutch C-2 is disposed axially between the planetary gear DP and the planetary gear unit PU, the first through fourth clutches may be disposed collectively on one side of the planetary gear unit PU. The planetary gear unit PU may be disposed close to the output shaft 15 especially when the vehicular automatic transmission is mounted in the FR-type vehicle, so that the member for linking the planetary gear unit PU with the output shaft 15, i.e., the member for transmitting a large torque, may be shortened. Thereby, it becomes possible to lighten the vehicular automatic transmission $\mathbf{1}_{11}$ and to improve the controllability thereof by cutting its inertia.

Further, because the vehicular automatic transmission $\mathbf{1}_{11}$ is arranged so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Furthermore, because the vehicular automatic transmission $\mathbf{1}_{11}$ is arranged so that the inputted rotation is inputted to the clutch drum 52 forming the hydraulic servo 50 of the fourth clutch C-4 via the carrier CR1, when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56.

Lastly, because the planetary gear unit PU is a Ravigneaux type planetary gear in which the ring gear R3 is disposed at one side of the outer peripheral side of the planetary gear unit PU and the friction plates 71 of the second brake B-2 are disposed on the other side of the outer peripheral side thereof, the friction plates 71 of the second brake B-2 may be disposed at the position radially overlapping with the planetary gear unit PU while assuring its capacity and decreasing the size thereof. Accordingly, the automatic transmission $\mathbf{1}_{11}$ may be built both compactly in the radial direction and shortly in the axial direction.

Figure 22:
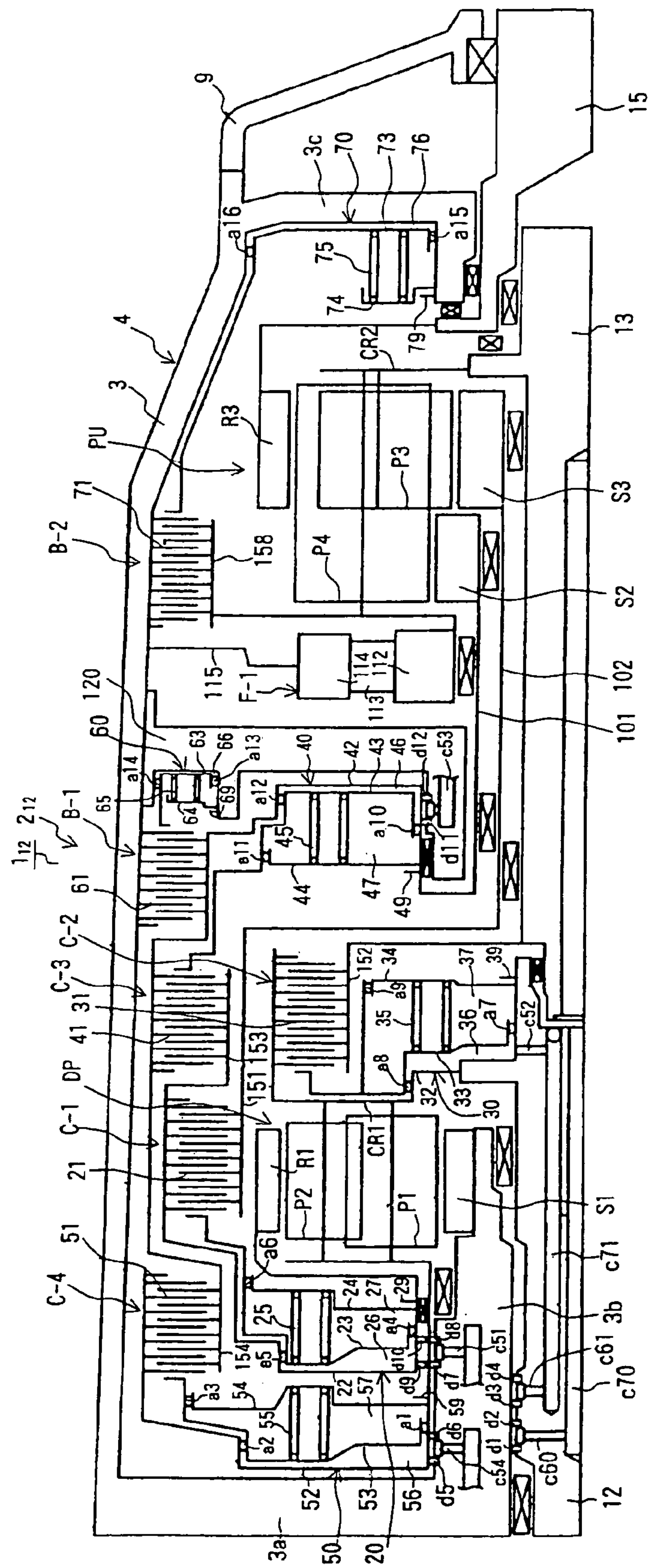
FIG. 22 is a diagrammatic section view showing an automatic transmission according to a twelfth exemplary embodiment.

A 12th embodiment, which is a partial modification of the seventh embodiment described above, will be explained with reference to FIG. 22. It is noted that in the 12th embodiment explained below, components having the same structure with those of the automatic transmission $\mathbf{1}_{7}$ of the seventh embodiment will be denoted by the same reference characters and an explanation thereof will be omitted here, except of partial components such as oil passages, seal rings and hub members.

The automatic transmission $\mathbf{1}_{12}$ of the 12th embodiment has a transmission mechanism $\mathbf{2}_{12}$ that is different from the automatic transmission $\mathbf{1}_{7}$ of the seventh embodiment in that the disposition of the hydraulic servo 30 of the second clutch C-2 is changed. That is, the hydraulic servo 50 of the fourth clutch C-4 and the hydraulic servo 20 of the first clutch C-1 are disposed axially on the opposite side of the planetary gear DP from the planetary gear unit PU and the hydraulic servo 30 of the second clutch C-2 and the hydraulic servo 40 of the third clutch C-3 are disposed between the planetary gear DP and the planetary gear unit PU.

Further, the support wall 120 is disposed between the planetary gear unit PU and the third clutch C-3, or more specifically, between the one-way clutch F-1 and the hydraulic servo 40 of the third clutch C-3. The first brake B-1 is disposed on the outer peripheral side of the hydraulic servo 40 of the third clutch C-3, the hydraulic servo 60 of the first brake B-1 is disposed on the outer peripheral side at the front part of the support wall 120 and the hydraulic servo 70 of the second brake B-2 is disposed between the planetary gear unit PU and the partitioning portion 3*c*.

Further, the friction plates 51 of the fourth clutch C-4 are disposed on the outer peripheral side of the hydraulic servo 20 of the first clutch C-1, the friction plates 21 of the first clutch C-1 are disposed on the outer peripheral side of the planetary gear DP, the friction plates 41 of the third clutch C-3 are disposed on the outer peripheral side of the hydraulic servo 30 of the second clutch C-2, the friction plates 31 of the second clutch C-2 are disposed on the outer peripheral side of the hydraulic servo 30 of the second clutch C-2, the friction plates 61 of the first brake B-1 is disposed on the outer peripheral side of the hydraulic servo 40 of the third clutch C-3 and the friction plates 71 of the second brake B-2 are disposed on the front side of the outer peripheral side of the planetary gear unit PU, respectively.

Next, transmission routes of the transmission mechanism $\mathbf{2}_{12}$ will be briefly explained. The carrier CR1 of the planetary gear DP is linked to the clutch drum 52 of the fourth clutch C-4 through the inner peripheral side of the first clutch C-1 and the hub member 154, spline-coupled with the inner friction plates of the friction plates 51 of the fourth clutch C-4, is linked to the clutch drum 42 of the third clutch C-3 along the outer peripheral side of the first clutch C-1. Further, the clutch drum 42 is spline-coupled with the inner friction plates of the friction plates 61 of the first brake B-1 and is linked to the sun gear S2 of the planetary gear unit PU through an intermediary of the link member 101.

Meanwhile, the ring gear R1 of the planetary gear DP is linked to the clutch drum 22 of the first clutch C-1 and the hub member 153, spline-coupled with the inner friction plates of the friction plates 41 of the third clutch C-3, is linked to the clutch drum 22. Further, the hub member 151, spline-coupled with the inner friction plates of the friction plates 21 of the first clutch C-1, is linked to the sun gear S3 of the planetary gear unit PU through an intermediary of the link member 102. The clutch drum 32 of the second clutch C-2 is linked to the carrier CR1, i.e., the input shaft 12, and the hub member 152, spline-coupled with the inner friction plates of the friction plates 31 of the second clutch C-2 is linked to the intermediate shaft 13.

The carrier CR2 of the planetary gear unit PU is linked to the inner race 112 of the one-way clutch F-1 on the front side and is also linked to the hub member 158, spline-coupled with the inner friction plates of the friction plates 71 of the second brake B-2. The carrier CR2 is linked to the intermediate shaft 13 on the rear side. It is noted that the outer race 114 of the one-way clutch F-1 is connected to the inner peripheral side of the mission case 3 through an intermediary of the flange-like member 115. The ring gear R3 of the planetary gear unit PU is linked to the output shaft 15. It is noted that in the automatic transmission $\mathbf{1}_{12}$ in the 12th embodiment, the intermediate shaft 13 does not always rotate equally with the input shaft 12 and rotates at the inputted rotation only when the second clutch C-2 engages.

Next, the structures of each oil passage and the supply of operating fluid will be briefly explained. The oil chamber 56 of the hydraulic servo 50 of the fourth clutch C-4, i.e., the oil chamber 56 formed by sealing the part between the clutch drum 52 and the piston member 53 by the seal rings a1, a2, is arranged so as to communicate with the oil passage c54 within the boss portion 3*b* by sealing the part between the clutch drum 52 and the boss portion 3*b* by the seal rings d5, d6. Operating fluid is supplied thereto from the oil passage c54. It is noted that oil is supplied from an oil passage (not shown) to the cancel oil chamber 57 formed by sealing the part between the piston member 53 and the cancel plate 54 by the seal rings a1, a3.

The oil chamber 26 of the hydraulic servo 20 of the first clutch C-1, i.e., the oil chamber 26 formed by sealing the part between the clutch drum 22 and the piston member 23 by the seal rings a4, a5, is arranged so as to communicate with the oil passage c51 within the boss portion 3*b* by sealing the part between the boss portion 3*b* and the clutch drum 42 by the seal rings d7, d8 and by sealing the part between the clutch drum 22 and the clutch drum 52 by the seal rings d9, d10. Operating fluid is supplied thereto from the oil passage c51. It is noted that oil is supplied from an oil passage (not shown) to the cancel oil chamber 27 formed by sealing the part between the piston member 23 and the cancel plate 24 by the seal rings a4, a6.

Further, oil passages (not shown) within the boss portion 3*b* communicate with the oil passages c61, c71, c52 within the input shaft 12 by sealing the part between the boss portion 3*b* and the input shaft 12 by the seal rings d3, d4. The oil chamber 36 of the hydraulic servo 30 of the second clutch C-2, i.e., the oil chamber 36 formed by sealing the part between the clutch drum 32 and the piston member 33 by the seal rings a7, a8, is arranged so as to communicate with the oil passage c52 within the input shaft 12 and operating fluid is supplied thereto from the oil passage c52. It is noted that oil is supplied from an oil passage (not shown) to the cancel oil chamber 37 formed by sealing the part between the piston member 33 and the cancel plate 34 by the seal rings a7, a9.

Further, the oil chamber 46 of the hydraulic servo 40 of the third clutch C-3, i.e., the oil chamber 46 formed by sealing the part between the clutch drum 42 and the piston member 43 by the seal rings a10, a12, is arranged so as to communicate with the oil passage c53 within the support wall 120 by sealing the part between the support wall 120 and the clutch drum 42 by the seal rings d11, d12. Operating fluid is supplied thereto from the oil passage c53. It is noted that operating fluid is supplied from an oil passage (not shown) to the cancel oil chamber 47 formed by sealing the part between the piston member 43 and the cancel plate 44 by the seal rings a10, a11.

Further, operating fluid is supplied from an oil passage (not shown) within the support wall 120 to the oil chamber 66 of the hydraulic servo 60 of the first brake B-1, i.e., to the oil chamber 66 formed by sealing the part between the cylinder member 62 and the piston member 63 by the seal rings a13, a14.

Further, operating fluid is supplied from an oil passage (not shown) within the partitioning portion 3*c* to the oil chamber 76 of the hydraulic servo 70 of the second brake B-2, i.e., to the oil chamber 76 formed by sealing the part between the partitioning portion 3*c* of the mission case 3 and the piston member 73 by the seal rings a15, a16.

While the oil passages c60, c70 within the input shaft 12 are arranged so as to communicate with the oil passage (not shown) within the boss portion 3*b* by sealing by the seal rings d1, d2, lubricant oil is splashed from the oil passage c70 to the outer peripheral side of the input shaft 12 via the oil passage (not shown).

According to the vehicular automatic transmission $1_{12}$ described above, the fourth clutch C-4 is linked to the sun gear S2 of the planetary gear unit PU through an intermediary of the output side members (the clutch drum 42 and the link member 101) of the third clutch C-3, so that the output side members become the output side members of the two clutches that transmit different rotations. That is, they may be commonly used as one rotary member. Thereby, the vehicular automatic transmission $1_{12}$ may be compactly built.

Furthermore, the hydraulic servo 50 of the fourth clutch C-4 is disposed axially on the opposite side of the planetary gear DP from the planetary gear unit PU and is also disposed on the boss portion 3*b* extending from the case 4. Operating fluid is supplied to the hydraulic servo 50 of the fourth clutch C-4 from the oil passage within the boss portion 3*b*, so that the number of seal rings can be reduced as compared to a case of disposing the hydraulic servo 50 of the fourth clutch C-4 on the input shaft 12 through an intermediary of a member having another speed of rotation, i.e., as compared to a case of supplying operating fluid through an intermediary of another member. Thereby, it becomes possible to prevent the drop in the efficiency and controllability of the vehicular automatic transmission $1_{12}$.

In addition, because the first brake B-1 is disposed axially between the third clutch C-3 and the planetary gear unit PU, it becomes possible to increase the size of the hydraulic servo 50 and the friction plates 51 of the fourth clutch C-4 relatively in the radial direction and thereby to increase the capacity of the fourth clutch C-4.

Because the support wall 120, fixed to the case 4, is disposed axially between the planetary gear unit PU and the third clutch C-3 and operating fluid is supplied to the hydraulic servo 40 of the third clutch C-3 via the oil passage c53 provided within the support wall 120, operating fluid may be supplied to the hydraulic servo 40 of the third clutch C-3 by providing a pair of seal rings d11, d12 between the hydraulic servo 40 and the support wall 120. Thereby, it becomes possible to reduce the number of seal rings, to reduce sliding resistance of the seal rings and to improve the power transmitting efficiency of the vehicular automatic transmission $1_{12}$.

Because the hydraulic servo 60 of the first brake B-1 is disposed on the outer peripheral side of the support wall 120, also becomes possible to use the support wall 120 in common as the cylinder member of the hydraulic servo 60 of the first brake B-1 and to cut the number of parts.

Further, because the second clutch C-2 is disposed axially between the planetary gear DP and the planetary gear unit PU, the first through fourth clutches may be disposed collectively on one side of the planetary gear unit PU. And, the planetary gear unit PU may be disposed close to the output shaft 15, especially when the vehicular automatic transmission is mounted in the FR-type vehicle, so that the member for linking the planetary gear unit PU with the output shaft 15, i.e., the member for transmitting a large torque, may be shortened. Thereby, it becomes possible to lighten the vehicular automatic transmission $1_{12}$ and to improve the controllability thereof by cutting its inertia.

Further, because the vehicular automatic transmission $1_{12}$ is arranged so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Further, because the planetary gear unit PU is a Ravigneaux type planetary gear in which the ring gear R3 is disposed at one side of the outer peripheral side and the friction plates 71 of the second brake B-2 are disposed on the other side of the outer peripheral side of the planetary gear unit PU, the friction plates 71 of the second brake B-2 may be disposed at the position radially overlapping with the planetary gear unit PU while assuring its capacity and decreasing the size thereof. Accordingly, the automatic transmission $1_{12}$ may be built both compactly in the radial direction and shortly in the axial direction.

Figure 23:
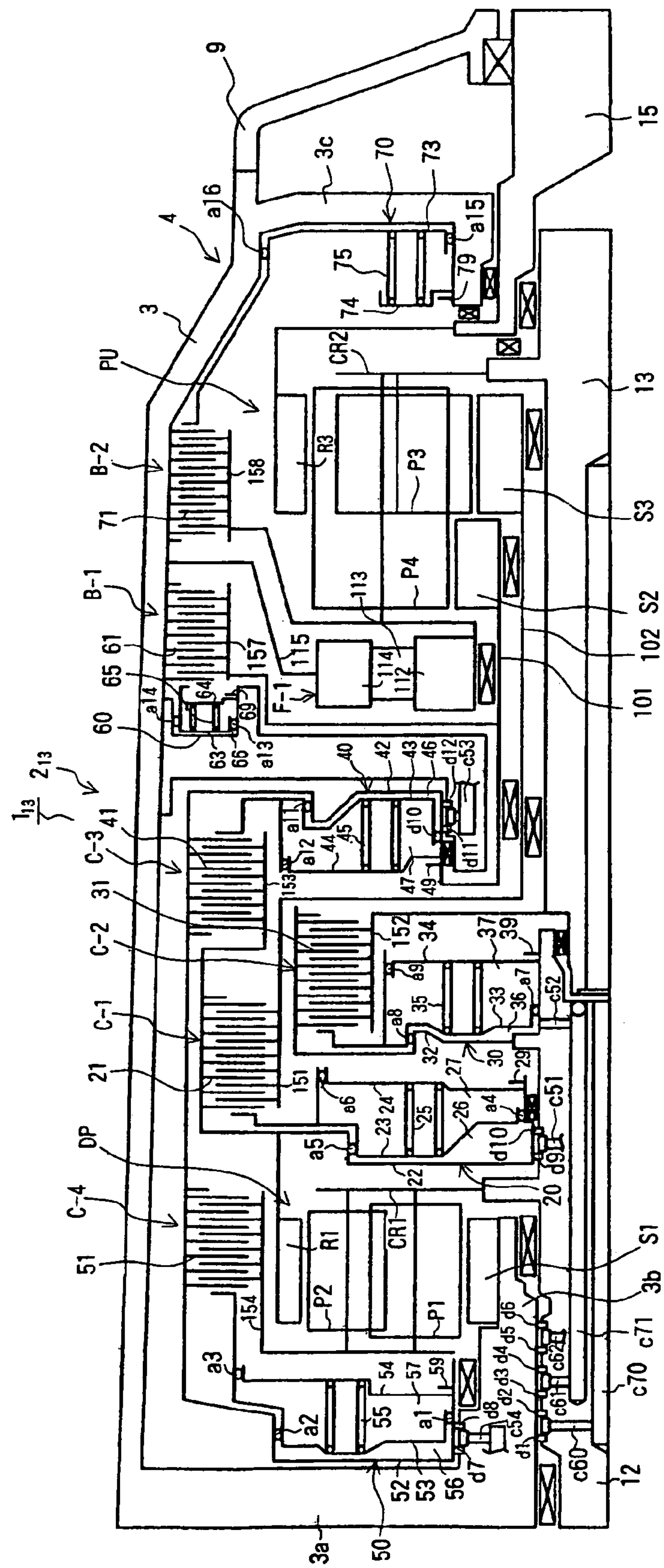
FIG. 23 is a diagrammatic section view showing an automatic transmission according to a thirteenth exemplary embodiment.

A 13th embodiment, which is a partial modification of the fifth and sixth embodiments described above, will be explained with reference to FIG. 23. It is noted that in the 13th embodiment explained below, components having the same structure with those of the automatic transmissions $1_5$, $1_6$ of the fifth and sixth embodiments will be denoted by the same reference characters and an explanation thereof will be omitted here, except of partial components such as oil passages, seal rings and hub members.

The automatic transmission $1_{13}$ of the 13th embodiment has a transmission mechanism $2_{13}$ which is different from the automatic transmissions $1_5$, $1_6$ of the fifth and sixth embodiments in that the disposition of the hydraulic servo 30 of the second clutch C-2 is changed. That is, the hydraulic servo 50 of the fourth clutch C-4 is disposed axially on the opposite side of the planetary gear DP from the planetary gear unit PU and the hydraulic servo 20 of the first clutch C-1, the hydraulic servo 30 of the second clutch C-2, and the hydraulic servo 40 of the third clutch C-3 are disposed between the planetary gear DP and the planetary gear unit PU.

The support wall 120 is disposed between the planetary gear unit PU and the third clutch C-3, or more specifically, between the one-way clutch F-1 and the hydraulic servo 40 of the third clutch C-3. Further, the first brake B-1 is disposed on the outer peripheral side of the one-way clutch F-1, the hydraulic servo 60 of the first brake B-1 is disposed on the outer peripheral side of the rear part of the support wall 120 and the hydraulic servo 70 of the second brake B-2 is disposed between the planetary gear unit PU and the partitioning portion 3*c*.

Further, the friction plates 51 of the fourth clutch C-4 are disposed on the outer peripheral side of the planetary gear DP, the friction plates 21 of the first clutch C-1 are disposed on the outer peripheral side of the hydraulic servo 20 of the first clutch C-1 and the second clutch C-2, the friction plates 31 of the second clutch C-2 are disposed on the outer peripheral side of the hydraulic servo 30 of the second clutch C-2, the friction plates 41 of the third clutch C-3 are disposed on the outer peripheral side of the hydraulic servo 40 of the third clutch C-3 and the friction plates 31 of the second clutch C-2, the friction plates 61 of the first brake B-1 are disposed on the outer peripheral side of the one-way clutch F-1 and the friction plates 71 of the second brake B-2 is disposed on the outer peripheral side of the planetary gear unit PU, respectively.

Next, transmission routes of the transmission mechanism $2_{13}$ will be briefly explained. The carrier CR1 of the planetary gear DP is linked to the hub member 154 spline-coupled with the inner friction plates of the friction plates 51 of the fourth clutch C-4. The clutch drum 52 of the fourth clutch C-4 is linked to the clutch drum 42 of the third clutch C-3 through the outer peripheral side of the first clutch C-1. Further, the clutch drum 42 is linked to the sun gear S2 of the planetary gear unit PU through an intermediary of the link member 101 and the hub member 157, spline-coupled with the inner friction plates of the friction plates 61 of the first brake B-1, is linked to the link member 101.

The ring gear R1 of the planetary gear DP is linked to the clutch drum 22 of the first clutch C-1 and the hub member 153, spline-coupled with the inner friction plates of the friction plates 41 of the third clutch C-3, is linked to the clutch drum 22. The hub member 151, spline-coupled with the inner friction plates of the friction plates 21 of the first clutch C-1, is linked to the sun gear S3 of the planetary gear unit PU through an intermediary of the link member 102. Further, the clutch drum 32 of the second clutch C-2 is linked to the input shaft 12 and the hub member 152, spline-coupled with the inner friction plates of the friction plates 31 of the second clutch C-2, is linked to the intermediate shaft 13.

Furthermore, the carrier CR2 of the planetary gear unit PU is linked with the inner race 112 of the one-way clutch F-1 at the front side and is also linked to the hub member 158, spline-coupled with the inner friction plates of the friction plates 71 of the second brake B-2. The carrier CR2 is also linked to the intermediate shaft 13 on the rear side. It is noted that the outer race 114 of the one-way clutch F-1 is connected to the inner peripheral side of the mission case 3 through an intermediary of the flange-like member 115. The ring gear R3 of the planetary gear unit PU is linked to the output shaft 15. It is also noted that in the vehicular automatic transmission $\mathbf{1}_{13}$ of the 13th embodiment that the intermediate shaft 13 does not always rotate equally with the input shaft 12 and rotates at the inputted rotation only when the second clutch C-2 engages.

Next, the structures of each oil passage and the supply of operating fluid will be briefly explained. The oil chamber 56 of the hydraulic servo 50 of the fourth clutch C-4, i.e., the oil chamber 56 formed by sealing the part between the clutch drum 52 and the piston member 53 by seal rings a1, a2, is arranged so as to communicate with the oil passage c54 within the boss portion 3*b* by sealing the part between the clutch drum 52 and the boss portion 3*b* by the seal rings d7, d8. Operating fluid is supplied thereto from the oil passage c54. It is noted that oil is supplied from an oil passage (not shown) to the cancel oil chamber 57 formed by sealing the part between the piston member 53 and the cancel plate 54 by the seal rings a1, a3.

The oil passages (not shown) within the boss portion 3*b* are arranged so as to communicate with the oil passages c61, c71, c51 within the input shaft 12 by sealing the part between the boss portion 3*b* and the input shaft 12 by the seal rings d3, d4. Still more, the oil chamber 26 of the hydraulic servo 20 of the first clutch C-1, i.e., the oil chamber 26 formed by sealing the part between the clutch drum 22 and the piston member 23 by the seal rings a4, a5, is arranged so as to communicate with the oil passage c51 by sealing the part between the input shaft 12 and the clutch drum 22 by the seal rings d9, d10 and operating fluid is supplied thereto from the oil passage c51. It is noted that oil is supplied from an oil passage (not shown) to the cancel oil chamber 27 formed by sealing the part between the piston member 23 and the cancel plate 24 by the seal rings a4, a6.

The oil passages (not shown) within the boss portion 3*b* are arranged so as to communicate with the oil passage c62, an oil passage (not shown) perforated in parallel with the oil passage c71 and the oil passage c52 within the input shaft 12 by sealing the part between the boss portion 3*b* and the input shaft 12 by the seal rings d5, d6. The oil chamber 36 of the hydraulic servo 30 of the second clutch C-2, i.e., the oil chamber 36 formed by sealing the part between the clutch drum 32 and the piston member 33 by the seal rings a7, a8, is arranged so as to communicate with the oil passage c52 and operating fluid is supplied thereto from the oil passage c52. It is noted that oil is supplied from an oil passage (not shown) to the cancel oil chamber 37 formed by sealing the part between the piston member 33 and the cancel plate 34 by the seal rings a7, a9.

The oil chamber 46 of the hydraulic servo 40 of the third clutch C-3, i.e., the oil chamber 46 formed by sealing the part between the clutch drum 42 and the piston member 43 by the seal rings a10, a11, is arranged so as to communicate with the oil passage c53 within the support wall 120 by sealing the part between the support wall 120 and the clutch drum 42 by the seal rings d11, d12. Operating fluid is supplied thereto from the oil passage c53. It is noted that oil is supplied from the oil passage (not shown) to the cancel oil chamber 47 formed by sealing the part between the piston member 43 and the cancel plate 44 by the seal rings a10, a12.

Operating fluid is supplied from the oil passage (not shown) within the support wall 120 to the oil chamber 66 of the hydraulic servo 60 of the first brake B-1, i.e., to the oil chamber 66 formed by sealing the part between the support wall 120 and the piston member 63 by the seal rings a13, a14.

Further, operating fluid is supplied from the oil passage (not shown) within the partitioning portion 3*c* to the oil chamber 76 of the hydraulic servo 70 of the second brake B-2, i.e., to the oil chamber 76 formed by sealing the part between the partitioning portion 3*c* of the mission case 3 and the piston member 73 by the seal rings a15, a16.

Furthermore, while oil passages c60, c70 within the input shaft 12 are arranged so as to communicate with the oil passage (not shown) within the boss portion 3*b* by sealing by the seal rings d1, d2, lubricant oil is splashed from the oil passage c70 to the outer peripheral side of the input shaft 12 via the oil passage (not shown).

According to the inventive vehicular automatic transmission $\mathbf{1}_{13}$ described above, the fourth clutch C-4 is linked to the sun gear S2 of the planetary gear unit PU via the output side members (the clutch drum 42 and the link member 101) of the third clutch C-3, so that the output side members become the output side members of the two clutches that transmit different rotations. That is, they may be commonly used as one rotary member. Thereby, the vehicular automatic transmission $\mathbf{1}_{13}$ may be compactly built.

The hydraulic servo 50 of the fourth clutch C-4 is disposed axially on the opposite side of the planetary gear DP from the planetary gear unit PU and is also disposed on the boss portion 3*b* extending from the case 4 and operating fluid is supplied to the hydraulic servo 50 of the fourth clutch C-4 from the oil passage within the boss portion 3*b*, so that a number of seal rings can be reduced as compared to a case of disposing the hydraulic servo 50 of the fourth clutch C-4 on the input shaft 12 through an intermediary of a member having another speed of rotation, i.e., as compared to a case of supplying operating fluid through an intermediary of another member. Thereby, it becomes possible to prevent the drop in the efficiency and controllability of the vehicular automatic transmission $\mathbf{1}_{13}$.

Because the hydraulic servo 60 of the first brake B-1 is disposed on the outer peripheral side of the support wall 120, it becomes possible to use the support wall 120 in common as the cylinder member of the hydraulic servo 60 of the first brake B-1 and thereby to reduce the number of parts.

Further, because the hydraulic servo 20 of the first clutch C-1 and the hydraulic servo 40 of the third clutch C-3 are disposed axially between the planetary gear unit PU and the planetary gear DP, the vehicular automatic transmission $\mathbf{1}_{13}$ may be compactly built especially in the radial direction, even though it is capable of attaining the multi-stage shifts, as compared to a case of disposing the hydraulic servos of the plurality of clutches on the boss portion 3*b* extending from the case 4 for example.

Because the link member 102 linking the first clutch C-1 with the sun gear S2 of the planetary gear unit PU is disposed along the inner peripheral side of the third clutch C-3, the output side members, i.e., the clutch drum 42 and the link member 101, of the third clutch C-3 may be provided on the outer peripheral side of the link member 102 of the first clutch C-1. Accordingly, it becomes possible to link the fourth clutch C-4 disposed on the opposite side of the planetary gear DP with the output side members, i.e., the clutch drum 42 and the link member 101, of the third clutch C-3 without complicating the members and thereby to build the vehicular automatic transmission $\mathbf{1}_{13}$ compactly.

Because the friction plates 51 of the fourth clutch C-4 are disposed on the outer peripheral side of the ring gear R1 of the planetary gear DP, it becomes possible to increase the size of the hydraulic servo 50 and the friction plates 51 of the fourth clutch C-4 relatively in the radial direction and thereby increase the capacity of the fourth clutch C-4.

Further, because the hydraulic servo 20 of the first clutch C-1 is disposed on the input shaft 12, the support wall 120 fixed to the case 4 is disposed axially between the planetary gear unit PU and the third clutch C-3, operating fluid is supplied to the hydraulic servo 20 of the first clutch C-1 via the oil passage c52 provided within the input shaft 12 and operating fluid is supplied to the hydraulic servo 40 of the third clutch C-3 via the oil passage c53 provided within the support wall 120, the operating fluid may be supplied to the hydraulic servo 20 of the first clutch C-1 by providing the pairs of seal rings d5, d6 and d9, d10 between the boss portion 3*b* and the input shaft 12 and between the hydraulic servo 20 and the input shaft 12, respectively, and to the hydraulic servo 40 of the third clutch C-3 by providing the pair of seal rings d11, d12 between the hydraulic servo 40 and the support wall 120. Thereby, it becomes possible to reduce the number of seal rings, to cut sliding resistance of the seal rings and to improve the power transmitting efficiency of the vehicular automatic transmission $\mathbf{1}_{13}$ as compared to the case of supplying operating fluid to the both of the hydraulic servos 20, 40 of the first and third clutches C-1, C-3 from the input shaft 12.

Because the second clutch C-2 is disposed axially between the planetary gear DP and the planetary gear unit PU, the first through fourth clutches may be disposed collectively on one side of the planetary gear unit PU. The planetary gear unit PU may be disposed close to the output shaft 15 in mounting the vehicular automatic transmission in an FR-type vehicle, in particular, so that the member for linking the planetary gear unit PU with the output shaft 15, i.e., the member transmitting a large torque, may be shortened. Thereby, it becomes possible to lighten the vehicular automatic transmission $\mathbf{1}_{13}$ and to improve the controllability thereof by cutting its inertia.

Further, because the vehicular automatic transmission $\mathbf{1}_{13}$ is arranged so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Further, because the vehicular automatic transmission $\mathbf{1}_{13}$ is arranged so that the inputted rotation is inputted to the clutch drum 52 forming the hydraulic servo 50 of the fourth clutch C-4 when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the entire hydraulic servo 50 of the fourth clutch C-4 from rotating and to prevent dragging of the fourth clutch C-4 which is otherwise caused by a centrifugal hydraulic pressure generated in the oil chamber 56.

A 14th embodiment, which is a partial modification of the first through 13th embodiments described above, will be explained with reference to FIG. 24. It is noted that in the 14th embodiment explained below, components having the same structure with those of the automatic transmissions 1 of the first through 13th embodiments will be denoted by the same reference characters and an explanation thereof will be omitted here, except of partial components such as oil passages, seal rings and hub members.

The automatic transmission $\mathbf{1}_{14}$, that is suitably mounted in an FF-type (front engine front drive) vehicle, has the case 4 formed by connecting the mission case 3, the housing case for housing the torque converter (not shown) and other elements. A transmission mechanism $\mathbf{2}_{14}$, a counter shaft and a differential unit (not shown) are disposed within the mission case 3. The transmission mechanism $\mathbf{2}_{14}$ is disposed on the shafts centering on the input shaft 12 and the intermediate shaft 13 which are coaxial with the output shaft of the engine (not shown). The counter shaft (not shown) is disposed on an axis parallel with the input shaft 12 and the intermediate shaft 13 and the differential gear unit (not shown) is disposed on the axis parallel with the counter shaft in a manner of having left and right axles. It is noted that the input shaft 12, the intermediate shaft 13, the counter shaft and the left and right axles have a positional relationship in the shape of L when seen from the side thereof.

It is further noted that although the lateral direction in the drawings has been actually the longitudinal direction in the automatic transmission suitably mounted to the FR-type vehicle in the first through 13th embodiments described above, the lateral direction in the drawings will be the actual lateral direction of the vehicle in the automatic transmission suitably mounted to the FF-type vehicle described hereinbelow. However, the right side in the drawings is the left side in the actual vehicle and the left side in the drawings is the right side in the actual vehicle depending on the direction in which the automatic transmission is mounted, “the right side” or “the left side” mentioned in the explanation below will denote “the right side” or “the left side” in the drawings.

Figure 24:
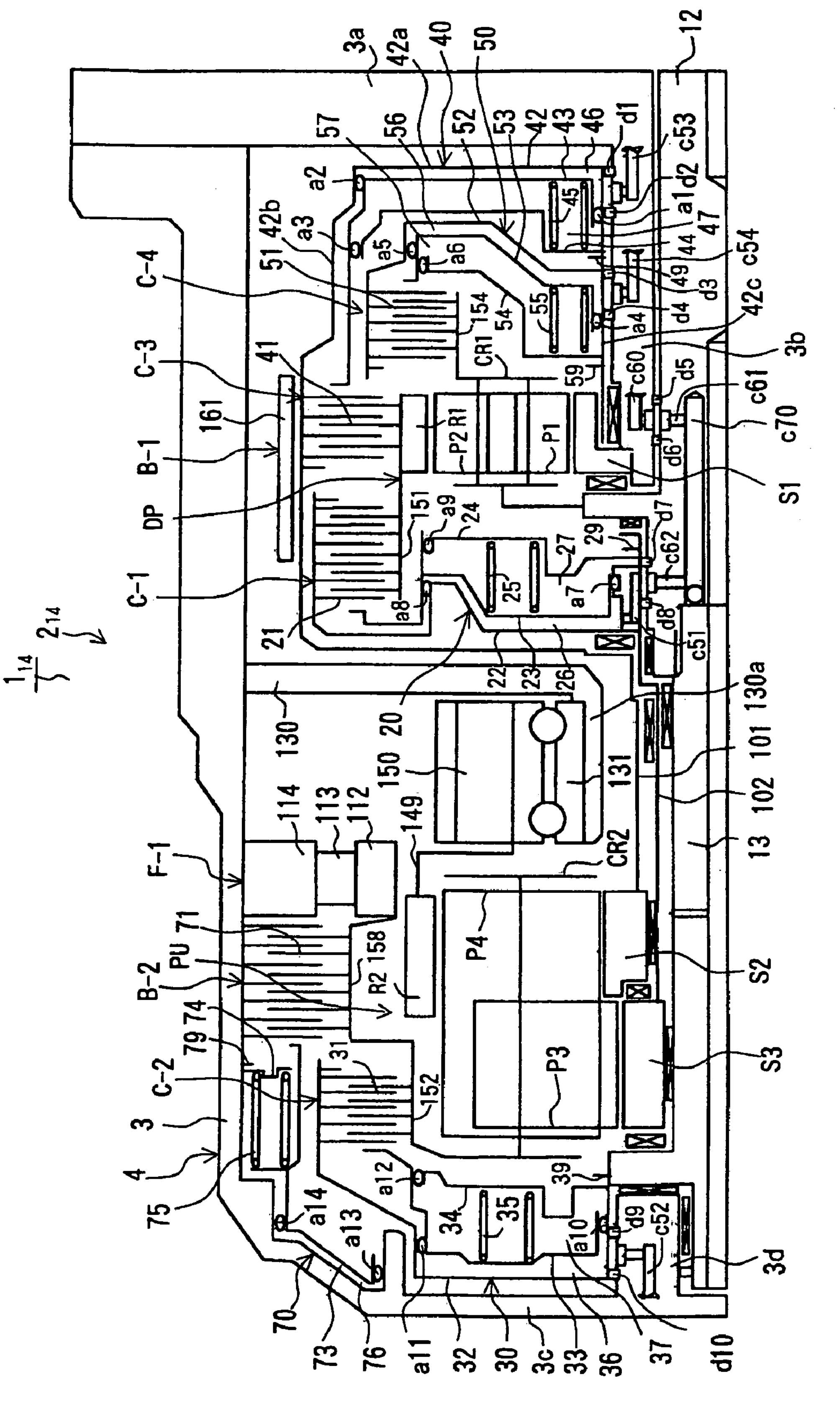
FIG. 24 is a diagrammatic section view showing an automatic transmission according to a fourteenth exemplary embodiment.

As shown in FIG. 24, within the mission case 3, the planetary gear unit PU is disposed on the intermediate shaft 13 and the third clutch C-3, the fourth clutch C-4, the planetary gear DP, the first clutch C-1 and the counter gear (output member) 150 are disposed axially on the right side (input side) of the planetary gear unit PU in order from the right side. The fourth clutch C-4 and the planetary gear DP are disposed on the inner peripheral side of the clutch drum 42 of the third clutch C-3 described later in detail. Further, the first brake B-1, comprising a band brake, is disposed on the outer peripheral side of the clutch drum 42 of the third clutch C-3.

Meanwhile, the second clutch C-2 is disposed axially on the left side of the planetary gear unit PU. The second brake B-2 and the one-way clutch F-1 are disposed on the outer peripheral side of the planetary gear unit PU.

The friction plates 51 of the fourth clutch C-4, the friction plates 41 of the third clutch C-3 and the friction plates 21 of the first clutch C-1 are disposed relatively on the outer diametric side within the mission case 3 on the input shaft 12 in order from the right side within the inner right part of the mission case 3, i.e., on the right side of the counter gear 150. Further, the brake band 161 of the first brake B-1 is disposed so as to overlap with the outer diametric side of the friction plates 41 of the third clutch C-3 and a part of the friction plates 21 of the first clutch C-1. It is noted that although the brake band 161 is a band-type brake, it will be explained as one type of a friction plate in the present specification. That is, it is assumed that the "friction plates of the brake" encompasses the friction plates of the multi-plate brake and the braking band of the band brake.

The partition member 3*a*, for partitioning the mission case 3 from the housing case (not shown), is secured to the mission case 3 as a part of the case 4 and the hydraulic servo 40 of the third clutch C-3 is disposed on the boss portion 3*b* extending from the partition member 3*a*. Further, the hydraulic servo 50 of the fourth clutch C-4 is disposed on the left side of the hydraulic servo 40, the planetary gear DP is disposed on the inner diametric side of the friction plates 41 and the hydraulic servo 20 of the first clutch C-1 is disposed nearly on the inner diametric side of the friction plates 21. That is, the hydraulic servo 40, the hydraulic servo 50 and the planetary gear DP are disposed in order (in order from the side of the joint of the boss portion 3*b* with the case 4 in the axial direction) on the boss portion 3*b* on the right side of the mission case 3 and the hydraulic servo 20 is disposed on the input shaft 12 in a manner of adjoining with the planetary gear DP.

The flange-like support wall 130 is disposed on the left side of the hydraulic servo 20 of the first clutch C-1 by being secured to the inner peripheral face of the mission case 3 and the counter gear 150, connected to the ring gear R2 of the planetary gear unit PU, described later, via a ball bearing 131, is disposed and rotatably supported by the support wall 130 on the inner diametric side of the support wall 130.

Meanwhile, the planetary gear unit PU is disposed on the intermediate shaft 13 on the left side of the mission case 3 in the drawing, i.e., on the left side of the counter gear 150. The friction plates 71 of the second brake B-2 and the one-way clutch F-1 are disposed on right part of the outer peripheral side of the planetary gear unit PU and the friction plates 31 of the second clutch C-2 is disposed on the left part of the outer diametric side of the planetary gear unit PU. The hydraulic servo 30 of the second clutch C-2 is disposed from the left side to the inner diametric side of the friction plates 31 and the hydraulic servo 70 of the second brake B-2 is disposed on the outer peripheral side of the hydraulic servo 30.

As described above, the hydraulic servo 40 of the third clutch C-3 and the hydraulic servo 50 of the fourth clutch C-4 are disposed axially on the opposite side of the planetary gear DP from the planetary gear unit PU, the hydraulic servo 20 of the first clutch C-1 and the counter gear 150 are disposed axially between the planetary gear DP and the planetary gear unit PU and the hydraulic servo 30 of the second clutch C-2 is disposed axially on the opposite side of the planetary gear unit PU from the planetary gear DP.

Next, the structure within the mission case 3 will be explained in detail with reference to FIG. 24. It is noted that the structure of each oil passage will be collectively explained later.

The planetary gear DP, disposed within the mission case 3, is provided with the sun gear S1, the carrier CR1 and the ring gear R1. Among them, the sun gear S1 is fixed to the boss portion 3*b* so as not to be rotatable. The carrier CR1 has two carrier plates in the lateral direction to rotatably support the pinions P1, P2. While the pinions P1, P2 engage with each other, the pinion P1 engages with the sun gear S1 and the pinion P2 engages with the ring gear R1, respectively. The left carrier plate is connected to the input shaft 12 and the right carrier plate is connected to the hub member 154, spline-coupled with the inner friction plates of the friction plates 51 of the fourth clutch C-4. The inner friction plates of the friction plates 41 of the third clutch C-3 are spline-coupled with the outer peripheral face of the ring gear R1. The hub portion 151 is linked on the left side of the ring gear R1 and is spline-coupled with the inner friction plates of the friction plates 21 of the first clutch C-1.

The fourth clutch C-4 is disposed on the boss portion 3*b* through an intermediary of the clutch drum 42 of the third clutch C-3 on the right side of the planetary gear DP. The fourth clutch C-4 is provided with the friction plates 51 and the hydraulic servo 50 for engaging/disengaging the friction plates 51. The hydraulic servo 50 has the clutch drum 52, the piston member 53, the cancel plate 54 and the return spring 55 and defines thereby the oil chamber 56 and the cancel oil chamber 57. The clutch drum 52 is fixed to the hub portion 42*c* of the clutch drum 42 of the third clutch C-3 and the outer friction plates 51*a* of the friction plates 51 are spline-coupled with the inner peripheral face of the outer diametric portion thereof. The piston member 53 is disposed on the left side of the clutch drum 52 so as to be movable in the axial direction and defines the oil-tight oil chamber 56 between the clutch drum 52 using the seal rings a4, a5. The cancel plate 54 is blocked from moving to the left by the snap ring 59 fitted to the clutch drum 42. The cancel plate 54 is provided with the return spring 55 in contraction between it and the piston member 53, disposed on the right side thereof, and defines the oil-tight cancel oil chamber 57 using the seal rings a4, a6.

It is noted that because the fourth clutch C-4 is built as described above, the inputted rotation of the carrier CR1 is inputted to the clutch drum 52 when the fourth clutch C-4 engages. The rotation is not inputted to the clutch drum 52 and the hydraulic servo 50 will not rotate when the fourth clutch C-4 is not engaged in Neutral and Parking ranges in particular.

The third clutch C-3 is built so as to surround the inner peripheral side, the right side and the outer peripheral side of the fourth clutch C-4 and is disposed on the boss portion 3*b*. The third clutch C-3 is provided with the friction plates 41 and the hydraulic servo 40 for engaging/disengaging the friction plates 41. The hydraulic servo 40 has the clutch drum 42, the piston member 43, the cancel plate 44 and the return spring 45 and defines the oil chamber 46 and the cancel oil chamber 47 with them. The clutch drum 42 has the flange portion 42*a* disposed on the left side of the partition member 3*a*, the hub portion 42*c* extending to the left from the inner periphery of the flange portion 42*a* and the drum portion 42*b* extending to the left from the outer periphery of the flange portion 42*a*. Among them, the outer peripheral face of the boss portion 3*b*, extending from the partition member 3*a* to the left side, rotatably supports the hub portion 42*c*. The end of the hub portion 42*c* of the clutch drum 42 is positioned on the left side of the fourth clutch C-4 and the hydraulic servo 50 of the fourth clutch C-4 is disposed on the outer peripheral side thereof. The drum portion 42*b* of the clutch drum 42 extends to the outer diametric side of the first clutch C-1 by passing along the outer diametric side of the fourth clutch C-4. The brake band 161 of the first brake B-1, comprising the band brake, is disposed on the outer peripheral face of the drum portion 42*b* of the clutch drum 42, the outer friction plates of the friction plates 41 are spline-coupled with the part corresponding to the ring gear R1 and the link member 101 is linked at the left part thereof. The link member 101 extends to the inner diametric side via the outer diametric side and the left side of the first clutch C-1 and is linked to the sun gear S2.

The piston member 43 of the third clutch C-3 is disposed so as to be movable from the clutch drum 42 and defines the oil-tight oil chamber 46 between the clutch drum 42 by the seal rings a1, a2. The outer diametric portion of the piston member 43 extends to the left by passing the outer peripheral side of the clutch drum 52 and the inner peripheral side of the clutch drum 42 of the third clutch C-3 so that its end faces the friction plates 41. The cancel plate 44 is blocked from moving to the left side by the snap ring 49 fitted to the outer peripheral face of the hub portion 42c of the clutch drum 42. The cancel plate 44 is provided with the return spring 45 in contraction between it and the piston member 43 disposed on the right side thereof and defines the oil-tight cancel oil chamber 47 by the seal rings a1, a3.

It is noted that because the third clutch C-3 is built as described above, the reduced rotation of the ring gear R1 is inputted to the clutch drum 42 when the third clutch C-3 engages. Accordingly, the rotation is not inputted to the clutch drum 42 and the hydraulic servo 40 will not rotate when the third clutch C-3 is not engaged, specifically in Neutral and Parking ranges.

The first clutch C-1 is disposed on the input shaft 12 on the left side of the planetary gear DP and the friction plates 41 of the third clutch C-3 and is provided with the friction plates 21 and the hydraulic servo 20 for engaging/disengaging the friction plates 21. The inner friction plates of the friction plates 21 are spline-coupled with the outer peripheral face of the hub member 151 linked to the ring gear R1. The outer friction plates of the friction plates 21 are spline-coupled with the inner peripheral side of the clutch drum 22 and the clutch drum 22 is linked to the link member 102. The link member 102 is then linked to the sun gear S3.

The hydraulic servo 20 has the clutch drum 22, the piston member 23, the cancel plate 24 and the return spring 25 and defines the oil chamber 26 and the cancel oil chamber 27 with them. The clutch drum 22 is attached to the outer peripheral face of the left side of the input shaft 12 so as to be relatively rotatable. The piston member 23 is disposed in the clutch drum 22 so as to be movable in the axial direction and defines the oil-tight oil chamber 26 between the clutch drum 22 using seal rings a7, a8. A part of the piston member 23 on the outer peripheral side faces to the front face of the friction plates 21. The cancel plate 24 is blocked from moving to the right side by the snap ring 29 fitted around the outer peripheral face on the inner diametric side of the clutch drum 22. The cancel plate 24 is provided with the return spring 25 in contraction between it and the piston member 23 disposed on the left side thereof and defines the oil-tight cancel oil chamber 27 using the seal rings a7, a9.

The first brake B-1 is disposed on the outer diametric side of the clutch drum 42 and is provided with a hydraulic servo (not shown) and set so as not to be rotatable with respect to the mission case 3 and the brake band 161 for fastening and releasing the outer peripheral part of the clutch drum 42 by the hydraulic servo.

The second brake B-2 is disposed from the outer diametric side of the ring gear R2 of the planetary gear unit PU to the outer diametric side of the second clutch C-2 on the left side described later. The second brake B-2 has the friction plates 71 and the hydraulic servo 70 for engaging/disengaging the friction plates 71. The outer friction plates of the friction plates 71 are spline-coupled with the inner peripheral face of the mission case 3 and the inner friction plates are spline-coupled with the hub member 158 linked to the carrier CR2 of the planetary gear unit PU via the hub member 152.

The hydraulic servo 70 has a piston member 73, a cancel plate 74 and a return spring 75 and defines an oil chamber 76 between the piston member 73 and the mission case 3. The piston member 73 is movably disposed in the axial direction and its right end faces to the friction plates 71. The oil-tight oil chamber 76 is formed between the piston member 73 and the mission case 3 using two seal rings a13, a14. The cancel plate 74 is blocked from moving to the right side by a snap ring 79 fitted into the inner peripheral face of the mission case 3.

The one-way clutch F-1 is disposed on the outer diametric side of the planetary gear unit PU and on the right side of the second brake B-2 and is provided with the inner race 112 linked to the hub member 158, the sprag mechanism 113 and the outer race 114, spline-coupled with the inner peripheral side of the mission case 3, in order from the inner peripheral side to the outer peripheral side.

The second clutch C-2 is disposed on the left side from the outer diametric side of the planetary gear unit PU and on the inner diametric side of the second brake B-2 and is provided with the friction plates 31 and the hydraulic servo 30 for engaging/disengaging the friction plates 31. The inner friction plates of the friction plates 31 are spline-coupled with the hub member 152 that is linked with the inner race 112 and the hub member 158 and with the carrier CR2. The outer friction plates of the friction plates 31 are spline-coupled with the inner peripheral side of the clutch drum 32 and the clutch drum 32 is linked with the intermediate shaft 13. The intermediate shaft 13 is spline-coupled with the input shaft 12. That is, the clutch drum 32 is linked with the input shaft 12 via the intermediate shaft 13.

The hydraulic servo 30 has the clutch drum 32, the piston member 33, the cancel plate 34 and the return spring 35 and defines the oil chamber 36 and the cancel oil chamber 37 with them. The right end on the inner peripheral side of the clutch drum 32 is attached to the intermediate shaft 13 and is rotatably supported on the boss portion 3d extending from the side wall 3c of the mission case 3. The piston member 33 is disposed in the clutch drum 32 movably in the axial direction and defines the oil-tight oil chamber 36 between the clutch drum 32 using the seal rings a10, a11. The part of the piston member 33 on the outer peripheral side faces to the front face of the friction plates 31. The cancel plate 34 is blocked from moving to the right side by the snap ring 39 fitted around the outer peripheral face on the inner diametric side of the clutch drum 32. The clutch drum 32 is provided with the return spring 35 in contraction between it and the piston member 33 disposed on the left side thereof and defines the oil-tight cancel oil chamber 37 using the seal rings a10, a12.

The support wall 130 is disposed nearly at the center of the inner peripheral side of the mission case 3 so that its outer peripheral side is linked to the mission case 3 and the counter gear 150 is disposed on the boss portion 130a extending in the inner diametric side of the support wall 130 through an intermediary of a ball bearing 131. It is noted that a gear linked to the counter shaft (not shown) is engaged with the outer peripheral side of the counter gear 150 and the counter shaft is linked with driving wheels through an intermediary of gear mechanisms and differential gears (not shown).

Next, the structures of each oil passage and the supply of operating fluid will be briefly explained. The oil chamber 56 of the hydraulic servo 50 of the fourth clutch C-4, i.e., the oil chamber 56 formed by sealing the part between the clutch drum 52 and the piston member 53 by the seal rings a4, a5, is arranged so as to communicate with the oil passage c54 within the boss portion 3b by sealing the part between the clutch drum 52 and the boss portion 3b by the seal rings d3, d4 and operating fluid is supplied from the oil passage c54. It is noted that operating fluid is supplied from the oil passage (not shown) to the cancel oil chamber 57 formed by sealing the part between the piston member 53 and the cancel plate 54 by the seal rings a4, a6.

The oil chamber 46 of the hydraulic servo 40 of the third clutch C-3, i.e., the oil chamber 46 formed by sealing the part between the clutch drum 42 and the piston member 43 by the seal rings a1, a2, is arranged so as to communicate with the oil passage c53 within the boss portion 3*b* by sealing the part between the clutch drum 42 and the boss portion 3*b* by the seal rings d1, d2. Operating fluid is supplied thereto from the oil passage c53. It is noted that operating fluid is supplied from the oil passage (not shown) to the cancel oil chamber 47 formed by sealing the part between the piston member 43 and the cancel plate 44 by the seal rings a1, a3.

The oil chamber 26 of the hydraulic servo 20 of the first clutch C-1, i.e., the oil chamber 26 formed by sealing the part between the clutch drum 22 and the piston member 23 by the seal rings a7, a8, is arranged so as to communicate with the oil passage c60 within the boss portion 3*b* by sealing the part between the boss portion 3*b* and the input shaft 12 by the seal rings d5, d6 and the part between the input shaft 12 and the clutch drum 22 by the seal rings d7, d8, respectively, via the oil passages c61, c70, c62 within the input shaft 12 and the oil passage c51 and operating fluid is supplied thereto from the oil passage c51. It is noted that operating fluid is supplied from the oil passage (not shown) to the cancel oil chamber 27 formed by sealing the part between the piston member 23 and the cancel plate 24 by the seal rings a7, a9.

The oil chamber 36 of the hydraulic servo 30 of the second clutch C-2, i.e., the oil chamber 36 formed by sealing the part between the clutch drum 32 and the piston member 33 by the seal rings a10, a11, is arranged so as to communicate with the oil passage c52 within the boss portion 3*b* by sealing the part between the clutch drum 32 and the boss portion 3*d* by the seal rings d9, d10. Operating fluid is supplied thereto from the oil passage c52. It is noted that operating fluid is supplied from the oil passage (not shown) to the cancel oil chamber 37 formed by sealing the part between the piston member 33 and the cancel plate 34 by the seal rings a10, a12.

Operating fluid is supplied from the oil passage within the partitioning portion 3*c* (not shown) to the oil chamber 76 of the hydraulic servo 70 of the second brake B-2, i.e., to the oil chamber 76 formed by sealing the part between the side wall 3*c* of the mission case 3 and the piston member 73 by the seal rings a13, a14.

According to the automatic transmission $\mathbf{1}_{14}$ described above, the fourth clutch C-4 is linked with the sun gear S2 of the planetary gear unit PU via the output side members (clutch drum 42 and the link member 102) of the third clutch C-3, so that the output side members turn out to be output side members of the two clutches transmitting different rotations, i.e., they may be shared in common as one rotary member. Thereby, the automatic transmission $\mathbf{1}_{14}$ may be compactly built.

Because the hydraulic servo 50 of the fourth clutch C-4 is disposed axially on the opposite side of the planetary gear DP from the planetary gear unit PU and on the boss portion 3*b* extending from the case 4 to supply the operating fluid to the hydraulic servo 50 of the fourth clutch C-4 from the oil passage within the boss portion 3*b*, the number of seal rings can be reduced as compared to a case of disposing the hydraulic servo 50 of the fourth clutch C-4 on the input shaft 12 through an intermediary of a member having another speed of rotation, i.e., as compared to a case of supplying the operating fluid via the other member for example. Thereby, it is possible to prevent the drop in the efficiency and controllability of the automatic transmission $\mathbf{1}_{14}$.

Further, because the planetary gear DP, the first clutch C-1, the third and fourth clutches C-3, C-4 are disposed axially on one side of the planetary gear unit PU and the planetary gear DP and the fourth clutch C-4 are disposed on the inner peripheral side of the clutch drum 42 of the third clutch C-3, it becomes possible to increase an area of the friction plates 21, 41 of the first and third clutches C-1, C-3. That is, even though a capacity of the first clutch C-1 and the third clutch C-3 for transmitting the reduced rotation may be increased (although the "capacity" is a meaning including a capacity of torque, thermal capacity and the like that can be transmitted, it will be abbreviated and referred to simply as "capacity" hereinafter), the fourth clutch C-4 and the planetary gear DP whose transmittable torque capacity can be relatively small for transmitting the inputted rotation may be disposed on the inner peripheral side of the clutch drum 42 of the third clutch C-3. Accordingly, the automatic transmission $\mathbf{1}_{14}$, that is capable of attaining the multi-stage shift such as the forward eighth speed stage and the reverse second speed stage, may be compactly built.

Because the hydraulic servo 20 of the first clutch C-1 is disposed on the input shaft 12 and adjacent to the planetary gear DP and the operating fluid is supplied to the hydraulic servo 20 of the first clutch C-1 from the oil passage provided within the input shaft 12, the operating fluid may be supplied just by providing pairs of seal rings d5, d6 and d7, d8 along the oil passage for supplying the operating fluid from the hydraulic control unit, i.e., between the oil passage within the boss portion 3*b* and the input shaft 12 and between the hydraulic servo 20 of the first clutch C-1 and the input shaft 12, respectively. Accordingly, the number of seal rings can be reduced as compared to a case of supplying operating fluid via another member. Thereby, it becomes possible to prevent the drop in the efficiency and controllability of the vehicular automatic transmission $\mathbf{1}_{14}$.

Although the increase of radial size of the first clutch C-1 to the outer peripheral side is limited, because the third and fourth clutches C-3 and C-4 are linked to the sun gear S2 of the planetary gear unit PU through the outer peripheral side of the first clutch C-1 and the link member 101 and others for linking the third and fourth clutches C-3, C-4 with the sun gear S2 of the planetary gear unit PU pass through the outer peripheral side of the first clutch C-1, the capacity of the first clutch C-1 may be maintained by increasing the size in the inner radial direction because the first clutch C-1 is disposed on the input shaft 12 as compared to a case of disposing it on the boss portion 3*b*.

Also, because the sun gear S2 of the planetary gear unit PU is capable of transmitting the inputted rotation in connection with the fourth clutch C-4, is capable of transmitting the reduced rotation in connection with the third clutch C-3, and is capable of fixing the rotation in connection with the first brake B-1, the sun gear S3 is capable of transmitting the reduced rotation in connection with the first clutch C-1, the carrier CR2 is capable of transmitting the inputted rotation in connection with the second clutch C-2 and is capable of fixing the rotation in connection with the second brake B-2, and the ring gear R2 is linked to the counter gear 150, the multi-stage shift such as the forward eighth speed stage and the reverse second speed stage may be attained.

Further, because the friction plates 41 of the third clutch C-3 are disposed on the outer peripheral side of the ring gear R1 and the fourth clutch C-4 is disposed axially between the hydraulic servo 40 of the third clutch C-3 and the friction plates 41 of the third clutch C-3, it is possible to prevent the fourth clutch C-4 from radially overlapping with the hydraulic servo 40 or the friction plates 41 of the third clutch C-3. Accordingly, because the radial size of the fourth clutch C-4 may be increased as compared to a case of disposing it on the inner peripheral side of the third clutch C-3, the capacity of the fourth clutch C-4 may be maintained and the vehicular automatic transmission $1_{14}$ may be compactly built in the axial direction as a result.

Still further, although the first brake B-1 is disposed on the outer peripheral side of the friction plates 41 of the third clutch C-3 in the present embodiment, it is also possible to dispose the first brake B-1 on the outer peripheral side of the hydraulic servo 40 of the third clutch C-3. Accordingly, it is possible to build the vehicular automatic transmission $1_{14}$ compactly in the radial direction while maintaining the capacity of the first brake B-1 and reducing the size thereof by disposing the first brake B-1 at the position overlapping with the third clutch C-3.

Further, because the automatic transmission $1_{14}$ is built so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range, for example, and the input shaft rotates. Accordingly, it is possible to prevent the entire hydraulic servo 40 from rotating and to prevent dragging of the third clutch C-3 which is otherwise caused by a centrifugal hydraulic pressure generated in the oil chamber 46.

Because the automatic transmission $1_{14}$ is built so that the inputted rotation is inputted to the clutch drum 52 of the fourth clutch C-4 forming the hydraulic servo 50 of the fourth clutch C-4 via the carrier CR1 when the fourth clutch C-4 engages, the inputted rotation is not inputted to the clutch drum 52 of the fourth clutch C-4 when the fourth clutch C-4 is not engaged even if the driver races the engine in Neutral or Parking range and the input shaft rotates. Accordingly, it is possible to prevent the rotation of the entire hydraulic servo 50 of the fourth clutch C-4 and to prevent dragging of the fourth clutch C-4 which is otherwise caused by a centrifugal hydraulic pressure generated in the oil chamber 56.

Because the second clutch C-2 is disposed axially on the opposite side of the planetary gear unit PU from the planetary gear DP, the second clutch C-2 may be linked with the carrier CR2 without becoming entangled with the member for linking the first clutch C-1 with the sun gear S3 and the member for linking the third clutch C-3 with the sun gear S2, for example.

It is noted that an automatic transmission $1_{59}$ of a 59th embodiment, described later, may be built by inverting the transmission mechanism $2_{14}$ of the automatic transmission $1_{14}$ of the 14th embodiment in the lateral direction (axial direction) almost as it is.

Figure 25:
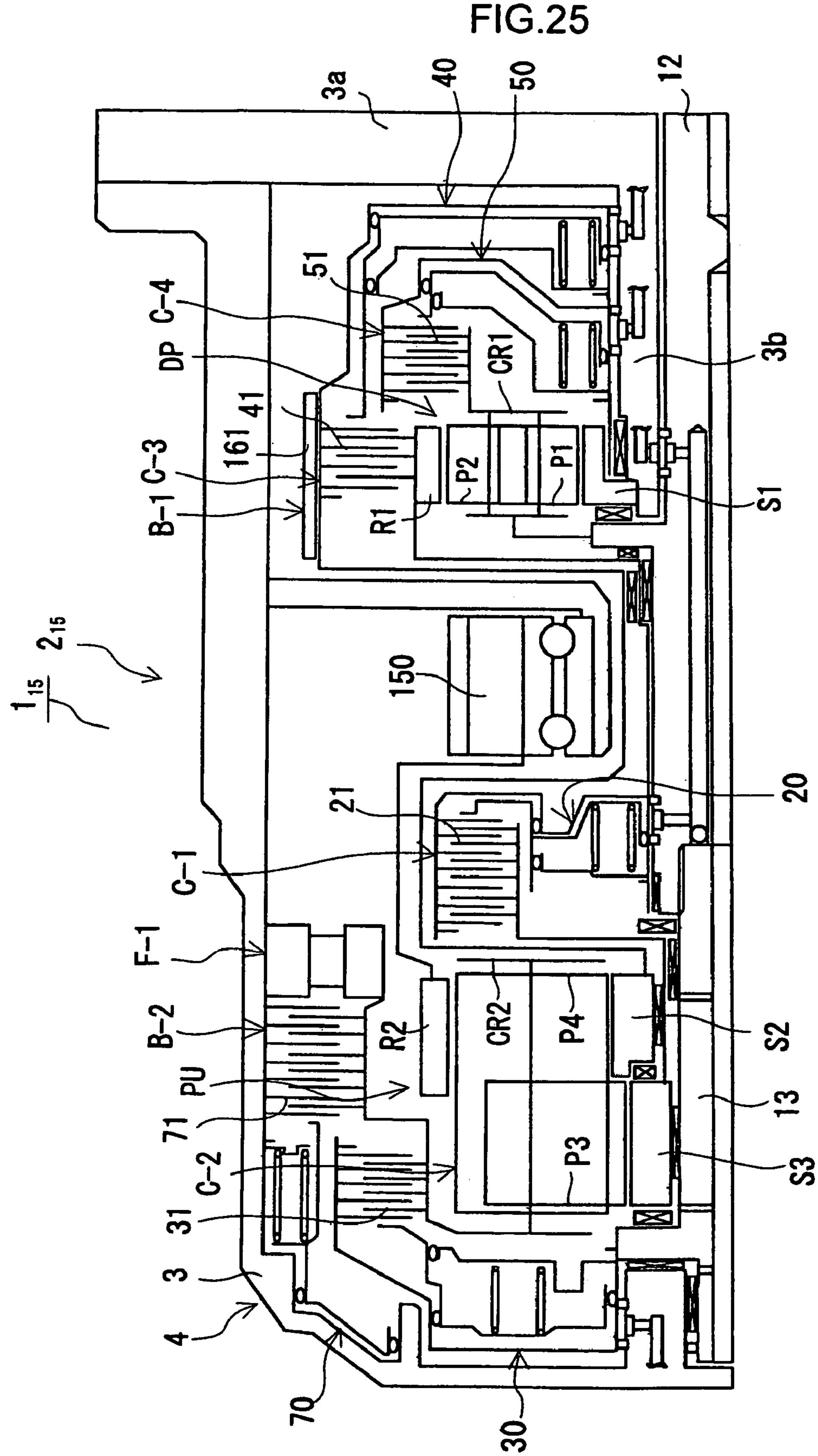
FIG. 25 is a diagrammatic section view showing an automatic transmission according to a fifteenth exemplary embodiment.

A 15th embodiment, which is a partial modification of the 14th embodiment described above, will be explained with reference to FIG. 25. It is noted that in the 15th embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{15}$ of the 15th embodiment is characterized in that it is arranged by switching the lateral (axial) disposition of the hydraulic servo 20 of the first clutch C-1 and the counter gear 150.

It is noted that an automatic transmission $1_{60}$ of a 60th embodiment, described later, may be built by inverting a transmission mechanism $2_{15}$ of the automatic transmission $1_{15}$ of the 15th embodiment in the lateral direction (axial direction) almost as it is.

Figure 26:
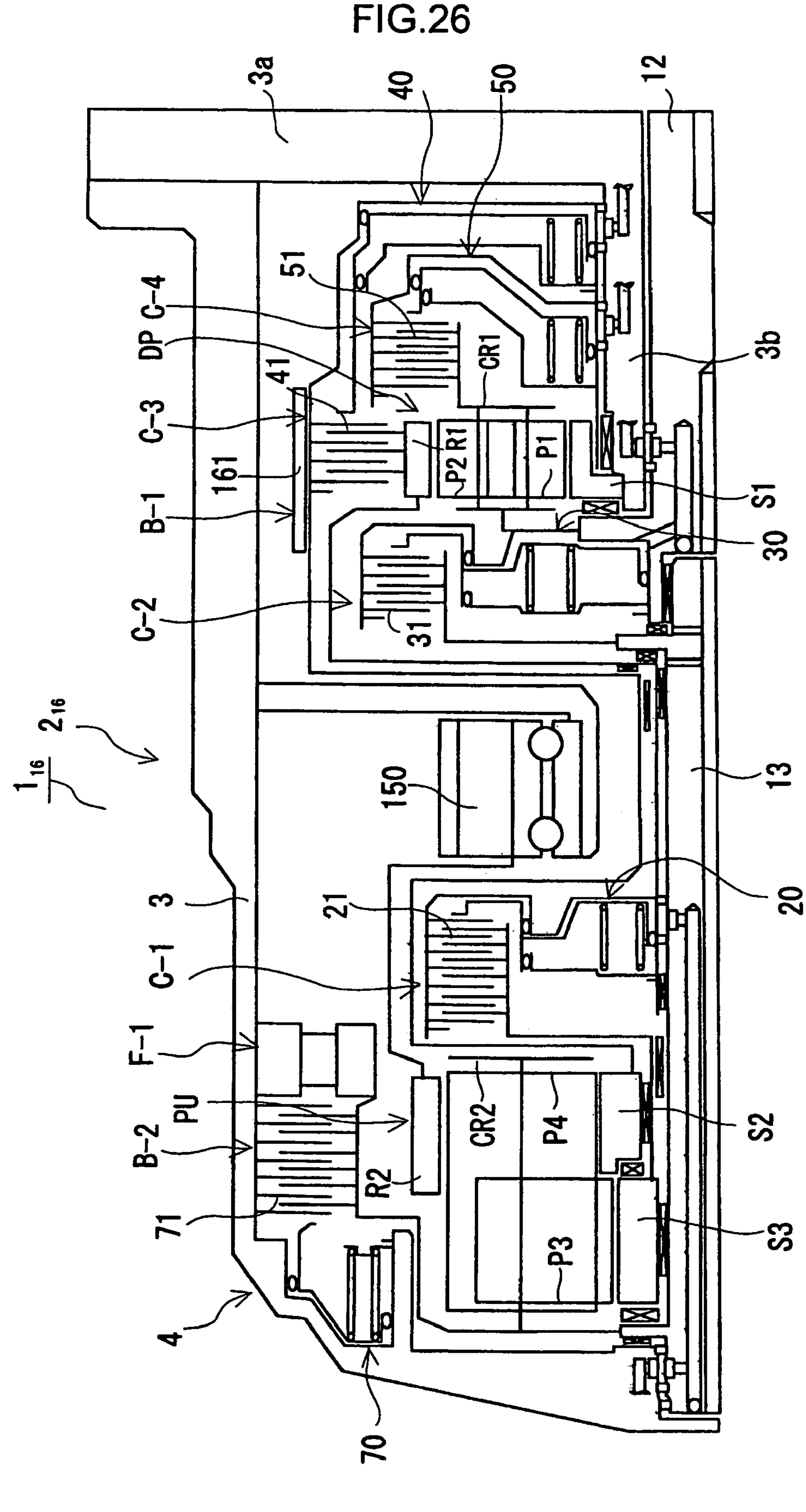
FIG. 26 is a diagrammatic section view showing an automatic transmission according to a sixteenth exemplary embodiment.

A 16th embodiment, which is a partial modification of the 14th embodiment described above, will be explained with reference to FIG. 26. It is noted that in the 16th embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{16}$ of the 16th embodiment is arranged so that the hydraulic servo 30 of the second clutch C-2 is disposed axially between the planetary gear unit PU and the planetary gear DP, or more specifically, axially between the planetary gear DP and the counter gear 150. Further, the hydraulic servo 20 of the first clutch C-1 is disposed axially between the planetary gear unit PU and the planetary gear DP, or more specifically, axially between the planetary gear unit PU and the counter gear 150.

Because this arrangement allows the second clutch C-2 to be disposed on the input shaft 12, it becomes possible to eliminate the necessity of always transmitting the inputted rotation to the intermediate shaft 13 and to use the intermediate shaft 13 as a power transmitting member for transmitting the output (rotation) from the second clutch C-2.

It is noted that an automatic transmission $1_{61}$ of a 61st embodiment, described later, may be built by inverting a transmission mechanism $2_{16}$ of the automatic transmission $1_{16}$ of the 16th embodiment in the lateral direction (axial direction) almost as it is and by adding a transmitting member from the second clutch C-2 to the planetary gear unit.

Figure 27:
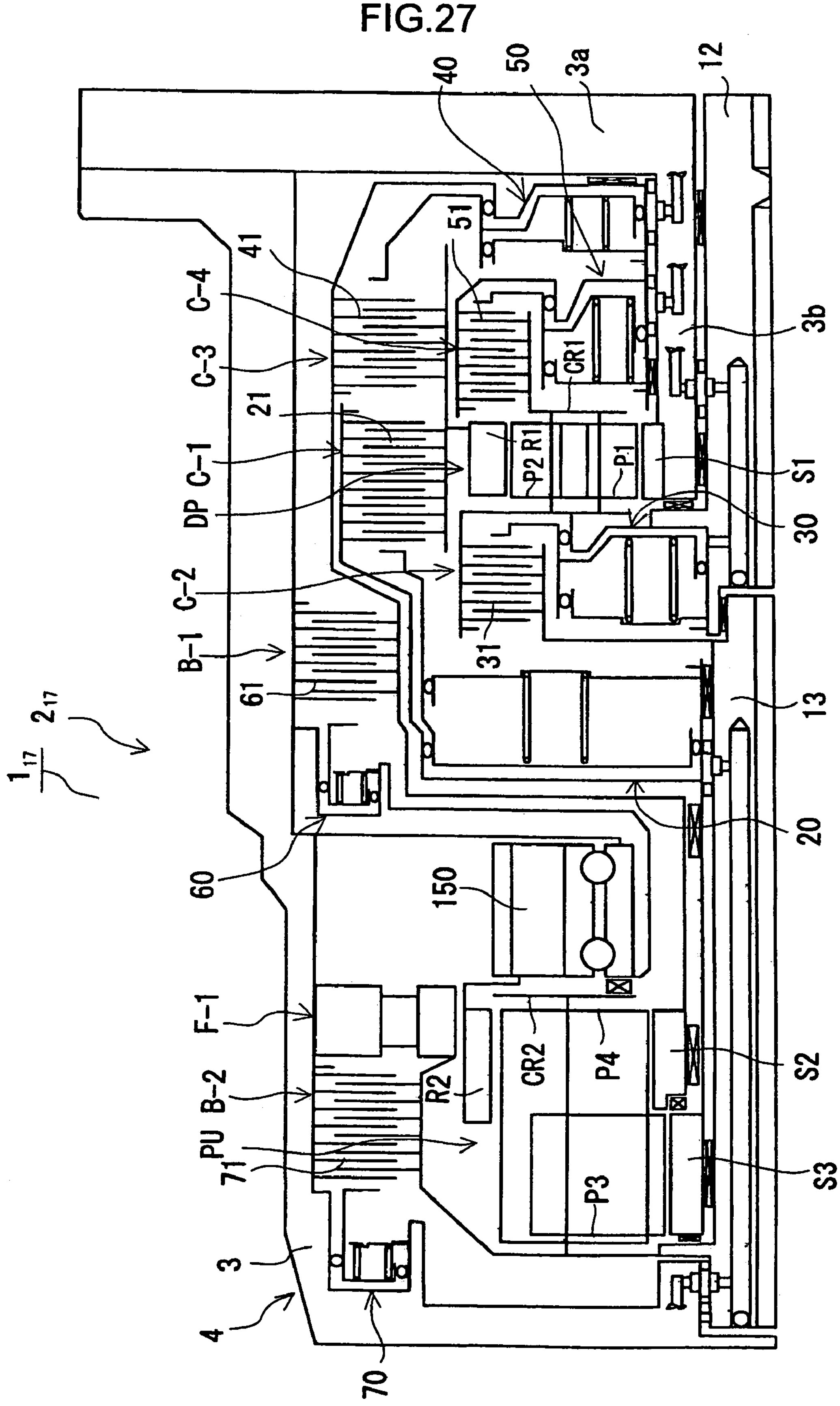
FIG. 27 is a diagrammatic section view showing an automatic transmission according to a seventeenth exemplary embodiment.

A 17th embodiment, which is a partial modification of the 14th embodiment described above, will be explained with reference to FIG. 27. It is noted that in the 17th embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{17}$ of the 17th embodiment is arranged so that the hydraulic servo 30 of the second clutch C-2 is disposed axially between the planetary gear unit PU (specifically the counter gear 150) and the planetary gear DP, or more specifically, axially between the hydraulic servo 20 of the first clutch C-1 and the planetary gear DP. Further, the multi-plate type brake similar to that of the first embodiment is used for the first brake B-1 instead of the band brake. Further still, a part of the support wall is used as the cylinder member of the first brake B-1, thus reducing a number of parts, in the present embodiment.

It is noted that an automatic transmission $1_{62}$ of a 62nd embodiment, described later, may be built by inverting a transmission mechanism $2_{17}$ of the automatic transmission $1_{17}$ of the 17th embodiment in the lateral direction (axial direction) almost as it is and by adding the transmitting member from the second clutch C-2 to the planetary gear unit.

Figure 28:
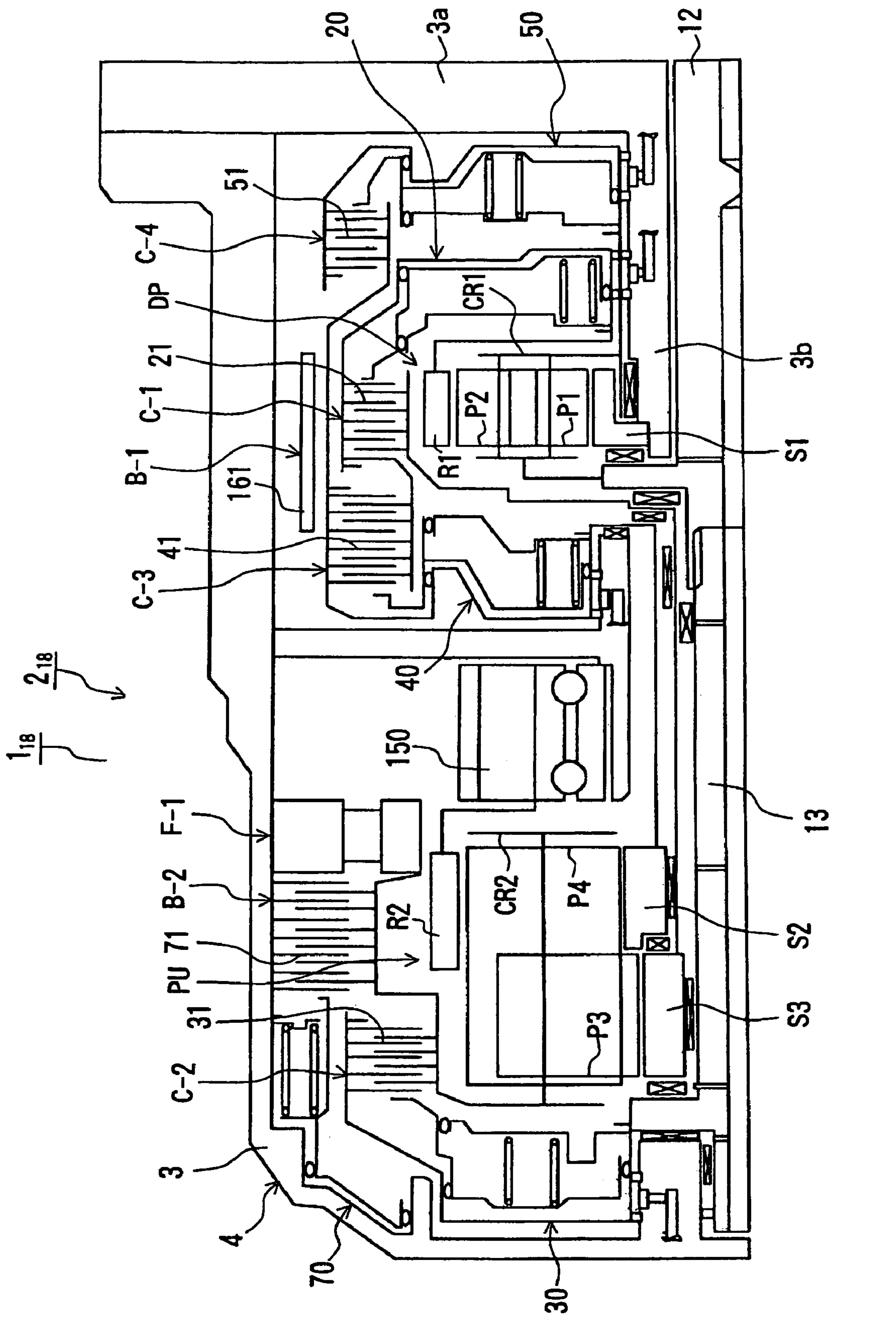
FIG. 28 is a diagrammatic section view showing an automatic transmission according to an eighteenth exemplary embodiment.

An 18th embodiment, which is a partial modification of the 14th embodiment described above, will be explained with reference to FIG. 28. In the 18th embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{18}$ of the 18th embodiment is arranged so that the hydraulic servo 40 of the third clutch C-3 is disposed axially between the planetary gear unit PU (specifically the counter gear 150) and the planetary gear DP and the hydraulic servo 20 of the first clutch C-1 is disposed axially on the opposite side of the planetary gear DP from the planetary gear unit PU, or more specifically, the hydraulic servo 20 of the first clutch C-1 is disposed axially between the planetary gear DP and the hydraulic servo 50 of the fourth clutch C-4.

It is noted that the disposition of the first clutch C-1 and the third clutch C-3 may be switched. That is, the hydraulic servo 20 of the first clutch C-1 may be disposed axially between the planetary gear unit PU (the counter gear 150) and the planetary gear DP and the hydraulic servo 40 of the third clutch C-3 may be disposed axially between the planetary gear DP and the hydraulic servo 50 of the fourth clutch C-4.

Further, an automatic transmission $1_{63}$ of a 63rd embodiment, described later, may be built by inverting a transmission mechanism $2_{18}$ of the automatic transmission $1_{18}$ of the 18th embodiment in the lateral direction (axial direction) almost as it is.

Figure 29:
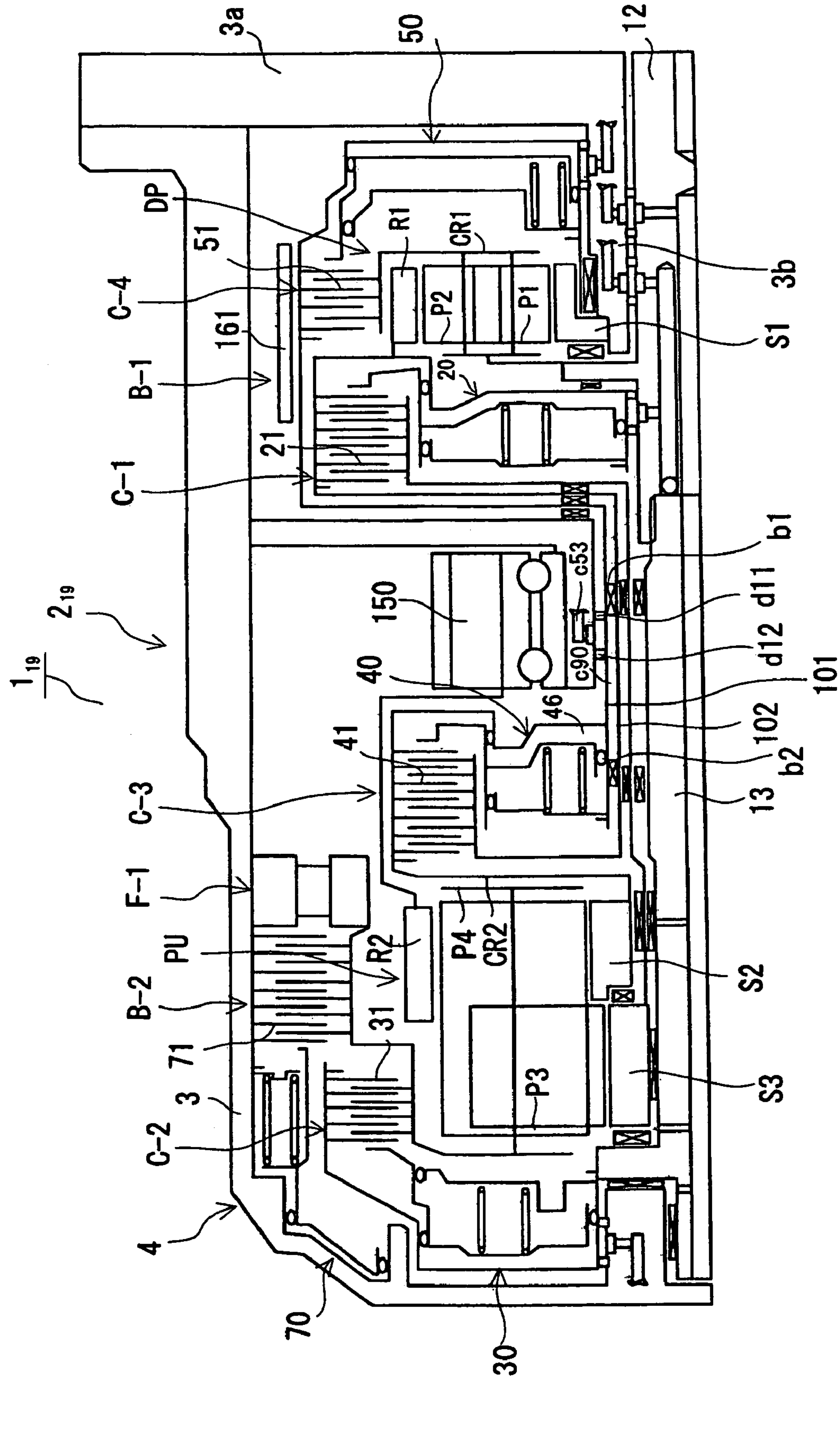
FIG. 29 is a diagrammatic section view showing an automatic transmission according to a nineteenth exemplary embodiment.

A 19th embodiment, which is a partial modification of the 14th embodiment described above, will be explained with reference to FIG. 29. In the 19th embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{19}$ of the 19th embodiment is arranged so that the hydraulic servo 40 of the third clutch C-3 is disposed axially between the planetary gear unit PU and the planetary gear DP, or more specifically, axially between the planetary gear unit PU and the counter gear 150. Further, an oil passage c90 is formed by sealing the part between the support wall and the link member 101 by the seal rings d11, d12 and by providing the bushes b1, b2 between the link member 101 and the link member 102 to supply operating fluid to the oil chamber 46 of the hydraulic servo 40 of the third clutch C-3 from an oil passage c53 within the support wall via the oil passage c90.

It is noted that an automatic transmission $1_{64}$ of a 64th embodiment, described later, may be built by inverting a transmission mechanism $2_{19}$ of the automatic transmission $1_{19}$ of the 19th embodiment in the lateral direction (axial direction) almost as it is.

Figure 30:
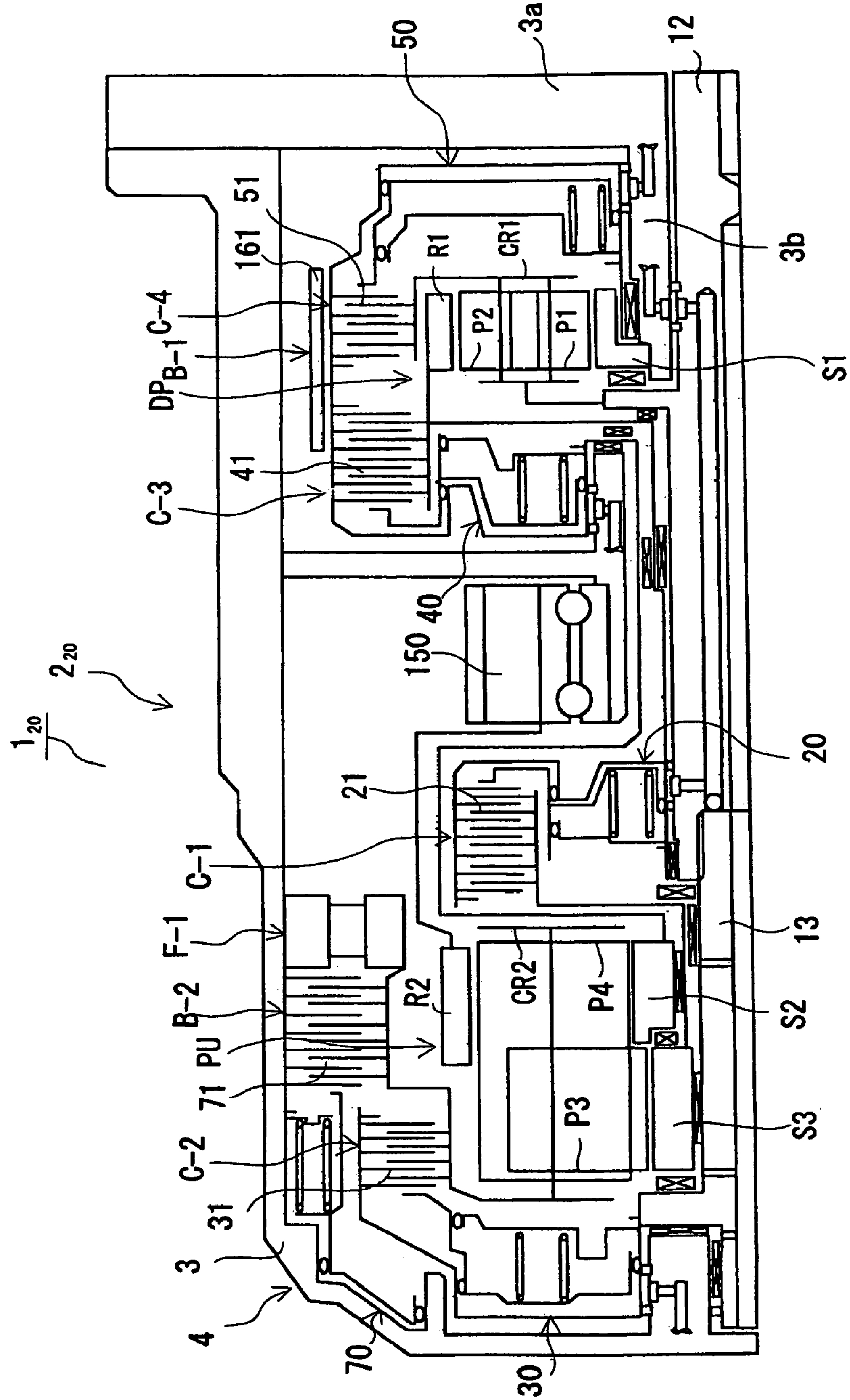
FIG. 30 is a diagrammatic section view showing an automatic transmission according to a 20th exemplary embodiment.

A 20th embodiment, which is a partial modification of the 14th embodiment described above, will be explained with reference to FIG. 30. In the 20th embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{20}$ of the 20th embodiment is arranged so that the hydraulic servo 20 of the first clutch C-1 and the hydraulic servo 40 of the third clutch C-3 are disposed axially between the planetary gear unit PU and the planetary gear DP, or more specifically, the hydraulic servo 20 of the first clutch C-1 is disposed axially between the planetary gear unit PU and the counter gear 150 and the hydraulic servo 40 of the third clutch C-3 is disposed axially between the counter gear 150 and the planetary gear DP.

It is noted that an automatic transmission $1_{65}$ of a 65th embodiment, described later, may be built by inverting a transmission mechanism $2_{20}$ of the automatic transmission $1_{20}$ of the 20th embodiment in the lateral direction (axial direction) almost as it is.

Figure 31:
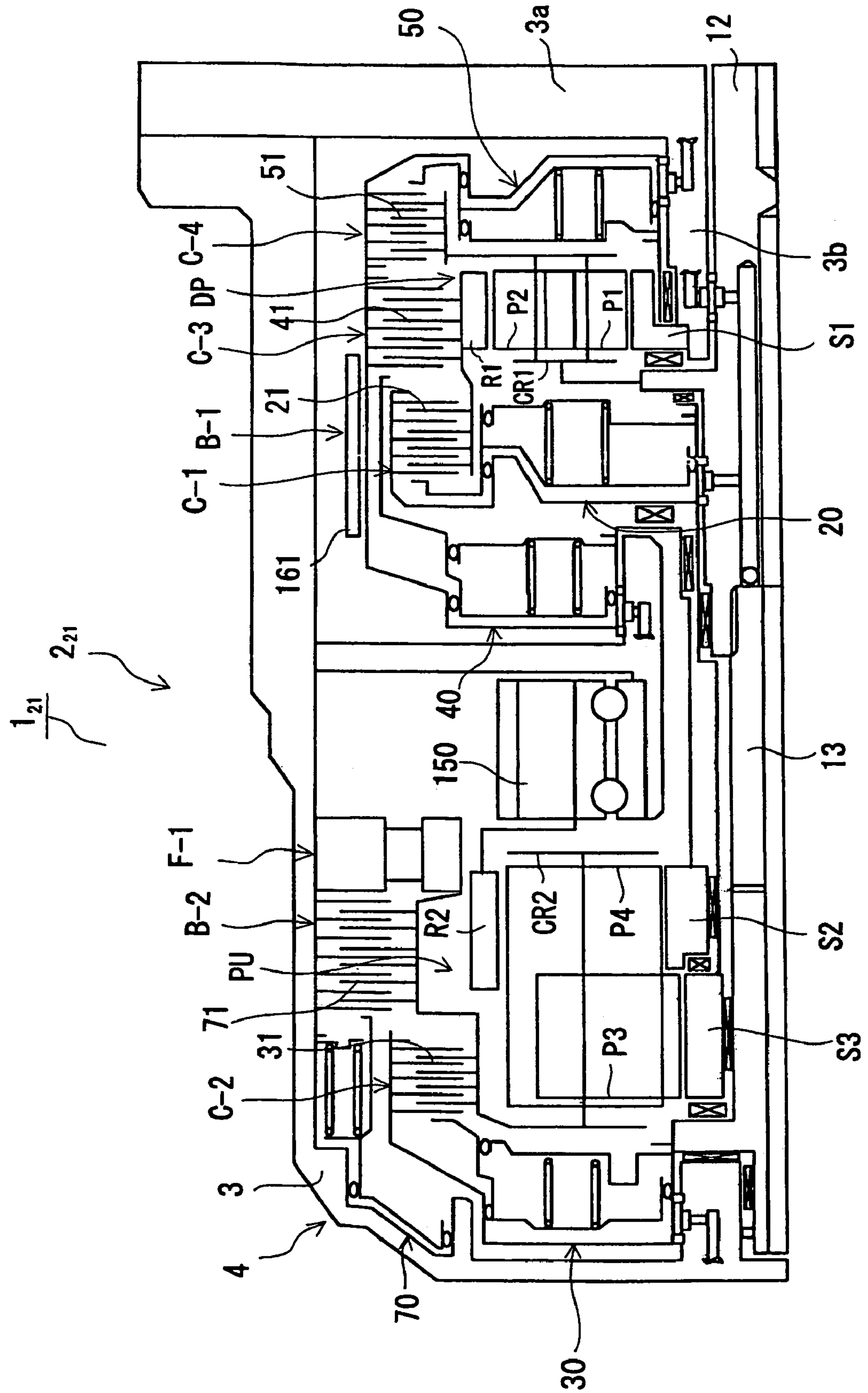
FIG. 31 is a diagrammatic section view showing an automatic transmission according to a 21st exemplary embodiment.

A 21st embodiment, which is a partial modification of the 14th embodiment described above, will be explained with reference to FIG. 31. In the 21st embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{21}$ of the 21st embodiment is arranged so that the hydraulic servo 40 of the third clutch C-3 is disposed axially between the planetary gear unit PU and the planetary gear DP, or more specifically, axially between the counter gear 150 and the planetary gear DP (or more specifically the hydraulic servo 20 of the first clutch C-1).

It is noted that an automatic transmission $1_{65}$ of a 65th embodiment, described later, may be built by inverting a transmission mechanism $2_{21}$ of the automatic transmission $1_{21}$ of the 21st embodiment in the lateral direction (axial direction) almost as it is.

Figure 32:
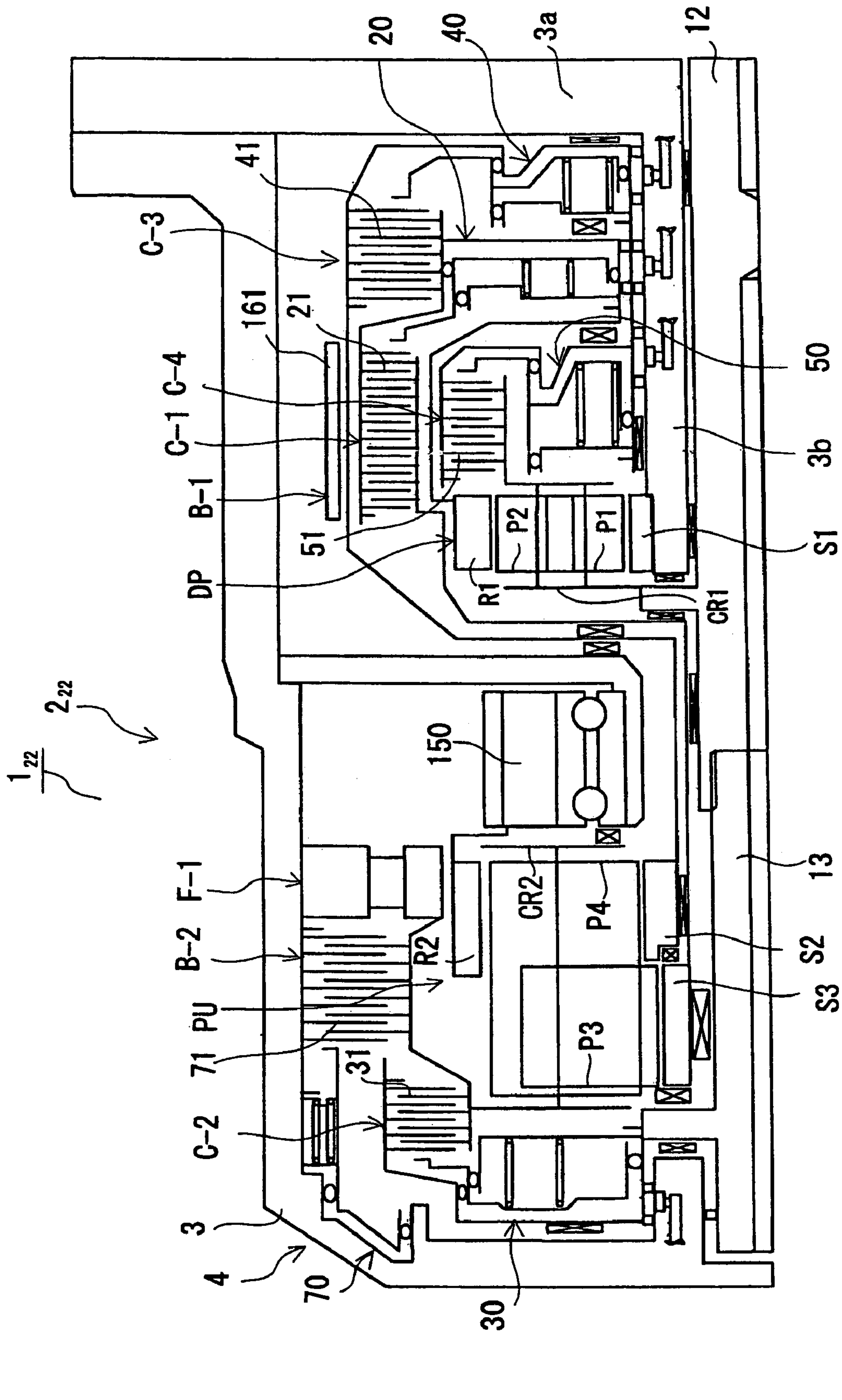
FIG. 32 is a diagrammatic section view showing an automatic transmission according to a 22nd exemplary embodiment.

A 22nd embodiment, which is a partial modification of the 14th embodiment described above, will be explained with reference to FIG. 32. In the 22nd embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{22}$ of the 22nd embodiment is arranged so that the hydraulic servo 20 of the first clutch C-1 is disposed axially on the opposite side of the planetary gear DP from the planetary gear unit PU, or more specifically, axially between the hydraulic servo 50 of the fourth clutch C-4 and the hydraulic servo 40 of the third clutch C-3.

It is noted that an automatic transmission $1_{67}$ of a 67th embodiment, described later, may be built by inverting a transmission mechanism $2_{22}$ of the automatic transmission $1_{22}$ of the 22nd embodiment in the lateral direction (axial direction) almost as it is.

Figure 33:
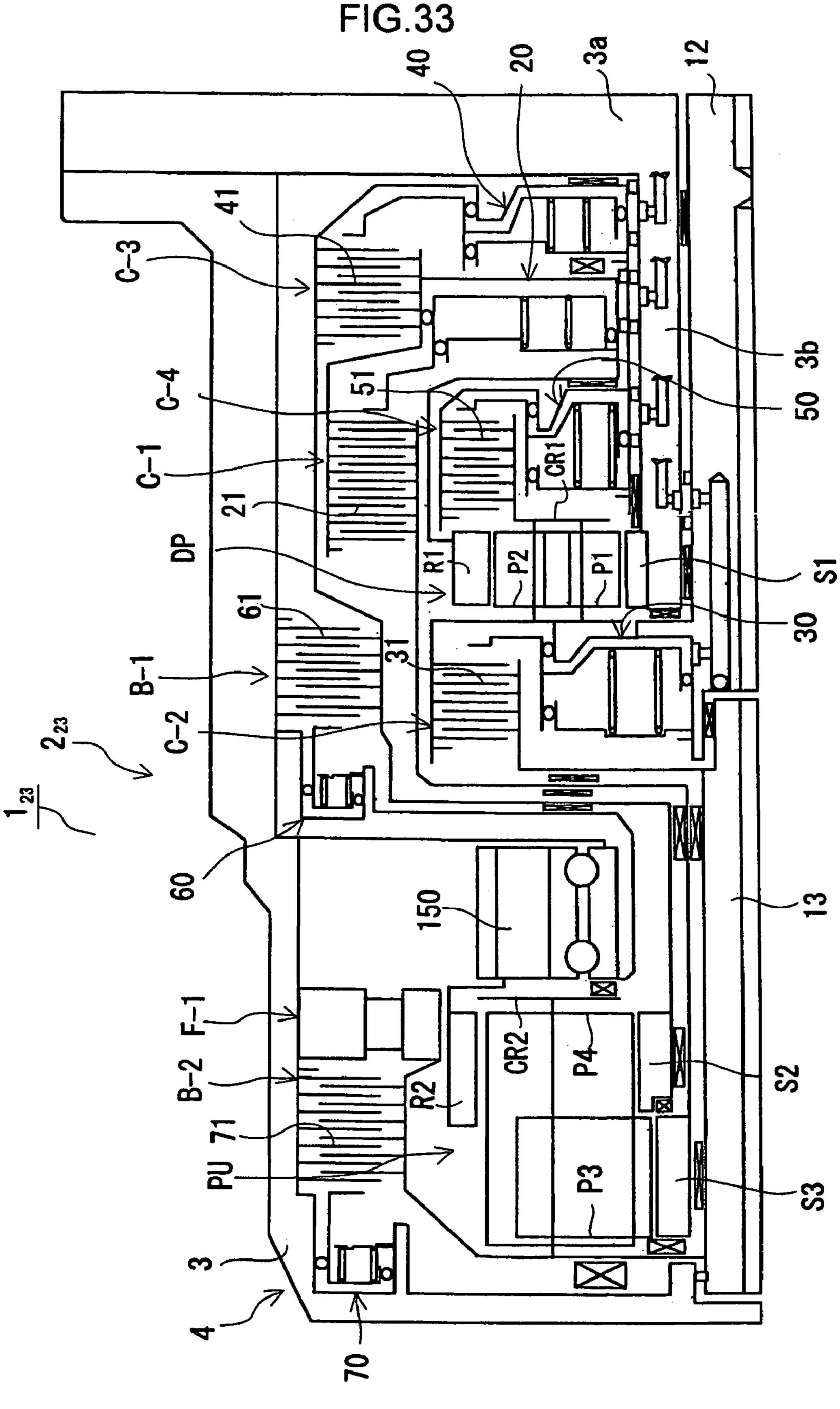
FIG. 33 is a diagrammatic section view showing an automatic transmission according to a 23rd exemplary embodiment.

A 23rd embodiment, which is a partial modification of the 14th embodiment described above, will be explained with reference to FIG. 33. In the 23rd embodiment explained below, only structures or components different from those of the automatic transmission $1_{14}$ of the 14th embodiment will be explained and an explanation of the structures or components other than that will be omitted here because they are almost the same.

As compared to the automatic transmission $1_{14}$ of the 14th embodiment, the automatic transmission $1_{23}$ of the 23rd embodiment is arranged so that the hydraulic servo 20 of the first clutch C-1 is disposed axially on the opposite side of the planetary gear DP from the planetary gear unit PU and the hydraulic servo 30 of the second clutch C-2 is disposed axially between the planetary gear unit PU and the planetary gear DP. More specifically, the hydraulic servo 20 of the first clutch C-1 is disposed axially between the hydraulic servo 50 of the fourth clutch C-4 and the hydraulic servo 40 of the third clutch C-3 and the hydraulic servo 30 of the second clutch C-2 is disposed axially between the counter gear 150 and the planetary gear DP. The multi-plate type brake is used for the first brake B-1 instead of the band brake similar to the first embodiment.

It is noted that an automatic transmission $\mathbf{1}_{68}$ of a 68th embodiment, described later, may be built by inverting a transmission mechanism $\mathbf{2}_{23}$ of the automatic transmission $\mathbf{1}_3$ of the 23rd embodiment in the lateral direction (axial direction) almost as it is and by adding a link member from the second clutch C-2 to the carrier of the planetary gear unit.

Figure 34:
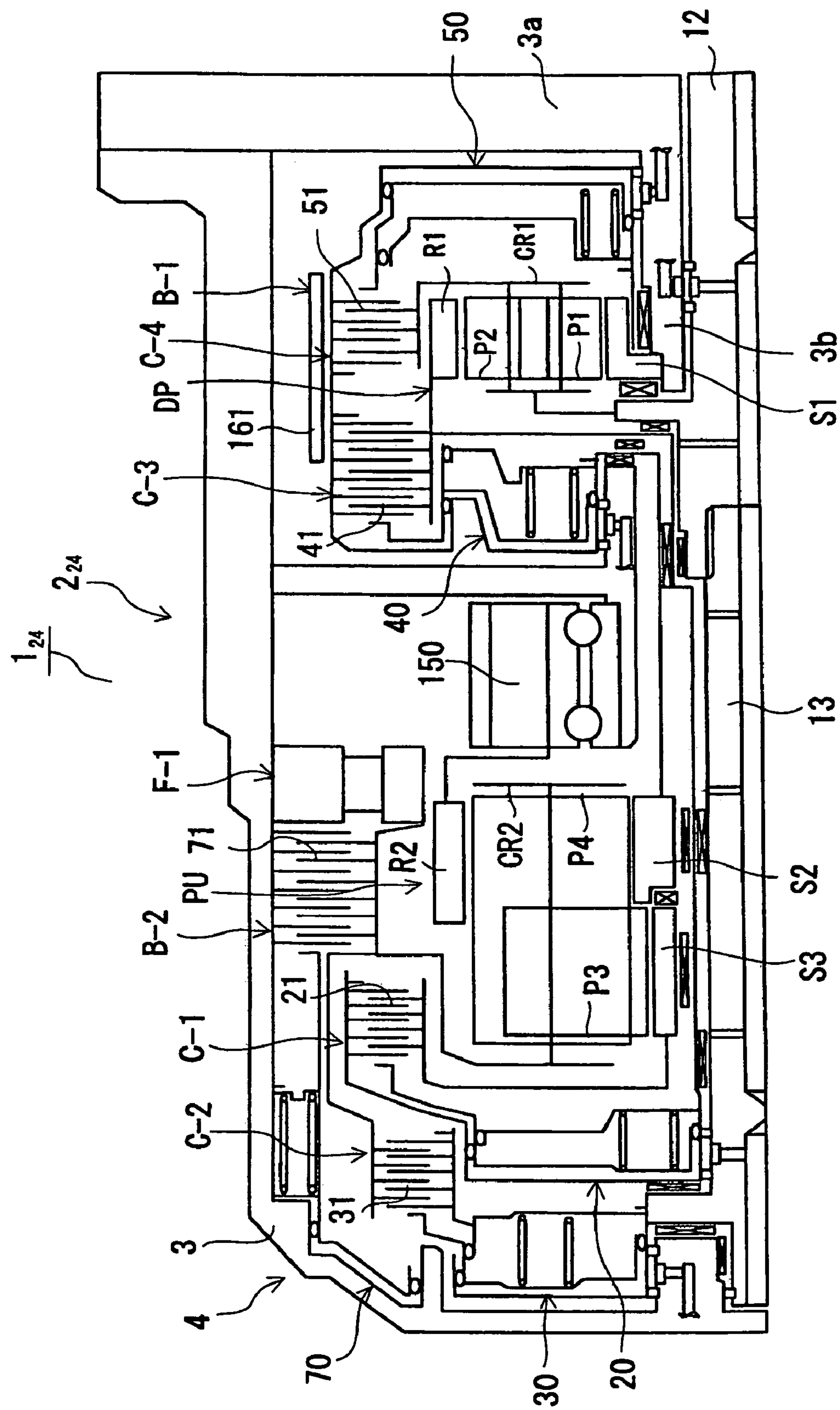
FIG. 34 is a diagrammatic section view showing an automatic transmission according to a 24th exemplary embodiment.

A 24th embodiment, which is a partial modification of the 14th embodiment described above, will be explained with reference to FIG. 34. In the 24th embodiment explained below, only structures or components different from those of the automatic transmission $\mathbf{1}_{14}$ of the 14th embodiment will be explained and an explanation of the structures or components other than that will be omitted here because they are almost the same.

As compared to the automatic transmission $\mathbf{1}_{14}$ of the 14th embodiment, the automatic transmission $\mathbf{1}_{24}$ of the 24th embodiment is arranged so that the hydraulic servo 40 of the third clutch C-3 is disposed axially between the planetary gear unit PU and the planetary gear DP and the hydraulic servo 20 of the first clutch C-1 is disposed axially on the opposite side of the planetary gear unit PU from the planetary gear DP. More specifically, the hydraulic servo 40 of the third clutch C-3 is disposed axially between the counter gear 150 and the planetary gear DP and the hydraulic servo 20 of the first clutch C-1 is disposed axially between the planetary gear unit PU and the hydraulic servo 30 of the second clutch C-2.

It is noted that an automatic transmission $\mathbf{1}_{69}$ of a 69th embodiment, described later, may be built by inverting a transmission mechanism $\mathbf{2}_{24}$ of the automatic transmission $\mathbf{1}_{24}$ of the 24th embodiment in the lateral direction (axial direction) almost as it is.

Figure 35:
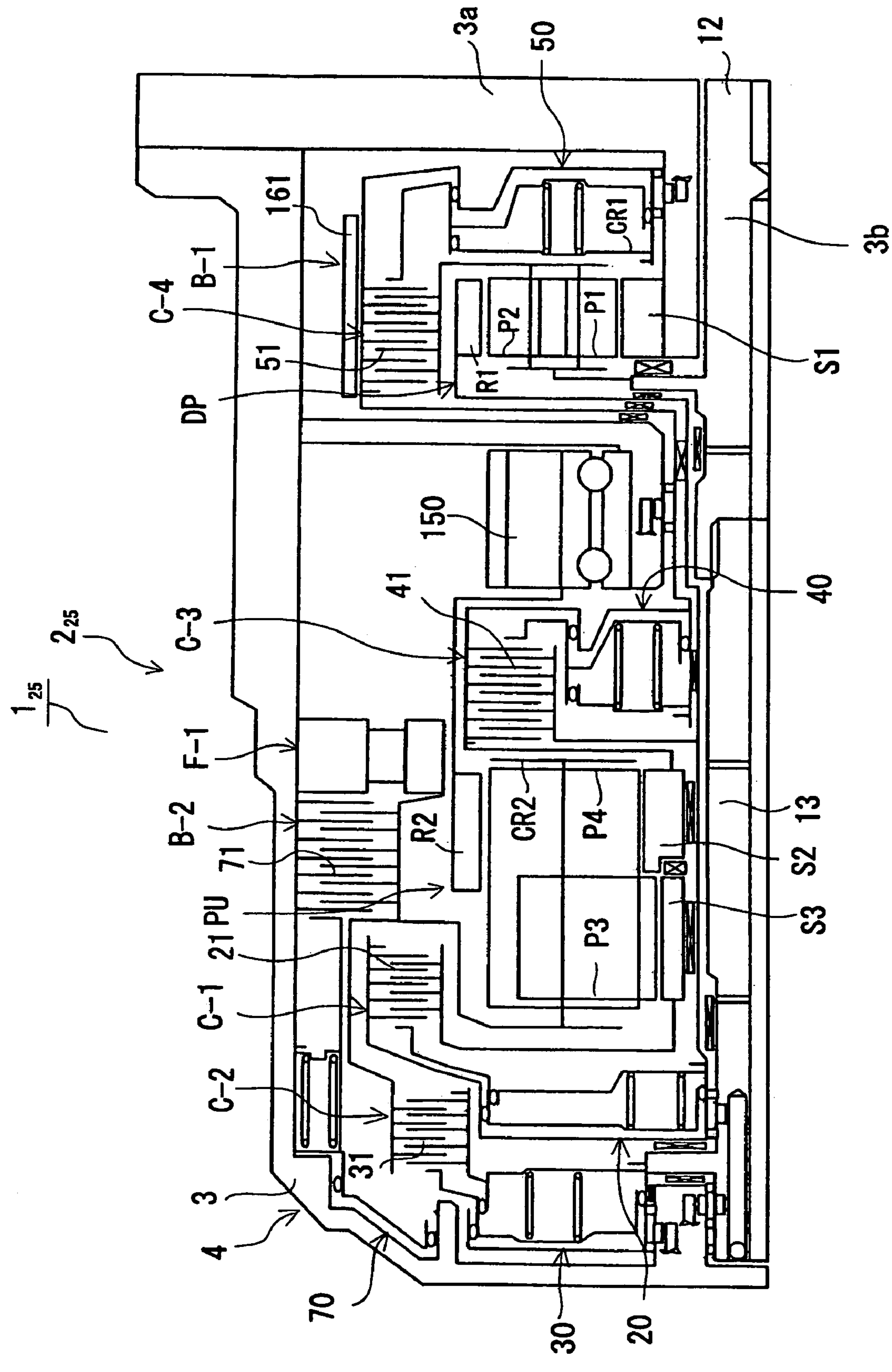
FIG. 35 is a diagrammatic section view showing an automatic transmission according to a 25th exemplary embodiment.

A 25th embodiment, which is a partial modification of the 14th embodiment described above, will be explained with reference to FIG. 35. In the 25th embodiment explained below, only structures or components different from those of the automatic transmission $\mathbf{1}_{14}$ of the 14th embodiment will be explained and an explanation of the structures or components other than that will be omitted here because they are almost the same.

As compared to the automatic transmission $\mathbf{1}_{14}$ of the 14th embodiment, the automatic transmission $\mathbf{1}_{25}$ of the 25th embodiment is arranged so that the hydraulic servo 40 of the third clutch C-3 is disposed axially between the planetary gear unit PU and the planetary gear DP and the hydraulic servo 20 of the first clutch C-1 is disposed axially on the opposite side of the planetary gear unit PU from the planetary gear DP. More specifically, the hydraulic servo 40 of the third clutch C-3 is disposed axially between the counter gear 150 and the planetary gear unit PU and the hydraulic servo 20 of the first clutch C-1 is disposed axially between the planetary gear unit PU and the hydraulic servo 30 of the second clutch C-2.

It is noted that an automatic transmission $\mathbf{1}_{70}$ of a 70th embodiment, described later, may be built by inverting a transmission mechanism $\mathbf{2}_{25}$ of the automatic transmission $\mathbf{1}_{25}$ of the 25th embodiment in the lateral direction (axial direction) almost as it is.

Figure 36:
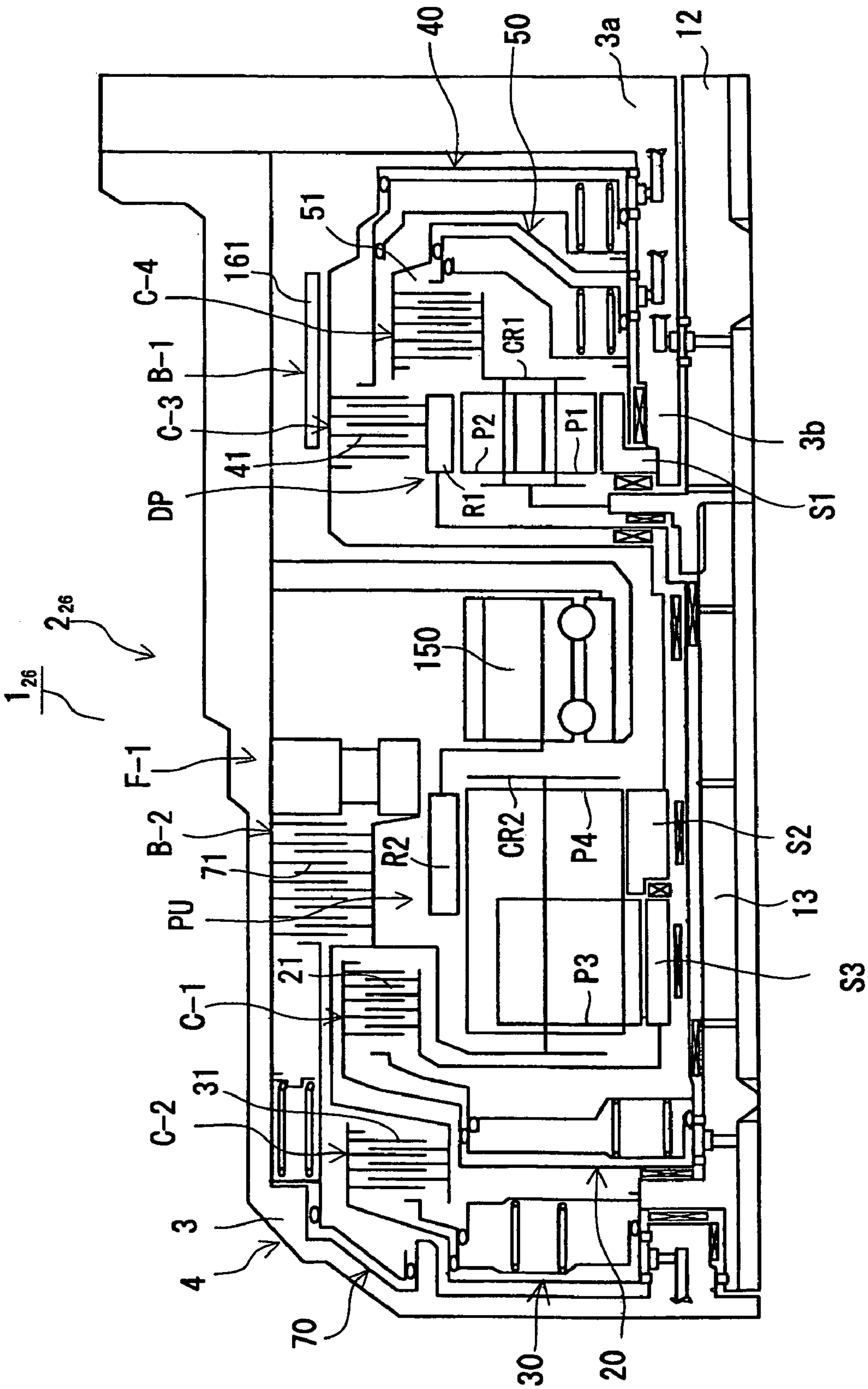
FIG. 36 is a diagrammatic section view showing an automatic transmission according to a 26th exemplary embodiment.

A 26th embodiment, which is a partial modification of the 14th embodiment described above, will be explained with reference to FIG. 36. In the 26th embodiment explained below, only structures or components different from those of the automatic transmission $\mathbf{1}_{14}$ of the 14th embodiment will be explained and an explanation of the structures or components other than that will be omitted here because they are almost the same.

As compared to the automatic transmission $\mathbf{1}_{14}$ of the 14th embodiment, the automatic transmission $\mathbf{1}_{26}$ of the 26th embodiment is arranged so that the hydraulic servo 20 of the first clutch C-1 is disposed axially on the opposite side of the planetary gear unit PU from the planetary gear DP, or more specifically, the hydraulic servo 20 of the first clutch C-1 is disposed axially between the planetary gear unit PU and the hydraulic servo 30 of the second clutch C-2.

It is noted that an automatic transmission $\mathbf{1}_{71}$ of the 71st embodiment, described later, may be built by inverting a transmission mechanism $\mathbf{2}_{26}$ of the automatic transmission $\mathbf{1}_{26}$ of the 26th embodiment in the lateral direction (axial direction) almost as it is.

A 27th embodiment, which is a partial modification of the first through 26th embodiments described above, will be explained with reference to FIG. 37. In the 27th embodiment explained below, components having the same structure with those of the automatic transmissions 1 of the first through 26th embodiments will be denoted by the same reference characters and an explanation thereof will be omitted here, except of partial components such as oil passages, seal rings and hub members.

Figure 37:
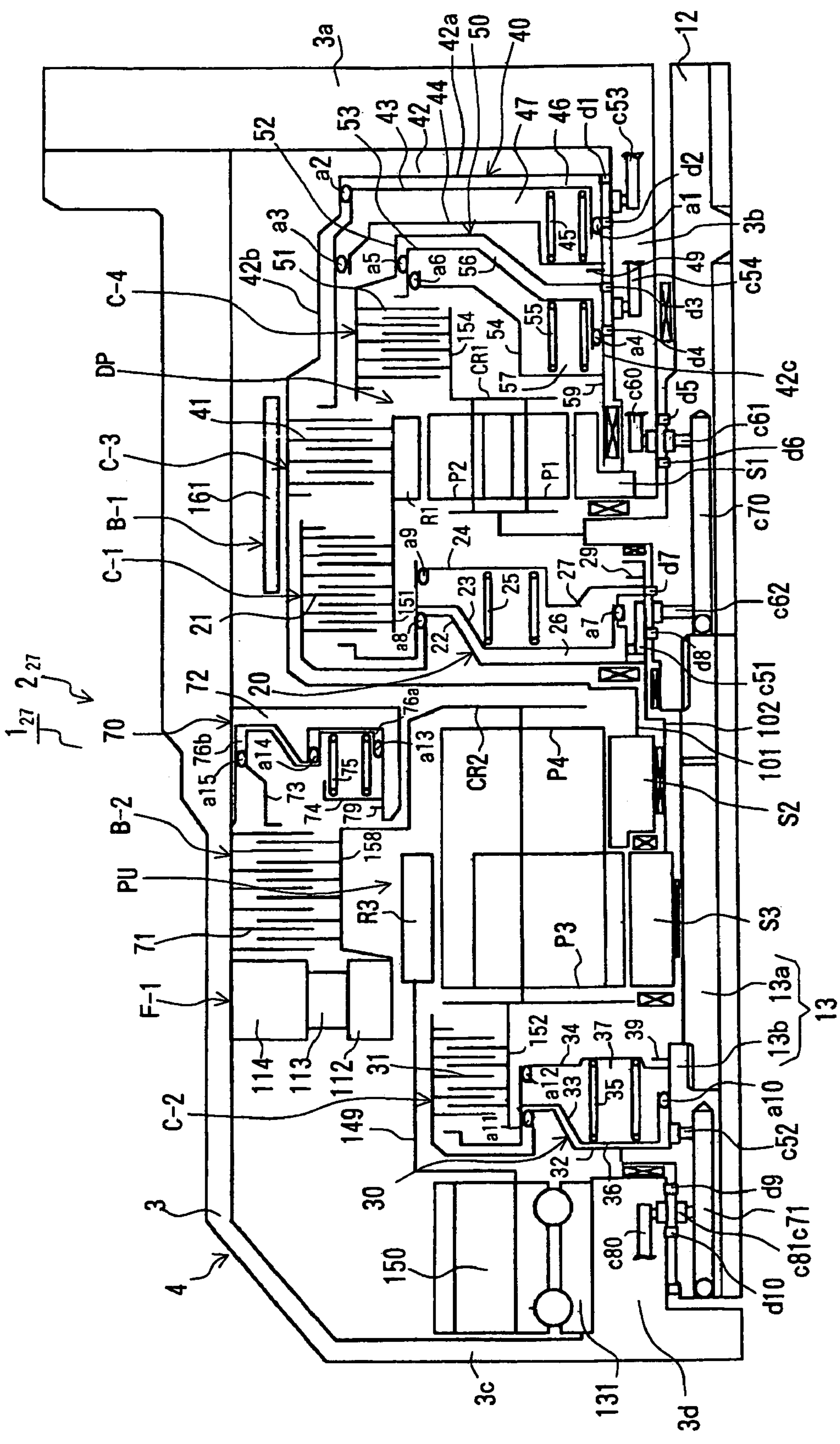
FIG. 37 is a diagrammatic section view showing an automatic transmission according to a 27th exemplary embodiment.

As shown in FIG. 37, the automatic transmission $\mathbf{1}_{27}$ that is suitably mounted in an FF-type (front engine front drive) vehicle has the case 4 formed by connecting the mission case 3, the housing case for housing the torque converter (not shown) and other elements. A transmission mechanism $\mathbf{2}_{27}$, the counter shaft and the differential unit (not shown) are disposed within the mission case 3. The transmission mechanism $\mathbf{2}_{27}$ is disposed on the axis centering on the input shaft 12 and the intermediate shaft 13, which are coaxial with the output shaft of the engine (not shown). The intermediate shaft 13 is composed of a first intermediate shaft **13*a* linked with the input shaft 12 on the right side and a second intermediate shaft 13*b* linked with the first intermediate shaft 13*a* on the left side. That is, the intermediate shaft 13** is composed of two partial shafts.

As shown in FIG. 37, within the mission case 3, the planetary gear unit PU is disposed on the intermediate shaft 13 and the third clutch C-3, the fourth clutch C-4, the planetary gear DP and the first clutch C-1 are disposed axially on the right side (input side) of the planetary gear unit PU in order from the right side. The fourth clutch C-4 and the planetary gear DP are disposed on the inner peripheral side of the clutch drum 42 of the third clutch C-3, described later in detail. Further, the first brake B-1, comprised of a band brake 161, is disposed on the outer peripheral side of the clutch drum 42 of the third clutch C-3.

Meanwhile, the second clutch C-2 and the counter gear 150 are disposed axially on the left side of the planetary gear unit PU in order from the right side. The second brake B-2 and the one-way clutch F-1 are disposed on the outer peripheral side of the planetary gear unit PU.

The friction plates 51 of the fourth clutch C-4, the friction plates 41 of the third clutch C-3 and the friction plates 21 of the first clutch C-1 are disposed relatively on the outer diametric side within the mission case 3 on the input shaft 12 in order from the right side within the inner right part of the mission case 3, i.e., on the right side of the planetary gear unit PU. Further, the brake band 161 of the first brake B-1 is disposed so as to overlap with the outer diametric side of the friction plates 41 of the third clutch C-3 and a part of the friction plates 21 of the first clutch C-1.

Still more, the partition member 3*a* for partitioning the mission case 3 from the housing case (not shown) is secured to the mission case 3 as a part of the case 4 and the hydraulic servo 40 of the third clutch C-3 is disposed on the boss portion 3*b* extending from the partition member 3*a*. Further, the hydraulic servo 50 of the fourth clutch C-4 is disposed on the left side of the hydraulic servo 40, the planetary gear DP is disposed on the inner diametric side of the friction plates 41 and the hydraulic servo 20 of the first clutch C-1 is disposed nearly on the inner diametric side of the friction plates 21. That is, the hydraulic servo 40, the hydraulic servo 50 and the planetary gear DP are disposed in order (in order from the side of the joint of the boss portion 3*b* in the axial direction) on the boss portion 3*b* on the right side of the mission case 3 and the hydraulic servo 20 is disposed on the input shaft 12 in a manner of adjoining with the planetary gear DP.

Meanwhile, the planetary gear unit PU is disposed on the intermediate shaft 13 on the left side of the mission case 3 in the drawing, i.e., on the left side of the hydraulic servo 20 of the first clutch C-1. The friction plates 71 of the second brake B-2 are disposed on left part of the outer peripheral side of the planetary gear unit PU and the hydraulic servo 70 of the second brake B-2 is disposed on the right part of the outer diametric side of the planetary gear unit PU. The friction plates 31 of the second clutch C-2 are disposed on the outer diametric side and the hydraulic servo 30 of the second clutch C-2 is disposed on the inner diametric side on the left side of the planetary gear unit PU. Then, the one-way clutch F-1 is disposed in a manner of overlapping from a part on the outer diametric side of the friction plates 31 to a part on the outer diametric side of the planetary gear unit PU.

A boss portion 3*d* extends from the side wall 3*c* of the mission case 3 on the left side of the hydraulic servo 30 of the second clutch C-2 and the counter gear 150, connected to the ring gear R3 of the planetary gear unit PU via the ball bearing 131, is disposed on the boss portion 3*d* and rotatably supported by the boss portion 3*d*.

As described above, the hydraulic servo 40 of the third clutch C-3 and the hydraulic servo 50 of the fourth clutch C-4 are disposed axially on the opposite side of the planetary gear DP from the planetary gear unit PU, the hydraulic servo 20 of the first clutch C-1 is disposed axially between the planetary gear DP and the planetary gear unit PU and the hydraulic servo 30 of the second clutch C-2 and the counter gear 150 are disposed axially on the opposite side of the planetary gear unit PU from the planetary gear DP.

The planetary gear DP, disposed within the mission case 3, is provided with the sun gear S1, the carrier CR1 and the ring gear R1. Among them, the sun gear S1 is fixed to the boss portion 3*b* extending to the left from the partition member 3*a* described above so as not to be rotatable. The carrier CR1 has the two carrier plates in the lateral direction to rotatably support the pinions P1, P2. While these pinions P1, P2 engage with each other, the former pinion P1 engages with the sun gear S1 and the latter pinion P2 engages with the ring gear R1, respectively. The left carrier plate is connected to the input shaft 12 and the right carrier plate is connected to the hub member 154 spline-coupled with the inner friction plates of the friction plates 51 of the fourth clutch C-4. The inner friction plates of the friction plates 41 of the third clutch C-3 are spline-coupled with the outer peripheral face of the ring gear R1. The hub portion 151 is linked on the left side of the ring gear R1 and the inner friction plates of the friction plates 21 of the first clutch C-1 are spline-coupled with the hub member 151.

The fourth clutch C-4 is disposed on the boss portion 3*b* through an intermediary of the clutch drum 42 of the third clutch C-3 on the right side of the planetary gear DP. The fourth clutch C-4 is provided with the friction plates 51 and the hydraulic servo 50 for engaging/disengaging the friction plates 51. The hydraulic servo 50 has the clutch drum 52, the piston member 53, the cancel plate 54 and the return spring 55 and defines thereby the oil chamber 56 and the cancel oil chamber 57. The inner diametric portion of the clutch drum 52 is linked to the clutch drum 42 of the third clutch C-3 and the outer friction plates of the friction plates 51 are spline-coupled with the inner peripheral face of the outer diametric portion thereof. The piston member 53 is disposed on the left side of the clutch drum 52 so as to be movable in the axial direction and defines the oil-tight oil chamber 56 between it and the clutch drum 52 using the seal rings a4, a5. The cancel plate 54 is blocked from moving to the left by the snap ring 59 fitted to the clutch drum 42. The cancel plate 54 is provided with the return spring 55 in contraction between it and the piston member 53, disposed on the right side thereof, and defines the oil-tight cancel oil chamber 57 by the seal rings a4, a6.

It is noted that because the fourth clutch C-4 is built as described above, the inputted rotation of the carrier CR1 is inputted to the clutch drum 52 when the fourth clutch C-4 engages. The rotation is not inputted to the clutch drum 52 and the hydraulic servo 50 will not rotate when the fourth clutch C-4 is not engaged in Neutral and Parking ranges in particular.

The third clutch C-3 is built so as to surround the right side and the outer peripheral side of the fourth clutch C-4 and is disposed on the boss portion 3*b*. The third clutch C-3 is provided with the friction plates 41 and the hydraulic servo 40 for engaging/disengaging the friction plates 41. The hydraulic servo 40 has the clutch drum 42, the piston member 43, the cancel plate 44 and the return spring 45 and defines the oil chamber 46 and the cancel oil chamber 47 with them. The clutch drum 42 has the flange portion 42*a* disposed on the left side of the partition member 3*a*, the hub portion 42*c* extending to the left from the inner periphery of the flange portion 42*a* and the drum portion 42*b* extending to the left from the outer periphery of the flange portion 42*a*. Among them, the outer peripheral face of the boss portion 3*b* extending from the partition member 3*a* to the left side rotatably supports the hub portion 42*c*. The end of the hub portion 42*c* of the clutch drum 42 is positioned on the left side of the fourth clutch C-4 and the hydraulic servo 50 of the fourth clutch C-4 is disposed on the outer peripheral side thereof. The drum portion 42*b* of the clutch drum 42 extends to the outer diametric side of the first clutch C-1 by passing through the outer diametric side of the fourth clutch C-4. The brake band 161 of the first brake B-1, comprising the band brake, is disposed on the outer peripheral face of the drum portion 42*b* of the clutch drum 42, the outer friction plates of the friction plates 41 are spline-coupled with the part corresponding to the ring gear R1 and the link member 101 is linked at the left part thereof. The link member 101 extends to the inner diametric side via the outer diametric side and the left side of the first clutch C-1 and is linked to the sun gear S2.

The piston member 43 of the third clutch C-3 is disposed so as to be movable with respect to the clutch drum 42 and defines the oil-tight oil chamber 46 between it and the clutch drum 42 using the seal rings a1, a2. Further, the outer diametric portion of the piston member 43 extends to the left by passing the outer peripheral side of the clutch drum 52 and the inner peripheral side of the clutch drum 42 of the third clutch C-3 so that its end faces to the friction plates 41. The cancel plate 44 is blocked from moving to the left side by the snap ring 49 fitted to the outer peripheral face of the inner diametric side of the clutch drum 42. The cancel plate 44 is provided with the return spring 45 in contraction between it and the piston member 43, disposed on the right side thereof, and defines the oil-tight cancel oil chamber 47 using the seal rings a1, a3.

It is noted that because the third clutch C-3 is built as described above, the reduced rotation of the ring gear R1 is inputted to the clutch drum 42 when the third clutch C-3 engages. Accordingly, the rotation is not inputted to the clutch drum 42 and the hydraulic servo 40 will not rotate when the third clutch C-3 is not engaged, especially in Neutral and Parking ranges.

The first clutch C-1 is disposed on the input shaft 12 on the left side of the planetary gear DP and the friction plates 41 of the third clutch C-3 and is provided with the friction plates 21 and the hydraulic servo 20 for engaging/disengaging the friction plates 21. The inner friction plates of the friction plates 21 are spline-coupled with the outer peripheral face of the hub member 151 linked to the ring gear R1. The outer friction plates of the friction plates 21 are spline-coupled with the inner peripheral side of the clutch drum 22 described later and the clutch drum 22 is linked to the link member 102. The link member 102 is then linked to the sun gear S3.

The hydraulic servo 20 has the clutch drum 22, the piston member 23, the cancel plate 24 and the return spring 25 and defines the oil chamber 26 and the cancel oil chamber 27 with them. The clutch drum 22 is attached to the outer peripheral face of the left side of the input shaft 12 so as to be relatively rotatable. The piston member 23 is disposed in the clutch drum 22 so as to be movable in the axial direction and composes the oil-tight oil chamber 26 between it and the clutch drum 22 using the seal rings a7, a8. A part of the piston member 23 on the outer peripheral side faces to the front face of the friction plates 21. The cancel plate 24 is blocked from moving to the right side by the snap ring 29 fitted around the outer peripheral face on the inner diametric side of the clutch drum 22. The cancel plate 24 is provided with the return spring 25 in contraction between it and the piston member 23, disposed on the left side thereof, and defines the oil-tight cancel oil chamber 27 using the seal rings a7, a9.

The first brake B-1 is disposed on the outer diametric side of the clutch drum 42 and is provided with a hydraulic servo (not shown) and set so as not to be rotatable with respect to the mission case 3 and the brake band 161 is for fastening and releasing the outer peripheral part of the clutch drum 42 by the hydraulic servo.

The second brake B-2 is disposed on the outer diametric side of the planetary gear unit PU. The second brake B-2 has the friction plates 71 and the hydraulic servo 70 for engaging/disengaging the friction plates 71. The outer friction plates of the friction plates 71 are spline-coupled with the inner peripheral face of the mission case 3 and the inner friction plates are spline-coupled with the hub member 158 linked to the carrier CR2 of the planetary gear unit PU.

The hydraulic servo 70 has the drum-like cylinder member 72, the piston member 73, the cancel plate 74 and the return spring 75 and defines the oil chamber 76 between the piston member 73 and the cylinder member 72. The piston member 73 is movably disposed in the axial direction and its left end faces to the friction plates 71. Oil-tight oil chambers 76*a*, 76*b* are formed between the piston member 73 and the cylinder member 72 by three seal rings a13, a14, a15. The cancel plate 74 is blocked from moving to the left by a snap ring 79 fitted into the inner peripheral face of the cylinder member 72.

The one-way clutch F-1 is disposed so as to overlap from the outer diametric side of the planetary gear unit PU to the outer diametric side of the second clutch C-2 and on the left side of the second brake B-2 and is provided with the inner race 112 linked to the hub member 158, the sprag mechanism 113 and the outer race 114 spline-coupled with the inner peripheral side of the mission case 3, in order from the inner peripheral side to the outer peripheral side.

The second clutch C-2 is disposed on the left side of the planetary gear unit PU and on the inner diametric side of a part of the one-way clutch F-1 and is provided with the friction plates 31 and the hydraulic servo 30 for engaging/disengaging the friction plates 31. The inner friction plates of the friction plates 31 are spline-coupled with the hub member 152 that is linked to the carrier CR2. The outer friction plates of the friction plates 31 are spline-coupled with the inner peripheral side of the clutch drum 32 and the clutch drum 32 is linked with the second intermediate shaft 13*b*. The second intermediate shaft 13*b* is spline-coupled with the input shaft 12 through an intermediary of the first intermediate shaft 13*a*. That is, the clutch drum 32 is linked to the input shaft 12 through an intermediary of the intermediate shaft 13 comprising the first and second intermediate shafts 13*a*, 13*b*.

The hydraulic servo 30 has the clutch drum 32, the piston member 33, the cancel plate 34 and the return spring 35 and defines the oil chamber 36 and the cancel oil chamber 37 with them. The inner peripheral side of the clutch drum 32 is attached to and supported by the second intermediate shaft 13*b*. The piston member 33 is disposed in the clutch drum 32 movably in the axial direction and composes the oil-tight oil chamber 36 between it and the clutch drum 32 using the seal rings a10, all. The part of the piston member 33 on the outer peripheral side faces to the front face of the friction plates 31. Further, the cancel plate 34 is blocked from moving to the right side by the snap ring 39 fitted around the outer peripheral face on the inner diametric side of the clutch drum 32. The clutch drum 32 is provided with the return spring 35 in contraction between it and the piston member 33 disposed on the left side thereof and defines the oil-tight cancel oil chamber 37 using the seal rings a10, a12.

The counter gear 150 is disposed on the boss portion 130*a* extending from the side wall 3*c* of the mission case 3 through an intermediary of a ball bearing 131. It is noted that the gear linked to the counter shaft (not shown) is engaged with the outer peripheral side of the counter gear 150 and the counter shaft is linked with driving wheels through an intermediary of gear mechanisms and differential gears (not shown).

The structure of each oil passage and the supply of operating fluid will be briefly explained. The oil chamber 56 of the hydraulic servo 50 of the fourth clutch C-4, i.e., the oil chamber 56 formed by sealing the part between the clutch drum 52 and the piston member 53 by the seal rings a4, a5, is arranged so as to communicate with the oil passage c54 within the boss portion 3*b* by sealing the part between the clutch drum 52 and the boss portion 3*b* by the seal rings d3, d4. Operating fluid is supplied from the oil passage c54. It is noted that operating fluid is supplied from the oil passage (not shown) to the cancel oil chamber 57 formed by sealing the part between the piston member 53 and the cancel plate 54 by the seal rings a4, a6.

The oil chamber 46 of the hydraulic servo 40 of the third clutch C-3, i.e., the oil chamber 46 formed by sealing the part between the clutch drum 42 and the piston member 43 by the seal rings a1, a2, is arranged so as to communicate with the oil passage c53 within the boss portion 3*b* by sealing the part between the clutch drum 42 and the boss portion 3*b* by the seal rings d1, d2. Operating fluid is supplied thereto from the oil passage c53. It is noted that operating fluid is supplied from the oil passage (not shown) to the cancel oil chamber 47 formed by sealing the part between the piston member 43 and the cancel plate 44 by the seal rings a1, a3.

The oil chamber 26 of the hydraulic servo 20 of the first clutch C-1, i.e., the oil chamber 26 formed by sealing the part between the clutch drum 22 and the piston member 23 by the seal rings a7, a8, is arranged so as to communicate with the oil passage c60 within the boss portion 3*b* by sealing the part between the boss portion 3*b* and the input shaft 12 by the seal rings d5, d6 and the part between the input shaft 12 and the clutch drum 22 by the seal rings d7, d8, respectively, via the oil passages c61, c70, c62 within the input shaft 12 and the oil passage c51 and operating fluid is supplied thereto from the oil passage c51. It is noted that operating fluid is supplied from the oil passage (not shown) to the cancel oil chamber 27 formed by sealing the part between the piston member 23 and the cancel plate 24 by the seal rings a7, a9.

The oil chamber 36 of the hydraulic servo 30 of the second clutch C-2, i.e., the oil chamber 36 formed by sealing the part between the clutch drum 32 and the piston member 33 by the seal rings a10, a11, is arranged so as to communicate with the oil passage c80 within the boss portion 3*b* by sealing the part between the boss portion 3*d* and the second intermediate shaft 13*b* by the seal rings d9, d10. Operating fluid is supplied thereto from the oil passage c80. It is noted that operating fluid is supplied from the oil passage (not shown) to the cancel oil chamber 37 formed by sealing the part between the piston member 33 and the cancel plate 34 by the seal rings a10, a12.

Operating fluid is supplied from two oil passages formed within the mission case 3 (not shown) to the two oil chambers 76*a*, 76*b* of the hydraulic servo 70 of the second brake B-2, i.e., to the oil chambers 76*a*, 76*b* formed by sealing the part between the cylinder member 72 and the piston member 73 by the seal rings a13, a14, a15, respectively. It is noted that the second brake B-2 is allowed to press and control the piston member 73 stepwise based on hydraulic pressure of the operating fluid supplied to the two oil chambers 76*a*, 76*b*, so that it is capable of controlling the torque capacity of the second brake B-2 more finely and accurately.

According to the automatic transmission $\mathbf{1}_{27}$ described above, the fourth clutch C-4 is linked with the sun gear S2 of the planetary gear unit PU via the output side members (clutch drum 42 and the link member 102) of the third clutch C-3, so that the output side members turn out to be output side members of the two clutches transmitting different rotations, i.e., they may be shared in common as one rotary member. Thereby, the automatic transmission $\mathbf{1}_{27}$ may be compactly built.

Further, because the hydraulic servo 50 of the fourth clutch C-4 is disposed axially on the opposite side of the planetary gear DP from the planetary gear unit PU and on the boss portion 3*b* extending from the case 4 to supply the operating fluid to the hydraulic servo 50 of the fourth clutch C-4 from the oil passage within the boss portion 3*b*, the number of seal rings can be reduced as compared to a case of disposing the hydraulic servo 50 of the fourth clutch C-4 on the input shaft 12 through an intermediary of a member having another speed of rotation, i.e., as compared to a case of supplying the operating fluid via the other member for example. Thereby, it becomes possible to prevent the drop in the efficiency and controllability of the automatic transmission $\mathbf{1}_{27}$.

Because the planetary gear DP, the first clutch C-1, the third and fourth clutches C-3, C-4 are disposed axially on one side of the planetary gear unit PU and the planetary gear DP and the fourth clutch C-4 are disposed on the inner peripheral side of the clutch drum 42 of the third clutch C-3, it becomes possible to increase the area of the friction plates 21, 41 of the first and third clutches C-1, C-3. That is, even though the capacity of the first clutch C-1 and the third clutch C-3 for transmitting the reduced rotation may be increased, the fourth clutch C-4 and the planetary gear DP, whose transmittable torque capacity can be relatively small for transmitting the inputted rotation, may be disposed on the inner peripheral side of the clutch drum 42 of the third clutch C-3. Accordingly, the automatic transmission $\mathbf{1}_{27}$ that is capable of attaining the multi-stage shifts, such as the forward eighth speed stage and the reverse second speed stage, may be compactly built.

Further, because the hydraulic servo 20 of the first clutch C-1 is disposed on the input shaft 12 and adjacent to the planetary gear DP and the operating fluid is supplied to the hydraulic servo 20 of the first clutch C-1 from the oil passage provided within the input shaft 12, the operating fluid may be supplied just by providing pairs of seal rings d5, d6 and d7, d8 along the oil passage for supplying the operating fluid from the hydraulic control unit, i.e., between the oil passage within the boss portion 3*b* and the input shaft 12 and between the hydraulic servo 20 of the first clutch C-1 and the input shaft 12. Accordingly, the number of seal rings can be reduced as compared to a case of supplying operating fluid via another member for example. Thereby, it becomes possible to prevent the drop of the efficiency and controllability of the vehicular automatic transmission $\mathbf{1}_{27}$.

Although the increase of radial size of the first clutch C-1 to the outer peripheral side is limited because the third and fourth clutches C-3, C-4 are linked to the sun gear S2 of the planetary gear unit PU along the outer peripheral side of the first clutch C-1 and the link member 101 and others for linking the third and fourth clutches C-3, C-4 with the sun gear S2 of the planetary gear unit PU pass along the outer peripheral side of the first clutch C-1, the capacity of the first clutch C-1 may be maintained by increasing the size in the inner radial direction because the first clutch C-1 is disposed on the input shaft 12 as compared to a case of disposing it on the boss portion 3*b*.

Still further, because the sun gear S2 of the planetary gear unit PU is capable of transmitting the inputted rotation in connection with the fourth clutch C-4, is capable of transmitting the reduced rotation in connection with the third clutch C-3, and is capable of fixing the rotation in connection with the first brake B-1; the sun gear S3 is capable of transmitting the reduced rotation in connection with the first clutch C-1; the carrier CR2 is capable of transmitting the inputted rotation in connection with the second clutch C-2 and is capable of fixing the rotation in connection with the second brake B-2; and the ring gear R2 is linked to the counter gear 150, the multi-stage shifts, such as the forward eighth speed stage and the reverse second speed stage, may be attained.

Further, because the friction plates 41 of the third clutch C-3 are disposed on the outer peripheral side of the ring gear R1 and the fourth clutch C-4 is disposed axially between the hydraulic servo 40 of the third clutch C-3 and the friction plates 41 of the third clutch C-3, it is possible to prevent the fourth clutch C-4 from radially overlapping with the hydraulic servo 40 or the friction plates 41 of the third clutch C-3. Accordingly, because the radial size of the fourth clutch C-4 may be increased as compared to a case of disposing it on the inner peripheral side of the third clutch C-3, the capacity of the fourth clutch C-4 may be maintained and the vehicular automatic transmission $\mathbf{1}_{27}$ may be compactly built in the axial direction as a result.

Additionally, although the first brake B-1 is disposed on the outer peripheral side of the friction plates 41 of the third clutch C-3 in the present embodiment, it is also possible to dispose the first brake B-1 on the outer peripheral side of the hydraulic servo 40 of the third clutch C-3. Accordingly, it is possible to build the vehicular automatic transmission 127 compactly in the radial direction while maintaining the capacity of the first brake B-1 and reducing the size thereof by disposing the first brake B-1 at the position overlapping with the third clutch C-3.

Further, because the automatic transmission $\mathbf{1}_{27}$ is built so that the reduced rotation of the ring gear R1 is inputted to the clutch drum 42, forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Also, because the automatic transmission $\mathbf{1}_{27}$ is built so that the inputted rotation is inputted to the clutch drum 52 forming the hydraulic servo 50 of the fourth clutch C-4 via the carrier CR1 when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the rotation of the entire hydraulic servo 50 of the fourth clutch C-4 and to prevent dragging of the fourth clutch C-4 which is otherwise caused by a centrifugal hydraulic pressure generated in the oil chamber 56.

Because the second clutch C-2 is disposed axially on the opposite side of the planetary gear unit PU from the planetary gear DP, the second clutch C-2 may be linked with the carrier CR2 without becoming entangled with the members for linking the first clutch C-1 with the sun gear S3 and for linking the third clutch C-3 with the sun gear S2, for example.

In addition, because the counter gear 150 is disposed axially on the opposite side of the planetary gear unit PU from the planetary gear DP and is disposed axially at the end position (the left side in the figure) on the opposite side from the input shaft 12 in particular, the vehicular automatic transmission $\mathbf{1}_{27}$ suitably used for the FF-type vehicles may be readily converted to be used for the FR-type vehicles.

It is noted that a nearly similar transmission with the vehicular automatic transmission $\mathbf{1}_{27}$ of the 27th embodiment may be built by changing the part of the output shaft 15 of the vehicular automatic transmission $\mathbf{1}_{1}$ of the first embodiment with the counter gear 150.

An automatic transmission $\mathbf{1}_{44}$ of the 44th embodiment, described later, may be built by inverting the transmission mechanism $\mathbf{2}_{27}$ of the automatic transmission $\mathbf{1}_{27}$ of the 27th embodiment in the lateral direction (axial direction) almost as it is.

Figure 38:
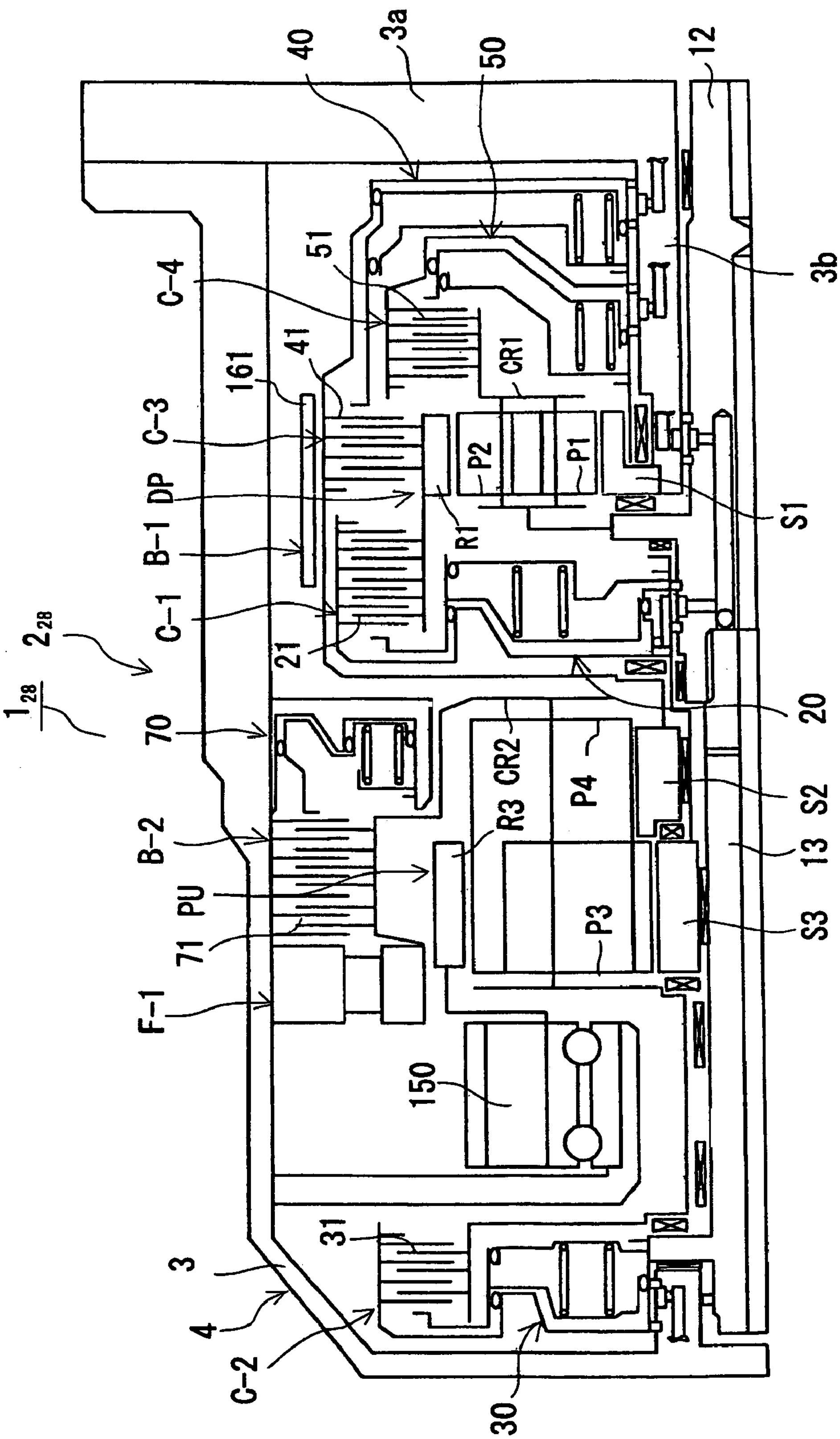
FIG. 38 is a diagrammatic section view showing an automatic transmission according to a 28th exemplary embodiment.

A 28th embodiment, which is a partial modification of the 27th embodiment described above, will be explained with reference to FIG. 38. In the 28th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{28}$ of the 28th embodiment is arranged so that the lateral (axial) position of the counter gear 150 and the hydraulic servo 30 of the second clutch C-2 is switched.

Although it becomes impossible to readily convert the automatic transmission $\mathbf{1}_{28}$ of the 28th embodiment into an vehicular automatic transmission for use in FR-type vehicles as compared to the 27th embodiment, the number of seal rings can be reduced because the hydraulic servo 30 of the second clutch C-2 is disposed on the boss portion 3*d* and operating fluid may be supplied from the boss portion just by providing one pair of seal rings.

It is noted that an automatic transmission $\mathbf{1}_{43}$ of the 43rd embodiment, described later, may be built by inverting a transmission mechanism $\mathbf{2}_{28}$ of the automatic transmission $\mathbf{1}_{28}$ of the 28th embodiment in the lateral direction (axial direction) almost as it is.

Figure 39:
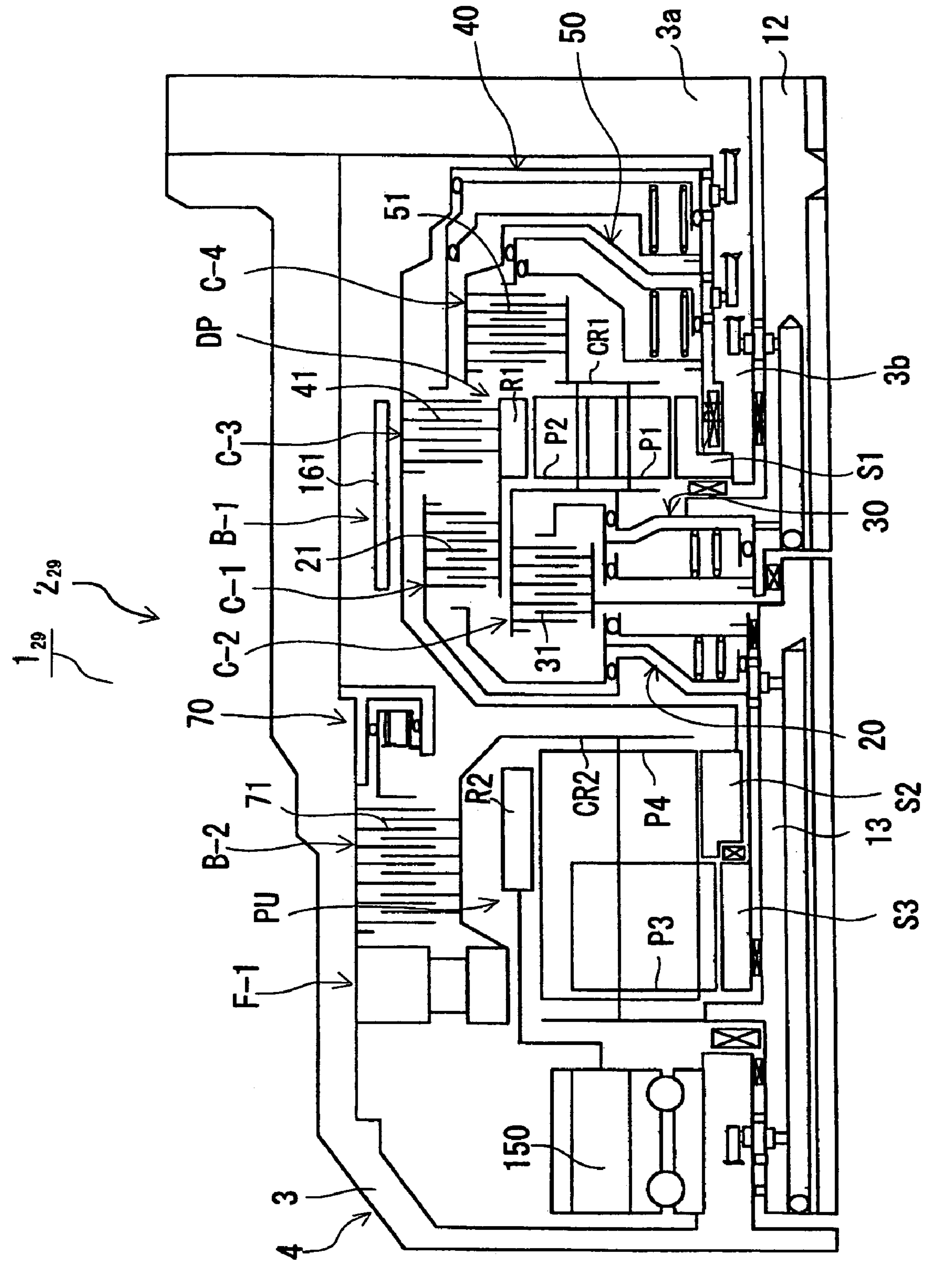
FIG. 39 is a diagrammatic section view showing an automatic transmission according to a 29th exemplary embodiment.

A 29th embodiment, which is a partial modification of the 27th embodiment described above, will be explained with reference to FIG. 39. In the 29th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{29}$ of the 29th embodiment is arranged so that the hydraulic servo 30 of the second clutch C-2 is disposed axially between the planetary gear unit PU and the planetary gear DP, or more specifically, axially between the planetary gear DP and the hydraulic servo 20 of the first clutch C-1.

It is noted that an automatic transmission $\mathbf{1}_{45}$ of a 45th embodiment, described later, may be built by inverting a transmission mechanism $\mathbf{2}_{29}$ of the automatic transmission $\mathbf{1}_{29}$ of the 29th embodiment in the lateral direction (axial direction) almost as it is.

Figure 40:
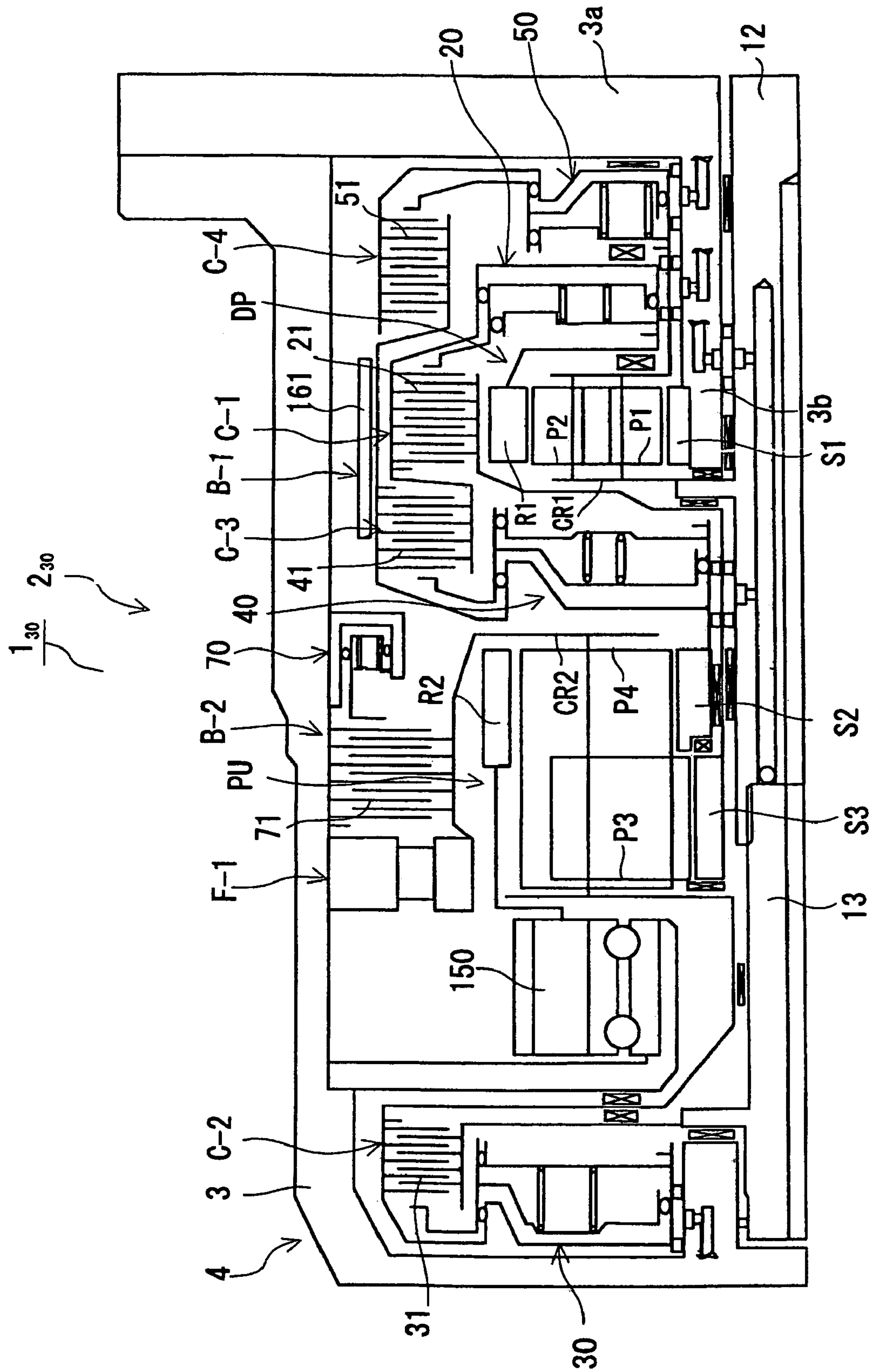
FIG. 40 is a diagrammatic section view showing an automatic transmission according to a 30th exemplary embodiment.

A 30th embodiment, which is a partial modification of the 27th embodiment described above, will be explained with reference to FIG. 40. In the 30th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{30}$ of the 30th embodiment is arranged so that the lateral (axial) position of the counter gear 150 and the hydraulic servo 30 of the second clutch C-2 is switched and the lateral (axial) position of the hydraulic servo 30 of the second clutch C-2 and the hydraulic servo 40 of the third clutch C-3 is switched. That is, the hydraulic servo 40 of the third clutch C-3 is disposed axially between the planetary gear DP and the planetary gear unit PU and the hydraulic servo 20 of the first clutch C-1 is disposed axially on the opposite side of the planetary gear DP from the planetary gear unit PU. Specifically, the hydraulic servo 20 of the first clutch C-1 is disposed axially between the planetary gear DP and the hydraulic servo 50 of the fourth clutch C-4.

It is noted that an automatic transmission $\mathbf{1}_{46}$ of a 46th embodiment, described later, may be built by inverting a transmission mechanism $\mathbf{2}_{30}$ of the automatic transmission $\mathbf{1}_{30}$ of the 30th embodiment in the lateral direction (axial direction) almost as it is.

Figure 41:
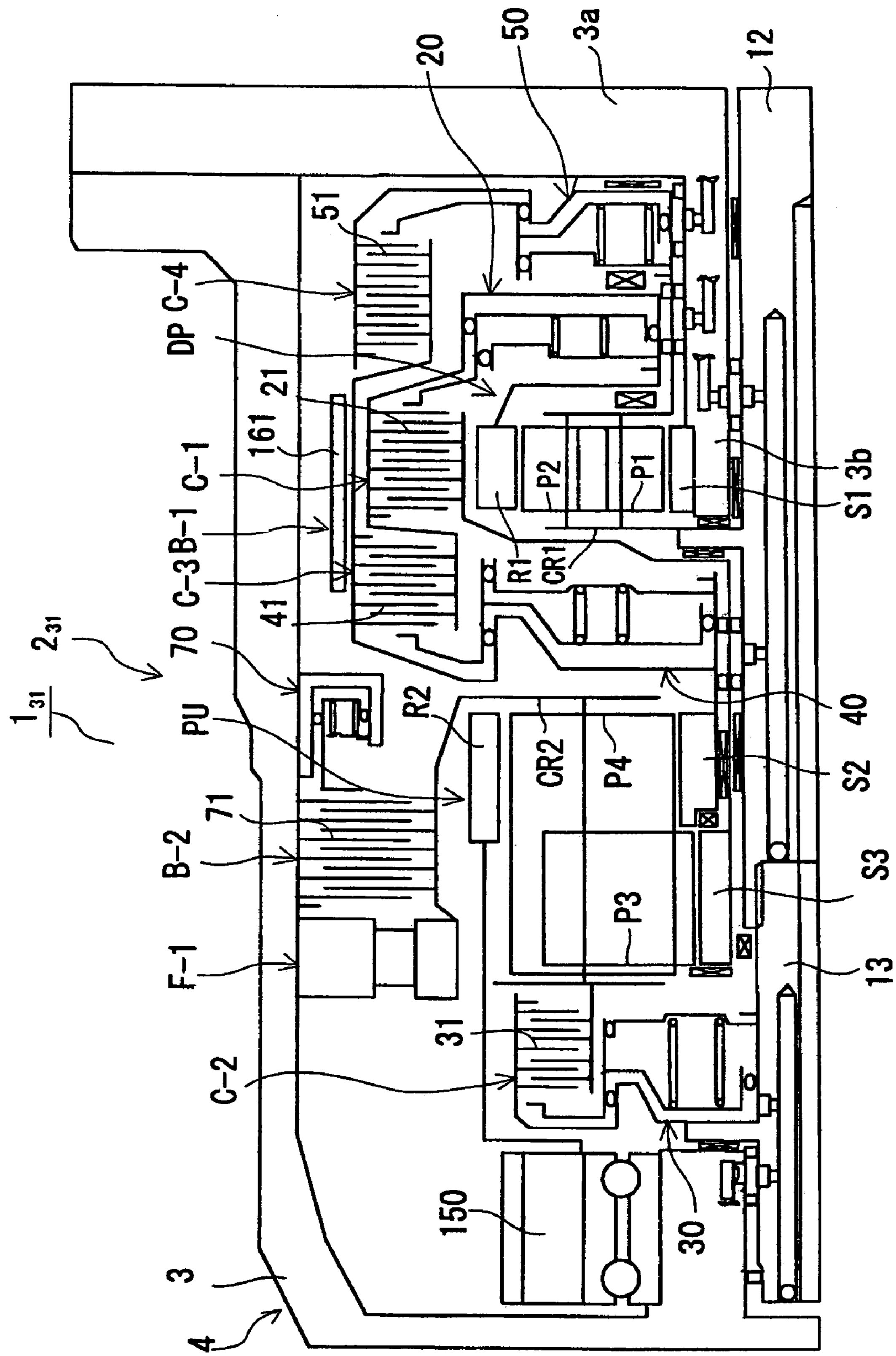
FIG. 41 is a diagrammatic section view showing an automatic transmission according to a 31st exemplary embodiment.

A 31st embodiment, which is a partial modification of the 27th embodiment described above, will be explained with reference to FIG. 41. In the 31st embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{31}$ of the 31st embodiment is arranged so that the lateral (axial) position of the hydraulic servo 20 of the first clutch C-1 and the hydraulic servo 40 of the third clutch C-3 is switched, i.e., the hydraulic servo 40 of the third clutch C-3 is disposed axially between the planetary gear DP and the planetary gear unit PU and the hydraulic servo 20 of the first clutch C-1 is disposed axially on the opposite side of the planetary gear DP from the planetary gear unit PU. Specifically, the hydraulic servo 20 of the first clutch C-1 is disposed axially between the planetary gear DP and the hydraulic servo 50 of the fourth clutch C-4.

It is noted that an automatic transmission $\mathbf{1}_{47}$ of a 47th embodiment, described later, may be built by inverting a transmission mechanism $\mathbf{2}_{31}$ of the automatic transmission $\mathbf{1}_{31}$ of the 31st embodiment in the lateral direction (axial direction) almost as it is.

Figure 42:
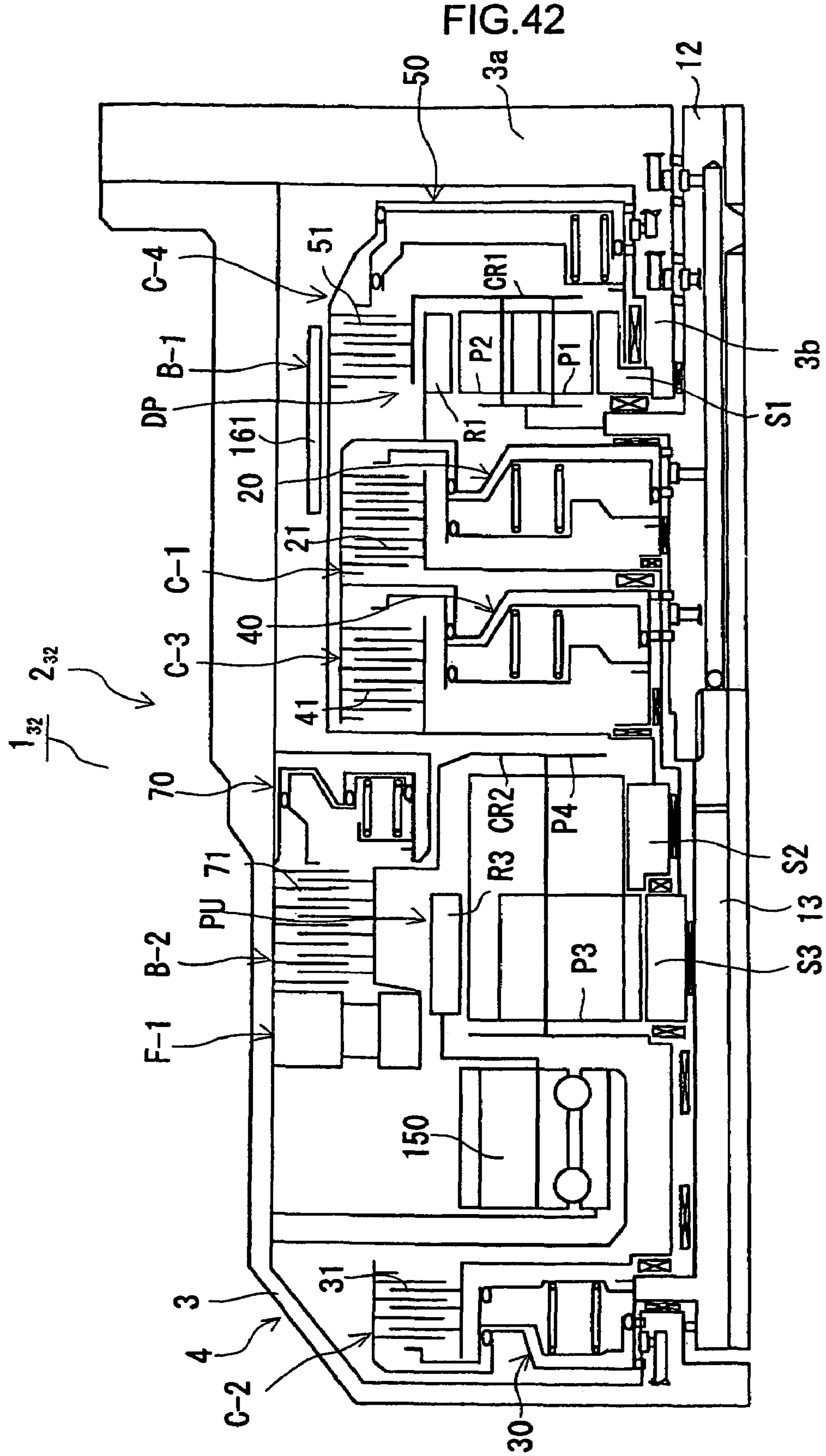
FIG. 42 is a diagrammatic section view showing an automatic transmission according to a 32nd exemplary embodiment.

A 32nd embodiment, which is a partial modification of the 27th embodiment described above, will be explained with reference to FIG. 42. In the 32nd embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{32}$ of the 32nd embodiment is arranged so that the lateral (axial) position of the counter gear 150 and the hydraulic servo 30 of the second clutch C-2 is switched and the hydraulic servo 40 of the third clutch C-3 is disposed axially between the planetary gear DP and the planetary gear unit PU, or more specifically, axially between the hydraulic servo 20 of the first clutch C-1 and the planetary gear unit PU.

It is noted that an automatic transmission $\mathbf{1}_{48}$ of a 48th embodiment, described later, may be built by inverting a transmission mechanism $\mathbf{2}_{32}$ of the automatic transmission $\mathbf{1}_{32}$ of the 32nd embodiment in the lateral direction (axial direction) almost as it is.

Figure 43:
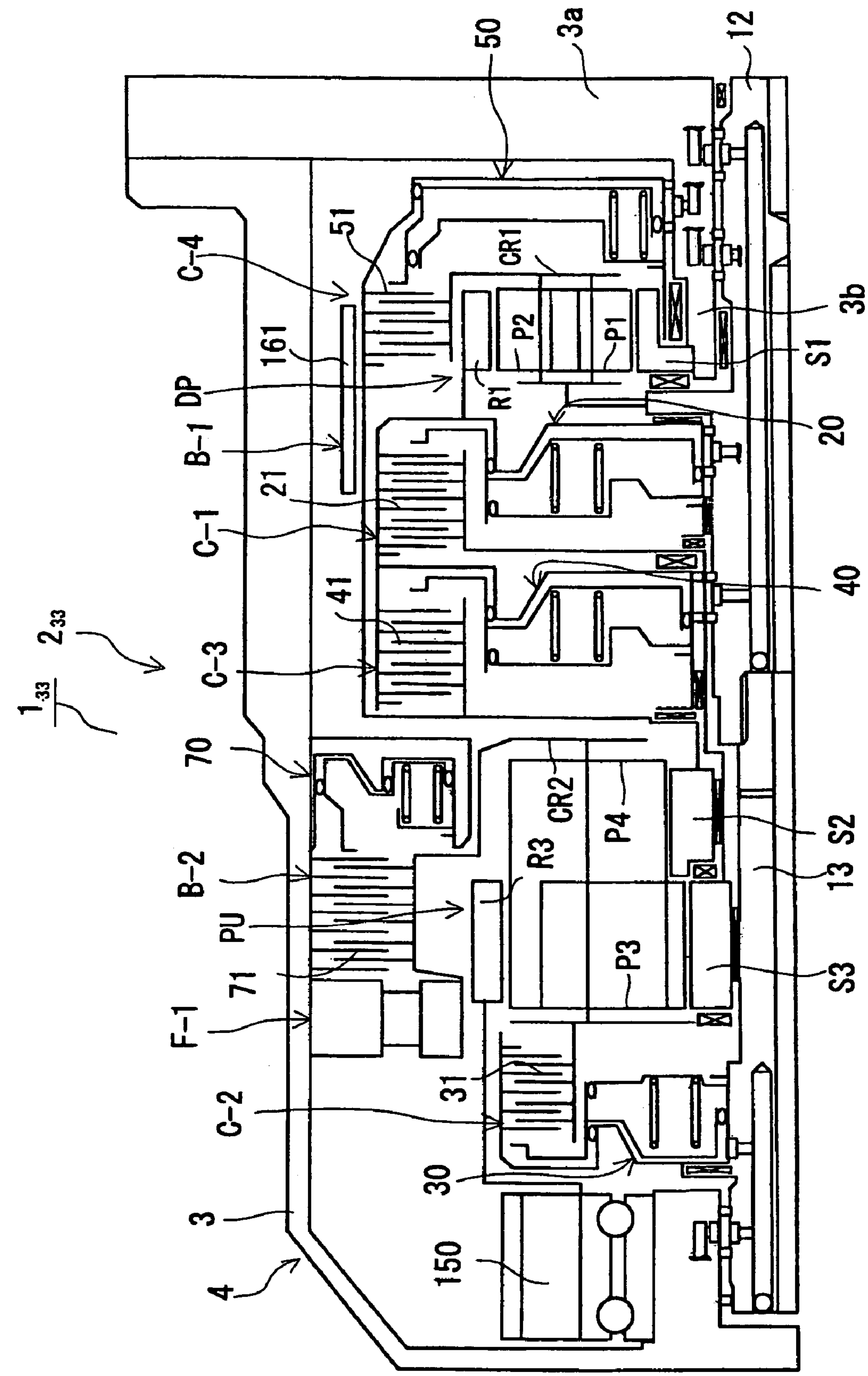
FIG. 43 is a diagrammatic section view showing an automatic transmission according to a 33rd exemplary embodiment.

A 33rd embodiment, which is a partial modification of the 27th embodiment described above, will be explained with reference to FIG. 43. In the 33rd embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{33}$ of the 33rd embodiment is arranged so that the hydraulic servo 40 of the third clutch C-3 is disposed axially between the planetary gear DP and the planetary gear unit PU and between the hydraulic servo 20 of the first clutch C-1 and the planetary gear unit PU.

It is noted that an automatic transmission $\mathbf{1}_{49}$ of a 49th embodiment, described later, may be built by inverting a transmission mechanism $\mathbf{2}_{33}$ of the automatic transmission $\mathbf{1}_{33}$ of the 33rd embodiment in the lateral direction (axial direction) almost as it is.

Figure 44:
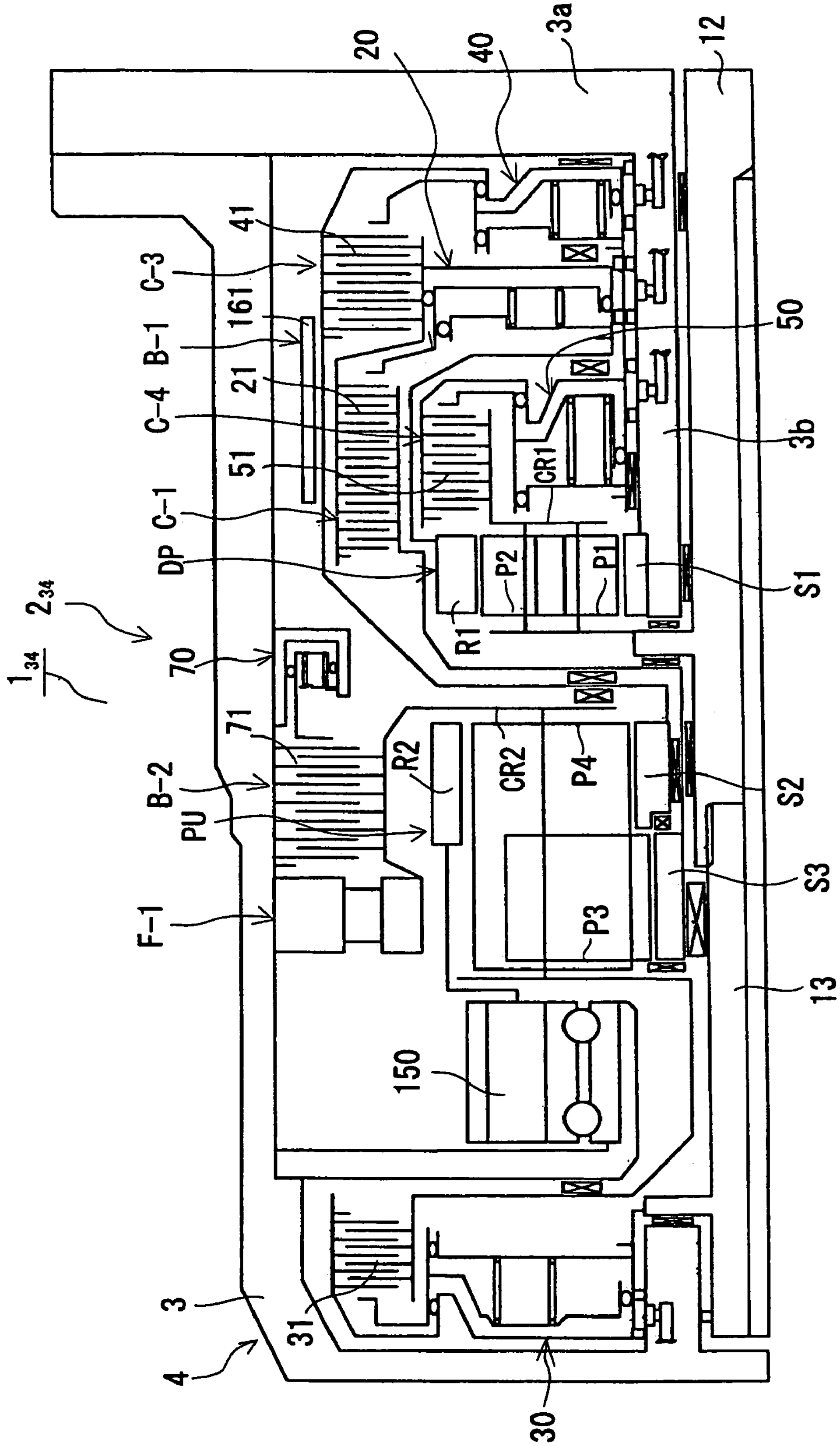
FIG. 44 is a diagrammatic section view showing an automatic transmission according to a 34th exemplary embodiment.

A 34th embodiment, which is a partial modification of the 27th embodiment described above, will be explained with reference to FIG. 44. In the 34th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{34}$ of the 34th embodiment is arranged so that the lateral (axial) position of the counter gear 150 and the hydraulic servo 30 of the second clutch C-2 is switched and the hydraulic servo 20 of the first clutch C-1 is disposed axially on the opposite side of the planetary gear DP from the planetary gear unit PU, or more specifically, the hydraulic servo 20 of the first clutch C-1 is disposed axially between the hydraulic servo 40 of the third clutch C-3 and the hydraulic servo 50 of the fourth clutch C-4.

It is noted that an automatic transmission $\mathbf{1}_{50}$ of a 50th embodiment, described later, may be built by inverting a transmission mechanism $\mathbf{2}_{34}$ of the automatic transmission $\mathbf{1}_{34}$ of the 34th embodiment in the lateral direction (axial direction) almost as it is.

Figure 45:
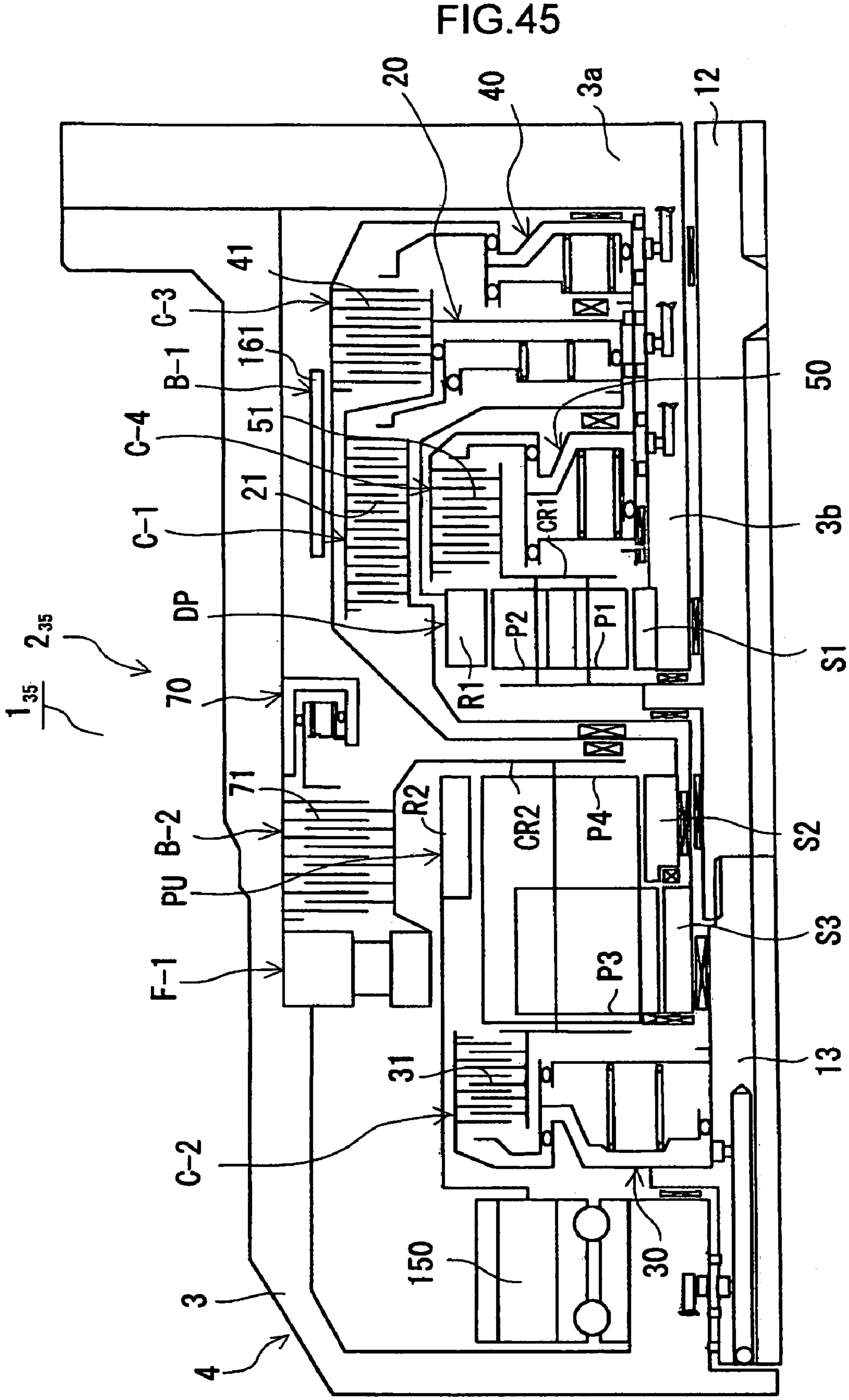
FIG. 45 is a diagrammatic section view showing an automatic transmission according to a 35th exemplary embodiment.

A 35th embodiment, which is a partial modification of the 27th embodiment described above, will be explained with reference to FIG. 45. In the 35th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{35}$ of the 35th embodiment is arranged so that the hydraulic servo 20 of the first clutch C-1 is disposed axially on the opposite side of the planetary gear DP from the planetary gear unit PU, or more specifically, the hydraulic servo 20 of the first clutch C-1 is disposed axially between the hydraulic servo 40 of the third clutch C-3 and the hydraulic servo 50 of the fourth clutch C-4.

It is noted that an automatic transmission $\mathbf{1}_{51}$ of a 51st embodiment, described later, may be built by inverting a transmission mechanism $\mathbf{2}_{35}$ of the automatic transmission $\mathbf{1}_{35}$ of the 35th embodiment in the lateral direction (axial direction) almost as it is.

Figure 46:
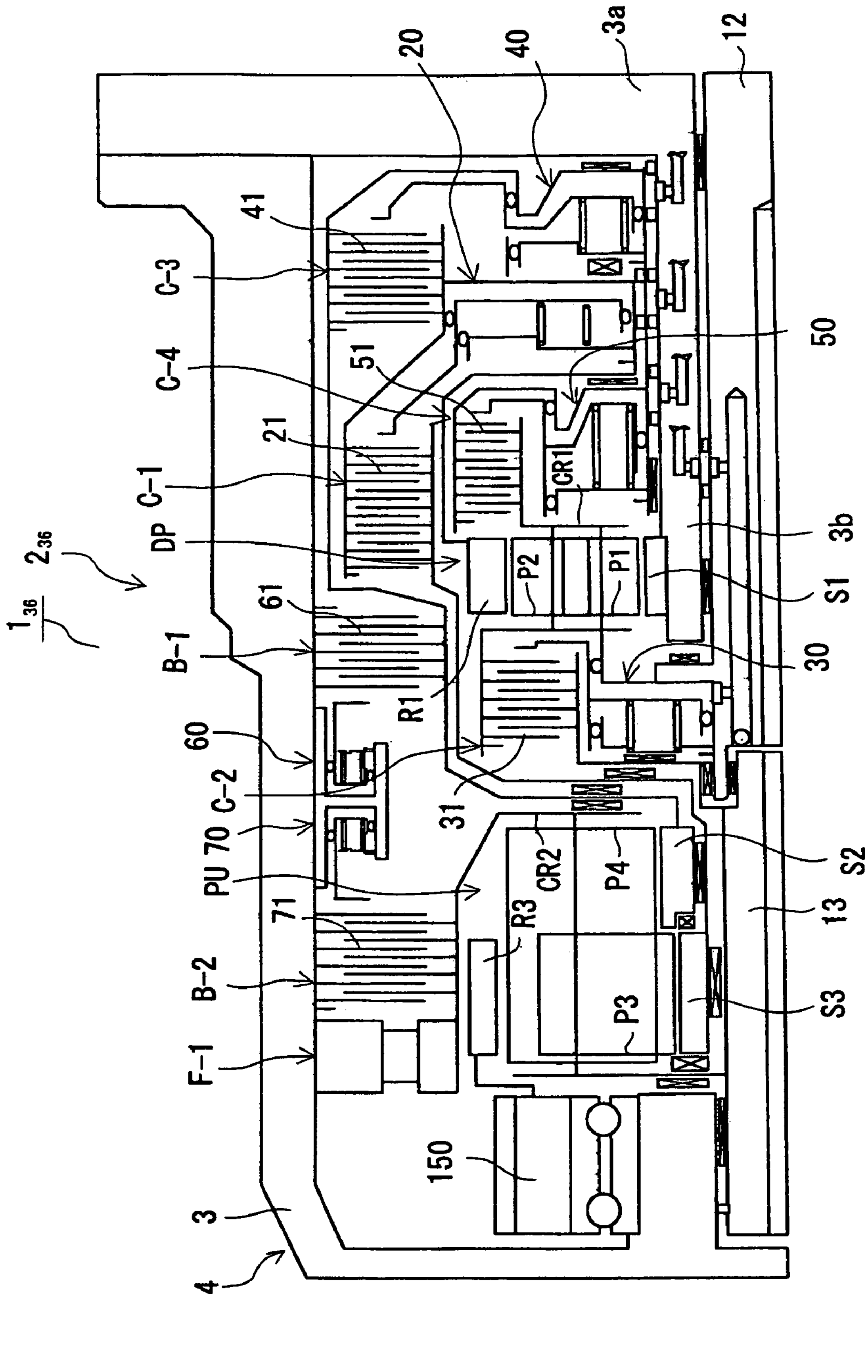
FIG. 46 is a diagrammatic section view showing an automatic transmission according to a 36th exemplary embodiment.

A 36th embodiment, which is a partial modification of the 27th embodiment described above, will be explained with reference to FIG. 46. In the 36th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{36}$ of the 36th embodiment is arranged so that the hydraulic servo 20 of the first clutch C-1 is disposed axially on the opposite side of the planetary gear DP from the planetary gear unit PU, or more specifically, the hydraulic servo 20 of the first clutch C-1 is disposed axially between the hydraulic servo 40 of the third clutch C-3 and the hydraulic servo 50 of the fourth clutch C-4. Further, the hydraulic servo 30 of the second clutch C-2 is disposed axially between the planetary gear DP and the planetary gear unit PU. The multi-plate type brake, similar to that of the first embodiment, is used for the first brake B-1 instead of the band brake. When the multi-plate type brake is used for the first brake B-1, the number of parts may be reduced and lightened by commonly using the cylinder member of each brake by adjoining the first brake B-1 with the second brake B-2.

It is noted that an automatic transmission $\mathbf{1}_{52}$ of a 52nd embodiment, described later, may be built by inverting a transmission mechanism $\mathbf{2}_{36}$ of the automatic transmission $\mathbf{1}_{36}$ of the 36th embodiment in the lateral direction (axial direction) almost as it is.

Figure 47:
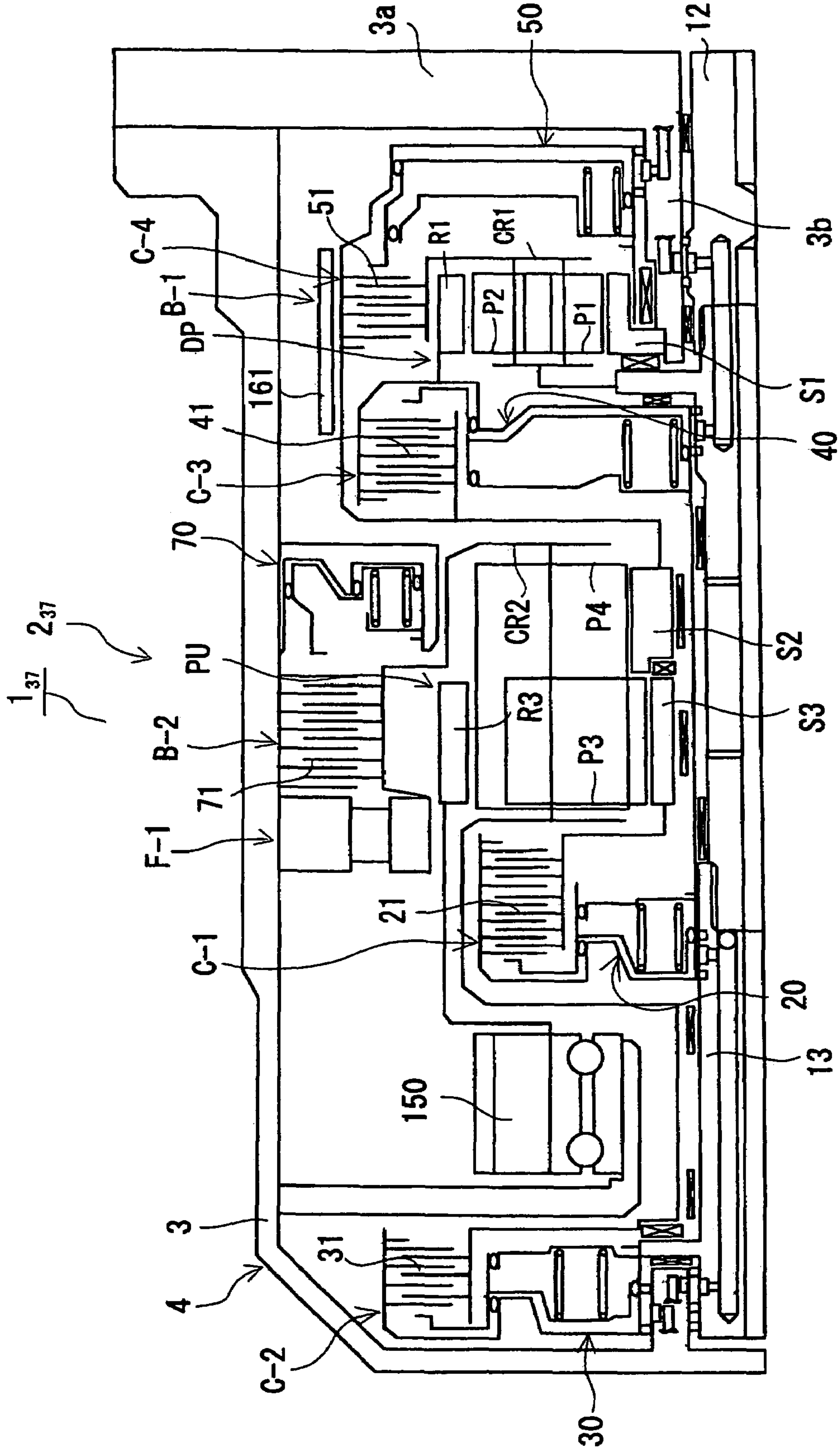
FIG. 47 is a diagrammatic section view showing an automatic transmission according to a 37th exemplary embodiment.

A 37th embodiment, which is a partial modification of the 27th embodiment described above, will be explained with reference to FIG. 47. In the 37th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{37}$ of the 37th embodiment is arranged so that the lateral (axial) position of the counter gear 150 and the hydraulic servo 30 of the second clutch C-2 is switched. Further, the hydraulic servo 20 of the first clutch C-1 is disposed axially on the opposite side of the planetary gear unit PU from the planetary gear DP, or more specifically, the hydraulic servo 20 of the first clutch C-1 is disposed axially between the counter gear 150 and the planetary gear unit PU. Further, the hydraulic servo 40 of the third clutch C-3 is disposed axially between the planetary gear DP and the planetary gear unit PU.

It is noted that an automatic transmission $\mathbf{1}_{53}$ of a 53rd embodiment, described later, may be built by inverting a transmission mechanism $\mathbf{2}_{37}$ of the automatic transmission $\mathbf{1}_{37}$ of the 37th embodiment in the lateral direction (axial direction) almost as it is.

Figure 48:
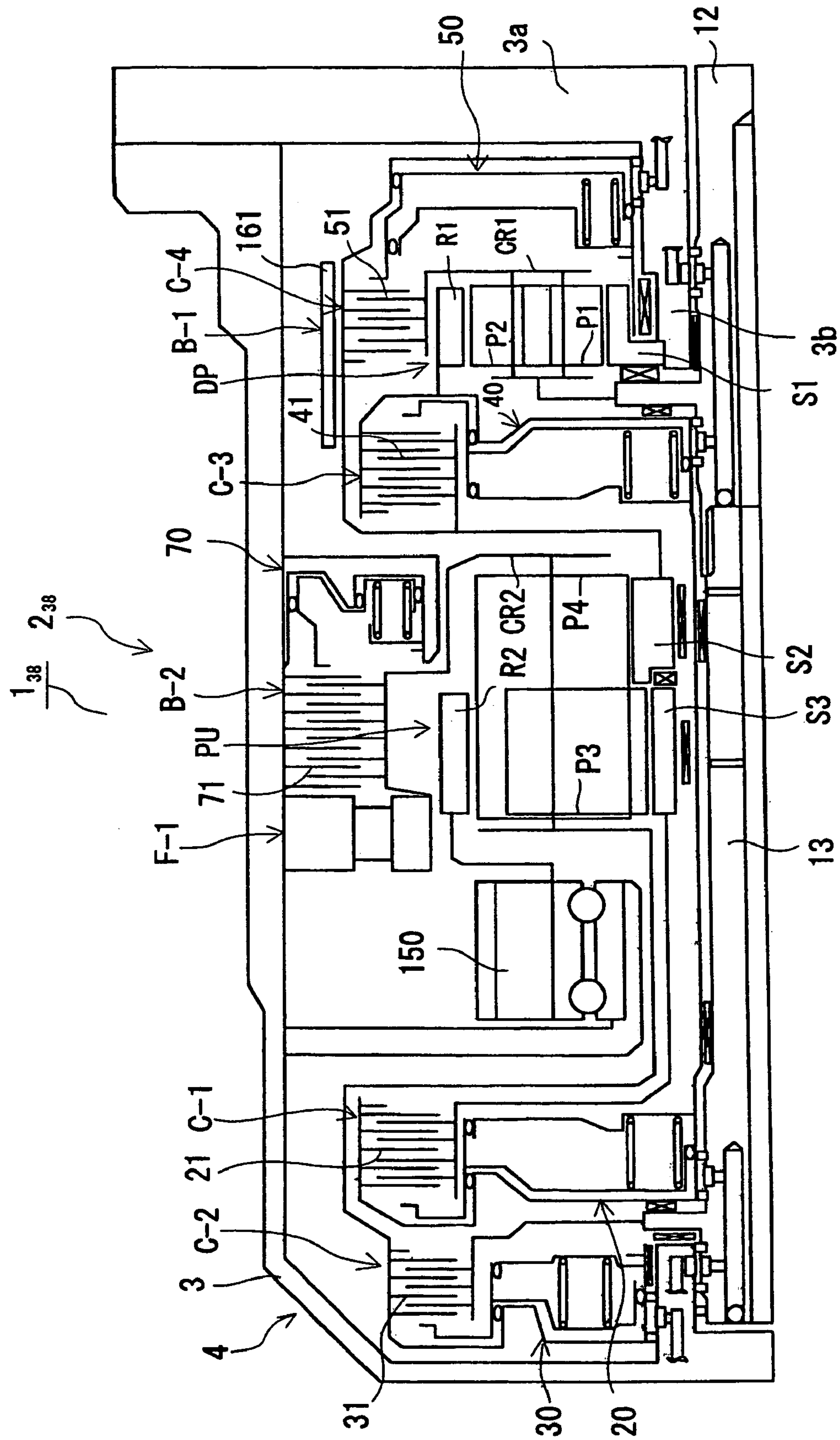
FIG. 48 is a diagrammatic section view showing an automatic transmission according to a 38th exemplary embodiment.

A 38th embodiment, which is a partial modification of the 27th embodiment described above, will be explained with reference to FIG. 48. In the 38th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{38}$ of the 38th embodiment is arranged so that the lateral (axial) position of the counter gear 150 and the hydraulic servo 30 of the second clutch C-2 is switched and the hydraulic servo 20 of the first clutch C-1 is disposed axially on the opposite side of the planetary gear unit PU from the planetary gear DP, or more specifically, the hydraulic servo 20 of the first clutch C-1 is disposed axially between the counter gear 150 and the hydraulic servo 30 of the second clutch C-2. Further, the hydraulic servo 40 of the third clutch C-3 is disposed axially between the planetary gear DP and the planetary gear unit PU.

It is noted that an automatic transmission $\mathbf{1}_{54}$ of a 54th embodiment, described later, may be built by inverting a transmission mechanism $\mathbf{2}_{38}$ of the automatic transmission $\mathbf{1}_{38}$ of the 38th embodiment in the lateral direction (axial direction) almost as it is.

Figure 49:
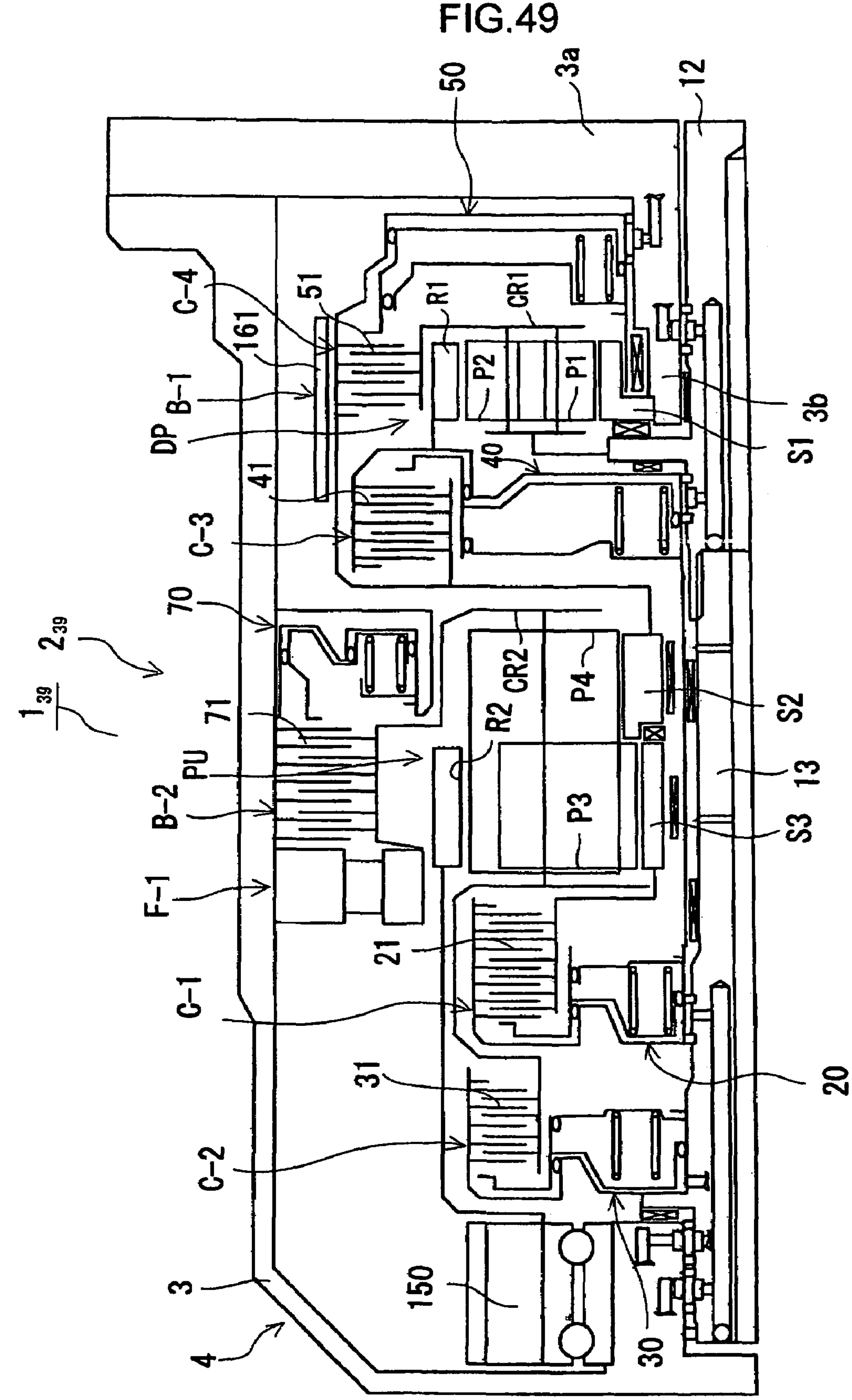
FIG. 49 is a diagrammatic section view showing an automatic transmission according to a 39th exemplary embodiment.

A 39th embodiment, which is a partial modification of the 27th embodiment described above, will be explained with reference to FIG. 49. In the 39th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{39}$ of the 39th embodiment is arranged so that the hydraulic servo 20 of the first clutch C-1 is disposed axially on the opposite side of the planetary gear unit PU from the planetary gear DP, or more specifically, the hydraulic servo 20 of the first clutch C-1 is disposed axially between the planetary gear unit PU and the hydraulic servo 30 of the second clutch C-2. Further, the hydraulic servo 40 of the third clutch C-3 is disposed axially between the planetary gear DP and the planetary gear unit PU.

It is noted that an automatic transmission $\mathbf{1}_{55}$ of a 55th embodiment, described later, may be built by inverting a transmission mechanism $\mathbf{2}_{39}$ of the automatic transmission $\mathbf{1}_{39}$ of the 39th embodiment in the lateral direction (axial direction) almost as it is.

Figure 50:
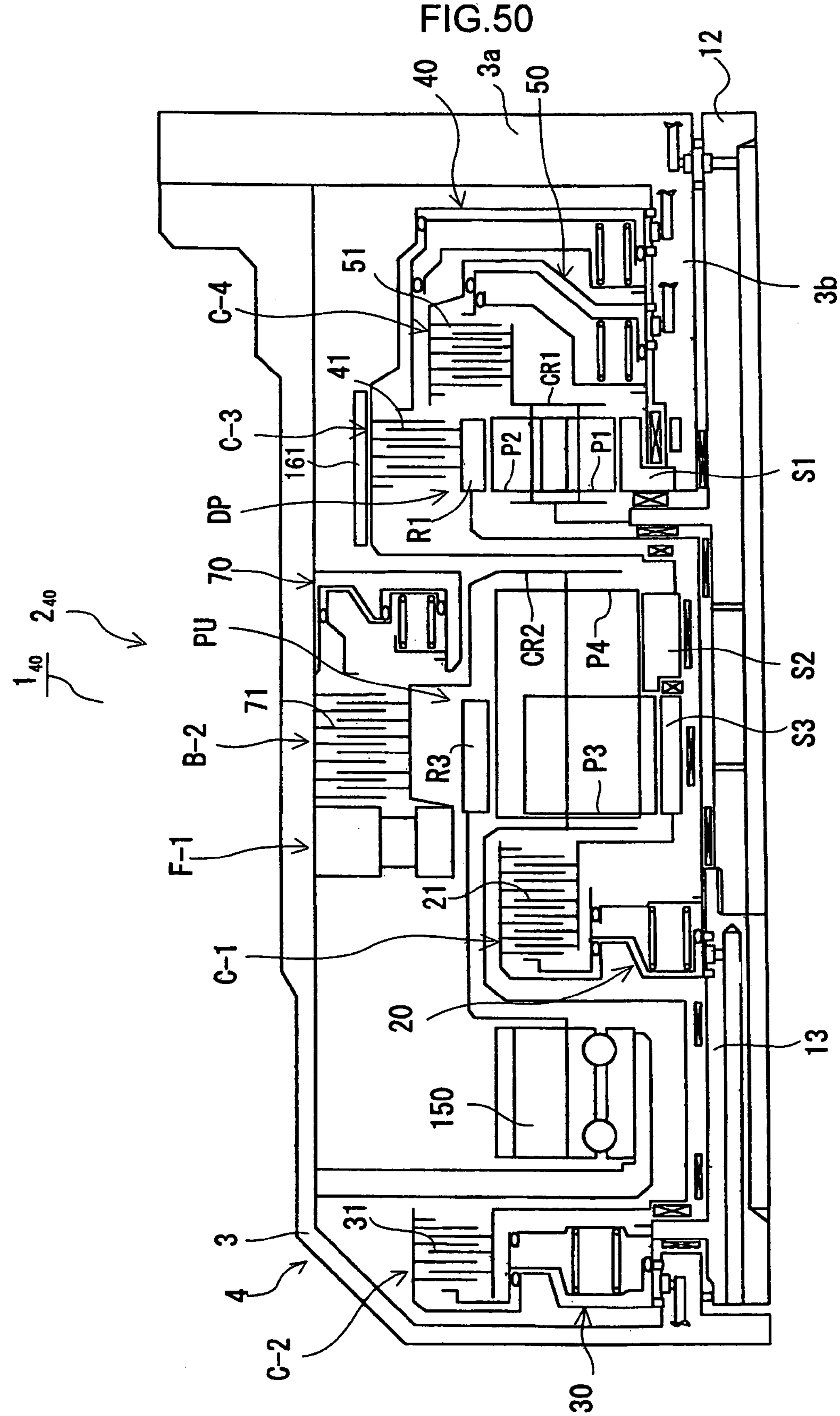
FIG. 50 is a diagrammatic section view showing an automatic transmission according to a 40th exemplary embodiment.

A 40th embodiment, which is a partial modification of the 27th embodiment described above, will be explained with reference to FIG. 50. In the 40th embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{40}$ of the 40th embodiment is arranged so that the lateral (axial) position of the counter gear 150 and the hydraulic servo 30 of the second clutch C-2 is switched and the hydraulic servo 20 of the first clutch C-1 is disposed axially on the opposite side of the planetary gear unit PU from the planetary gear DP, or more specifically, the hydraulic servo 20 of the first clutch C-1 is disposed axially between the planetary gear unit PU and the counter gear 150.

It is noted that an automatic transmission $\mathbf{1}_{56}$ of a 56th embodiment, described later, may be built by inverting a transmission mechanism $\mathbf{2}_{40}$ of the automatic transmission $\mathbf{1}_{40}$ of the 40th embodiment in the lateral direction (axial direction) almost as it is.

Figure 51:
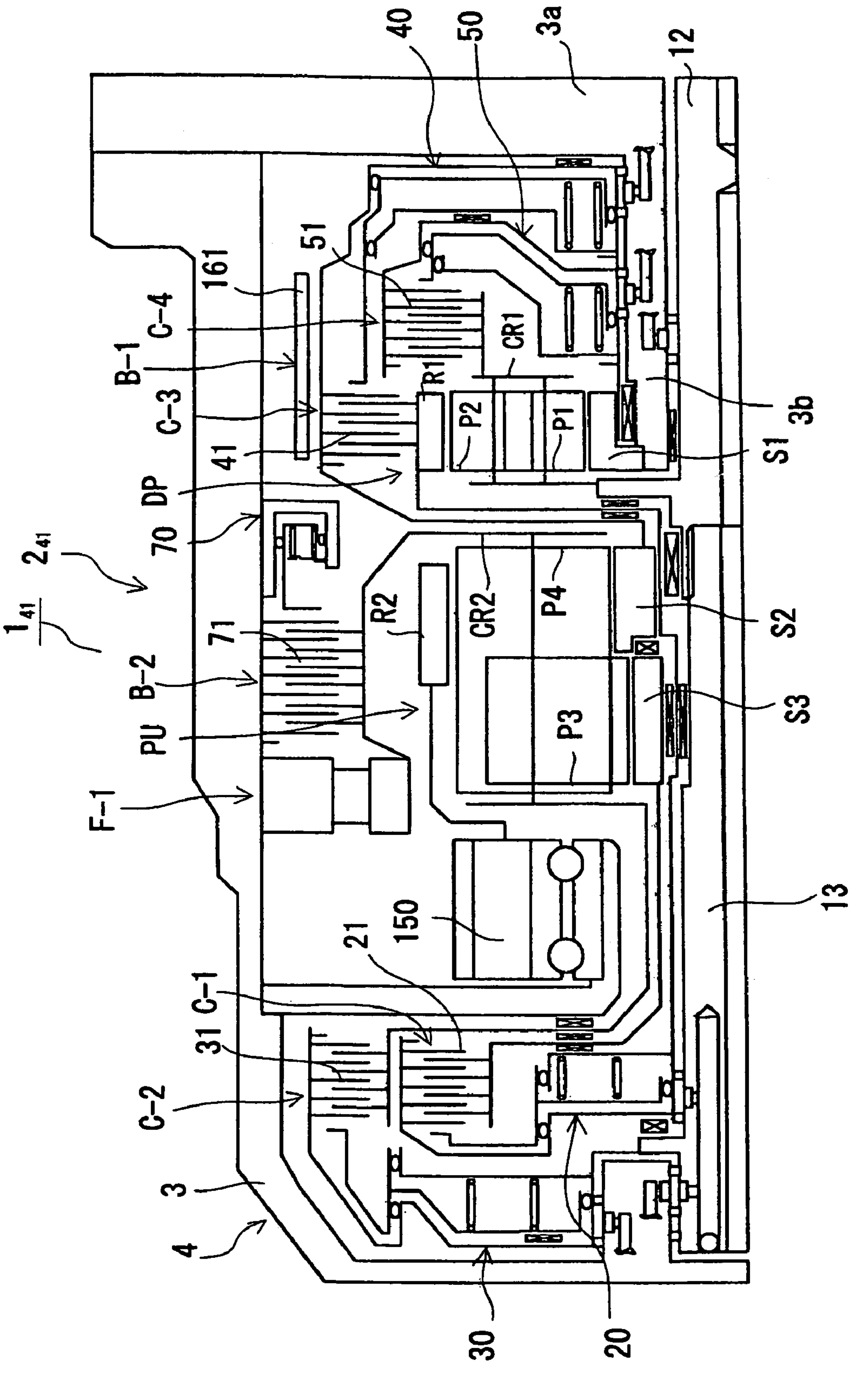
FIG. 51 is a diagrammatic section view showing an automatic transmission according to a 41st exemplary embodiment.

A 41st embodiment, which is a partial modification of the 27th embodiment described above, will be explained with reference to FIG. 51. In the 41st embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{41}$ of the 41st embodiment is arranged so that the lateral (axial) position of the counter gear 150 and the hydraulic servo 30 of the second clutch C-2 is switched and the hydraulic servo 20 of the first clutch C-1 is disposed axially on the opposite side of the planetary gear unit PU from the planetary gear DP, or more specifically, the hydraulic servo 20 of the first clutch C-1 is disposed axially between the counter gear 150 and the hydraulic servo 30 of the second clutch C-2.

It is noted that an automatic transmission $\mathbf{1}_{57}$ of a 57th embodiment, described later, may be built by inverting a transmission mechanism $\mathbf{2}_{41}$ of the automatic transmission $\mathbf{1}_{41}$ of the 41st embodiment in the lateral direction (axial direction) almost as it is.

Figure 52:
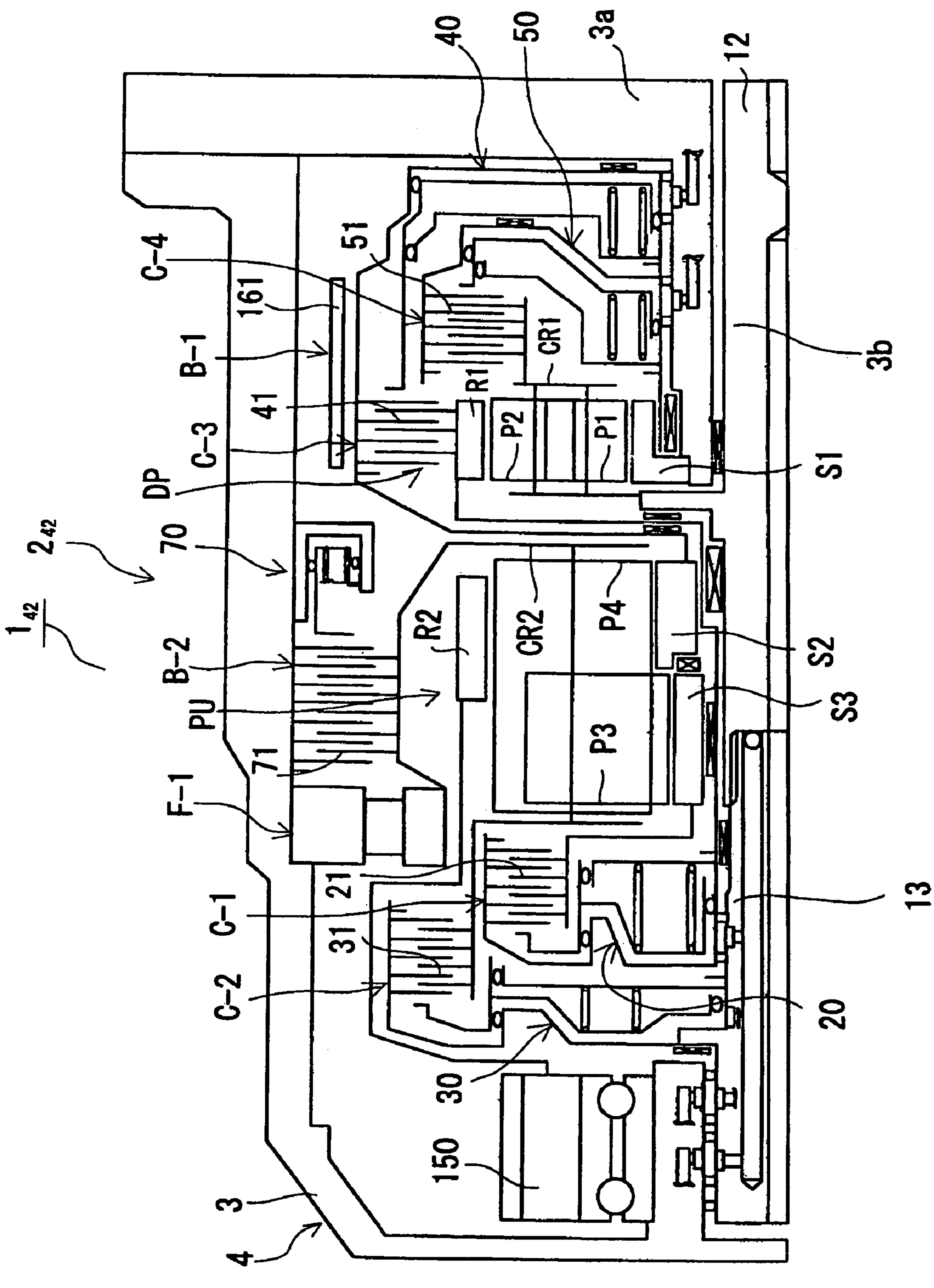
FIG. 52 is a diagrammatic section view showing an automatic transmission according to a 42nd exemplary embodiment.

A 42nd embodiment, which is a partial modification of the 27th embodiment described above, will be explained with reference to FIG. 52. In the 42nd embodiment explained below, only structures or components different from those of the automatic transmission $\mathbf{1}_{27}$ of the 27th embodiment will be explained and an explanation of the structures or components other than that will be omitted here because they are almost the same.

As compared to the automatic transmission $\mathbf{1}_{27}$ of the 27th embodiment, the automatic transmission $\mathbf{1}_{42}$ of the 42nd embodiment is arranged so that the hydraulic servo 20 of the first clutch C-1 is disposed axially on the opposite side of the planetary gear unit PU from the planetary gear DP, or more specifically, the hydraulic servo 20 of the first clutch C-1 is disposed axially between the hydraulic servo 30 of the second clutch C-2 and the planetary gear unit PU.

It is noted that an automatic transmission $\mathbf{1}_{58}$ of a 58th embodiment, described later, may be built by inverting a transmission mechanism $2_{42}$ of the automatic transmission $1_{42}$ of the 42nd embodiment in the lateral direction (axial direction) almost as it is.

A 43rd embodiment, which is a partial modification of the first through 42nd embodiments described above, will be explained with reference to FIG. 53. In the 43rd embodiment explained below, components having the same structure with those in the automatic transmission 1 of the first through 42nd embodiments are denoted by the same reference characters and an explanation thereof will be simplified, except of those structural parts such as oil passages, seal rings and hub members.

Figure 53:
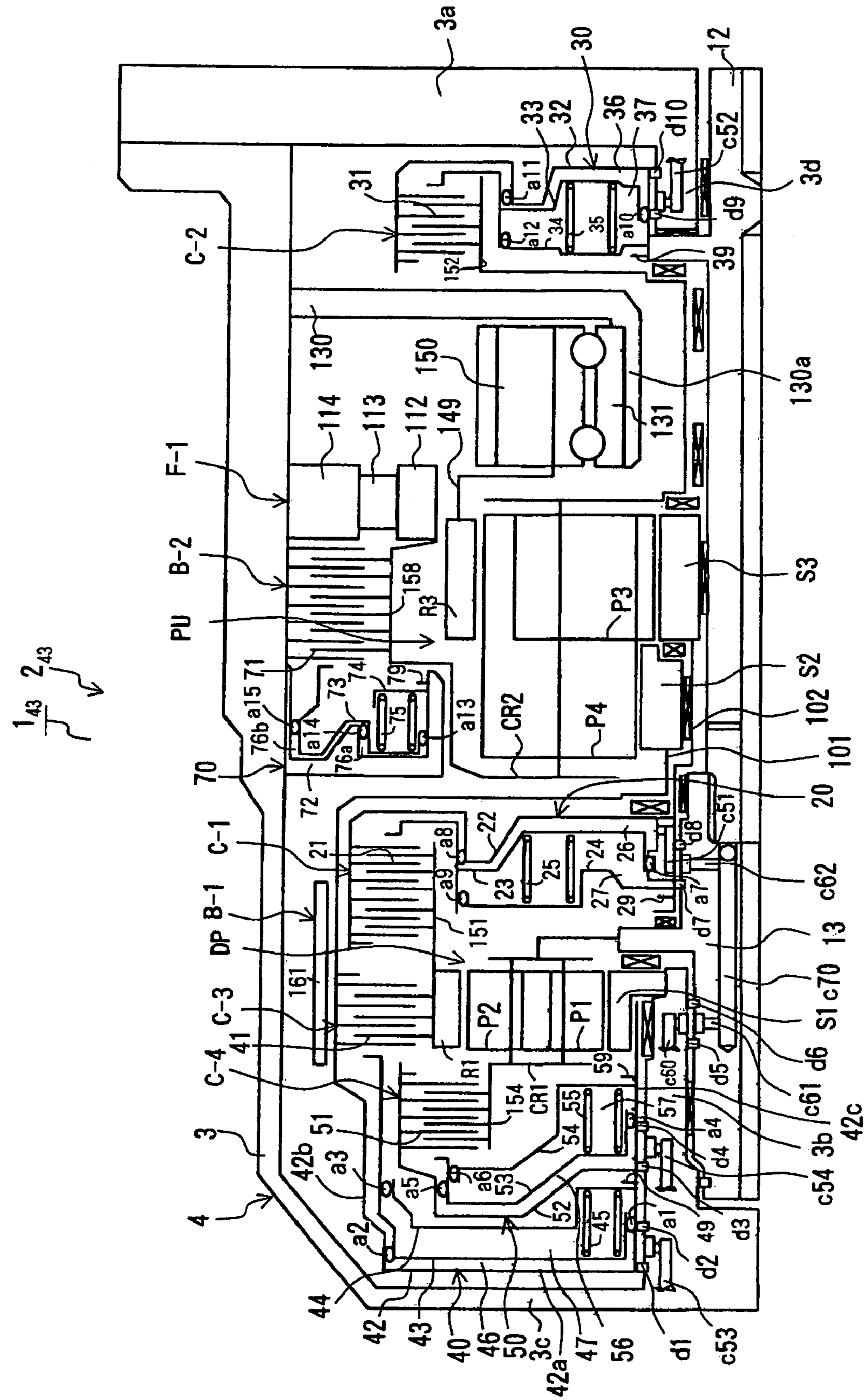
FIG. 53 is a diagrammatic section view showing an automatic transmission according to a 43rd exemplary embodiment.

As shown in FIG. 53, as compared to the automatic transmission $1_{28}$ of the 28th embodiment, the automatic transmission $1_{43}$ that may be suitably mounted to an FF-type (front engine front drive) vehicle, for example, is characterized in that the disposition of the first through fourth clutches C-1 through C-4, the first and second brakes B-1, B-2, the one-way clutch F-1, the planetary gear DP, the planetary gear unit PU and the counter gear 150 is nearly inverted in the lateral (axial) direction while keeping the input shaft 12 and the intermediate shaft 13 as they are and the direction in which the engine is disposed as it is. That is, the transmission mechanism $2_{43}$ is built by nearly inverting the transmission mechanism $2_{28}$ in the lateral (axial) direction.

More specifically, the automatic transmission $1_{43}$ has the case 4 formed by connecting the mission case 3, the housing case for housing the torque converter (not shown) and other elements. A transmission mechanism $2_{43}$, the counter shaft and the differential unit (not shown) are disposed within the mission case 3. The transmission mechanism $2_{43}$ is disposed on the shafts centering on the input shaft 12 and the intermediate shaft 13 which are coaxial with the output shaft of the engine (not shown).

As shown in FIG. 53, within the mission case 3, the planetary gear unit PU is disposed on the input shaft 12 and the third clutch C-3, the fourth clutch C-4, the planetary gear DP and the first clutch C-1 are disposed axially on the left side of the planetary gear unit PU in order from the left side. The fourth clutch C-4 and the planetary gear DP are disposed on the inner peripheral side of the clutch drum 42 of the third clutch C-3, described later in detail. Further, the first brake B-1, comprised of a band brake 161, is disposed on the outer peripheral side of the clutch drum 42 of the third clutch C-3.

Meanwhile, the second clutch C-2 and the counter gear 150 are disposed axially on the right side (input side) of the planetary gear unit PU in order from the right side. The second brake B-2 and the one-way clutch F-1 are disposed on the outer peripheral side of the planetary gear unit PU.

The friction plates 51 of the fourth clutch C-4, the friction plates 41 of the third clutch C-3 and the friction plates 21 of the first clutch C-1 are disposed relatively on the outer diametric side within the mission case 3 on the intermediate shaft 13 in order from the left side within the inner left part of the mission case 3, i.e., on the left side of the planetary gear unit PU. Further, the brake band 161 of the first brake B-1 is disposed so as to overlap with the outer diametric side of the friction plates 41 of the third clutch C-3 and a part of the friction plates 21 of the first clutch C-1.

The hydraulic servo 40 of the third clutch C-3 is disposed on the boss portion **3*b* extending from the side wall 3*c* of the mission case 3. Further, the hydraulic servo 50 of the fourth clutch C-4 is disposed on the right side of the hydraulic servo 40, the planetary gear DP is disposed on the inner diametric side of the friction plates 41 and the hydraulic servo 20 of the first clutch C-1 is disposed nearly on the inner diametric side of the friction plates 21. That is, the hydraulic servo 40, the hydraulic servo 50 and the planetary gear DP are disposed in order (in order from the side of the joint of the boss portion 3*b* axially to the right side) on the boss portion 3*b* on the left side of the mission case 3 and the hydraulic servo 20 is disposed on the intermediate shaft 13** in a manner of adjoining with the planetary gear DP.

Meanwhile, the planetary gear unit PU is disposed on the input shaft 12 on the right side of the mission case 3 in the drawing, i.e., on the right side of the hydraulic servo 20 of the first clutch C-1. The friction plates 71 of the second brake B-2 are disposed on right part of the outer peripheral side of the planetary gear unit PU and the hydraulic servo 70 of the second brake B-2 is disposed on the left part of the outer diametric side of the planetary gear unit PU. Then, the one-way clutch F-1 is disposed in a manner of overlapping from a part on the outer diametric side of the friction plates 31 to a part on the outer diametric side of the planetary gear unit PU.

The flange-like support wall 130 is disposed on the right side of the planetary gear unit PU by being secured to the inner peripheral face of the mission case 3. The counter gear 150, connected to the ring gear R2 of the planetary gear unit PU via the ball bearing 131, is disposed on the inner diametric side of the support wall 130 in a manner of being rotatably supported by the support wall 130.

As described above, the hydraulic servo 40 of the third clutch C-3 and the hydraulic servo 50 of the fourth clutch C-4 are disposed axially on the opposite side of the planetary gear DP from the planetary gear unit PU, the hydraulic servo 20 of the first clutch C-1 is disposed axially between the planetary gear DP and the planetary gear unit PU and the hydraulic servo 30 of the second clutch C-2 and the counter gear 150 are disposed axially on the opposite side of the planetary gear unit PU from the planetary gear DP.

The planetary gear DP disposed within the mission case 3 is provided with the sun gear S1, the carrier CR1 and the ring gear R1. Among them, the sun gear S1 is fixed to the boss portion **3*b* extending to the right from the side wall 3*a* of the mission case 3 so as not to be rotatable. The carrier CR1 has the two carrier plates in the lateral direction to rotatably support the pinions P1, P2. While the pinions P1, P2 engage with each other, the former pinion P1 engages with the sun gear S1 and the latter pinion P2 engages with the ring gear R1, respectively. The right carrier plate is connected to the intermediate shaft 13 and the left carrier plate is connected to the hub member 154, spline-coupled with the inner friction plates of the friction plates 51, of the fourth clutch C-4. The inner friction plates of the friction plates 41 of the third clutch C-3 are spline-coupled with the outer peripheral face of the ring gear R1. The hub portion 151 is linked on the right side of the ring gear R1 and the inner friction plates of the friction plates 21 of the first clutch C-1 are spline-coupled with the hub member 151**.

The fourth clutch C-4 is disposed on the boss portion **3*b* through an intermediary of the clutch drum 42 of the third clutch C-3 on the left side of the planetary gear DP. The fourth clutch C-4 is provided with the friction plates 51 and the hydraulic servo 50 for engaging/disengaging the friction plates 51. The hydraulic servo 50 has the clutch drum 52, the piston member 53, the cancel plate 54 and the return spring 55 and defines thereby the oil chamber 56 and the cancel oil chamber 57. The inner diametric portion of the clutch drum 52 is linked to the clutch drum 42 of the third clutch C-3 and the outer friction plates of the friction plates 51 are spline-coupled with the inner peripheral face of the outer diametric portion thereof. The piston member 53 is disposed on the right side of the clutch drum 52 so as to be movable in the axial direction and defines the oil-tight oil chamber 56 between it and the clutch drum 52 using the seal rings a4, a5. The cancel plate 54 is blocked from moving to the right by the snap ring 59 fitted to the clutch drum 42 described above. The cancel plate 54 is provided with the return spring 55 in contraction between it and the piston member 53, disposed on the left side thereof, and defines the oil-tight cancel oil chamber 57 using the seal rings a4, a6**.

It is noted that because the fourth clutch C-4 is built as described above, the inputted rotation of the carrier CR1 is inputted to the clutch drum 52 when the fourth clutch C-4 engages. The rotation is not inputted to the clutch drum 52 and the hydraulic servo 50 will not rotate when the fourth clutch C-4 is not engaged in Neutral and Parking ranges in particular.

The third clutch C-3 is built so as to surround the left side and the outer peripheral side of the fourth clutch C-4 and is disposed on the boss portion 3*b*. The third clutch C-3 is provided with the friction plates 41 and the hydraulic servo 40 for engaging/disengaging the friction plates 41. The hydraulic servo 40 has the clutch drum 42, the piston member 43, the cancel plate 44 and the return spring 45 and defines the oil chamber 46 and the cancel oil chamber 47 with them. The clutch drum 42 has the flange portion 42*a* disposed on the right side of the side wall 3*c*, the hub portion 42*c* extending to the right from the inner periphery of the flange portion 42*a* and the drum portion 42*b* extending to the right from the outer periphery of the flange portion 42*a*. Among them, the outer peripheral face of the boss portion 3*b* extending from the side wall 3*c* to the right side rotatably supports the hub portion 42*c*. The end of the hub portion 42*c* of the clutch drum 42 is positioned on the right side of the fourth clutch C-4 and the hydraulic servo 50 of the fourth clutch C-4 is disposed on the outer peripheral side thereof. The drum portion 42*b* of the clutch drum 42 extends to the outer diametric side of the first clutch C-1 by passing along the outer diametric side of the fourth clutch C-4. The brake band 161 of the first brake B-1 is disposed on the outer peripheral face of the drum portion 42*b* of the clutch drum 42, the inner friction plates of the friction plates 41 are spline-coupled with the part corresponding to the ring gear R1 and the link member 101 is linked at the right part thereof. The link member 101 extends to the inner diametric side through the outer diametric side and the right side of the first clutch C-1 and is linked to the sun gear S2.

The piston member 43 of the third clutch C-3 is disposed so as to be movable with respect to the clutch drum 42 and composes the oil-tight oil chamber 46 between it and the clutch drum 42 by the seal rings a1, a2. The outer diametric portion of the piston member 43 extends to the right by passing the outer peripheral side of the clutch drum 52 and the inner peripheral side of the clutch drum 42 of the third clutch C-3 so that its end faces to the friction plates 41. The cancel plate 44 is blocked from moving to the right side by the snap ring 49 fitted to the outer peripheral face of the inner diametric side of the clutch drum 42. The cancel plate 44 is provided with the return spring 45 in contraction between it and the piston member 43 disposed on the left side thereof and defines the oil-tight cancel oil chamber 47 using the seal rings a1, a3.

It is noted that because the third clutch C-3 is built as described above, the reduced rotation of the ring gear R1 is inputted to the clutch drum 42 when the third clutch C-3 engages. Accordingly, the rotation is not inputted to the clutch drum 42 and the hydraulic servo 40 will not rotate when the third clutch C-3 is not engaged, specifically in Neutral and Parking ranges.

The first clutch C-1 is disposed on the intermediate shaft 13 linked with the input shaft 12 on the right side of the planetary gear DP and the friction plates 41 of the third clutch C-3 and is provided with the friction plates 21 and the hydraulic servo 20 for engaging/disengaging the friction plate 21. The inner friction plates of the friction plates 21 are spline-coupled with the outer peripheral face of the hub member 151 linked to the ring gear R1 described above. The outer friction plates of the friction plates 21 are spline-coupled with the inner peripheral side of the clutch drum 22 and the clutch drum 22 is linked to the link member 102. The link member 102 is then linked to the sun gear S3.

The hydraulic servo 20 has the clutch drum 22, the piston member 23, the cancel plate 24 and the return spring 25 and defines the oil chamber 26 and the cancel oil chamber 27 with them. The clutch drum 22 is attached to the outer peripheral face of the right side of the intermediate shaft 13 so as to be relatively rotatable. The piston member 23 is disposed in the clutch drum 22 so as to be movable in the axial direction and defines the oil-tight oil chamber 26 between it and the clutch drum 22 using the seal rings a7, a8. A part of the piston member 23 on the outer peripheral side faces to the front face of the friction plates 21. The cancel plate 24 is blocked from moving to the left side by the snap ring 29 fitted around the outer peripheral face on the inner diametric side of the clutch drum 22. The cancel plate 24 is provided with the return spring 25 in contraction between it and the piston member 23 disposed on the right side thereof and defines the oil-tight cancel oil chamber 27 using the seal rings a7, a9.

The first brake B-1 is disposed on the outer diametric side of the clutch drum 42 and is provided with a hydraulic servo (not shown) and set so as not to be rotatable with respect to the mission case 3. The brake band 161 is for fastening and releasing the outer peripheral part of the clutch drum 42.

The second brake B-2 is disposed on the outer diametric side of the planetary gear unit PU. The second brake B-2 has the friction plates 71 and the hydraulic servo 70 for engaging/disengaging the friction plates 71. The outer friction plates of the friction plates 71 are spline-coupled with the inner peripheral face of the mission case 3 and the inner friction plates are spline-coupled with the hub member 158 linked to the carrier CR2 of the planetary gear unit PU.

The hydraulic servo 70 has the drum-like cylinder member 72, the piston member 73, the cancel plate 74 and the return spring 75 and composes the oil chamber 76 between the piston member 73 and the cylinder member 72. The piston member 73 is movably disposed in the axial direction and its right end faces to the friction plates 71. The oil-tight oil chambers 76*a*, 76*b* are formed between the piston member 73 and the cylinder member 72 by the three seal rings a13, a14, a15. The cancel plate 74 is blocked from moving to the right by the snap ring 79 fitted into the inner peripheral face of the cylinder member 72.

The one-way clutch F-1 is disposed so as to overlap with the outer diametric side of the planetary gear unit PU on the right side of the second brake B-2 and is provided with the inner race 112 linked to the hub member 158, the sprag mechanism 113, and the outer race 114, spline-coupled with the inner peripheral side of the mission case 3, in order from the inner peripheral side to the outer peripheral side.

The second clutch C-2 is disposed on the boss portion 3*b* extending from the partition member 3*a* for parting the mission case 3 from the housing case (not shown) on the right side of the planetary gear unit PU and is provided with the friction plates 31 and the hydraulic servo 30 for engaging/disengaging the friction plates 31. The inner friction plates of the friction plates 31 are spline-coupled with the hub member 152 linked to the carrier CR2. The outer friction plates of the friction plates 31 are spline-coupled with the inner peripheral side of the clutch drum 32 and the clutch drum 32 is linked with the input shaft 12.

The hydraulic servo 30 has the clutch drum 32, the piston member 33, the cancel plate 34, and the return spring 35 and defines the oil chamber 36 and the cancel oil chamber 37 with them. The inner peripheral side of the clutch drum 32 is attached to and supported by the input shaft 12. The piston member 33 is disposed in the clutch drum 32 to be movable in the axial direction and defines the oil-tight oil chamber 36 between it and the clutch drum 32 using the seal rings a10, a11. The part of the piston member 33 on the outer peripheral side faces to the front face of the friction plates 31. The cancel plate 34 is blocked from moving to the left side by the snap ring 39 fitted around the outer peripheral face on the inner diametric side of the clutch drum 32 described above. The clutch drum 32 is provided with the return spring 35 in contraction between it and the piston member 33 disposed on the right side thereof and composes the oil-tight cancel oil chamber 37 using the seal rings a10, a12.

The support wall 130 is disposed so that the outer peripheral side thereof is linked with the mission case 3 on the inner peripheral side of the mission case 3. The support wall 130 on the right side of the planetary gear unit PU and the counter gear 150 is disposed on the boss portion 130*a* extending on the inner diametric side of the support wall 130 through an intermediary of the ball bearing 131. It is noted that the gear linked to the counter shaft (not shown) is engaged with the outer peripheral side of the counter gear 150 and the counter shaft is linked with driving wheels through an intermediary of gear mechanisms and differential gears not shown.

The structure of each oil passage and the supply of operating fluid will be briefly explained. The oil chamber 56 of the hydraulic servo 50 of the fourth clutch C-4, i.e., the oil chamber 56 formed by sealing the part between the clutch drum 52 and the piston member 53 by the seal rings a4, a5, is arranged so as to communicate with the oil passage c54 within the boss portion 3*b* by sealing the part between the clutch drum 52 and the boss portion 3*b* by the seal rings d3, d4. Operating fluid is supplied from the oil passage c54. It is noted that operating fluid is supplied from the oil passage (not shown) to the cancel oil chamber 57 formed by sealing the part between the piston member 53 and the cancel plate 54 by the seal rings a4, a6.

The oil chamber 46 of the hydraulic servo 40 of the third clutch C-3, i.e., the oil chamber 46 formed by sealing the part between the clutch drum 42 and the piston member 43 by the seal rings a1, a2, is arranged so as to communicate with the oil passage c53 within the boss portion 3*b* by sealing the part between the clutch drum 42 and the boss portion 3*b* by tho seal rings d1, d2. Operating fluid is supplied thereto from the oil passage c53. It is noted that operating fluid is supplied from the oil passage (not shown) to the cancel oil chamber 47 formed by sealing the part between the piston member 43 and the cancel plate 44 by the seal rings a1, a3.

The oil chamber 26 of the hydraulic servo 20 of the first clutch C-1, i.e., the oil chamber 26 formed by sealing the part between the clutch drum 22 and the piston member 23 by the seal rings a7, a8, is arranged so as to communicate with the oil passage c60 within the boss portion 3*b* by sealing the part between the boss portion 3*b* and the intermediate shaft 13 by the seal rings d5, d6 and the part between the intermediate shaft 13 and the clutch drum 22 by the seal rings d7, d8, respectively, via the oil passages c61, c70, c62 within the intermediate shaft 13 and the oil passage c51 and operating fluid is supplied thereto from the oil passage c51. It is noted that operating fluid is supplied from the oil passage (not shown) to the cancel oil chamber 27 formed by sealing the part between the piston member 23 and the cancel plate 24 by the seal rings a7, a9.

The oil chamber 36 of the hydraulic servo 30 of the second clutch C-2, i.e., the oil chamber 36 formed by sealing the part between the clutch drum 32 and the piston member 33 by the seal rings a10, a11, is arranged so as to communicate with the oil passage c52 within the boss portion 3*d* by sealing the part between the boss portion 3*d* and the clutch drum 32 by the seal rings d9, d10. Operating fluid is supplied thereto from the oil passage c52. It is noted that operating fluid is supplied from the oil passage (not shown) to the cancel oil chamber 37 formed by sealing the part between the piston member 33 and the cancel plate 34 by the seal rings a10, a12.

Operating fluid is supplied from two oil passages within the mission case 3 (not shown) to the two oil chambers 76*a*, 76*b* of the hydraulic servo 70 of the second brake B-2, i.e., to the oil chambers 76*a*, 76*b* formed by sealing the part between the cylinder member 72 and the piston member 73 by the seal rings a13, a14, a15, respectively. It is noted that the second brake B-2 is allowed to press and control the piston member 73 stepwise based on hydraulic pressure of the operating fluid supplied to the two oil chambers 76*a*, 76*b*, so that it is capable of controlling the torque capacity of the second brake B-2 more finely and accurately.

According to the automatic transmission $\mathbf{1}_{43}$ described above, the fourth clutch C-4 is linked with the sun gear S2 of the planetary gear unit PU via the output side members (clutch drum 42 and the link member 102) of the third clutch C-3, so that the output side members turn out to be output side members of the two clutches transmitting different rotations, i.e., they may be shared in common as one rotary member. Thereby, the automatic transmission $\mathbf{1}_{43}$ may be compactly built.

Because the hydraulic servo 50 of the fourth clutch C-4 is disposed axially on the opposite side of the planetary gear DP from the planetary gear unit PU and on the boss portion 3*b* extending from the case 4 to supply the operating fluid to the hydraulic servo 50 of the fourth clutch C-4 from the oil passage within the boss portion 3*b*, the number of seal rings can be reduced as compared to a case of disposing the hydraulic servo 50 of the fourth clutch C-4 on the intermediate shaft 13 through an intermediary of a member having another speed of rotation, i.e., as compared to a case of supplying the operating fluid via the other member for example. Thereby, it becomes possible to prevent the drop in the efficiency and controllability of the automatic transmission $\mathbf{1}_{43}$.

Because the planetary gear DP, the first clutch C-1, the third and fourth clutches C-3, C-4 are disposed axially on one side of the planetary gear unit PU and the planetary gear DP and the fourth clutch C-4 are disposed on the inner peripheral side of the clutch drum 42 of the third clutch C-3, it becomes possible to increase the area of the friction plates 21, 41 of the first and third clutches C-1, C-3. That is, even though the capacity of the first and third clutches C-1, C-3 for transmitting the reduced rotation may be increased, the fourth clutch C-4 and the planetary gear DP whose transmittable torque capacity can be relatively small for transmitting the inputted rotation may be disposed on the inner peripheral side of the clutch drum 42 of the third clutch C-3. Accordingly, the automatic transmission 143 that is capable of attaining the multi-stage shifts, such as the forward eighth speed stage and the reverse second speed stage, may be compactly built.

Further, because the hydraulic servo 20 of the first clutch C-1 is disposed on the intermediate shaft 13 and adjacent to the planetary gear DP and the operating fluid is supplied to the hydraulic servo 20 of the first clutch C-1 from the oil passage provided within the intermediate shaft 13, the operating fluid may be supplied just by providing two pairs of seal rings d5, d6 and d7, d8 along the oil passage for supplying the operating fluid from the hydraulic control unit, i.e., between the oil passage within the boss portion 3*b* and the intermediate shaft 13 and between the hydraulic servo 20 of the first clutch C-1 and the intermediate shaft 13. Accordingly, the number of seal rings can be reduced as compared to a case of supplying operating fluid via another member. Thereby, it becomes possible to prevent the drop in the efficiency and controllability of the vehicular automatic transmission $\mathbf{1}_{43}$.

Furthermore, although the increase of radial size of the first clutch C-1 to the outer peripheral side is limited because the third and fourth clutches C-3, C-4 are linked to the sun gear S2 of the planetary gear unit PU through the outer peripheral side of the first clutch C-1 and the link member 101 and other elements for linking the third and fourth clutches C-3, C-4 with the sun gear S2 of the planetary gear unit PU pass along the outer peripheral side of the first clutch C-1, the capacity of the first clutch C-1 may be maintained by increasing the size in the inner radial direction because the first clutch C-1 is disposed on the intermediate shaft 13 (the input shaft 12 in a broad sense) as compared to a case of disposing it on the boss portion 3*b*.

In addition, because the sun gear S2 of the planetary gear unit PU is capable of transmitting the inputted rotation in connection with the fourth clutch C-4, is capable of transmitting the reduced rotation in connection with the third clutch C-3 and is capable of fixing the rotation in connection with the first brake B-1; the sun gear S3 is capable of transmitting the reduced rotation in connection with the first clutch C-1; the carrier CR2 is capable of transmitting the inputted rotation in connection with the second clutch C-2 and is capable of fixing the rotation in connection with the second brake B-2; and the ring gear R2 is linked to the counter gear 150, the multi-stage shifts, such as the forward eighth speed stage and the reverse second speed stage, may be attained.

Further, because the friction plates 41 of the third clutch C-3 are disposed on the outer peripheral side of the ring gear R1 and the fourth clutch C-4 is disposed axially between the hydraulic servo 40 of the third clutch C-3 and the friction plates 41 of the third clutch C-3, it is possible to prevent the fourth clutch C-4 from radially overlapping with the hydraulic servo 40 or the friction plates 41 of the third clutch C-3. Accordingly, because the radial size of the fourth clutch C-4 may be increased, as compared to a case of disposing it on the inner peripheral side of the third clutch C-3, the capacity of the fourth clutch C-4 may be maintained and the vehicular automatic transmission $\mathbf{1}_{43}$ may be compactly built in the axial direction as a result.

Although the first brake B-1 is disposed on the outer peripheral side of the friction plates 41 of the third clutch C-3 in the present embodiment, it is also possible to dispose the first brake B-1 on the outer peripheral side of the hydraulic servo 40 of the third clutch C-3. Accordingly, it is possible to build the vehicular automatic transmission $\mathbf{1}_{43}$ compactly in the radial direction while maintaining the capacity of the first brake B-1 and reducing the size thereof by disposing the first brake B-1 at the position overlapping with the third clutch C-3.

Further, because the automatic transmission $\mathbf{1}_{43}$ is built so that the reduced rotation of the ring gear R1 is inputted to the clutch drum 42 forming the hydraulic servo 40 of the third clutch C-3 when the third clutch C-3 engages, the reduced rotation is not inputted to the clutch drum 42 when the third clutch C-3 is not engaged even if the driver races the engine in Neutral or Parking range, for example, and the input shaft rotates. Accordingly, it is possible to prevent the entire hydraulic servo 40 of the third clutch C-3 from rotating and to prevent dragging of the third clutch C-3 which is otherwise caused by a centrifugal hydraulic pressure generated in the oil chamber 46.

Because the automatic transmission $\mathbf{1}_{43}$ is built so that the inputted rotation is inputted to the clutch drum 52 forming the hydraulic servo 50 of the fourth clutch C-4 via the carrier CR1 when the fourth clutch C-4 engages, the inputted rotation is not inputted to the clutch drum 52 when the fourth clutch C-4 is not engaged even if the driver races the engine in Neutral or Parking range and the input shaft rotates. Accordingly, it is possible to prevent the rotation of the whole hydraulic servo 50 of the fourth clutch C-4 and to prevent dragging of the fourth clutch C-4 which is otherwise caused by a centrifugal hydraulic pressure generated in the oil chamber 56.

Because the second clutch C-2 is disposed axially on the opposite side of the planetary gear unit PU from the planetary gear DP, the second clutch C-2 may be linked with the carrier CR2 without becoming entangled with the members for linking the first clutch C-1 with the sun gear S3 and for linking the third clutch C-3 with the sun gear S2, for example.

Also, because the support wall 130 is disposed axially on the opposite side of the planetary gear unit PU from the planetary gear DP, the counter gear 150 supported by the support wall 130 may be disposed on the input side (axially on the right side) of the input shaft. Accordingly, the gear engaging with the counter gear 150 disposed in the counter shaft (not shown) may be disposed on the input side of the input shaft. Thereby, the axial length of the counter shaft may be shortened as a result and the whole automatic transmission may be lightened.

Figure 54:
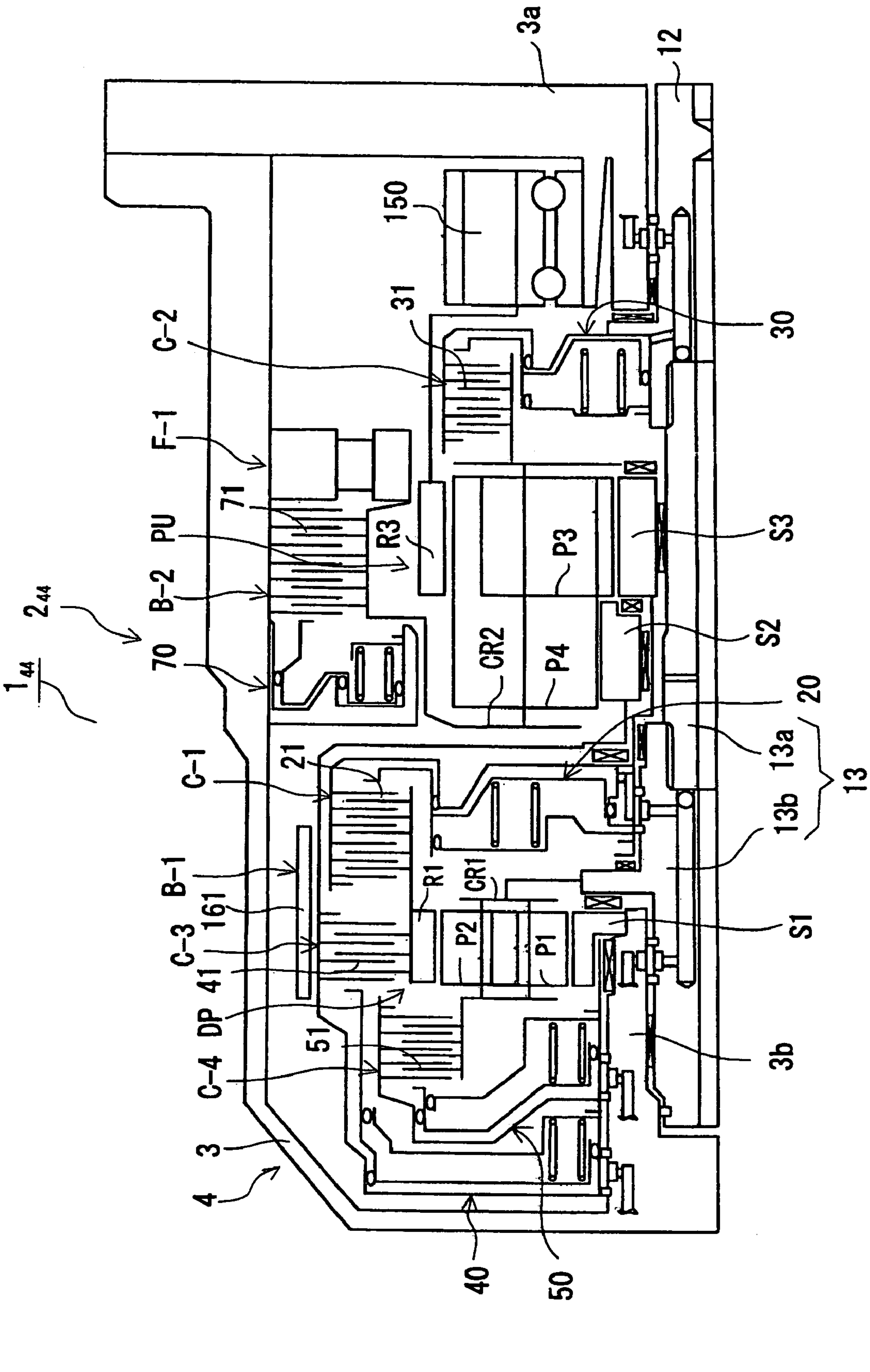
FIG. 54 is a diagrammatic section view showing an automatic transmission according to a 44th exemplary embodiment.

A 44th embodiment, which is a partial modification of the 43rd embodiment described above, will be explained with reference to FIG. 54. In the 44th embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{44}$ of the 44th embodiment is arranged so that the lateral (axial) position of the counter gear 150 and the hydraulic servo 30 of the second clutch C-2 is switched.

Because the counter gear 150 may be disposed on the boss extending from the partition member 3*a* by switching the lateral (axial) position of the counter gear 150 and the hydraulic servo 30 of the second clutch C-2 in the 44th embodiment, it becomes possible to cut the support wall used for supporting the counter gear thus reducing the number of parts and lightening the automatic transmission.

It is noted that the automatic transmission $\mathbf{1}_{27}$ of the 27th embodiment, described above, may be built by inverting a transmission mechanism $\mathbf{2}_{44}$ of the automatic transmission $\mathbf{1}_{44}$ of the 44th embodiment in the lateral direction (axial direction) almost as it is.

Figure 55:
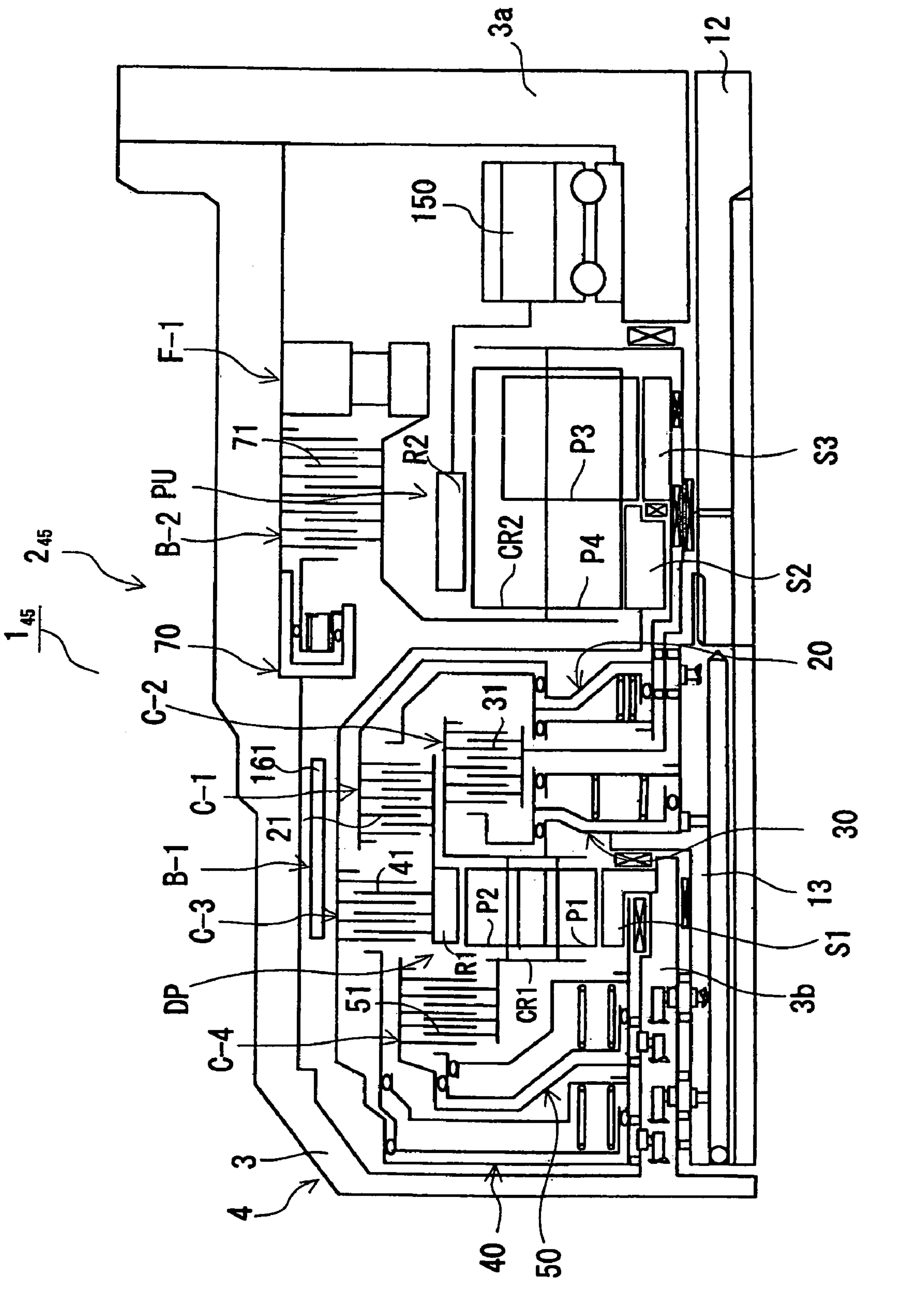
FIG. 55 is a diagrammatic section view showing an automatic transmission according to a 45th exemplary embodiment.

A 45th embodiment, which is a partial modification of the 43rd embodiment described above, will be explained with reference to FIG. 55. In the 45th embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{45}$ of the 45th embodiment is arranged so that the hydraulic servo 30 of the second clutch C-2 is disposed axially between the planetary gear unit PU and the planetary gear DP, or more specifically, axially between the planetary gear DP and the hydraulic servo 20 of the first clutch C-1.

It is noted that the automatic transmission $1_{29}$ of the 29th embodiment, described above, may be built by inverting a transmission mechanism $2_{45}$ of the automatic transmission $1_{45}$ of the 45th embodiment in the lateral direction (axial direction) almost as it is.

Figure 56:
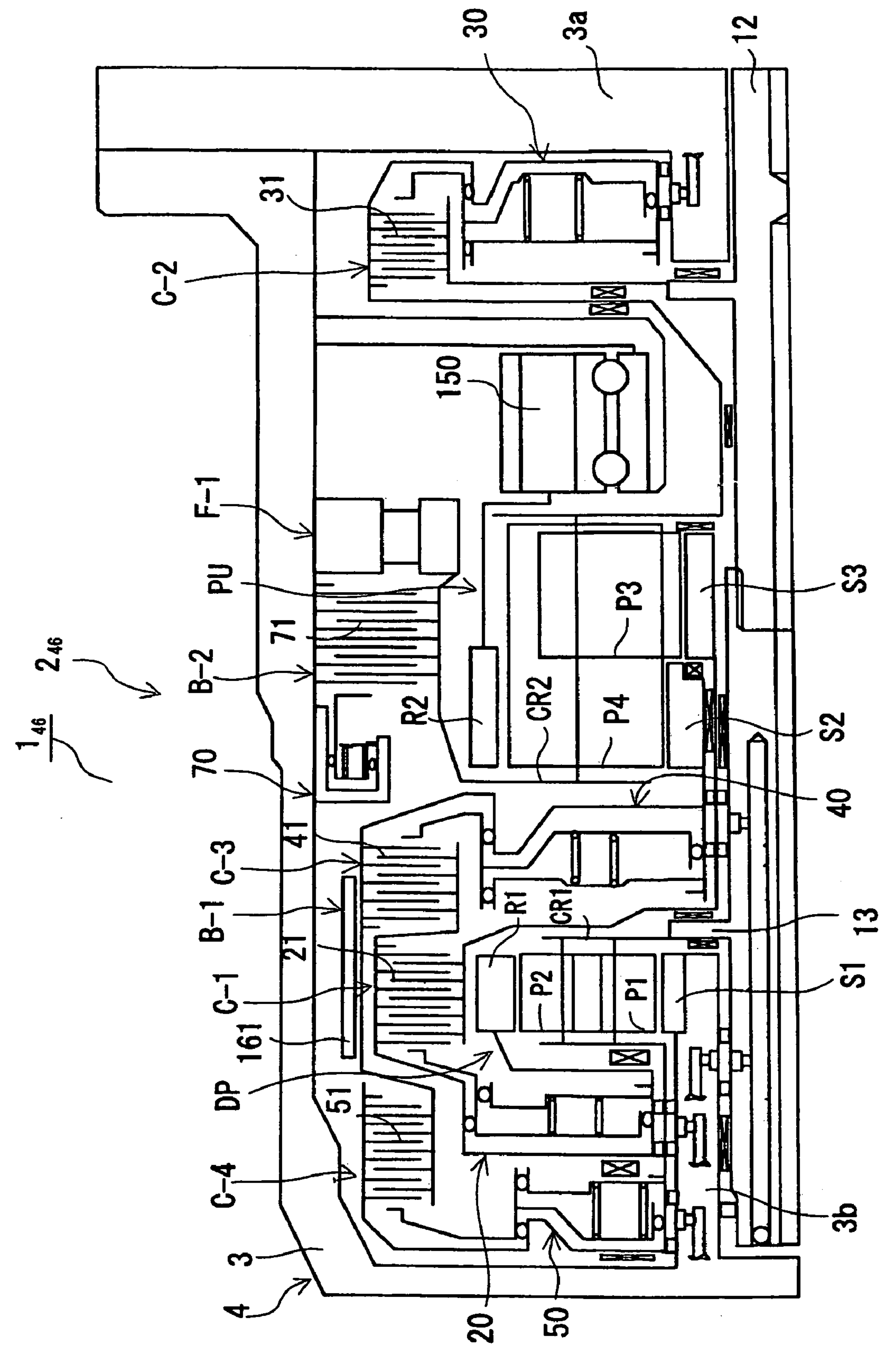
FIG. 56 is a diagrammatic section view showing an automatic transmission according to a 46th exemplary embodiment.

A 46th embodiment, which is a partial modification of the 43rd embodiment described above, will be explained with reference to FIG. 56. In the 46th embodiment explained below, only structures or components different from those of the automatic transmission $1_{43}$ of the 43rd embodiment will be explained and an explanation of the structures or components other than that will be omitted here because they are almost the same.

As compared to the automatic transmission $1_{43}$ of the 43rd embodiment, the automatic transmission $1_{46}$ of the 46th embodiment is arranged so that the lateral (axial) position of the hydraulic servo 20 of the first clutch C-1 and the hydraulic servo 40 of the third clutch C-3 is switched. That is, the hydraulic servo 40 of the third clutch C-3 is disposed axially between the planetary gear DP and the planetary gear unit PU and the hydraulic servo 20 of the first clutch C-1 is disposed axially on the opposite side of the planetary gear DP from the planetary gear unit PU. Specifically, the hydraulic servo 20 of the first clutch C-1 is disposed axially between the planetary gear DP and the hydraulic servo 50 of the fourth clutch C-4.

It is noted that the automatic transmission $1_{30}$ of the 30th embodiment, described above, may be built by inverting a transmission mechanism $2_{46}$ of the automatic transmission $1_{46}$ of the 46th embodiment in the lateral direction (axial direction) almost as it is.

Figure 57:
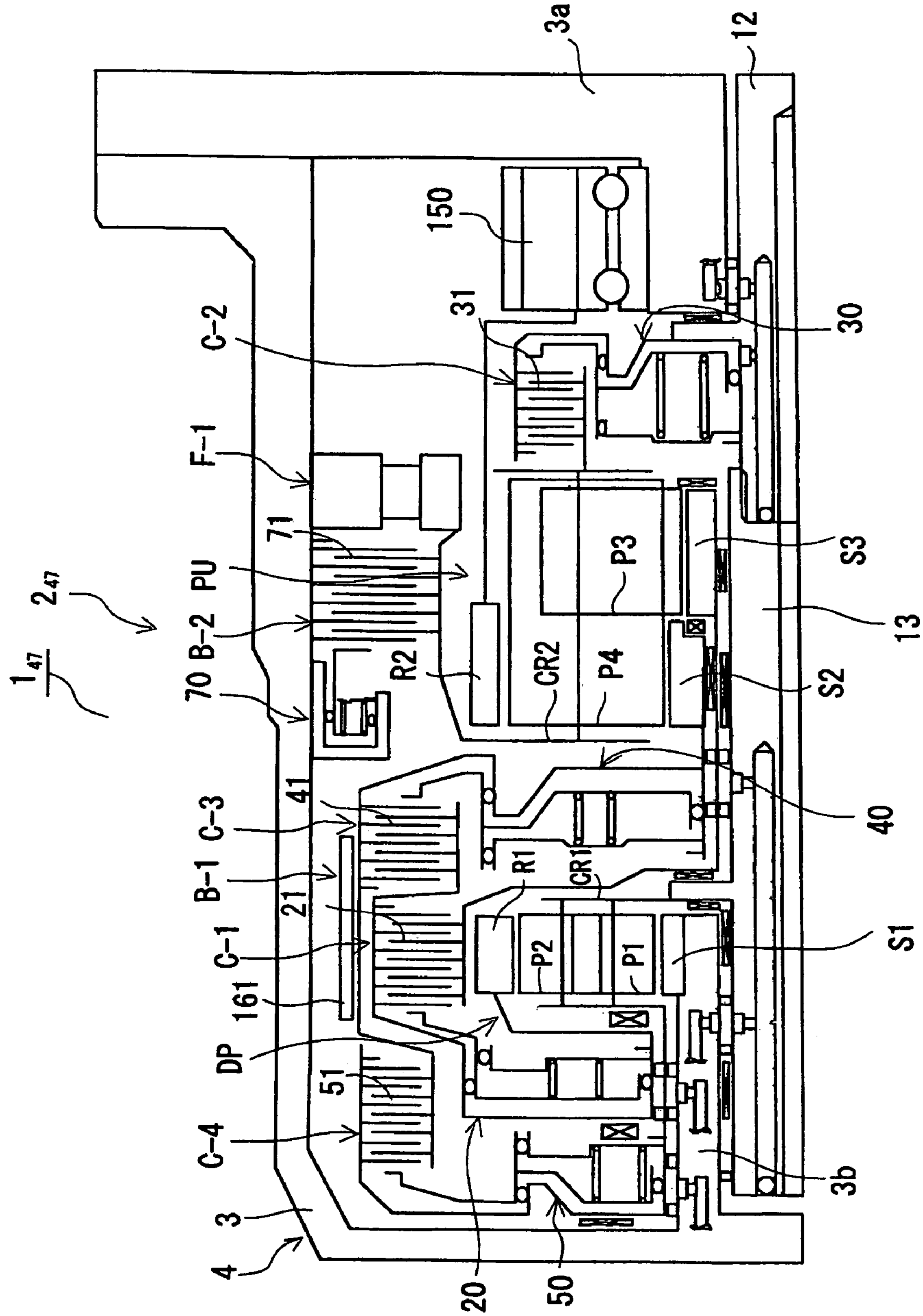
FIG. 57 is a diagrammatic section view showing an automatic transmission according to a 47th exemplary embodiment.

A 47th embodiment, which is a partial modification of the 43rd embodiment described above, will be explained with reference to FIG. 57. In the 47th embodiment explained below, only structures or components different from those of the automatic transmission $1_{43}$ of the 43rd embodiment will be explained and an explanation of the structures or components other than that will be omitted here because they are almost the same.

As compared to the automatic transmission $1_{43}$ of the 43rd embodiment, the automatic transmission $1_{47}$ of the 47th embodiment is arranged so that the lateral (axial) position of the hydraulic servo 20 of the first clutch C-1 and the hydraulic servo 40 of the third clutch C-3 is switched and the lateral (axial) position of the hydraulic servo 20 of the first clutch C-1 and the hydraulic servo 40 of the third clutch C-3 is switched. That is, the hydraulic servo 40 of the third clutch C-3 is disposed axially between the planetary gear DP and the planetary gear unit PU and the hydraulic servo 20 of the first clutch C-1 is disposed axially on the opposite side of the planetary gear DP from the planetary gear unit PU. Specifically, the hydraulic servo 20 of the first clutch C-1 is disposed axially between the planetary gear DP and the hydraulic servo 50 of the fourth clutch C-4.

It is noted that the automatic transmission $1_{31}$ of the 31st embodiment, described above, may be built by inverting a transmission mechanism $2_{47}$ of the automatic transmission $1_{47}$ of the 47th embodiment in the lateral direction (axial direction) almost as it is.

Figure 58:
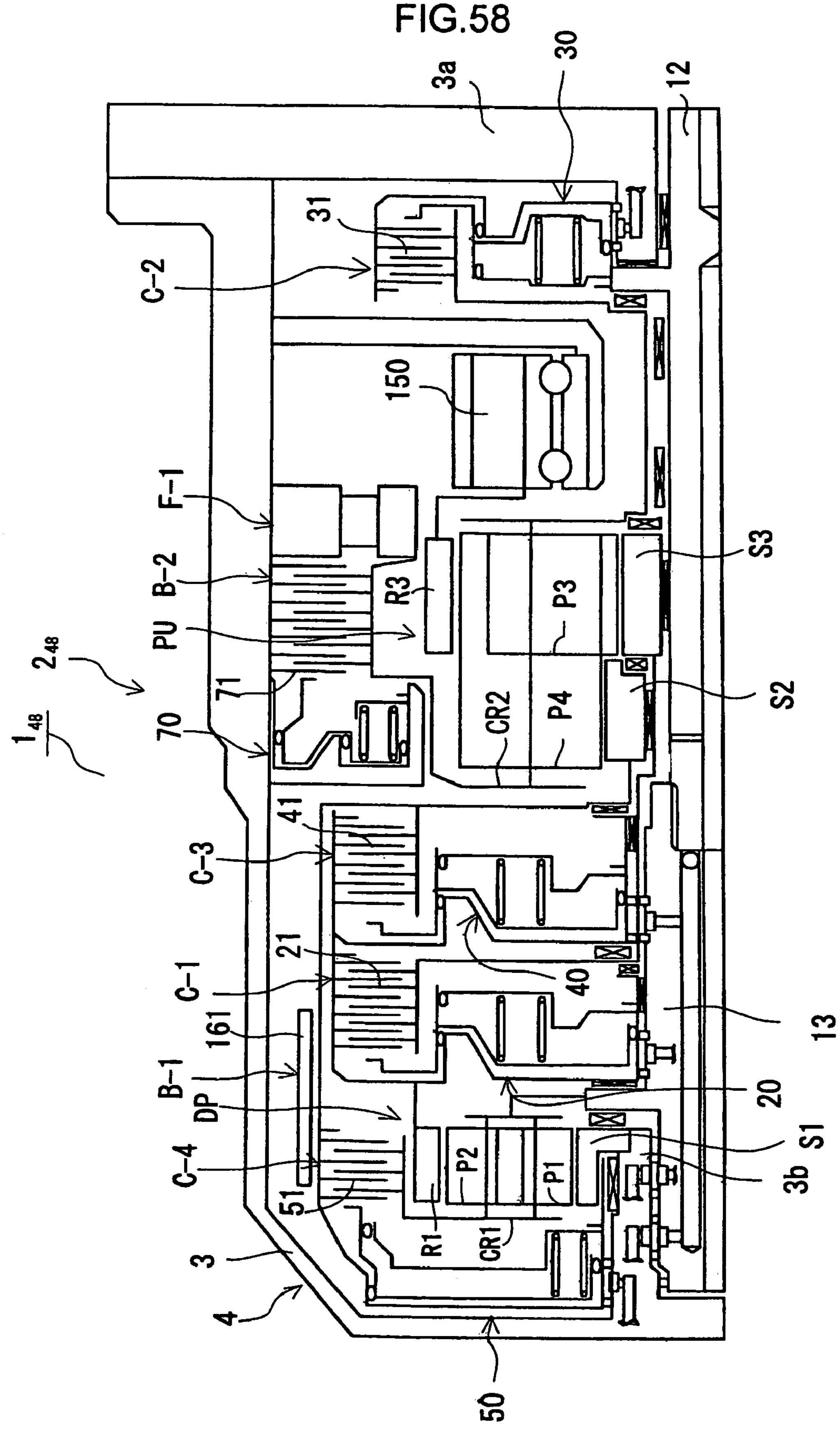
FIG. 58 is a diagrammatic section view showing an automatic transmission according to a 48th exemplary embodiment.

A 48th embodiment, which is a partial modification of the 43rd embodiment described above, will be explained with reference to FIG. 58. In the 48th embodiment explained below, only structures or components different from those of the automatic transmission $1_{43}$ of the 43rd embodiment will be explained and an explanation of the structures or components other than that will be omitted here because they are almost the same.

As compared to the automatic transmission $1_{43}$ of the 43rd embodiment, the automatic transmission $1_{48}$ of the 48th embodiment is arranged so that the hydraulic servo 40 of the third clutch C-3 is disposed axially between the planetary gear DP and the planetary gear unit PU, or more specifically, axially between the hydraulic servo 20 of the first clutch C-1 and the planetary gear unit PU.

It is noted that the automatic transmission $1_{32}$ of the 32nd embodiment, described above, may be built by inverting a transmission mechanism $2_{48}$ of the automatic transmission $1_{48}$ of the 48th embodiment in the lateral direction (axial direction) almost as it is.

Figure 59:
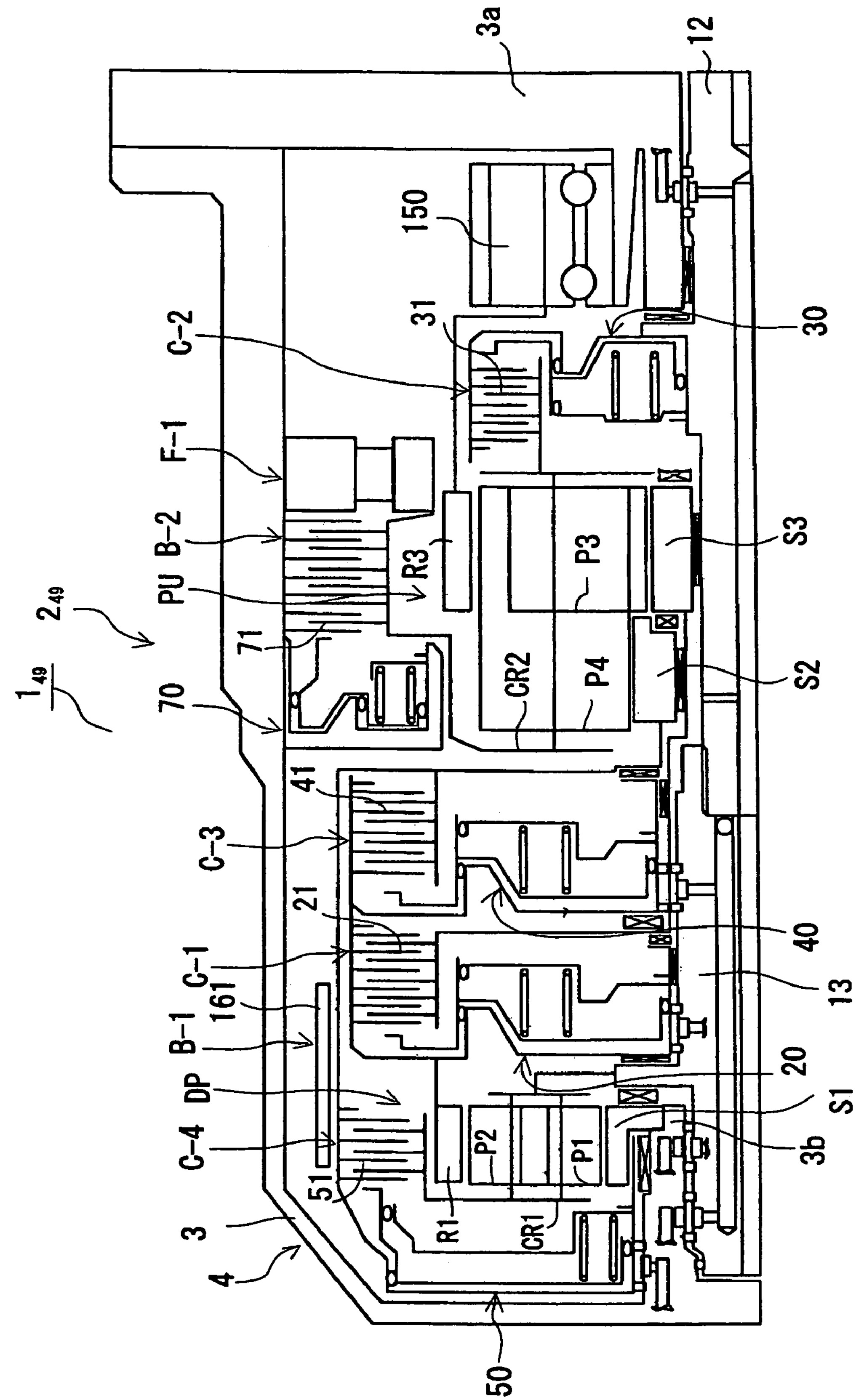
FIG. 59 is a diagrammatic section view showing an automatic transmission according to a 49th exemplary embodiment.

A 49th embodiment, which is a partial modification of the 43rd embodiment described above, will be explained with reference to FIG. 59. In the 49th embodiment explained below, only structures or components different from those of the automatic transmission $1_{43}$ of the 43rd embodiment will be explained and an explanation of the structures or components other than that will be omitted here because they are almost the same.

As compared to the automatic transmission $1_{43}$ of the 43rd embodiment, the automatic transmission $1_{49}$ of the 49th embodiment is arranged so that the lateral (axial) directions of the counter gear 150 and the hydraulic servo 30 of the second clutch C-2 are switched and the hydraulic servo 40 of the third clutch C-3 is disposed axially between the planetary gear DP and the planetary gear unit PU, or more specifically, axially between the hydraulic servo 20 of the first clutch C-1 and the planetary gear unit PU.

It is noted that the automatic transmission $1_{33}$ of the 33rd embodiment, described above, may be built by inverting a transmission mechanism $2_{49}$ of the automatic transmission $1_{49}$ of the 49th embodiment in the lateral direction (axial direction) almost as it is.

Figure 60:
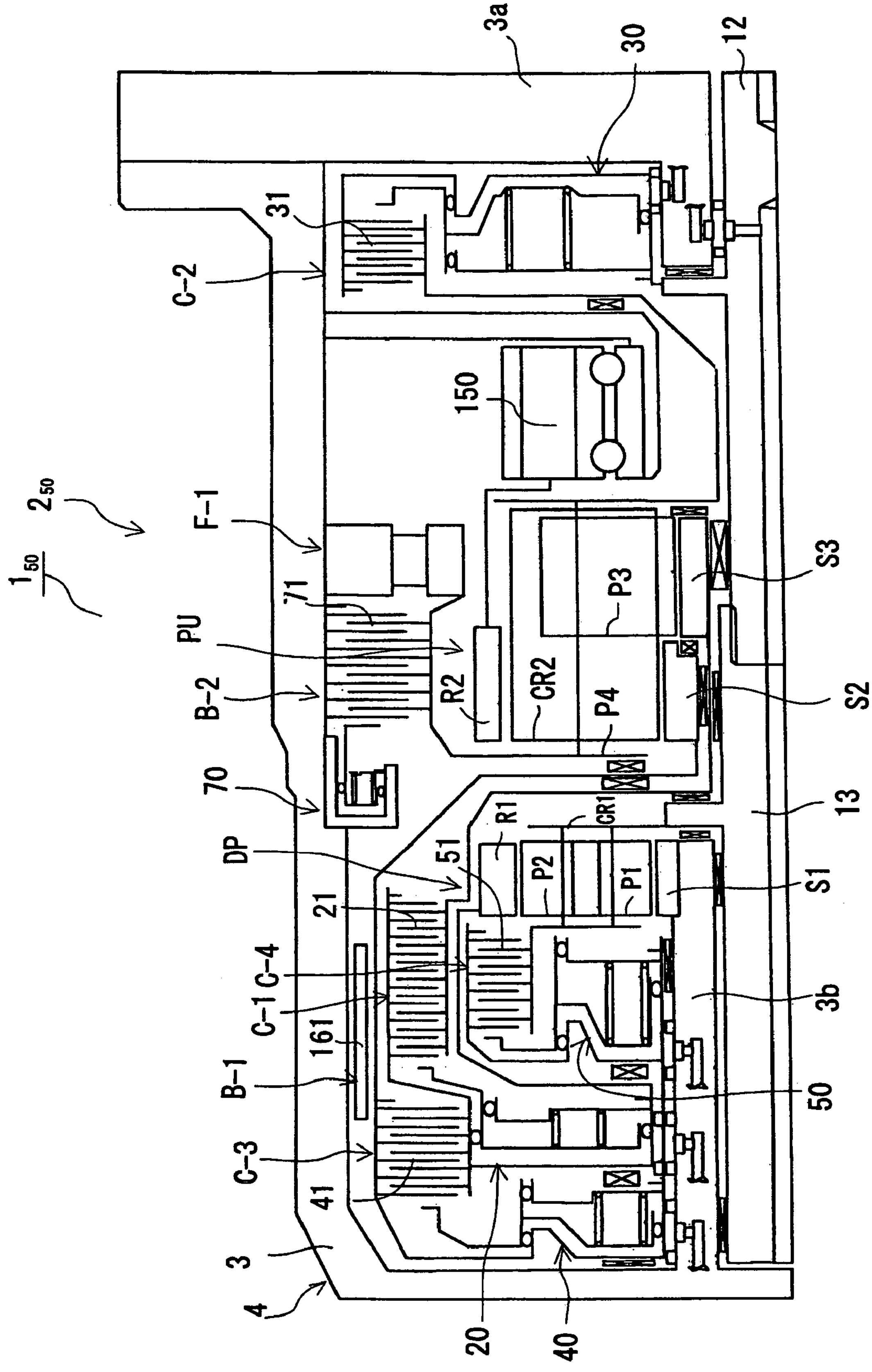
FIG. 60 is a diagrammatic section view showing an automatic transmission according to a 50th exemplary embodiment.

A 50th embodiment, which is a partial modification of the 43rd embodiment described above, will be explained with reference to FIG. 60. In the 50th embodiment explained below, only structures or components different from those of the automatic transmission $1_{43}$ of the 43rd embodiment will be explained and an explanation of the structures or components other than that will be omitted here because they are almost the same.

As compared to the automatic transmission $1_{43}$ of the 43rd embodiment, the automatic transmission $1_{50}$ of the 50th embodiment is arranged so that the hydraulic servo 20 of the first clutch C-1 is disposed axially on the opposite side of the planetary gear DP from the planetary gear unit PU, or more specifically, the hydraulic servo 20 of the first clutch C-1 is disposed axially between the hydraulic servo 40 of the third clutch C-3 and the hydraulic servo 50 of the fourth clutch C-4.

It is noted that the automatic transmission $1_{34}$ of the 34th embodiment, described above, may be built by inverting a transmission mechanism $2_{50}$ of the automatic transmission $1_{50}$ of the 50th embodiment in the lateral direction (axial direction) almost as it is.

Figure 61:
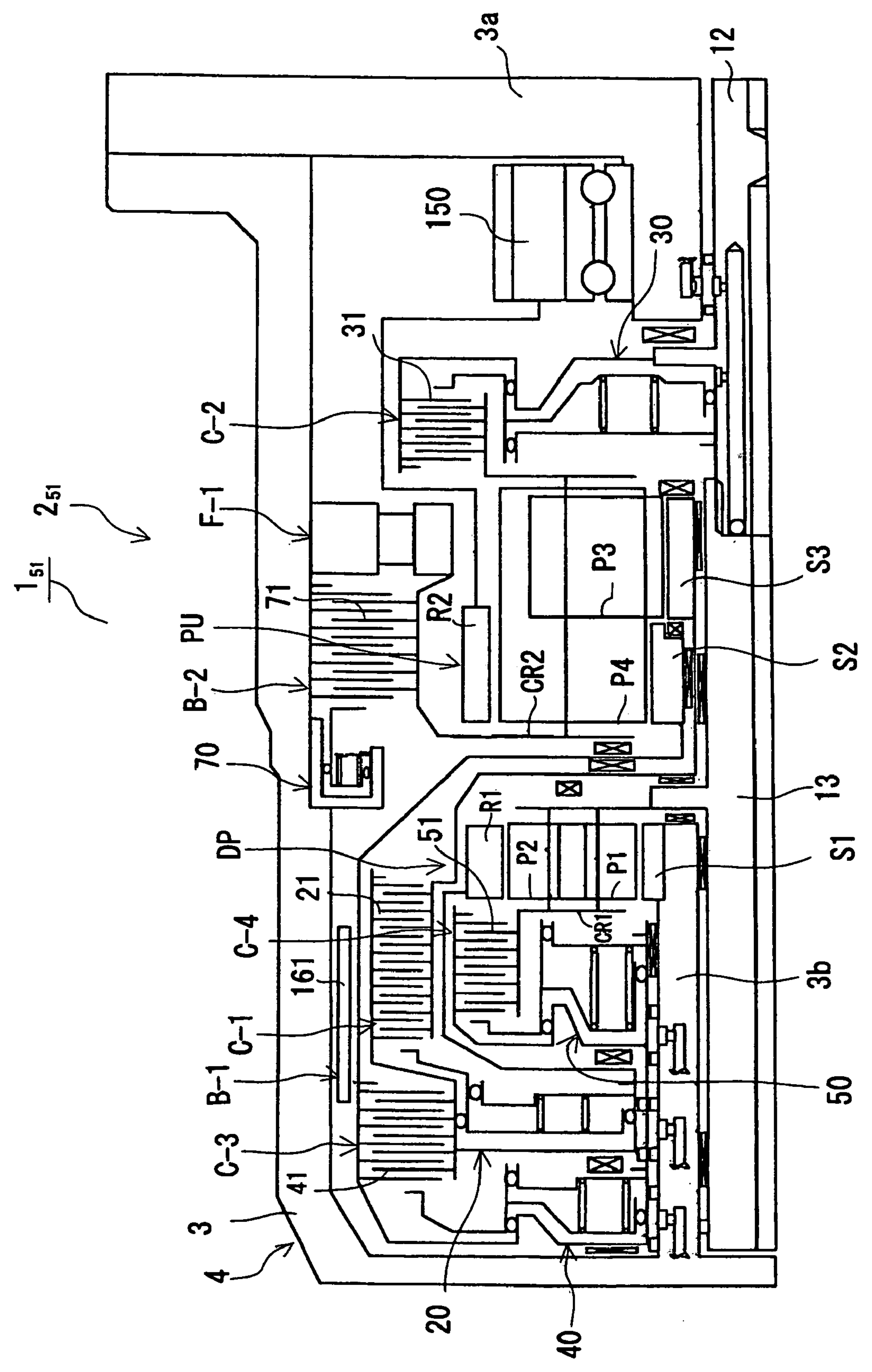
FIG. 61 is a diagrammatic section view showing an automatic transmission according to a 51st exemplary embodiment.

A 51st embodiment, which is a partial modification of the 43rd embodiment described above, will be explained with reference to FIG. 61. In the 51st embodiment explained below, only structures or components different from those of the automatic transmission $1_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{51}$ of the 51st embodiment is arranged so that the lateral (axial) position of the counter gear 150 and the hydraulic servo 30 of the second clutch C-2 is switched and the hydraulic servo 20 of the first clutch C-1 is disposed axially on the opposite side of the planetary gear DP from the planetary gear unit PU, or more specifically, the hydraulic servo 20 of the first clutch C-1 is disposed axially between the hydraulic servo 40 of the third clutch C-3 and the hydraulic servo 50 of the fourth clutch C-4.

It is noted that the automatic transmission $\mathbf{1}_{35}$ of the 35th embodiment, described above, may be built by inverting a transmission mechanism $\mathbf{2}_{51}$ of the automatic transmission $\mathbf{1}_{51}$ of the 51st embodiment in the lateral direction (axial direction) almost as it is.

Figure 62:
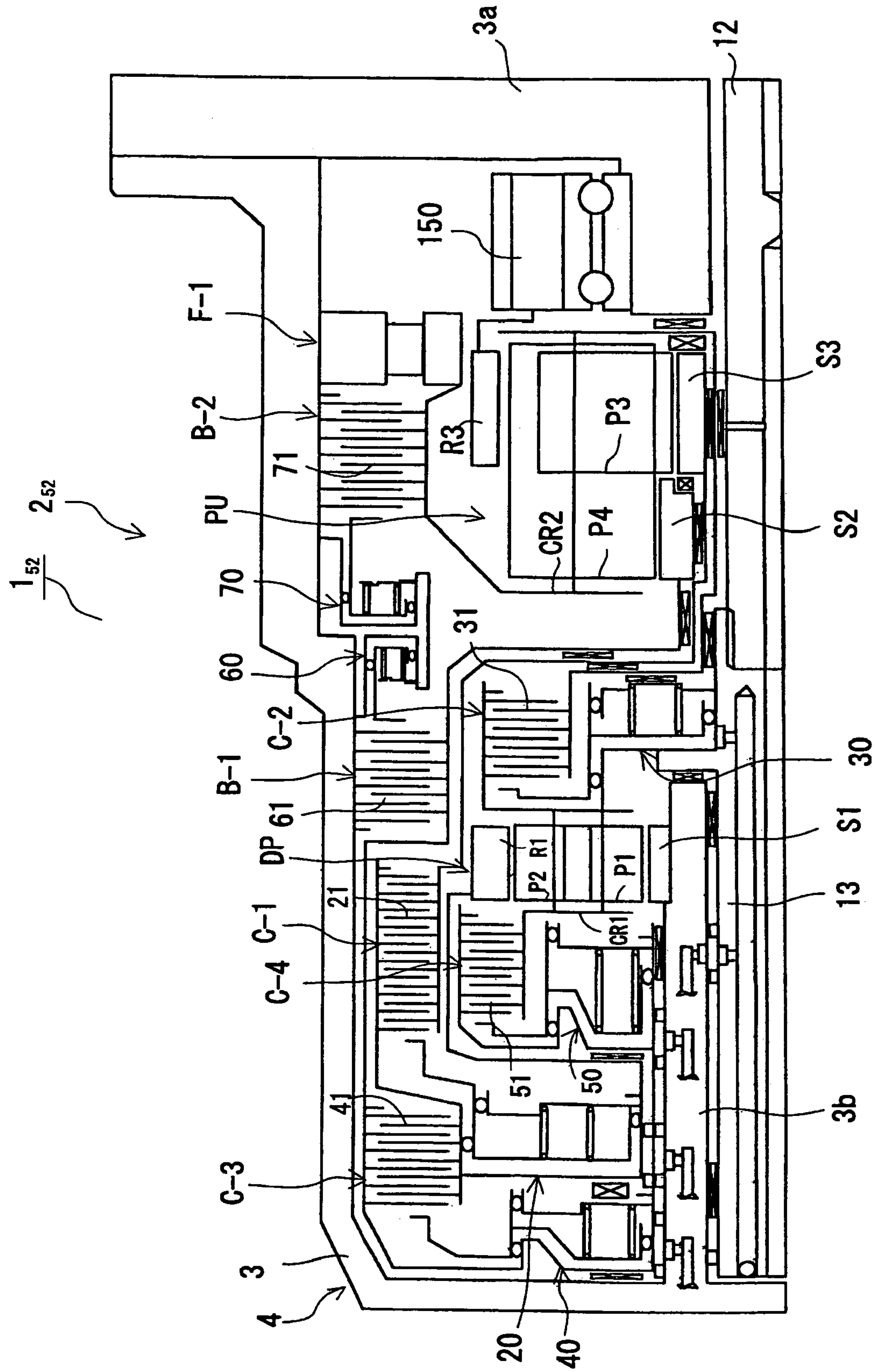
FIG. 62 is a diagrammatic section view showing an automatic transmission according to a 52nd exemplary embodiment.

A 52nd embodiment, which is a partial modification of the 43rd embodiment described above, will be explained with reference to FIG. 62. In the 52nd embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{52}$ of the 52nd embodiment is arranged so that the hydraulic servo 20 of the first clutch C-1 is disposed axially on the opposite side of the planetary gear DP from the planetary gear unit PU, or more specifically, the hydraulic servo 20 of the first clutch C-1 is disposed axially between the hydraulic servo 40 of the third clutch C-3 and the hydraulic servo 50 of the fourth clutch C-4. Further, the hydraulic servo 30 of the second clutch C-2 is disposed axially between the planetary gear DP and the planetary gear unit PU. The multi-plate type brake, similar to that of the first embodiment, is used for the first brake B-1 instead of the band brake.

It is noted that the automatic transmission $\mathbf{1}_{36}$ of the 36th embodiment, described above, may be built by inverting a transmission mechanism $\mathbf{2}_{52}$ of the automatic transmission $\mathbf{1}_{52}$ of the 52nd embodiment in the lateral direction (axial direction) almost as it is.

Figure 63:
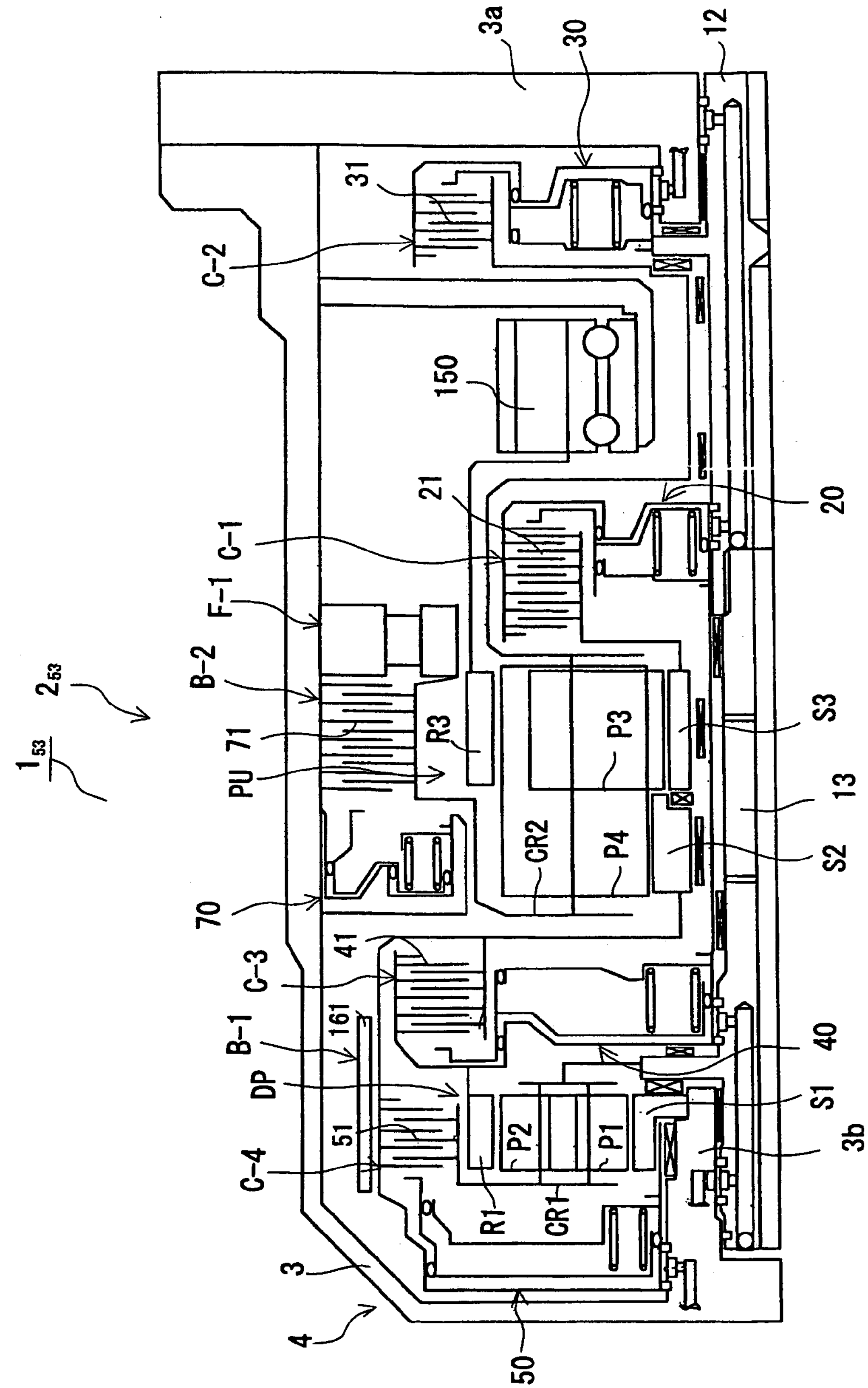
FIG. 63 is a diagrammatic section view showing an automatic transmission according to a 53rd exemplary embodiment.

A 53rd embodiment, which is a partial modification of the 43rd embodiment described above, will be explained with reference to FIG. 63. In the 53rd embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{53}$ of the 53rd embodiment is arranged so that the hydraulic servo 20 of the first clutch C-1 is disposed axially on the opposite side of the planetary gear unit PU from the planetary gear DP, or more specifically, the hydraulic servo 20 of the first clutch C-1 is disposed axially between the counter gear 150 and the planetary gear unit PU. Further, the hydraulic servo 40 of the third clutch C-3 is disposed axially between the planetary gear DP and the planetary gear unit PU.

It is noted that the automatic transmission $\mathbf{1}_{37}$ of the 37th embodiment, described above, may be built by inverting a transmission mechanism $\mathbf{2}_{53}$ of the automatic transmission $\mathbf{1}_{53}$ of the 53rd embodiment in the lateral direction (axial direction) almost as it is.

Figure 64:
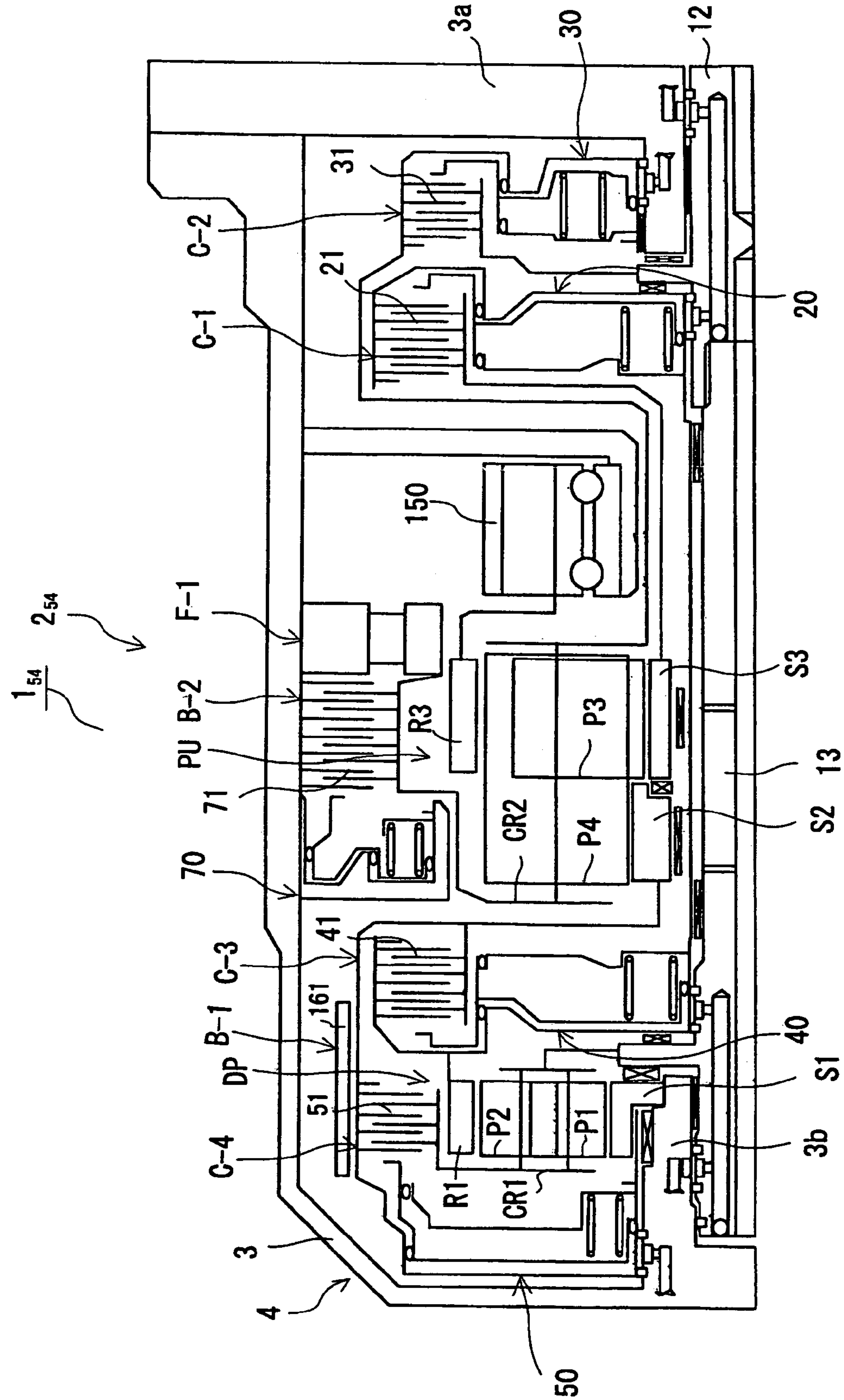
FIG. 64 is a diagrammatic section view showing an automatic transmission according to a 54th exemplary embodiment.

A 54th embodiment, which is a partial modification of the 43rd embodiment described above, will be explained with reference to FIG. 64. In the 54th embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{54}$ of the 54th embodiment is arranged so that the hydraulic servo 20 of the first clutch C-1 is disposed axially on the opposite side of the planetary gear unit PU from the planetary gear DP, or more specifically, the hydraulic servo 20 of the first clutch C-1 is disposed axially between the counter gear 150 and the hydraulic servo 30 of the second clutch C-2. Further, the hydraulic servo 40 of the third clutch C-3 is disposed axially between the planetary gear DP and the planetary gear unit PU.

It is noted that the automatic transmission $\mathbf{1}_{38}$ of the 38th embodiment, described above, may be built by inverting a transmission mechanism $\mathbf{2}_{54}$ of the automatic transmission $\mathbf{1}_{54}$ of the 54th embodiment in the lateral direction (axial direction) almost as it is.

Figure 65:
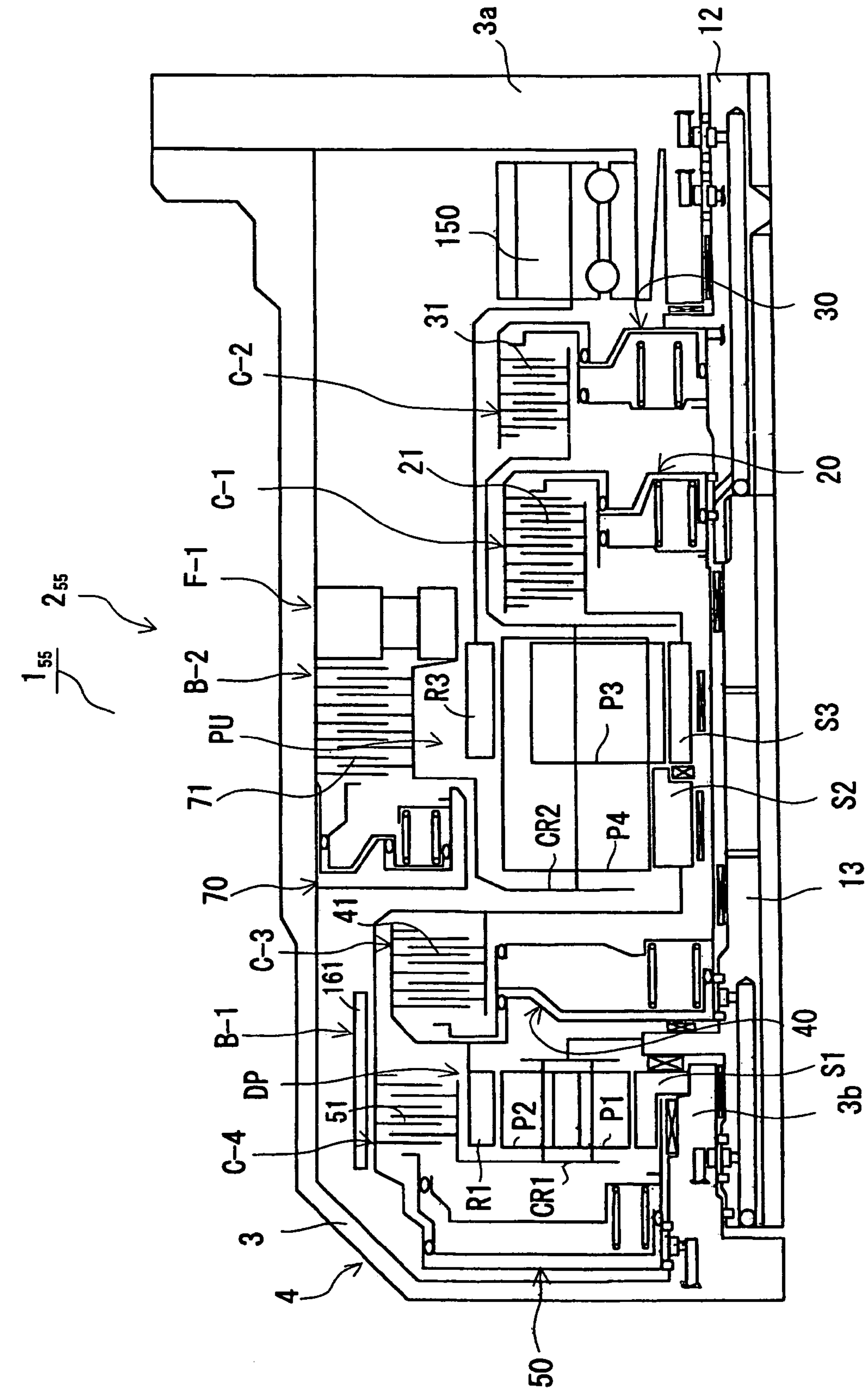
FIG. 65 is a diagrammatic section view showing an automatic transmission according to a 55th exemplary embodiment.

A 55th embodiment, which is a partial modification of the 43rd embodiment described above, will be explained with reference to FIG. 65. In the 55th embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{55}$ of the 55th embodiment is arranged so that the lateral (axial) position of the counter gear 150 and the hydraulic servo 30 of the second clutch C-2 is switched. Further, the hydraulic servo 20 of the first clutch C-1 is disposed axially on the opposite side of the planetary gear unit PU from the planetary gear DP, or more specifically, the hydraulic servo 20 of the first clutch C-1 is disposed axially between the planetary gear unit PU and the hydraulic servo 30 of the second clutch C-2. Further, the hydraulic servo 40 of the third clutch C-3 is disposed axially between the planetary gear DP and the planetary gear unit PU.

It is noted that the automatic transmission $\mathbf{1}_{39}$ of the 39th embodiment, described above, may be built by inverting a transmission mechanism $\mathbf{2}_{55}$ of the automatic transmission $\mathbf{1}_{55}$ of the 55th embodiment in the lateral direction (axial direction) almost as it is.

Figure 66:
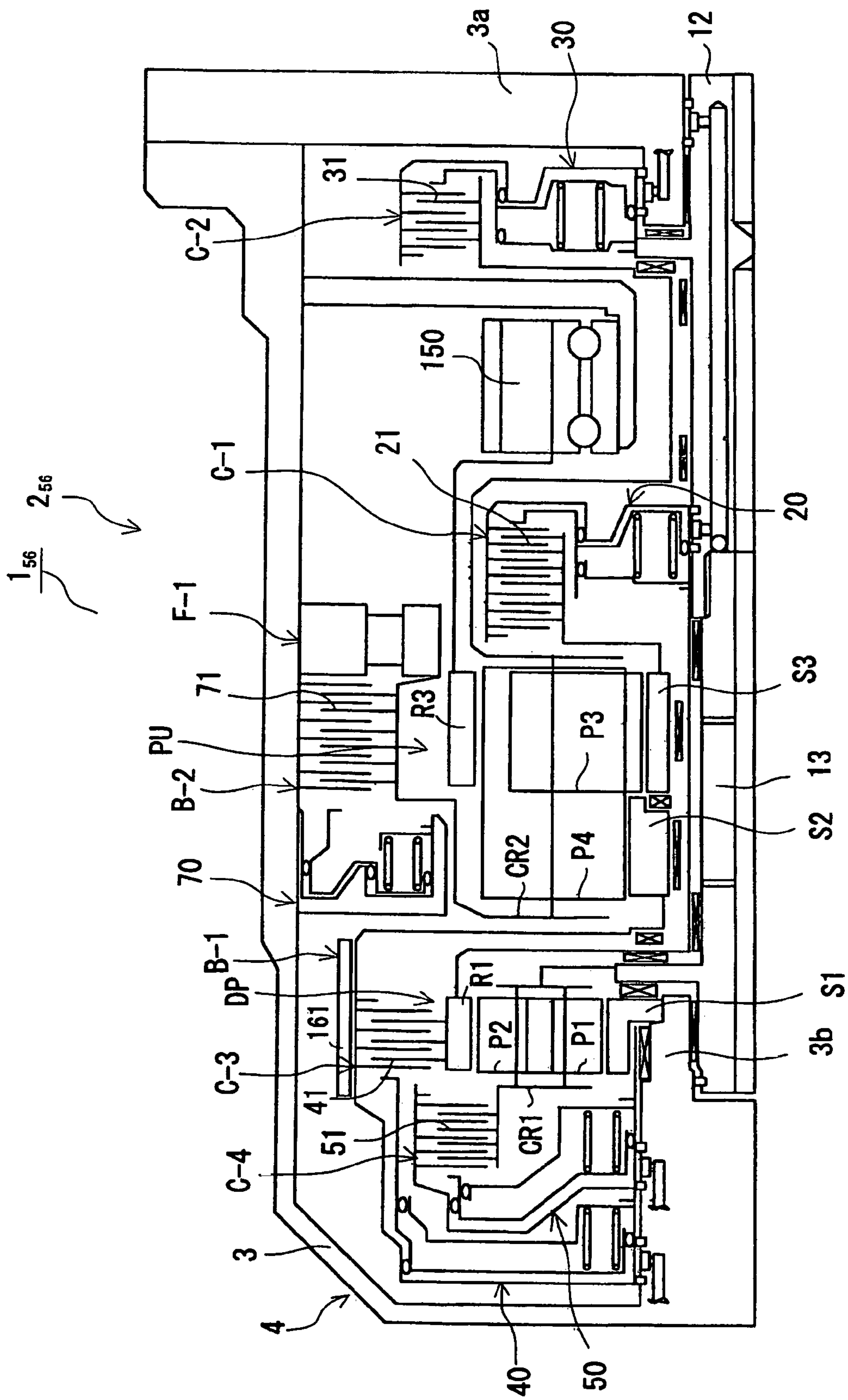
FIG. 66 is a diagrammatic section view showing an automatic transmission according to a 56th exemplary embodiment.

A 56th embodiment, which is a partial modification of the 43rd embodiment described above, will be explained with reference to FIG. 66. In the 56th embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{56}$ of the 56th embodiment is arranged so that the hydraulic servo 20 of the first clutch C-1 is disposed axially on the opposite side of the planetary gear unit PU from the planetary gear DP, or more specifically, the hydraulic servo 20 of the first clutch C-1 is disposed axially between the planetary gear unit PU and the counter gear 150.

It is noted that the automatic transmission $\mathbf{1}_{40}$ of the 40th embodiment, described above, may be built by inverting a transmission mechanism $\mathbf{2}_{56}$ of the automatic transmission $\mathbf{1}_{56}$ of the 56th embodiment in the lateral direction (axial direction) almost as it is.

Figure 67:
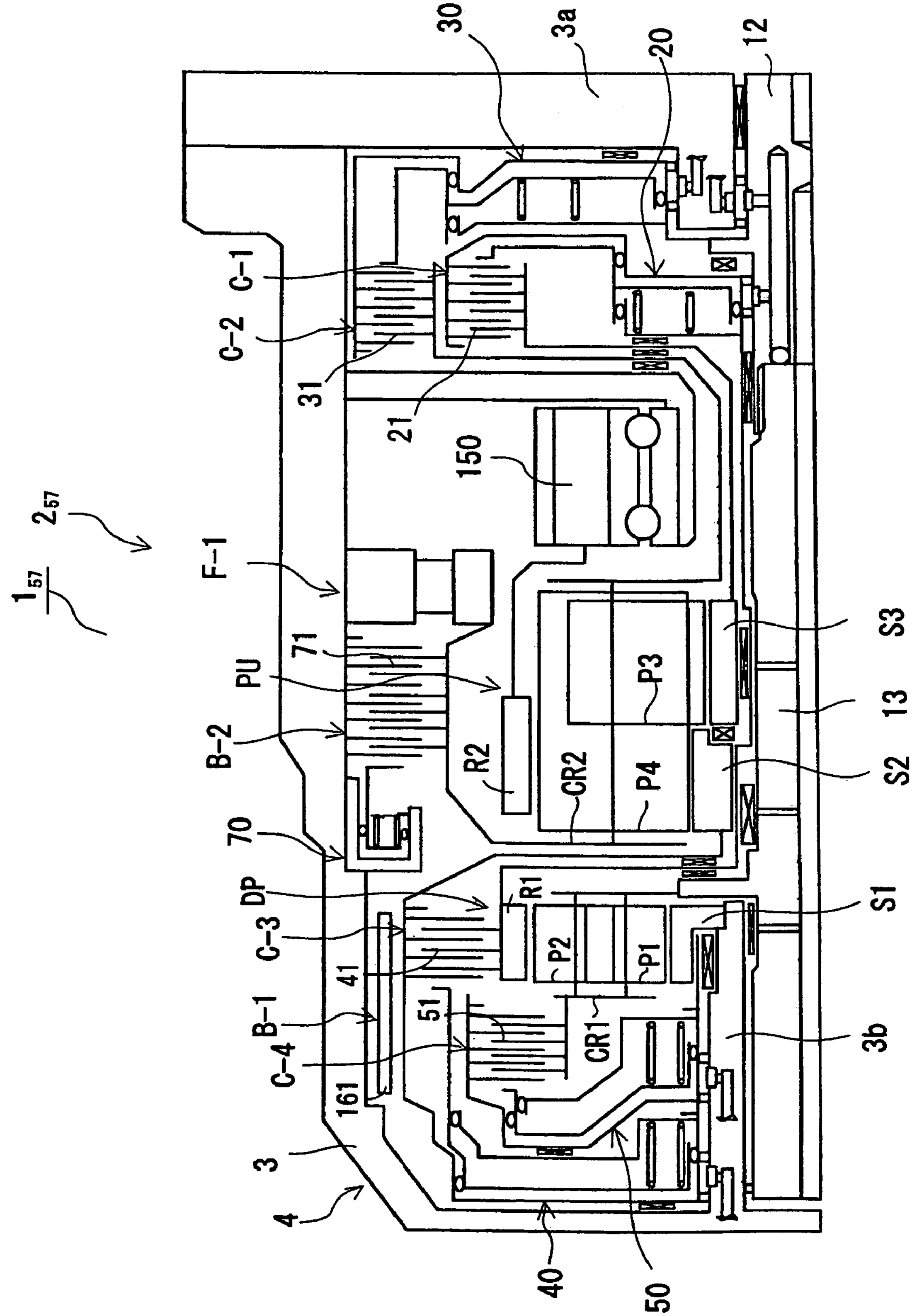
FIG. 67 is a diagrammatic section view showing an automatic transmission according to a 57th exemplary embodiment.

A 57th embodiment, which is a partial modification of the 43rd embodiment described above, will be explained with reference to FIG. 67. In the 57th embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{57}$ of the 57th embodiment is arranged so that the hydraulic servo 20 of the first clutch C-1 is disposed axially on the opposite side of the planetary gear unit PU from the planetary gear DP, or more specifically, the hydraulic servo 20 of the first clutch C-1 is disposed axially between the counter gear 150 and the hydraulic servo 30 of the second clutch C-2.

It is noted that the automatic transmission $\mathbf{1}_{41}$ of the 41st embodiment, described above, may be built by inverting a transmission mechanism $\mathbf{2}_{57}$ of the automatic transmission $\mathbf{1}_{57}$ of the 57th embodiment in the lateral direction (axial direction) almost as it is.

Figure 68:
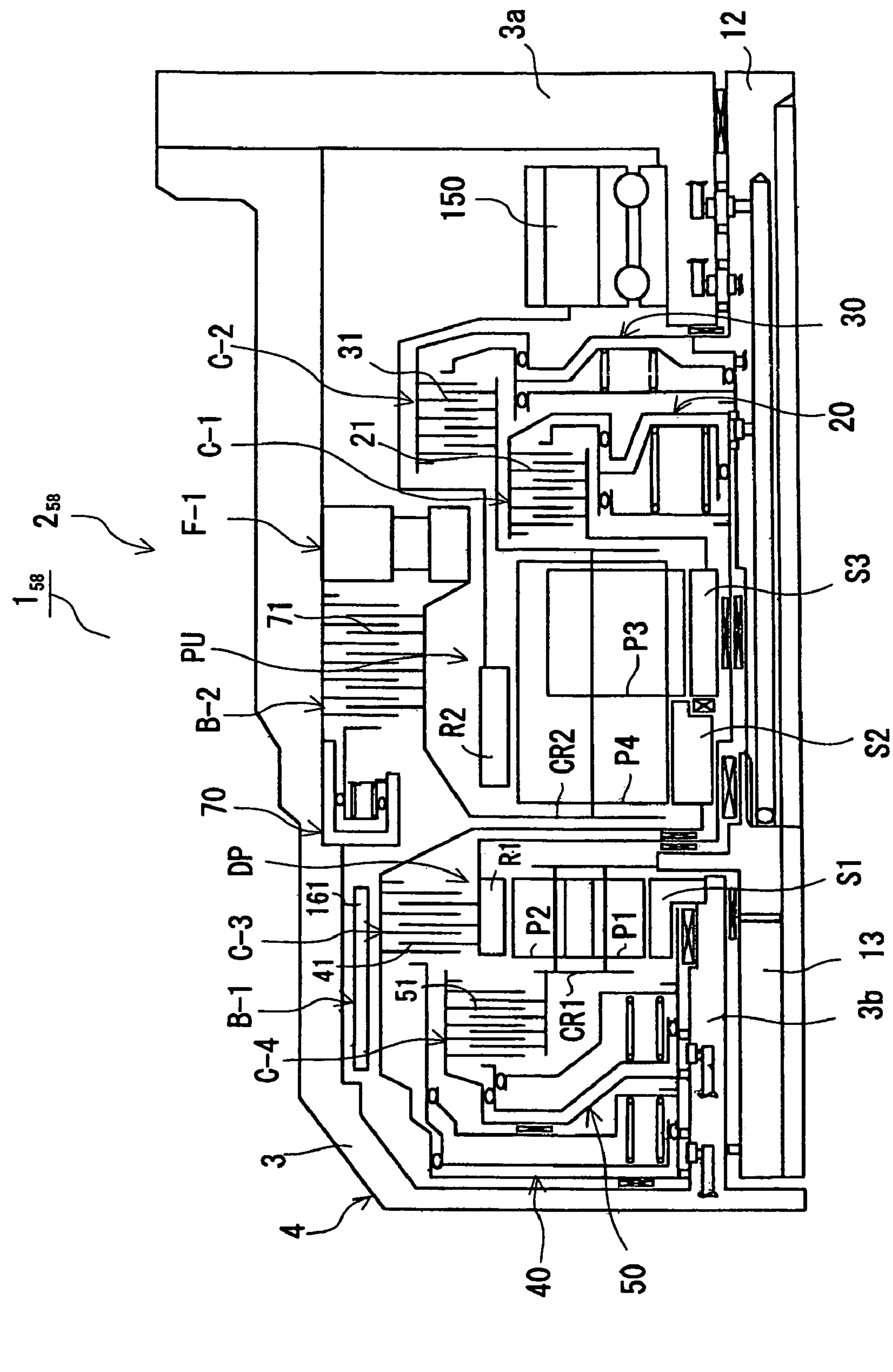
FIG. 68 is a diagrammatic section view showing an automatic transmission according to a 58th exemplary embodiment.

A 58th embodiment, which is a partial modification of the 43rd embodiment described above, will be explained with reference to FIG. 68. In the 58th embodiment explained below, only structures or components different from those of the automatic transmission $\mathbf{1}_{43}$ of the 43rd embodiment will be explained and an explanation of the structures or components other than that will be omitted here because they are almost the same.

As compared to the automatic transmission $\mathbf{1}_{43}$ of the 43rd embodiment, the automatic transmission $\mathbf{1}_{58}$ of the 58th embodiment is arranged so that the lateral (axial) position of the counter gear 150 and the hydraulic servo 30 of the second clutch C-2 is switched and the hydraulic servo 20 of the first clutch C-1 is disposed axially on the opposite side of the planetary gear unit PU from the planetary gear DP. Specifically, the hydraulic servo 20 of the first clutch C-1 is disposed axially between the hydraulic servo 30 of the second clutch C-2 and the planetary gear unit PU.

It is noted that the automatic transmission $\mathbf{1}_{42}$ of the 42nd embodiment, described above, may be built by inverting a transmission mechanism $\mathbf{2}_{58}$ of the automatic transmission $\mathbf{1}_{58}$ of the 58th embodiment in the lateral direction (axial direction) almost as it is.

A 59th embodiment, which is a partial modification of the first through 58th embodiments described above, will be explained with reference to FIG. 69. In the 59th embodiment explained below, only structures or components different from those of the automatic transmission $\mathbf{1}_{43}$ of the 43rd embodiment will be explained and an explanation of the structures or components other than that will be omitted here because they are almost the same.

Figure 69:
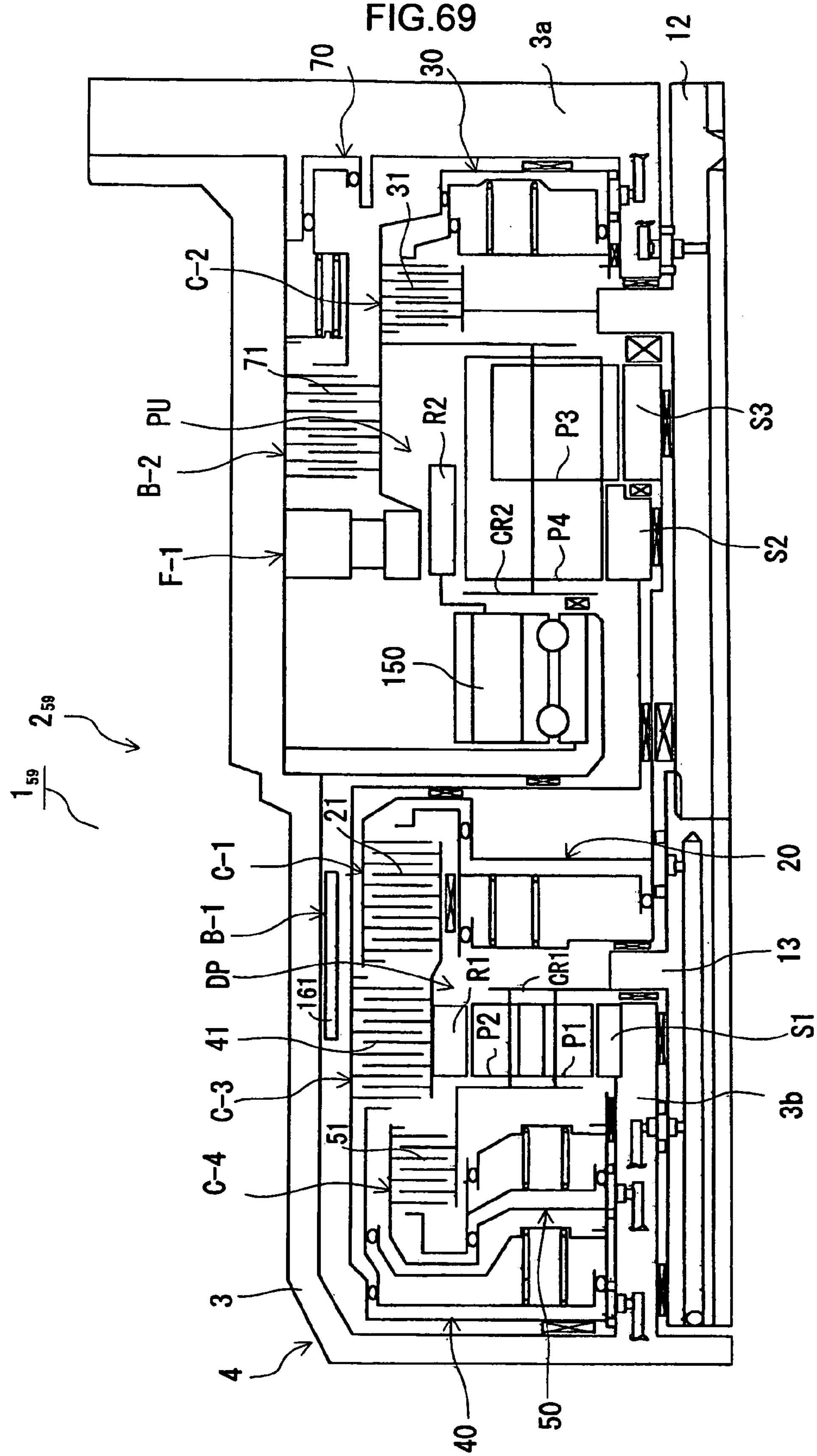
FIG. 69 is a diagrammatic section view showing an automatic transmission according to a 59th exemplary embodiment.

As compared to the automatic transmission $\mathbf{1}_{14}$ of the 14th embodiment described above, the automatic transmission $\mathbf{1}_{59}$ which is suitably mounted in an FF-type (front drive, front engine) vehicle, for example, is characterized in that the disposition of the first through fourth clutches C-1 through C-4, the first and second brakes B-1, B-2, the one-way clutch F-1, the planetary gear DP, the planetary gear unit PU and the counter gear 150 is nearly inverted in the lateral (axial) direction while keeping the input shaft 12 and the intermediate shaft 13 as they are, i.e., while keeping the direction in which the engine is disposed as it is as shown in FIG. 69. That is, the automatic transmission $\mathbf{1}_{59}$ is built by nearly inverting the transmission mechanism $\mathbf{2}_{14}$ in the lateral (axial) direction.

More specifically, the transmission mechanism $\mathbf{2}_{59}$ of the automatic transmission $\mathbf{1}_{59}$ is disposed on an axis centering on the input shaft 12 and the intermediate shaft 13 which are on the same axis with the output shaft of the engine (not shown), for example, and the planetary gear unit PU is disposed on the input shaft 12 within the mission case 3. The hydraulic servo 40 of the third clutch C-3, the hydraulic servo 50 of the fourth clutch C-4, the planetary gear DP, the hydraulic servo 20 of the first clutch C-1 and the counter gear 150 are disposed in order from the left axially on the left side of the planetary gear unit PU. Further, the first brake B-1, comprised of a band brake 161, is disposed on the outer peripheral side of the clutch drum of the mission case 3.

It is noted that the hydraulic servo 40 of the third clutch C-3, the hydraulic servo 50 of the fourth clutch C-4, and the planetary gear DP are disposed on the boss portion 3*b* extending from the partitioning portion 3*c* of the mission case 3 and the hydraulic servo 20 of the first clutch C-1 is disposed on the intermediate shaft 13.

Meanwhile, the hydraulic servo 30 of the second clutch C-2 is disposed axially on the right side (input side) of the planetary gear unit PU. Further, the second brake B-2 and the one-way clutch F-1 are disposed on the outer peripheral side of the planetary gear unit PU.

As described above, the hydraulic servo 40 of the third clutch C-3 and the hydraulic servo 50 of the fourth clutch C-4 are disposed axially on the opposite side of the planetary gear DP from the planetary gear unit PU, the hydraulic servo 20 of the first clutch C-1 and the counter gear 150 are disposed axially between the planetary gear DP and the planetary gear unit PU and the hydraulic servo 30 of the second clutch C-2 is disposed axially on the opposite side of the planetary gear unit PU from the planetary gear DP.

Figure 70:
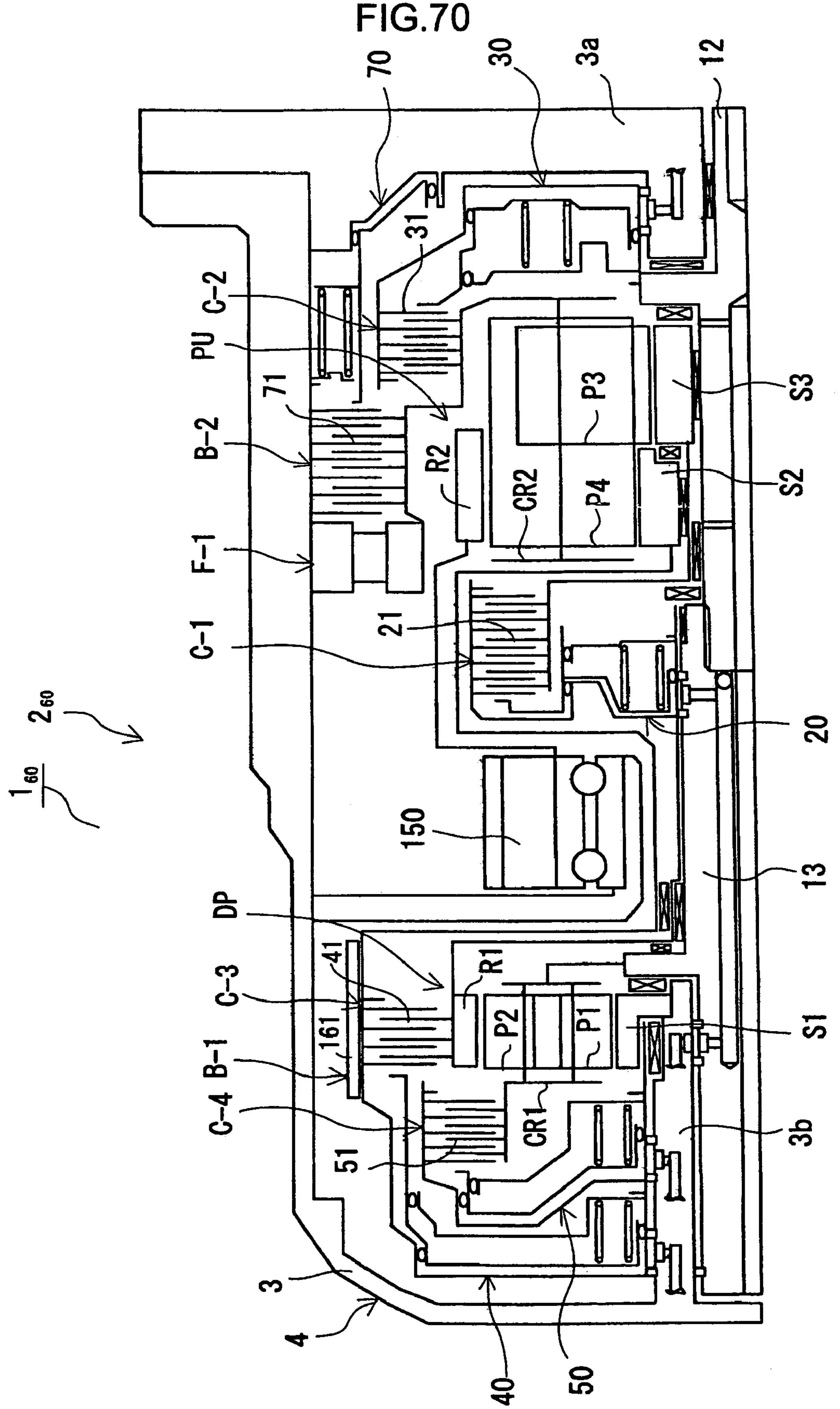
FIG. 70 is a diagrammatic section view showing an automatic transmission according to a 60th exemplary embodiment.

A 60th embodiment, which is a partial modification of the 59th embodiment, will be explained with reference to FIG. 70. In the 60th embodiment explained below, only structures or components different from those of the automatic transmission $\mathbf{1}_{59}$ of the 59th embodiment will be explained and an explanation of the structures or components other than that will be omitted here because they are almost the same.

As compared to the automatic transmission $\mathbf{1}_{59}$ of the 59th embodiment, the automatic transmission $\mathbf{1}_{60}$ of the 60th embodiment is arranged so that the lateral (axial) disposition of the hydraulic servo 20 of the first clutch C-1 and the counter gear 150 is switched.

It is noted that the automatic transmission $\mathbf{1}_{15}$ of the 15th embodiment, described above, may be built by inverting a transmission mechanism $\mathbf{2}_{60}$ of the automatic transmission $\mathbf{1}_{60}$ of the 60th embodiment in the lateral direction (axial direction) almost as it is.

Figure 71:
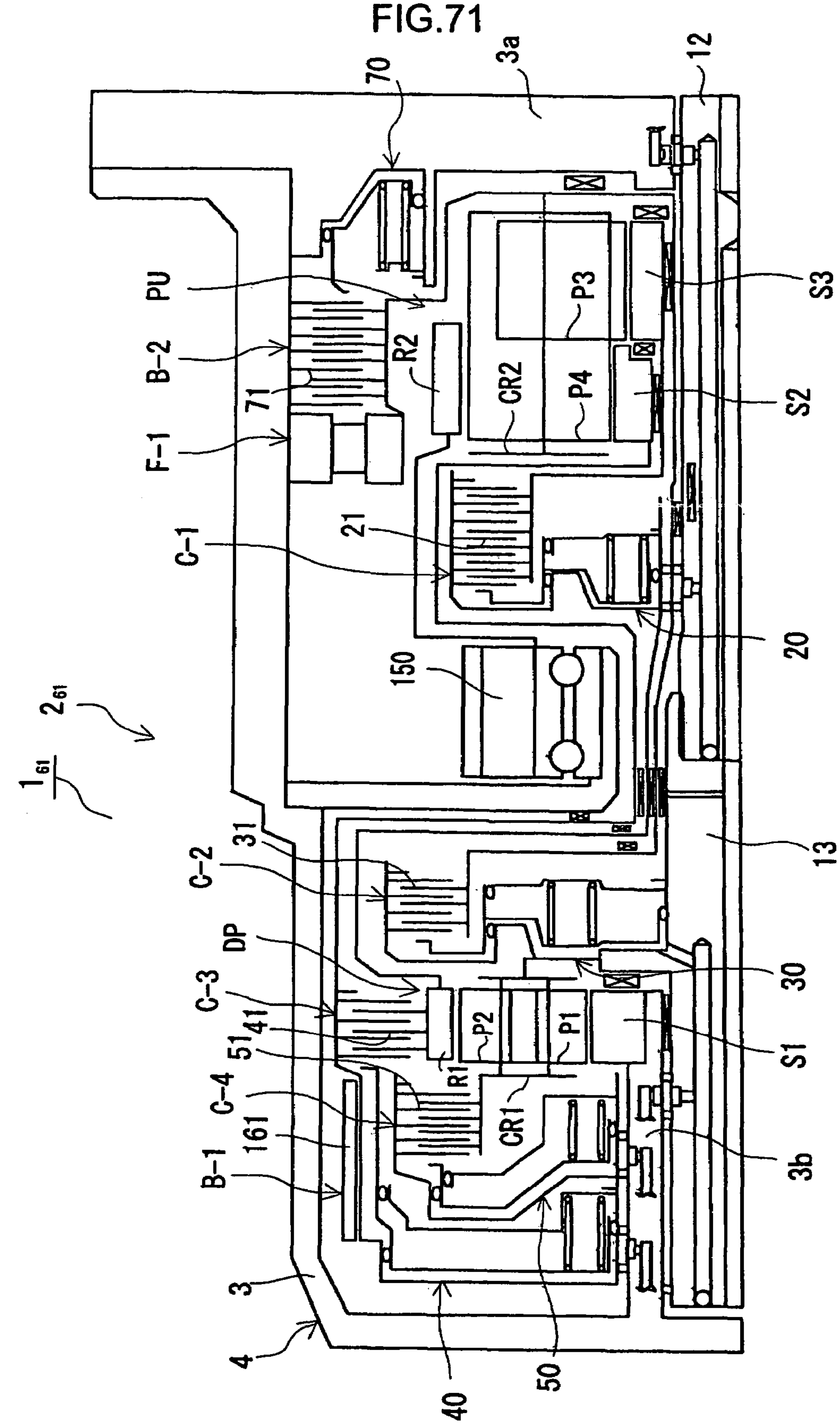
FIG. 71 is a diagrammatic section view showing an automatic transmission according to a 61st exemplary embodiment.

A 61st embodiment, which is a partial modification of the 59th embodiment described above, will be explained with reference to FIG. 71. In the 61st embodiment explained below, only structures or components different from those of the automatic transmission $\mathbf{1}_{59}$ of the 59th embodiment will be explained and an explanation of the structures or components other than that will be omitted here because they are almost the same.

As compared to the automatic transmission $\mathbf{1}_{59}$ of the 59th embodiment, the automatic transmission $\mathbf{1}_{61}$ of the 61st embodiment is arranged so that the hydraulic servo 30 of the second clutch C-2 is disposed axially between the planetary gear unit PU and the planetary gear DP, or more specifically, axially between the planetary gear DP and the counter gear 150. Further, the hydraulic servo 20 of the first clutch C-1 is disposed axially between the planetary gear unit PU and the planetary gear DP, or more specifically, axially between the planetary gear unit PU and the counter gear 150.

It is noted that the automatic transmission $1_{15}$ of the 15th embodiment, described above, may be built by inverting a transmission mechanism $2_{61}$ of the automatic transmission $1_{61}$ of the 61st embodiment in the lateral direction (axial direction) almost as it is.

Figure 72:
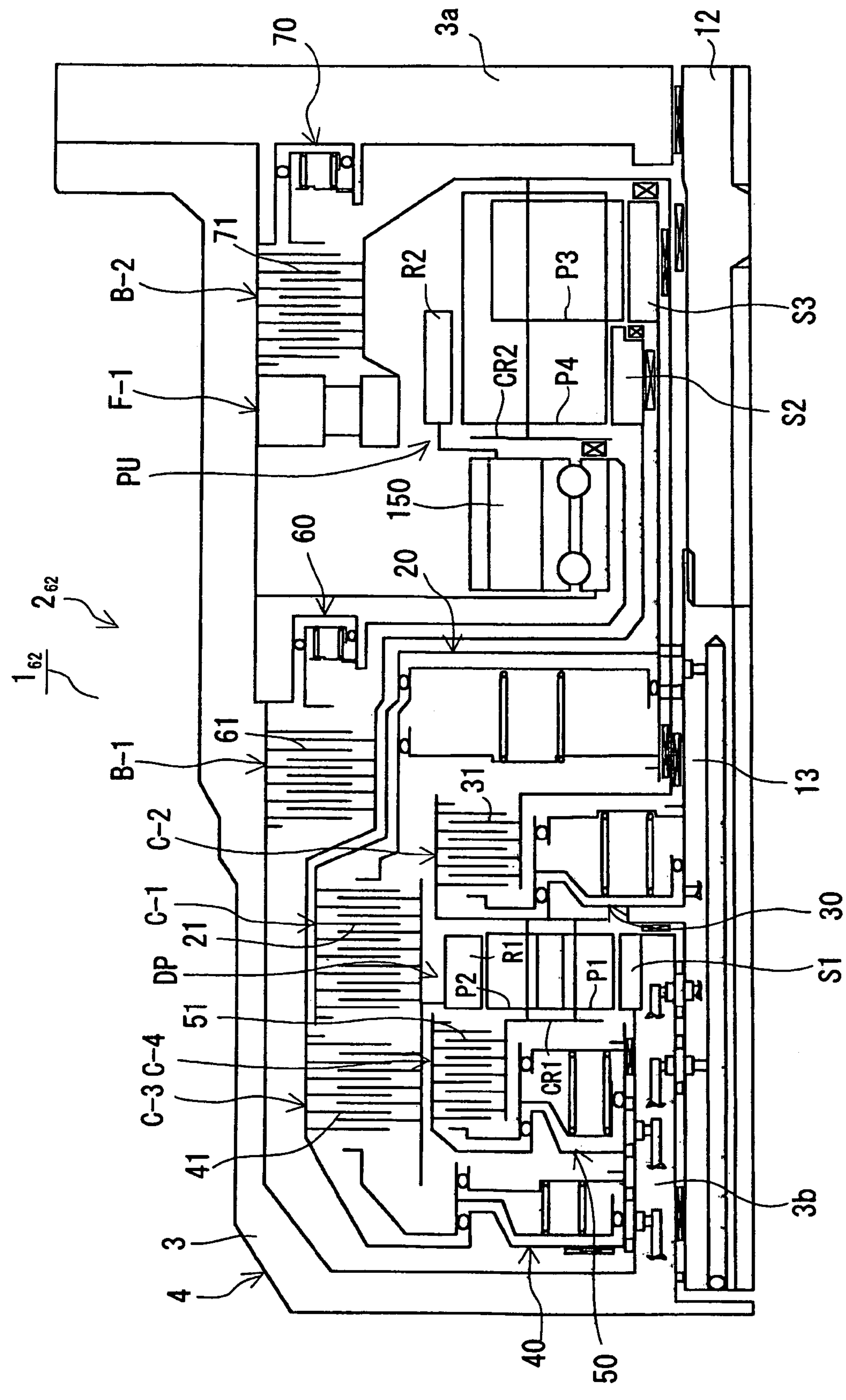
FIG. 72 is a diagrammatic section view showing an automatic transmission according to a 62nd exemplary embodiment.

A 62nd embodiment, which is a partial modification of the 59th embodiment described above, will be explained with reference to FIG. 72. In the 62nd embodiment explained below, only structures or components different from those of the automatic transmission $1_{59}$ of the 59th embodiment will be explained and an explanation of the structures or components other than that will be omitted here because they are almost the same.

As compared to the automatic transmission $1_{59}$ of the 59th embodiment, the automatic transmission $1_{62}$ of the 62nd embodiment is arranged so that the hydraulic servo 30 of the second clutch C-2 is disposed axially between the planetary gear unit PU (specifically the counter gear 150) and the planetary gear DP, or more specifically, axially between the hydraulic servo 20 of the first clutch C-1 and the planetary gear DP. Further, the multi-plate type brake similar to that of the first embodiment is used for the first brake B-1 instead of the band brake.

It is noted that the automatic transmission $1_{17}$ of the 17th embodiment, described above, may be built by inverting a transmission mechanism $2_{62}$ of the automatic transmission $1_{62}$ of the 62nd embodiment in the lateral direction (axial direction) almost as it is.

Figure 73:
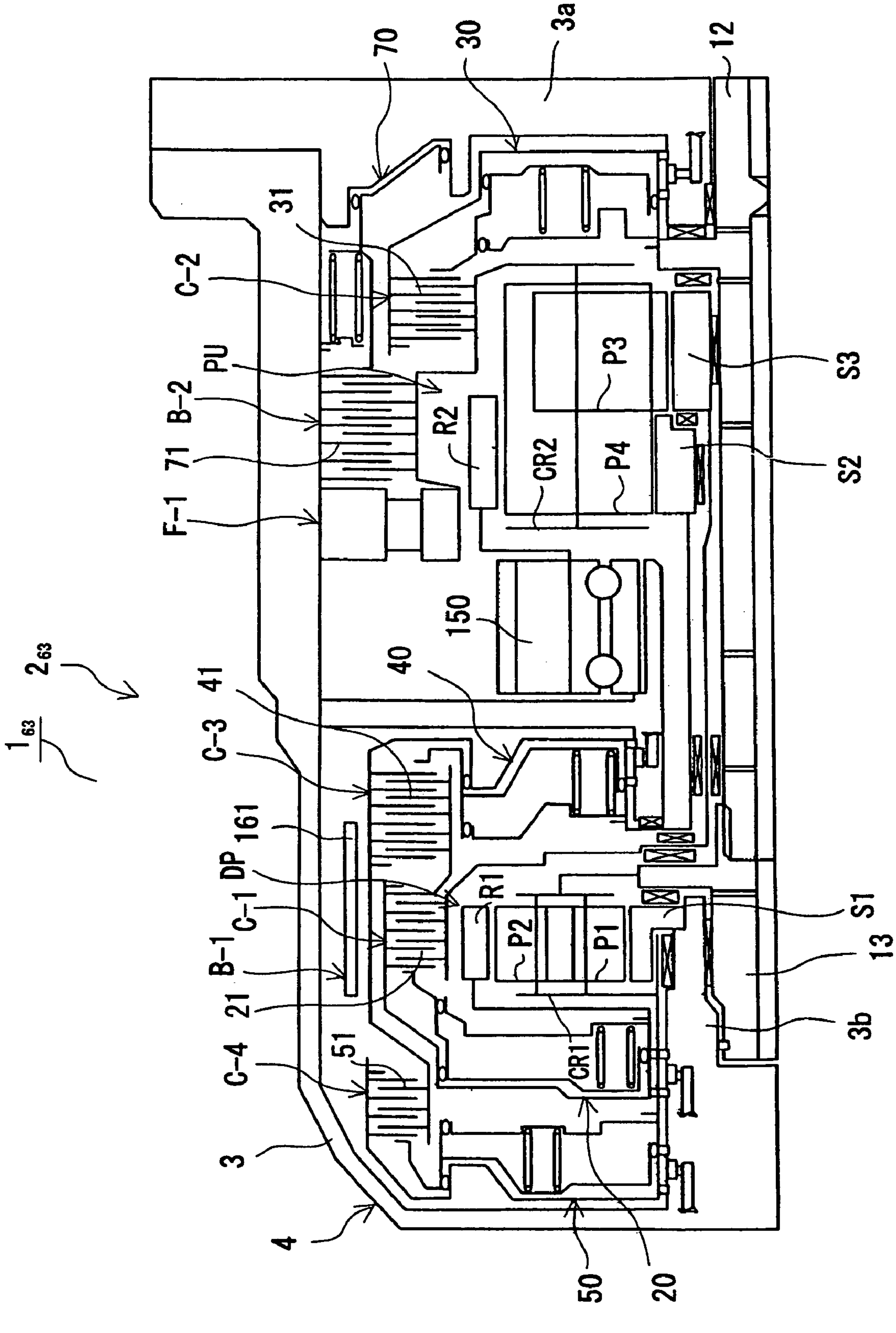
FIG. 73 is a diagrammatic section view showing an automatic transmission according to a 63rd exemplary embodiment.

A 63rd embodiment, which is a partial modification of the 59th embodiment described above, will be explained with reference to FIG. 73. In the 63rd embodiment explained below, only structures or components different from those of the automatic transmission $1_{59}$ of the 59th embodiment will be explained and an explanation of the structures or components other than that will be omitted here because they are almost the same.

As compared to the automatic transmission $1_{59}$ of the 59th embodiment, the automatic transmission $1_{63}$ of the 63rd embodiment is arranged so that the hydraulic servo 40 of the third clutch C-3 is disposed axially between the planetary gear unit PU (specifically the counter gear 150) and the planetary gear DP and the hydraulic servo 20 of the first clutch C-1 is disposed axially on the opposite side of the planetary gear DP from the planetary gear unit PU. Specifically, the hydraulic servo 20 of the first clutch C-1 is disposed axially between the planetary gear DP and the hydraulic servo 50 of the fourth clutch C-4.

It is noted that the automatic transmission $1_{18}$ of the 18th embodiment, described above, may be built by inverting a transmission mechanism $2_{18}$ of the automatic transmission $1_{18}$ of the 18th embodiment in the lateral direction (axial direction) almost as it is.

Figure 74:
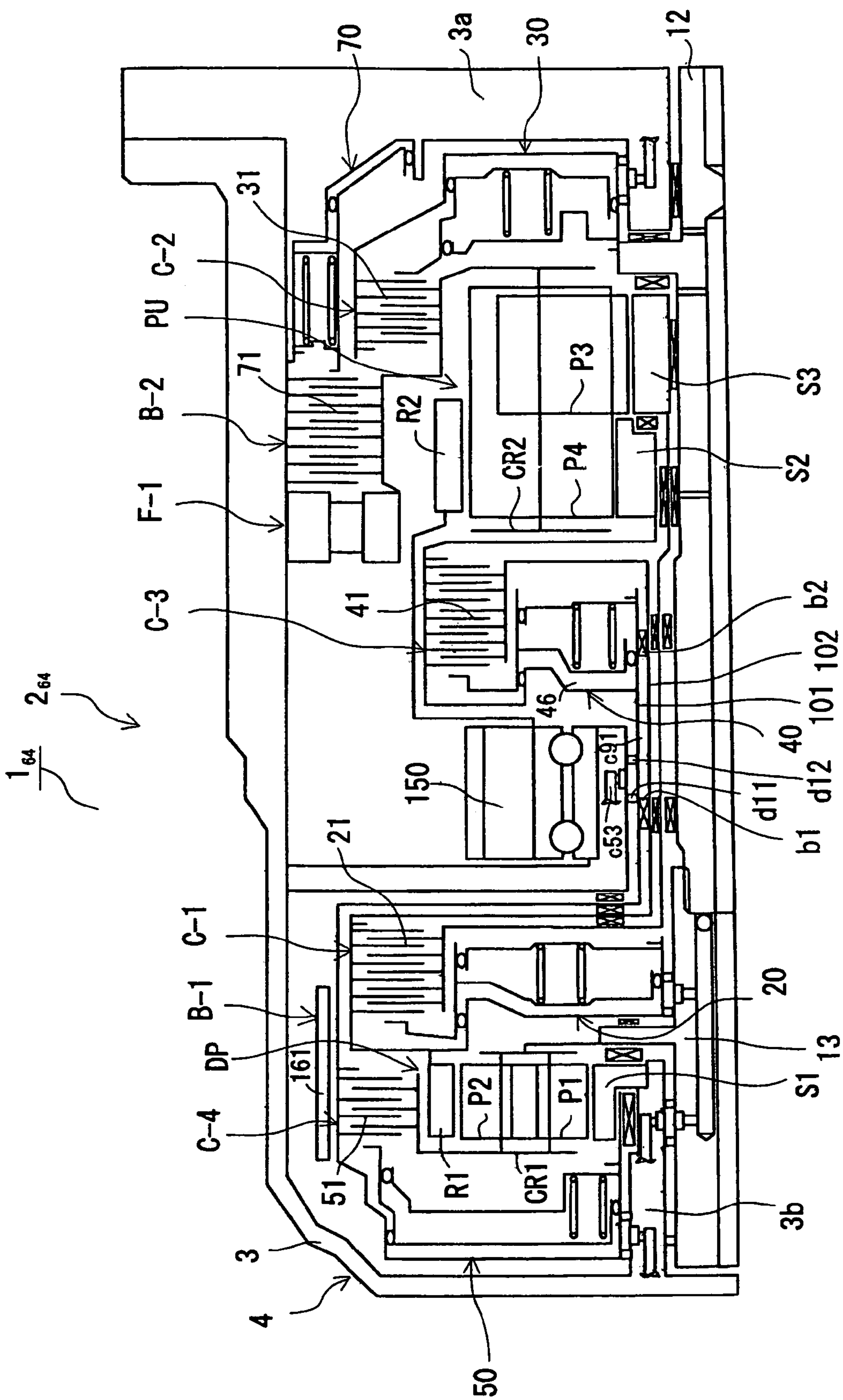
FIG. 74 is a diagrammatic section view showing an automatic transmission according to a 64th exemplary embodiment.

A 64th embodiment, which is a partial modification of the 59th embodiment described above, will be explained with reference to FIG. 74. In the 64th embodiment explained below, only structures or components different from those of the automatic transmission $1_{59}$ of the 59th embodiment will be explained and an explanation of the structures or components other than that will be omitted here because they are almost the same.

As compared to the automatic transmission $1_{59}$ of the 59th embodiment, the automatic transmission $1_{64}$ of the 64th embodiment is arranged so that the hydraulic servo 40 of the third clutch C-3 is disposed axially between the planetary gear unit PU and the planetary gear DP, or more specifically, axially between the planetary gear unit PU and the counter gear 150. Further, an oil passage c91 is formed by sealing a part between the support wall and the link member 101 by seal rings d11, d12 and a part between the link member 101 and the link member 102 by bushes b1, b2. Thereby, operating fluid is supplied to the oil chamber 46 of the hydraulic servo 40 of the third clutch C-3 from the oil passage c53 within the support wall via the oil passage c91.

Figure 75:
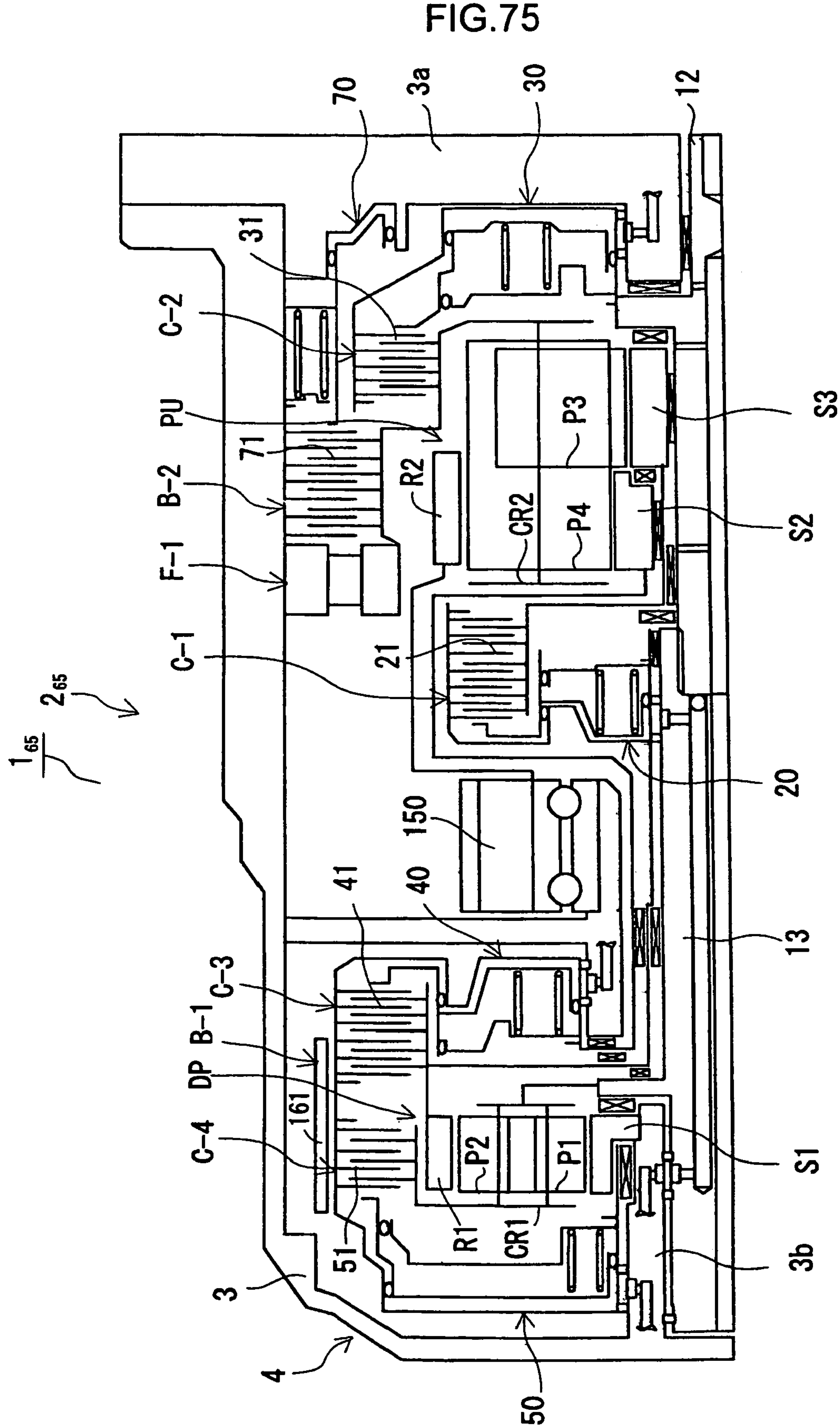
FIG. 75 is a diagrammatic section view showing an automatic transmission according to a 65th exemplary embodiment.

It is noted that the automatic transmission $1_{19}$ of the 19th embodiment, described above, may be built by inverting a transmission mechanism $2_{64}$ of the automatic transmission $1_{64}$ of the 64th embodiment in the lateral direction (axial direction) almost as it A 65th embodiment, which is a partial modification of the 59th embodiment described above, will be explained with reference to FIG. 75. In the 65th embodiment explained below, only structures or components different from those of the automatic transmission $1_{59}$ of the 59th embodiment will be explained and an explanation of the structures or components other than that will be omitted here because they are almost the same.

As compared to the automatic transmission $1_{59}$ of the 59th embodiment, the automatic transmission $1_{65}$ of the 65th embodiment is arranged so that the hydraulic servo 20 of the first clutch C-1 and the hydraulic servo 40 of the third clutch C-3 are disposed axially between the planetary gear unit PU and the planetary gear DP. More specifically, the hydraulic servo 20 of the first clutch C-1 is disposed axially between the planetary gear unit PU and the counter gear 150 and the hydraulic servo 40 of the third clutch C-3 is disposed axially between the counter gear 150 and the planetary gear DP.

It is noted that the automatic transmission $1_{20}$ of the 20th embodiment, described above, may be built by inverting a transmission mechanism $2_{65}$ of the automatic transmission $1_{65}$ of the 65th embodiment in the lateral direction (axial direction) almost as it is.

A 66th embodiment, which is a partial modification of the 59th embodiment described above, will be explained with reference to FIG. 76. In the 66th embodiment explained below, only structures or components different from those of the automatic transmission $1_{59}$ of the 59th embodiment will be explained and an explanation of the structures or components other than that will be omitted here because they are almost the same.

As compared to the automatic transmission $1_{59}$ of the 59th embodiment, the automatic transmission $1_{66}$ of the 66th embodiment is arranged so that the hydraulic servo 40 of the third clutch C-3 is disposed axially between the planetary gear unit PU and the planetary gear DP, or more specifically, axially between the counter gear 150 and the planetary gear DP (or more specifically, the hydraulic servo 20 of the first clutch C-1).

It is noted that the automatic transmission $1_{21}$ of the 21st embodiment, described above, may be built by inverting a transmission mechanism $2_{66}$ of the automatic transmission $1_{66}$ of the 66th embodiment in the lateral direction (axial direction) almost as it is.

Figure 76:
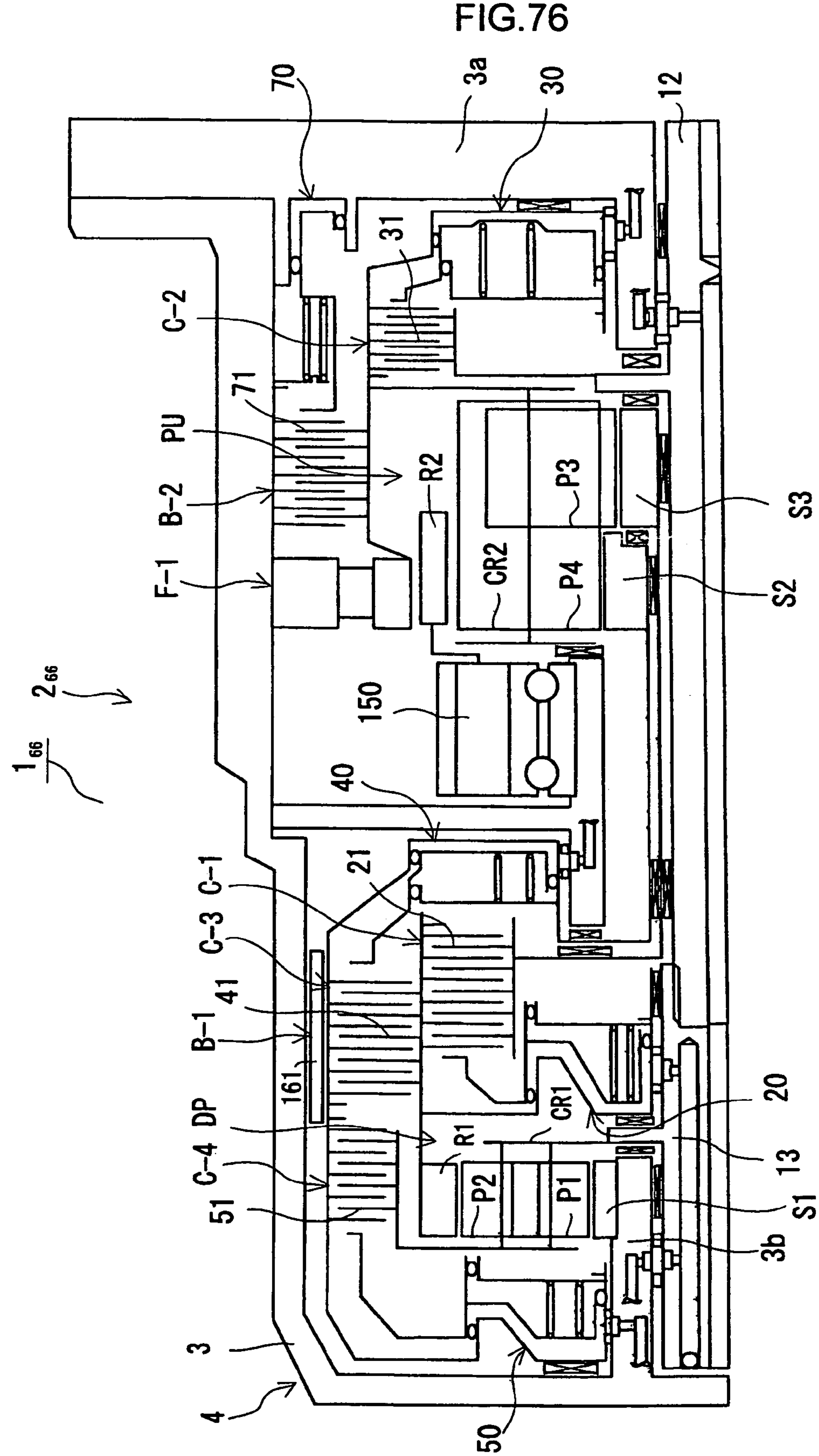
FIG. 76 is a diagrammatic section view showing an automatic transmission according to a 66th exemplary embodiment.

Further, the oil chamber of the hydraulic servo of the first clutch C-1 may be formed in a manner of using the clutch drum in common as a member for positioning and supporting the ring gear R1 of the planetary gear DP as shown in FIG. 76.

Figure 77:
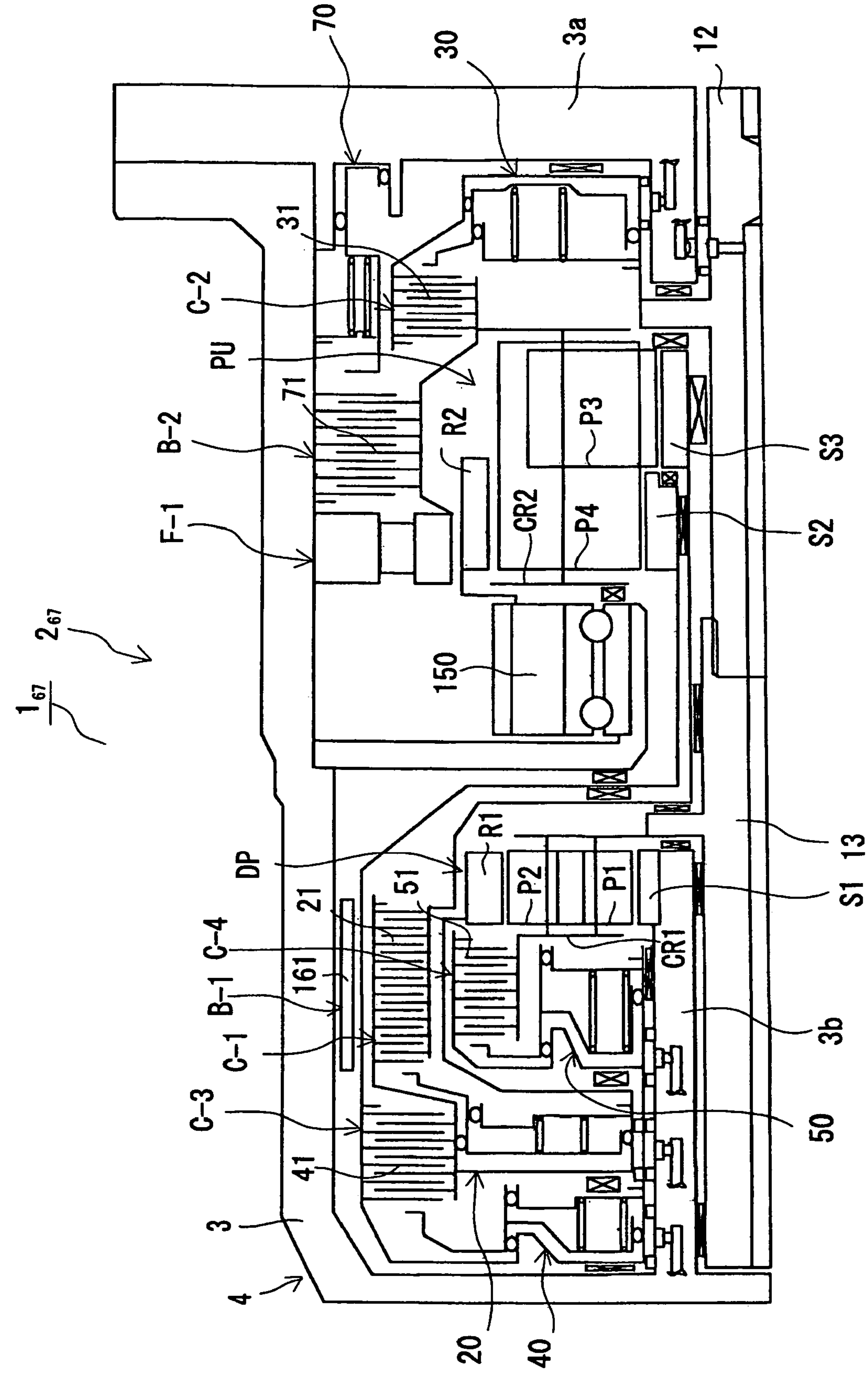
FIG. 77 is a diagrammatic section view showing an automatic transmission according to a 67th exemplary embodiment.

A 67th embodiment, which is a partial modification of the 59th embodiment described above, will be explained with reference to FIG. 77. In the 67th embodiment explained below, only structures or components different from those of the automatic transmission $1_{59}$ of the 59th embodiment will be explained and an explanation of the structures or components other than that will be omitted here because they are almost the same.

As compared to the automatic transmission $\mathbf{1}_{59}$ of the 59th embodiment, the automatic transmission $\mathbf{1}_{67}$ of the 67th embodiment is arranged so that the hydraulic servo 20 of the first clutch C-1 is disposed axially on the opposite side of the planetary gear DP from the planetary gear unit PU, or more specifically, axially between the hydraulic servo 50 of the fourth clutch C-4 and the hydraulic servo 40 of the third clutch C-3.

It is noted that the automatic transmission $\mathbf{1}_{22}$ of the 22nd embodiment, described above, may be built by inverting a transmission mechanism $\mathbf{2}_{67}$ of the automatic transmission $\mathbf{1}_{67}$ of the 67th embodiment in the lateral direction (axial direction) almost as it is.

Figure 78:
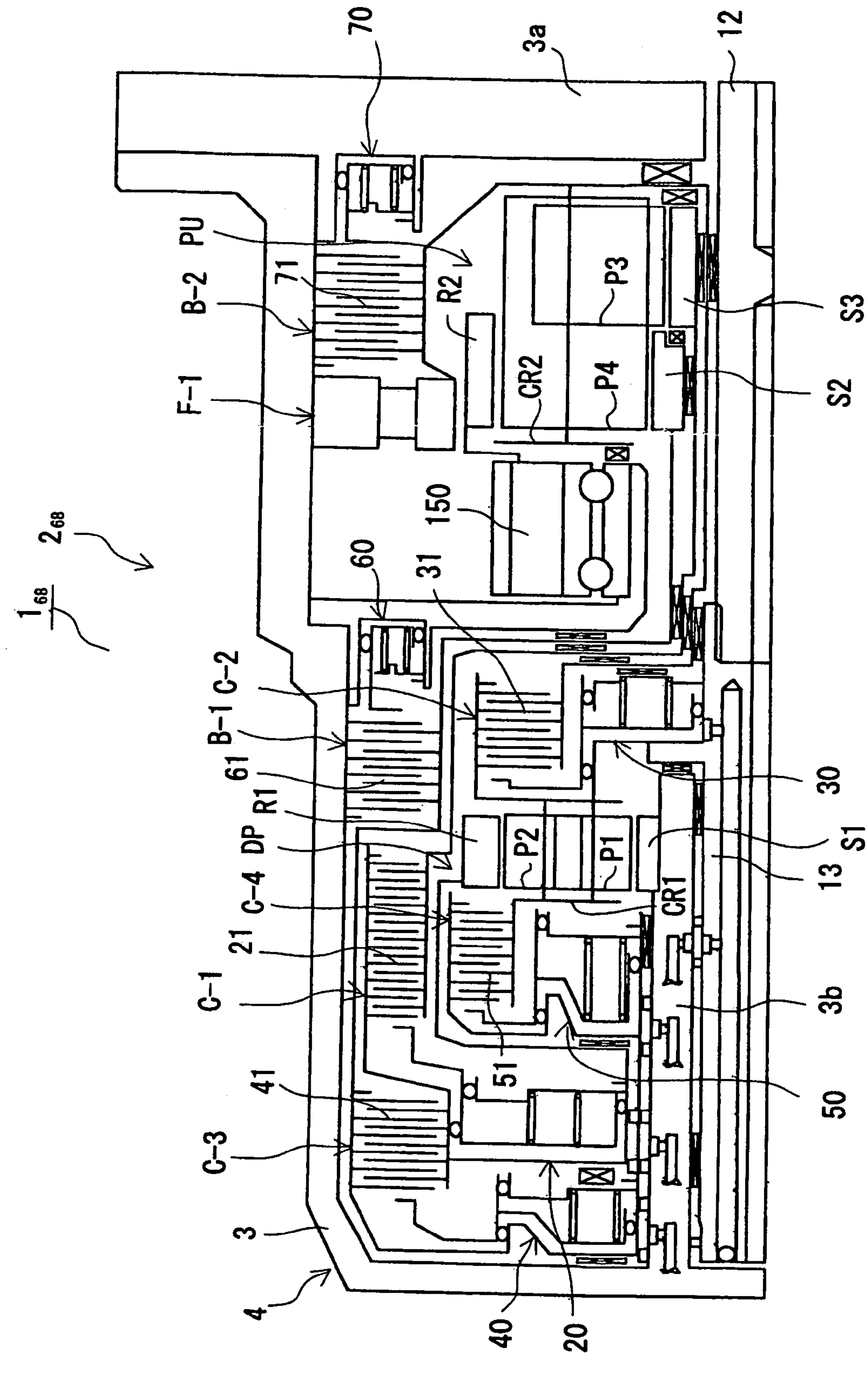
FIG. 78 is a diagrammatic section view showing an automatic transmission according to a 68th exemplary embodiment.

A 68th embodiment, which is a partial modification of the 59th embodiment described above, will be explained with reference to FIG. 78. In the 68th embodiment explained below, only structures or components different from those of the automatic transmission $\mathbf{1}_{59}$ of the 59th embodiment will be explained and an explanation of the structures or components other than that will be omitted here because they are almost the same.

As compared to the automatic transmission $\mathbf{1}_{59}$ of the 59th embodiment, the automatic transmission $\mathbf{1}_{68}$ of the 68th embodiment is arranged so that the hydraulic servo 20 of the first clutch C-1 is disposed axially on the opposite side of the planetary gear DP from the planetary gear unit PU and the hydraulic servo 30 of the second clutch C-2 is disposed axially between the planetary gear unit PU and the planetary gear DP. More specifically, the hydraulic servo 20 of the first clutch C-1 is disposed axially between the hydraulic servo 50 of the fourth clutch C-4 and the hydraulic servo 40 of the third clutch C-3 and the hydraulic servo 30 of the second clutch C-2 is disposed axially between the counter gear 150 and the planetary gear DP. Further, the multi-plate type brake, similar to that in the first embodiment, is used for the first brake B-1 instead of the band brake.

It is noted that the automatic transmission $\mathbf{1}_{23}$ of the 23rd embodiment, described above, may be built by inverting a transmission mechanism $\mathbf{2}_{68}$ of the automatic transmission $\mathbf{1}_{68}$ of the 68th embodiment in the lateral direction (axial direction) almost as it is.

Figure 79:
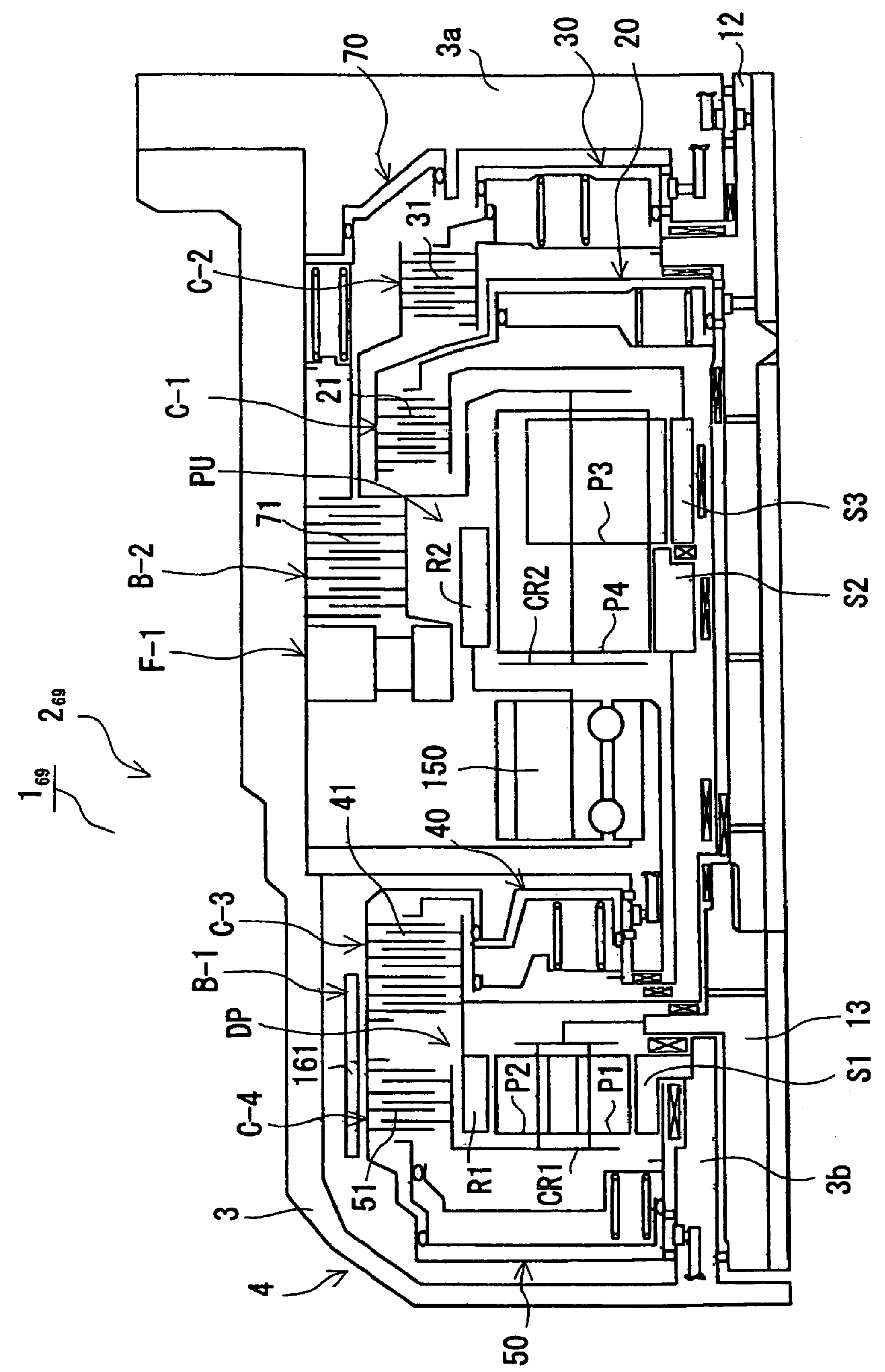
FIG. 79 is a diagrammatic section view showing an automatic transmission according to a 69th exemplary embodiment.

A 69th embodiment, which is a partial modification of the 59th embodiment described above, will be explained with reference to FIG. 79. In the 69th embodiment explained below, only structures or components different from those of the automatic transmission $\mathbf{1}_{59}$ of the 59th embodiment will be explained and an explanation of the structures or components other than that will be omitted here because they are almost the same.

As compared to the automatic transmission $\mathbf{1}_{59}$ of the 59th embodiment, the automatic transmission $\mathbf{1}_{69}$ of the 69th embodiment is arranged so that the hydraulic servo 40 of the third clutch C-3 is disposed axially between the planetary gear unit PU and the planetary gear DP and the hydraulic servo 20 of the first clutch C-1 is disposed axially on the opposite side of the planetary gear unit PU from the planetary gear DP. Specifically, the hydraulic servo 40 of the third clutch C-3 is disposed axially between the counter gear 150 and the planetary gear DP and the hydraulic servo 20 of the first clutch C-1 is disposed axially between the planetary gear unit PU and the hydraulic servo 30 of the second clutch C-2.

It is noted that the automatic transmission $\mathbf{1}_{24}$ of the 24th embodiment, described above, may be built by inverting a transmission mechanism $\mathbf{2}_{69}$ of the automatic transmission $\mathbf{1}_{69}$ of the 69th embodiment in the lateral direction (axial direction) almost as it is.

Figure 80:
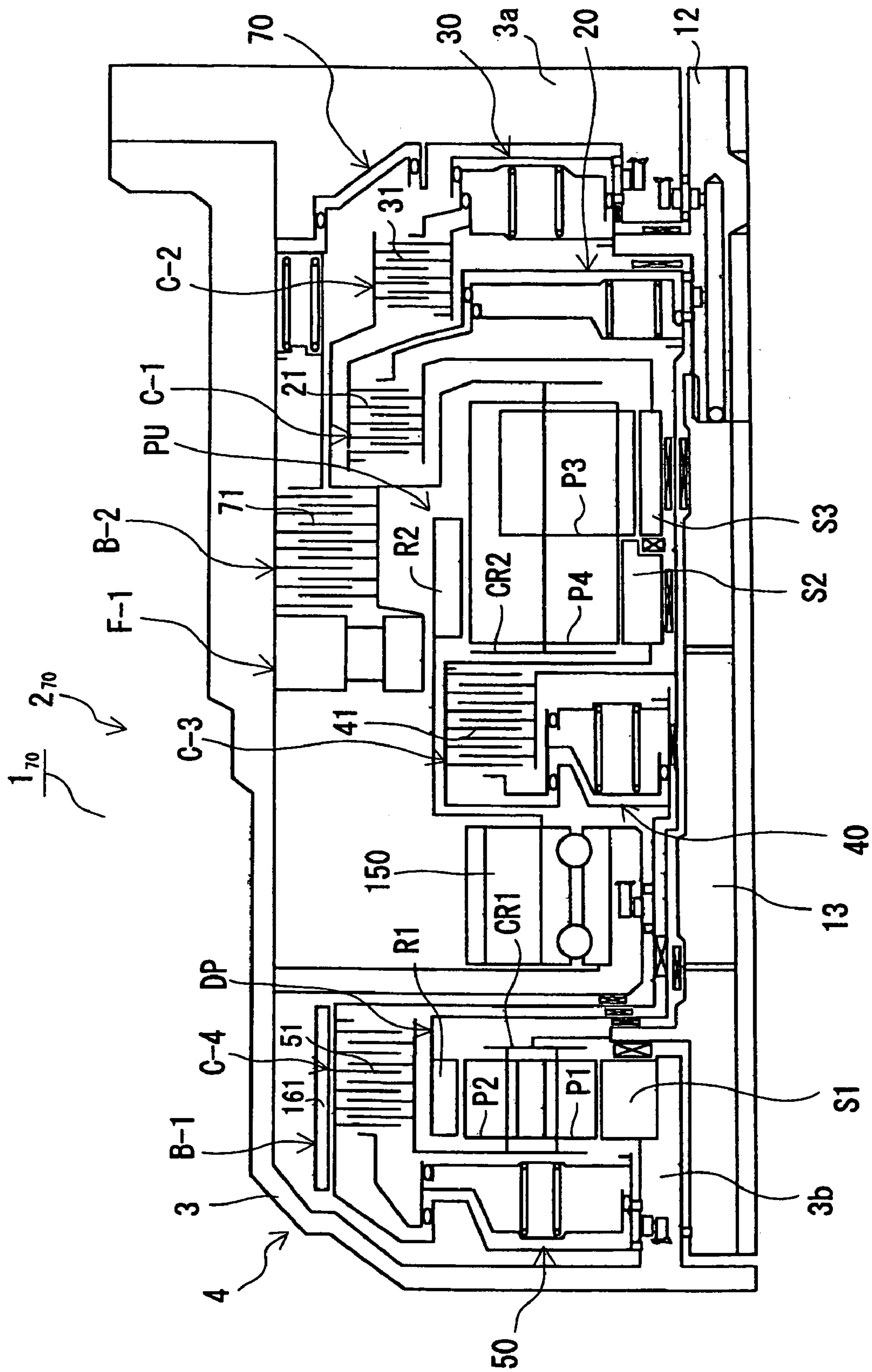
FIG. 80 is a diagrammatic section view showing an automatic transmission according to a 70th exemplary embodiment.

A 70th embodiment, which is a partial modification of the 59th embodiment described above, will be explained with reference to FIG. 80. In the hydraulic servo 70th embodiment explained below, only structures or components different from those of the automatic transmission $\mathbf{1}_{59}$ of the 59th embodiment will be explained and an explanation of the structures or components other than that will be omitted here because they are almost the same.

As compared to the automatic transmission $\mathbf{1}_{59}$ of the 59th embodiment, the automatic transmission $\mathbf{1}_{70}$ of the hydraulic servo 70th embodiment is arranged so that the hydraulic servo 40 of the third clutch C-3 is disposed axially between the planetary gear unit PU and the planetary gear DP and the hydraulic servo 20 of the first clutch C-1 is disposed axially on the opposite side of the planetary gear unit PU from the planetary gear DP. Specifically, the hydraulic servo 40 of the third clutch C-3 is disposed axially between the counter gear 150 and the planetary gear unit PU and the hydraulic servo 20 of the first clutch C-1 is disposed axially between the planetary gear unit PU and the hydraulic servo 30 of the second clutch C-2.

It is noted that the automatic transmission $\mathbf{1}_{25}$ of the 25th embodiment, described above, may be built by inverting a transmission mechanism $\mathbf{2}_{70}$ of the automatic transmission $\mathbf{1}_{70}$ of the hydraulic servo 70th embodiment in the lateral direction (axial direction) almost as it is.

Figure 81:
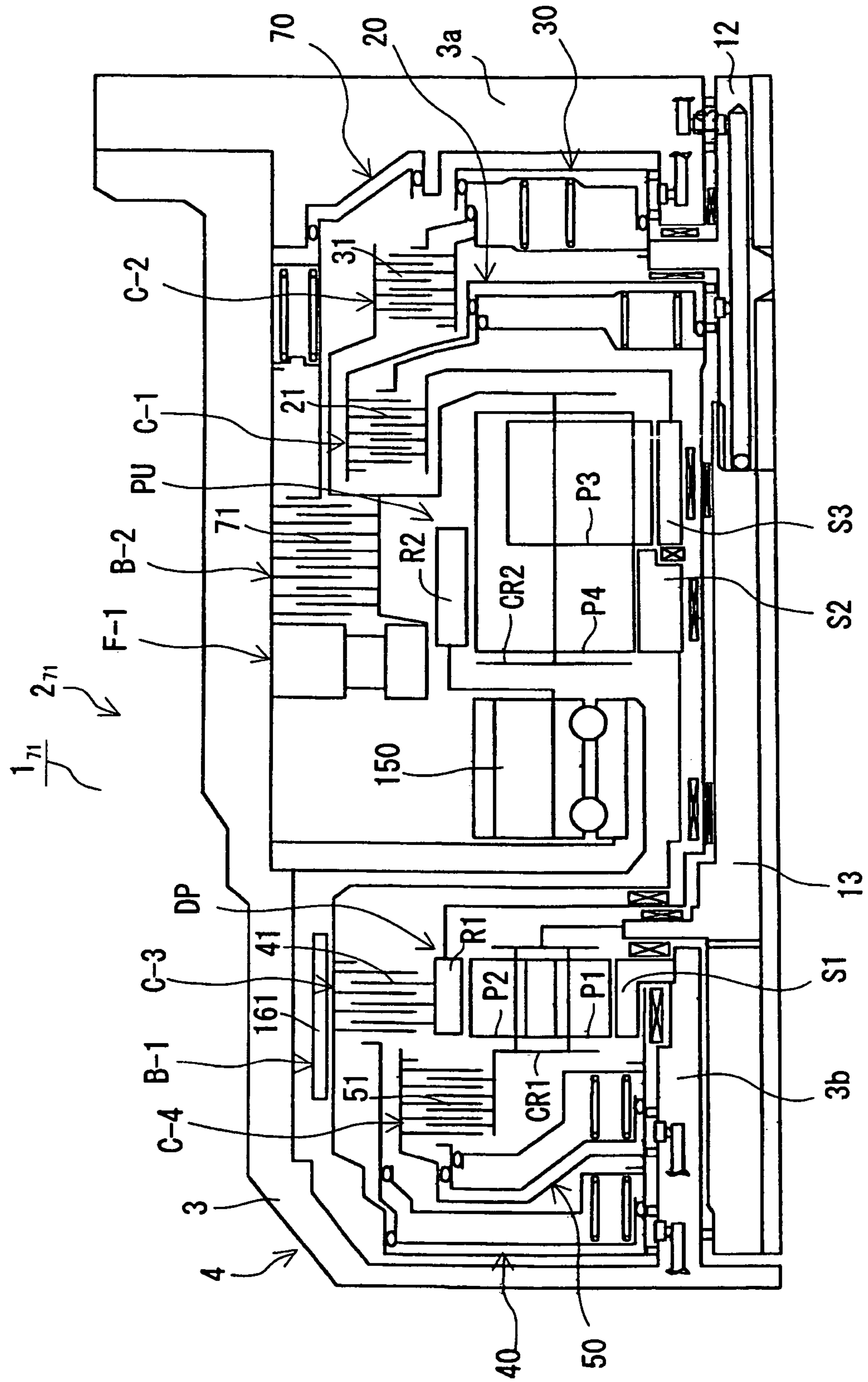
FIG. 81 is a diagrammatic section view showing an automatic transmission according to a 71st exemplary embodiment.

A 71st embodiment, which is a partial modification of the 59th embodiment described above, will be explained with reference to FIG. 81. In the 71st embodiment explained below, only structures or components different from those of the automatic transmission $\mathbf{1}_{59}$ of the 59th embodiment will be explained and an explanation of the structures or components other than that will be omitted here because they are almost the same.

As compared to the automatic transmission $\mathbf{1}_{59}$ of the 59th embodiment, the automatic transmission $\mathbf{1}_{71}$ of the 71st embodiment is arranged so that the hydraulic servo 20 of the first clutch C-1 is disposed axially on the opposite side of the planetary gear unit PU from the planetary gear DP, or more specifically, the hydraulic servo 20 of the first clutch C-1 is disposed axially between the planetary gear unit PU and the hydraulic servo 30 of the second clutch C-2.

It is noted that the automatic transmission $\mathbf{1}_{26}$ of the 26th embodiment, described above, may be built by inverting a transmission mechanism $\mathbf{2}_{71}$ of the automatic transmission $\mathbf{1}_{71}$ of the 71st embodiment in the lateral direction (axial direction) almost as it is.

It is noted that the case of using a so-called Ravigneaux type planetary gear having the long pinion P4 and the carrier CR2 engaging with the sun gear S2 and the sun gear S3 as the planetary gear unit PU has been explained in the first through 71st embodiments described above, the planetary gear may be one having four rotary elements in which a long pinion engages with a common sun gear, a first ring gear engages with the long pinion and a second ring gear engages with a short pinion engaging with the long pinion. Or, any type of planetary gear unit may be used as long as it has at least two rotary elements or preferably four rotary elements.

Further, although the vehicular automatic transmission 1 having the torque converter 7 has been explained in the first through 71st embodiments, it may be one having a starting clutch, for example.

Further, the vehicular automatic transmission 1 suitably used for the FR-type or FF-type vehicle has been exemplified in the first through 71st embodiments, the invention is not limited to that and the invention may be applied to a vehicular automatic transmission for use in a four-wheel drive type vehicle, for example. Additionally, the invention is also applicable to one having an engine-directly-coupled motor for example, i.e., to a vehicular automatic transmission for use in a hybrid-type vehicle.

Also, although the vehicular automatic transmission 1 having the one-way clutch F-1 and capable of attaining the forward first speed stage relatively smoothly has been exemplified in the first through 71st embodiments, the vehicular automatic transmission may be one having no one-way clutch F-1. In this case, the forward first speed stage may be attained by engaging the second brake B-2.

Further, the double pinion planetary gear in which rotation of the sun gear S1 is fixed, rotation of the input shaft 12 is inputted to the carrier CR1 and the ring gear R1 rotates at reduced rotation has been explained as the planetary gear DP for outputting reduced rotation in the first through 71st embodiments, the planetary gear DP may be a double pinion planetary gear in which the ring gear R1 is fixed, the rotation of the input shaft 12 is inputted to the carrier CR1 and the reduced rotation is outputted by the sun gear S1, for example. That is, the invention is not limited to the described planetary gear structure and any planetary gear structure may be used as long as it is capable of outputting the reduced rotation.

Although one that is capable of attaining the forward sixth speed and reverse first speed stages by removing the fourth clutch C-4 from the transmission mechanism $\mathbf{2}_1$ of the automatic transmission $\mathbf{1}_1$ of the first embodiment has been explained in the second embodiment, the invention is so limited and the automatic transmission capable of attaining the forward sixth speed and reverse first speed stages may be built similarly by removing the fourth clutch C-4 from the transmission mechanism of the automatic transmission of the third through 13th embodiments.

The automatic transmission as described is useful as what is mounted in vehicles, such as passenger cars, trucks and buses, and is especially suitable for vehicles which require compactness and improved power transmitting efficiency from the aspect of mountability.

What is claimed is:

1. A vehicular automatic transmission capable of attaining a multi-stage shift, comprising:

an input shaft;

a reduction planetary gear is composed of a double pinion planetary gear having:

a first sun gear whose rotation is fixed;

a first pinion gear engaging with said first sun gear;

a second pinion gear engaging with said first pinion gear;

a first carrier rotatably supporting said first and second pinion gears and always linked with said input shaft; and a first ring gear engaging with said second pinion gear and outputting a reduced rotation reduced than an inputted rotation of said input shaft;

a planetary gear set having at least four rotary elements, i.e. a first rotary element, a second rotary element, a third rotary element, and a fourth rotary element, a case having a boss portion;

at least two reduction transmitting clutches for enabling said transmission of said reduced rotation through said reduction planetary gear comprise a first clutch and a third clutch, said first clutch is configured to transmit said reduced rotation to said second rotary element, said third clutch is capable of transmitting said reduced rotation to said first rotary element;

an input transmitting clutch for enabling said transmission of said inputted rotation to said first rotary element comprises a fourth clutch;

a second clutch is configured to transmit said inputted rotation to said third rotary element;

a first braking is capable of fixing said first rotary element with said case;

a second braking is capable of fixing said third rotary element with said case;

an output member is linked to said fourth element, wherein;

a hydraulic servo of said fourth clutch is disposed axially on an opposite side from said planetary gear set to said reduction planetary gear; and said fourth clutch is linked to said first rotary element via an output side member of said third clutch.

2. The vehicular automatic transmission as set forth in claim 1, capable of attaining:

a forward first speed stage by engaging said first clutch and fastening the second braking means; a forward second speed stage by engaging said first clutch and fastening said first braking means;

a forward third speed stage by engaging said first clutch and said third clutch;

a forward fourth speed stage by engaging said first clutch and said fourth clutch;

a forward fifth speed stage by engaging said first clutch and said second clutch;

a forward sixth speed stage by engaging said second clutch and said fourth clutch;

a forward seventh speed stage by engaging said second clutch and said third clutch;

a forward eighth speed stage by engaging said second clutch and fastening said first braking means; and a reverse stage by engaging one of said third clutch and said fourth clutch and fastening the second braking means.

3. The vehicular automatic transmission as set forth in claim 1, wherein said reduction planetary gear and said planetary gear set are disposed coaxially and in line in an axial direction.

4. The vehicular automatic transmission as set forth in claim 1, wherein said fourth clutch is removable.

5. The vehicular automatic transmission as set forth in claim 1, wherein said output member is an output shaft for transmitting a rotation coaxially with the input shaft.

6. A vehicular automatic transmission as set forth in claim 1, wherein the hydraulic servo of said input transmitting clutch is disposed axially on an opposite side of said reduction planetary gear to said planetary gear set and on the boss portion extending from the case; and operating fluid is supplied to a hydraulic servo of said input transmitting clutch through an oil passage within said boss portion.

7. The vehicular automatic transmission as set forth in claim 1, wherein said hydraulic servo of said fourth clutch is disposed between said reduction and planetary gear on the boss portion.

8. The vehicular automatic transmission as set forth in claim 1, wherein the input transmitting clutch comprises a frictional plate and hydraulic servo.

9. The vehicular automatic transmission as set forth in claim 1, wherein a hydraulic servo of said third clutch is disposed axially on an opposite side of said reduction planetary gear to said planetary gear set and a hydraulic servo of said first clutch is disposed axially between said reduction planetary gear and said planetary gear set.

10. The vehicular automatic transmission as set forth in claim 9, wherein said second clutch is disposed axially on the opposite side of said planetary gear set to said reduction planetary gear.

11. The vehicular automatic transmission as set forth in claim 9, wherein said second clutch is disposed axially between said reduction planetary gear and said planetary gear set.

12. The vehicular automatic transmission as set forth in claim 9, wherein the reduced rotation of said reduction planetary gear is inputted to a clutch drum of said first clutch forming the hydraulic servo of said first clutch when said first clutch engages.

13. The vehicular automatic transmission as set forth in claim 9, wherein the reduced rotation of said reduction planetary gear is inputted to a clutch drum of said third clutch forming the hydraulic servo of said third clutch when said third clutch engages.

14. The vehicular automatic transmission as set forth in claim 9, wherein the inputted rotation of the input shaft is inputted to a clutch drum of said fourth clutch forming a hydraulic servo of said fourth clutch when said fourth clutch engages.

15. The vehicular automatic transmission as set forth in claim 9, wherein said reduction planetary gear and said fourth clutch are disposed on an inner peripheral side of at least either one of a clutch drum of said first clutch and a clutch drum of said third clutch.

16. The vehicular automatic transmission as set forth in claim 15, wherein:

the hydraulic servo of said third clutch, a hydraulic servo of said fourth clutch, and said reduction planetary gear are disposed on said boss portion extending from said case axially in order from a side of a joint of said boss portion with said case;

the hydraulic servo of said first clutch is disposed on said input shaft and adjacent to said reduction planetary gear;

operating fluid is supplied respectively to the hydraulic servo of said third clutch and the hydraulic servo of said fourth clutch from oil passages provided within said boss portion; and operating fluid is supplied to the hydraulic servo of said first clutch from an oil passage provided within said input shaft.

17. The vehicular automatic transmission as set forth in claim 15, wherein said third and fourth clutches are linked to said first rotary element through an outer peripheral side of said first clutch.

18. The vehicular automatic transmission as set forth in claim 15, wherein a friction plate of said third clutch is disposed on an outer peripheral side of the first ring gear and said fourth clutch is disposed axially between the hydraulic servo and a friction plate of said third clutch.

19. The vehicular automatic transmission as set forth in claim 15, wherein a friction plate of said first braking means is disposed on an outer peripheral side of the hydraulic servo of said third clutch.

20. The vehicular automatic transmission as set forth in claim 15, wherein said first braking means is disposed axially between said first clutch and said planetary gear set.

21. The vehicular automatic transmission as set forth in claim 15, wherein a friction plate of said third clutch is disposed on an outer peripheral side of said fourth clutch and a friction plate of said first clutch is disposed on an outer peripheral side of said first ring gear.

22. The vehicular automatic transmission as set forth in claim 21, wherein:

the clutch drum of said third clutch is disposed in linkage on an outer peripheral side of a clutch drum of said fourth clutch;

the hydraulic servo of said third clutch is disposed in linkage with the clutch drum of said fourth clutch and is built so as to have a cylinder member, a piston member and an oil chamber formed between the cylinder member and the piston member separately from the clutch drum of said third clutch; and the piston member of the hydraulic servo of said third clutch is disposed so as to penetrate through and intersects with the clutch drum of said third clutch and to face to the friction plate of said third clutch.

23. The vehicular automatic transmission as set forth in claim 22, wherein a return spring of the hydraulic servo of said third clutch is disposed on the clutch drum of said fourth clutch.

24. The vehicular automatic transmission as set forth in claim 1, wherein a hydraulic servo of said first clutch is disposed axially on an opposite side of said reduction planetary gear to said planetary gear set; and a hydraulic servo of said third clutch is disposed axially between said reduction planetary gear and said planetary gear set.

25. The vehicular automatic transmission as set forth in claim 24, wherein said first braking means is disposed axially between said third clutch and said planetary gear set.

26. The vehicular automatic transmission as set forth in claim 24, wherein said second clutch is disposed axially on an opposite side of said planetary gear set to said reduction planetary gear.

27. The vehicular automatic transmission as set forth in claim 24, wherein said second clutch is disposed axially between said reduction planetary gear and said planetary gear set.

28. The vehicular automatic transmission as set forth in claim 24, wherein the reduced rotation of said reduction planetary gear is inputted to a clutch drum of said third clutch forming the hydraulic servo of said third clutch when said third clutch engages.

29. The vehicular automatic transmission as set forth in claim 24, wherein said hydraulic servo of said fourth clutch is adjacent to said hydraulic servo of said first clutch.

30. The vehicular automatic transmission as set forth in claim 24, wherein the hub member spline-coupled with the inner friction plate of the friction plate of the fourth clutch is linked to said first rotary element through the outer peripheral side of the first clutch.

31. The vehicular automatic transmission as set forth in claim 24, further comprising a support wall fixed to the case, the support wall disposed axially between said planetary gear set and said third clutch; and operating fluid is supplied to the hydraulic servo of said third clutch via an oil passage provided in the support wall.

32. The vehicular automatic transmission as set forth in claim 31, wherein a hydraulic servo of said first braking means is disposed on an outer peripheral side of the support wall.

33. The vehicular automatic transmission as set forth in claim 1, wherein a hydraulic servo of said first clutch and a hydraulic servo of said third clutch are disposed axially between said reduction planetary gear and said planetary gear set.

34. The vehicular automatic transmission as set forth in claim 33, wherein a friction plate of said first braking means is disposed so as to overlap radially with an outside of said fourth clutch.

35. The vehicular automatic transmission as set forth in claim 33, wherein said second clutch is disposed axially on the opposite side of said planetary gear set to said reduction planetary gear.

36. The vehicular automatic transmission as set forth in claim 33, wherein said second clutch is disposed axially between said reduction planetary gear and said planetary gear set.

37. The vehicular automatic transmission as set forth in claim 33, wherein the reduced rotation of said reduction planetary gear is inputted to the clutch drum of said first clutch forming the hydraulic servo of said first clutch when said first clutch engages.

38. The vehicular automatic transmission as set forth in claim 33, wherein the reduced rotation of said reduction planetary gear is inputted to a clutch drum of said third clutch forming a hydraulic servo of said third clutch when said third clutch engages.

39. The vehicular automatic transmission as set forth in claim 33, wherein an inputted rotation of the input shaft is inputted to a clutch drum of said fourth clutch forming a hydraulic servo of said fourth clutch when said fourth clutch engages.

40. The vehicular automatic transmission as set forth in claim 33, wherein:

the hydraulic servo of said first clutch is disposed on the side of said planetary gear set;

the hydraulic servo of said third clutch is disposed on the side of said reduction planetary gear; and a link member for linking said third clutch with the rotary element of said planetary gear set is disposed so as to pass through an outer peripheral side of said first clutch.

41. The vehicular automatic transmission as set forth in claim 40, wherein said reduction planetary gear is composed of a double pinion planetary gear having a first sun gear whose rotation is fixed, a first pinion gear engaging with said first sun gear, a second pinion gear engaging with said first pinion gear, a first carrier for rotatably supporting said first and second pinion gears and always linked with said input shaft, and a first ring gear engaging with said second pinion gear and outputting the reduced rotation.

42. The vehicular automatic transmission as set forth in claim 41, wherein:

a friction plate of said third clutch is disposed on an outer peripheral side of the first ring gear of said reduction planetary gear;

a positioning member for positioning said first ring gear of said reduction planetary gear is disposed on said input shaft;

a cylinder portion of the hydraulic servo of said first clutch and a cylinder portion of the hydraulic servo of said third clutch are disposed axially on the both sides of said positioning member; and a piston member of the hydraulic servo of said third clutch and said first ring gear of said reduction planetary gear are built so that they penetrate through and intersect with each other and so that the piston member is slidable against the first ring gear and the positioning member.

43. The vehicular automatic transmission as set forth in claim 42, wherein an end portion of the first ring gear of said reduction planetary gear is formed in the shape of a comb; and a plurality of through holes through which the comb-like end portion of the first ring gear of said reduction planetary gear penetrates and intersects are formed through the piston member of the hydraulic servo of said third clutch.

44. The vehicular automatic transmission as set forth in claim 43, wherein:

an outer peripheral end portion of the positioning member is formed in the shape of a comb;

the comb-like end portion of the first ring gear of said reduction planetary gear is fitted into the comb-like outer peripheral end portion of said positioning member; and the first ring gear of said reduction planetary gear is fixed to said positioning member in the axial direction by a snap ring.

45. The vehicular automatic transmission as set forth in claim 33, wherein the hydraulic servo of said first clutch is disposed on the side of said reduction planetary gear; and the hydraulic servo of said third clutch is disposed on the side of said planetary gear set and a link member for linking said first clutch with said second rotary element is disposed through an inner peripheral side of said third clutch.

46. The vehicular automatic transmission as set forth in claim 45, wherein said reduction planetary gear comprises a double pinion planetary gear having a first sun gear whose rotation is fixed, a first pinion gear engaging with said first sun gear, a second pinion gear engaging with said first pinion gear, a first carrier for rotatably supporting said first and second pinion gears and always linked with said input shaft, and a

47. The vehicular automatic transmission as set forth in claim 46, wherein a friction plate of said third clutch is disposed on an outer peripheral side of said first ring gear of said reduction planetary gear; and said first clutch is disposed on an inner peripheral side of the clutch drum of said third clutch.

48. The vehicular automatic transmission as set forth in claim 46, wherein a friction plate of said fourth clutch is disposed on an outer peripheral side of the first ring gear of said reduction planetary gear.

49. The vehicular automatic transmission as set forth in claim 48, wherein a friction plate of said third clutch is disposed on an outer peripheral side of the clutch drum of said first clutch.

50. The vehicular automatic transmission as set forth in claim 33, further comprising a support wall fixed to the case wherein:

said fourth clutch and said reduction planetary gear are disposed on said boss portion extending from one side of said case;

operating fluid is supplied to the hydraulic servo of said fourth clutch from an oil passage provided within said boss portion; and operating fluid is supplied to a hydraulic servo of said second clutch from an oil passage provided in a wall on an other side of the case.

51. The vehicular automatic transmission as set forth in claim 50, wherein:

at least one of the hydraulic servo of said first clutch and the hydraulic servo of said third clutch are disposed on the input shaft;

the support wall fixed to said case is disposed axially between said planetary gear set and said first clutch and said third clutch;

operating fluid is supplied to one of the hydraulic servo of said first clutch and the hydraulic servo of said third clutch via an oil passage provided within the input shaft; and operating fluid is supplied to the other one of the hydraulic servo of said first clutch and the hydraulic servo of said third clutch via the oil passage provided within the support wall.

52. The vehicular automatic transmission as set forth in claim 50, wherein the hydraulic servo of said first clutch and the hydraulic servo of said third clutch are disposed on the input shaft; and operating fluid is supplied to the hydraulic servo of said first clutch and the hydraulic servo of said third clutch via oil passages provided within the input shaft.

53. The vehicular automatic transmission as set forth in claim 52, wherein a first oil passage for supplying operating fluid to the hydraulic servo of said first clutch in an axial direction, a second oil passage for supplying operating fluid to the hydraulic servo of said third clutch in the axial direction and a third oil passage for supplying lubricant oil in the axial direction are formed within the input shaft in parallel with the axial direction.

54. The vehicular automatic transmission as set forth in claim 1, wherein a hydraulic servo of said first clutch and a hydraulic servo of said third clutch are disposed axially on an opposite side of said reduction planetary gear to said planetary gear set.

55. The vehicular automatic transmission as set forth in claim 54, wherein said second clutch is disposed axially on the opposite side of said planetary gear set to said reduction planetary gear.

56. The vehicular automatic transmission as set forth in claim 54, wherein said second clutch is disposed axially between said reduction planetary gear and said planetary gear set.

57. The vehicular automatic transmission as set forth in claim 54, wherein the reduced rotation of said reduction planetary gear is inputted to a clutch drum of said third clutch forming the hydraulic servo of said third clutch when said third clutch engages.

58. The vehicular automatic transmission as set forth in claim 54, wherein an inputted rotation of the input shaft is inputted to a clutch drum of said fourth clutch forming a hydraulic servo of said fourth clutch when said fourth clutch engages.

59. The vehicular automatic transmission as set forth in claim 54, wherein:

the hydraulic servo of said third clutch, the hydraulic servo of said first clutch, a hydraulic servo of said fourth clutch and said reduction planetary gear are disposed on the boss portion extending from the case in order from a side of a joint of the boss portion with the case in an axial direction; and operating fluid is supplied to the hydraulic servo of said third clutch, the hydraulic servo of said first clutch and the hydraulic servo of said fourth clutch respectively from oil passages provided within the boss portion.

60. The vehicular automatic transmission as set forth in claim 59, wherein said first braking means is disposed axially between said reduction planetary gear and said planetary gear set.

61. The vehicular automatic transmission as set forth in claim 1, wherein a hydraulic servo of said first clutch is disposed axially on an opposite side of said planetary gear set to said reduction planetary gear; and a hydraulic servo of said third clutch is disposed between said reduction planetary gear and said planetary gear set.

62. The vehicular automatic transmission as set forth in claim 61, wherein said second clutch is disposed axially on an opposite side of said planetary gear set to said reduction planetary gear.

63. The vehicular automatic transmission as set forth in claim 61, wherein said second clutch is disposed axially between said reduction planetary gear and said planetary gear set.

64. The vehicular automatic transmission as set forth in claim 61, wherein the reduced rotation of said reduction planetary gear is inputted to a clutch drum of said first clutch forming a hydraulic servo of said first clutch when said first clutch engages.

65. The vehicular automatic transmission as set forth in claim 61, wherein the reduced rotation of said reduction planetary gear is inputted to a clutch drum of said third clutch forming a hydraulic servo of said third clutch when said third clutch engages.

66. The vehicular automatic transmission as set forth in claim 61, wherein an inputted rotation of the input shaft is inputted to a clutch drum of said fourth clutch forming a hydraulic servo of said fourth clutch when said fourth clutch engages.

67. The vehicular automatic transmission as set forth in claim 1, wherein a hydraulic servo of said first clutch is disposed axially on an opposite side of said planetary gear set to said reduction planetary gear; and a hydraulic servo of said third clutch is disposed on an opposite side of said reduction planetary gear from said planetary gear set.

68. The vehicular automatic transmission as set forth in claim 67, wherein said second clutch is disposed axially on an opposite side of said planetary gear set to said reduction planetary gear.

69. The vehicular automatic transmission as set forth in claim 67, wherein said second clutch is disposed axially between said reduction planetary gear and said planetary gear set.

70. The vehicular automatic transmission as set forth in claim 67, wherein the reduced rotation of said reduction planetary gear is inputted to a clutch drum of said first clutch forming the hydraulic servo of said first clutch when said first clutch engages.

71. The vehicular automatic transmission as set forth in claim 67, wherein the reduced rotation of said reduction planetary gear is inputted to a clutch drum of said third clutch forming the hydraulic servo of said third clutch when said third clutch engages.

72. The vehicular automatic transmission as set forth in claim 67, wherein an inputted rotation of the input shaft is inputted to a clutch drum of said fourth clutch forming a hydraulic servo of said fourth clutch when said fourth clutch engages.

73. The vehicular automatic transmission as set forth in claim 1, wherein:

said planetary gear set has a second sun gear, a third sun gear, a third pinion gear engaging with said third sun gear, a fourth pinion gear engaging with said second sun gear and with said third pinion gear, a carrier rotatably supporting said third and fourth pinion gears, and a ring gear engaging with said fourth pinion gear;

said first rotary element consists of said second sun gear;

said second rotary element consists of said third sun gear;

said third rotary element consists of said second carrier; and said fourth rotary element consists of said second ring gear.

74. The vehicular automatic transmission as set forth in claim 73, wherein said planetary gear set is a Ravigneoux type planetary gear in which said second ring gear is disposed on one side of an outer peripheral side; and a friction plate of the second braking means is disposed on an other side of the outer peripheral side of said planetary gear set.

75. The vehicular automatic transmission as set forth in claim 1, wherein said output member is a counter gear that transmits a rotation to a shaft parallel with the input shaft.

76. The vehicular automatic transmission as set forth in claim 75, further comprising a support wall fixed to the case, wherein said counter gear and the support wall for supporting said counter gear are disposed axially between said reduction planetary gear and said planetary gear set.

77. The vehicular automatic transmission as set forth in claim 75, wherein said counter gear is disposed axially on an opposite side of said planetary gear set to said reduction planetary gear.

78. The vehicular automatic transmission as set forth in claim 77, wherein said counter gear is disposed axially at an end position on an opposite side from said input shaft within said case.

79. The vehicular automatic transmission as set forth in claim 77, wherein said counter gear is disposed axially at an end position on the side of said input shaft within said case.

80. The vehicular automatic transmission as set forth in claim 77, wherein said counter gear is disposed on the boss portion which extends from the side wall of said case axially on an opposite side of said planetary gear unit to said reduction planetary gear.

81. The vehicular automatic transmission as set forth in claim 80, wherein said counter gear is disposed axially at an end position on an opposite side from said input shaft within said case.

* * * * *